(12) United States Patent
Bourassa et al.

(10) Patent No.: US 10,800,663 B2
(45) Date of Patent: Oct. 13, 2020

(54) PROCESSES FOR PREPARING LITHIUM CARBONATE

(71) Applicant: NEMASKA LITHIUM INC., Québec (CA)

(72) Inventors: Guy Bourassa, Québec (CA); Gary Pearse, Ottawa (CA); Stephen Charles Mackie, Peterborough (CA); Mykolas Gladkovas, Toronto (CA)

(73) Assignee: NEMASKA LITHIUM INC., Québec (CA)

( * ) Notice: Subject to any disclaimer, the term of this patent is extended or adjusted under 35 U.S.C. 154(b) by 320 days.

(21) Appl. No.: 15/861,587

(22) Filed: Jan. 3, 2018

(65) Prior Publication Data

US 2018/0222762 A1    Aug. 9, 2018

Related U.S. Application Data

(63) Continuation of application No. 15/190,296, filed on Jun. 23, 2016, now Pat. No. 9,890,053, which is a
(Continued)

(51) Int. Cl.
*C01D 15/08* (2006.01)
*C25B 15/08* (2006.01)
*C25B 1/16* (2006.01)

(52) U.S. Cl.
CPC .............. *C01D 15/08* (2013.01); *C25B 1/16* (2013.01); *C25B 15/08* (2013.01)

(58) Field of Classification Search
CPC ............ C01D 15/08; C25B 15/08; C25B 1/16
See application file for complete search history.

(56) References Cited

U.S. PATENT DOCUMENTS 2,331,838 A   10/1943  Lindblad et al.
2,516,109 A    7/1950  Ellestad et al.
(Continued)

FOREIGN PATENT DOCUMENTS

AU    2012211033    8/2012
AU    2012261548    1/2013
(Continued)

OTHER PUBLICATIONS

English Abstract of *Helmold* v. *Plessen*, Heinz Kau, "Utilization of sodium sulphate", Chem.-Ing.-Tech. 61 (1989) 12, pp. 933-940. (The year of publication is sufficiently earlier than the effective U.S. filed so that the particular month of publication is not an issue).
(Continued)

*Primary Examiner* — Daniel C. McCracken
(74) *Attorney, Agent, or Firm* — Bereskin & Parr LLP/S.E.N.C.R.L., s.r.l.

(57) ABSTRACT

There are provided methods for preparing lithium carbonate. For example, such methods can comprise reacting an aqueous composition comprising lithium hydroxide with $CO_2$ by sparging the $CO_2$ the said composition, thereby obtaining a precipitate comprising the lithium carbonate. The methods can also comprise inserting at least a portion of the precipitate into a clarifier and obtaining a supernatant comprising lithium bicarbonate and a solid comprising the lithium carbonate, separating the solid from the supernatant; and heating the supernatant at a desired temperature so as to at least partially convert the lithium bicarbonate into lithium carbonate.

20 Claims, 66 Drawing Sheets

Related U.S. Application Data continuation of application No. 14/404,466, filed as application No. PCT/CA2013/000526 on May 30, 2013, now Pat. No. 9,382,126.

(60) Provisional application No. 61/653,035, filed on May 30, 2012, provisional application No. 61/767,328, filed on Feb. 21, 2013.

(56) References Cited

U.S. PATENT DOCUMENTS

| | | |
|---|---|---|
| 2,793,941 A | 5/1957 | Estes |
| 2,872,393 A | 2/1959 | Gardiner et al. |
| 3,007,771 A | 11/1961 | Mazza et al. |
| 3,214,362 A | 10/1965 | Juda |
| 3,597,340 A | 8/1971 | Honeycutt et al. |
| 3,857,920 A | 12/1974 | Grantham et al. |
| 3,899,403 A | 8/1975 | Cook, Jr. et al. |
| 4,035,713 A | 7/1977 | Kawamoto et al. |
| 4,036,713 A | 7/1977 | Brown |
| 4,207,297 A | 6/1980 | Brown et al. |
| 4,273,628 A | 6/1981 | Kidon et al. |
| 4,287,163 A | 9/1981 | Garrett et al. |
| 4,391,680 A | 7/1983 | Mani et al. |
| 4,561,945 A | 12/1985 | Coker et al. |
| 4,707,234 A | 11/1987 | Mori et al. |
| 4,723,962 A | 2/1988 | Mehta |
| 4,806,215 A | 2/1989 | Twardowski |
| 4,999,095 A | 3/1991 | Chlanda et al. |
| 5,098,532 A | 3/1992 | Thompson et al. |
| 5,129,936 A | 7/1992 | Wilson |
| 5,198,080 A | 3/1993 | Cowley et al. |
| 5,198,081 A | 3/1993 | Kanoh et al. |
| 5,227,031 A | 7/1993 | Sundblad |
| 5,246,551 A | 9/1993 | Pletcher et al. |
| 5,258,106 A | 11/1993 | Habermann et al. |
| 5,423,959 A | 6/1995 | Sundblad et al. |
| 5,445,717 A | 8/1995 | Karki et al. |
| 5,595,641 A | 1/1997 | Traini et al. |
| 6,004,445 A | 12/1999 | Genders et al. |
| 6,048,507 A | 4/2000 | Amouzegar et al. |
| 6,306,787 B1 | 10/2001 | Sato et al. |
| 6,331,236 B1 | 12/2001 | Mani |
| 6,375,824 B1 | 4/2002 | Phinney |
| 6,514,311 B1 | 2/2003 | Lin et al. |
| 6,514,640 B1 | 2/2003 | Armand et al. |
| 6,547,836 B1 | 4/2003 | Lukes |
| 6,592,832 B1 | 7/2003 | Friedrich et al. |
| 6,770,187 B1 | 8/2004 | Putter et al. |
| 7,192,564 B2 | 3/2007 | Cardarelli et al. |
| 8,431,005 B1 | 4/2013 | Zbranek et al. |
| 8,715,482 B2 | 5/2014 | Amendola et al. |
| 8,936,770 B2 | 1/2015 | Burba, III |
| 9,255,011 B2 | 2/2016 | Kawata et al. |
| 9,255,012 B2 | 2/2016 | Tiihonen et al. |
| 9,382,126 B2 | 7/2016 | Bourassa et al. |
| 9,447,480 B2 | 9/2016 | Vaughan et al. |
| 9,493,881 B2 | 11/2016 | Kosmoski et al. |
| 9,677,181 B2 | 6/2017 | Bourassa et al. |
| 10,036,094 B2 | 7/2018 | Magnan et al. |
| 10,544,512 B2 | 1/2020 | Magnan et al. |
| 2001/0040093 A1 | 11/2001 | Mani |
| 2005/0051488 A1 | 3/2005 | Nagghappan et al. |
| 2011/0044882 A1 | 2/2011 | Buckley et al. |
| 2011/0123427 A1 | 5/2011 | Boryta et al. |
| 2011/0200508 A1 | 8/2011 | Harrison et al. |
| 2011/0203929 A1 | 8/2011 | Buckley et al. |
| 2012/0107210 A1 | 5/2012 | Harrison et al. |
| 2014/0010743 A1 | 1/2014 | Kosmoski et al. |
| 2014/0023572 A1 | 1/2014 | Vaughan et al. |
| 2015/0364761 A1 | 12/2015 | Fukui et al. |
| 2016/0032471 A1 | 2/2016 | Magnan et al. |
| 2016/0258071 A1 | 9/2016 | Magnan et al. |
| 2016/0304988 A1 | 10/2016 | Vaughan et al. |

FOREIGN PATENT DOCUMENTS

| | | |
|---|---|---|
| CA | 504477 | 7/1954 |
| CA | 659894 | 3/1963 |
| CA | 1073847 | 3/1980 |
| CA | 1272982 | 8/1990 |
| CA | 2205199 | 1/1997 |
| CA | 2205493 | 1/1997 |
| CA | 2786317 | 7/2011 |
| CA | 2796849 | 10/2011 |
| CA | 2820112 | 6/2012 |
| CA | 2825583 | 8/2012 |
| CN | 103086405 | 5/2013 |
| CN | 106315625 | 1/2017 |
| CN | 106365181 | 2/2017 |
| GB | 530028 | 12/1940 |
| GB | 841989 | 7/1960 |
| GB | 845511 | 8/1960 |
| JP | 5795826 | 6/1982 |
| JP | 2013173629 | 9/2013 |
| JP | 2013227180 | 11/2013 |
| SU | 310538 | 8/1974 |
| WO | 9859385 | 12/1998 |
| WO | 2010056322 | 5/2010 |
| WO | 2010103173 | 9/2010 |
| WO | 2011133165 | 10/2011 |
| WO | 2011148040 | 12/2011 |
| WO | 2011156861 | 12/2011 |
| WO | 2013140039 | 9/2013 |
| WO | 2013159194 | 10/2013 |
| WO | 2013182749 | 12/2013 |
| WO | 2014040138 | 3/2014 |
| WO | 2015058287 | 4/2015 |
| WO | 2015081385 | 6/2015 |
| WO | 2015123762 | 8/2015 |
| WO | 2013153692 | 12/2015 |
| WO | 2017144469 | 8/2017 |
| WO | 2017157906 | 9/2017 |
| WO | 2018234614 | 12/2018 |

OTHER PUBLICATIONS

Ulrich Joachim, "Crystallization", Kirk Othmer Encyclopedia of Chemical Technology, vol. 8 (Aug. 16, 2002), pp. 95-147.

English Abstract—Machine Translation of JP2013227180A, "Method for Producing Lithium Sulfide", published on Nov. 7, 2013.

English Abstract—Machine Translation of JPS5798826A, "Manufacture of High Purity Lithium Salt of Mineral Acid", published on Jun. 14, 1982.

English Abstract of JP2009270188(A), "Method of Manufacturing High-Purity Lithium Hydroxide", published on Nov. 19, 2009.

English Abstract of JPS5443174(A), "Preparation of Lithium Hydroxide", Published on Apr. 5, 1979.

English Abstract of JP2009270189(A), "Method of Manufacturing High-Purity Lithium Hydroxide", published on Nov. 19, 2009.

English Abstract of JP2011031232(A), "Method of Manufacturing Lithium Hydroxide", published on Feb. 17, 2011.

Walesh, S.G. (Feb. 21, 1989) Sedimentation Basin Design, in Urban Surface Water Management, pp. 297-313, John Wiley & Sons, Inc., Hoboken, NJ, USA, DOI: 10.002/9780470172810.

English Abstract of China Lithium Products Tech. Co., Ltd., "Lithium Hydroxide Purified Grade", Published on Jun. 6, 2011.

English Abstract of Scribd, "Extraction, Properties and Use of Lithium", Published on Feb. 2, 2009.

English Abstract of Sun et al., "Preparation of Li2CO3 by Gas-Liquid Reactive Crystallization of LiOH and CO2", Published on Jan. 31, 2012.

English Abstract of CN102030346 (A), "Preparation method for lithium carbonate", Published on Apr. 27, 2011.

English Abstract of JP62161973A, "Production of High-Purity Lithium Carbonate", Published on Jul. 17, 1987.

English Abstract of JP2004196606(A), "Method for Manufacturing High Purity Lithium Carbonate", Published on Jul. 15, 2004.

English Abstract of JP2004196607(A), "Method for Manufacturing High Purity Lithium Carbonate", Published on Jul. 15, 2004.

(56) References Cited

OTHER PUBLICATIONS

English Abstract of JP2009046390(A), "Production Method of High Purity Lithium Carbonate", Published on Mar. 5, 2009.
English Abstract of JP2009057278(A), "Method of Manufacturing High Purity Lithium Carbonate", Published on Mar. 19, 2009.
English Abstract of JP2010029797 (A), "Lithium Isotope Separation and Condensation Method, Apparatus, Measure, Lithium Ion Selective Permeation Membrane, and Lithium Isotope Concentrate", Published on Feb. 12, 2010.
English Abstract of KR20130092323(A), "Lithium Compound Recovering Device, Method for Recovering Lithium Compound and Lithium Compound Recovering System", published on Aug. 20, 2013.
Ryabtsev et al., "Preparation of High-Purity Lithium Hydroxide Monohydrate from Technical-Grade Lithium Carbonate by Membrane Electrolysis", Russian Journal of Applied Chemistry, vol. 77, No. 7, Feb. 2004, pp. 1108-1116.
English Abstract of JPWO2012153692(A1), "Method for collecting lithium", published on Dec. 17, 2015.
English Abstract of CL2012002968, "Method for the preparation of lithium carbonate from brines containing lithium chloride which comprises contacting the salt with sodium hydroxide and then contacting with carbon dioxide", published on Jan. 11, 2013.
English Translation—Machine Generated—Description of SU310538, published on Aug. 5, 1974.
Tipping et al., "Conditions Required for the Precipitation of Aluminium in Acidic Natural Waters", Wat. Res. vol. 22, No. 3, pp. 585-592, 1988. (The year of publication is sufficiently earlier than the effective U.S. filed so that the particular month of publication is not an issue).
English Translation—Machine Translation of JP2013173629(A), "Method of Producing High-Purity Lithium Hydroxide", published on Sep. 5, 2013.
Abstract, Tipping et al., "Conditions required for the precipitation of aluminium in acidic natural water", Water Research, vol. 22, Issue 5, May 1988, pp. 585-592.
English Translation—Machine Translation of CN106315625(A), "Method for composite production of high-purity lithium hydroxide monohydrate, high purity lithium carbonate and battery grade lithium carbonate", published on Jan. 11, 2017.
English Translation—Machine Translation of CN106335181(A), "Method of preparing battery-grade lithium carbonate from lithium-rich solution being high in content of impurities", published on Feb. 1, 2017.
Ogawa et al., "Effects of the Chemical Compositions of Salars de Uyuni and Atacama Brines on Lithium Concentration during Evaporation", Resource Geology vol. 64, No. 2: 91-101, Jan. 20, 2014.
Abstract of PH12013501570A1, "Improved method of ore processing" published on Sep. 30, 2013.
English Translation—Machine Translation of JPWO2013153692, "Method for Collecting Lithium", published on Dec. 17, 2015.
Rjabtsev A.D. et al., Abstract and Figure 1 of RU2196735C1, "Process of Extracting Monohydrate of High-Purity Lithium Hydroxide From Materials Containing Lithium Carbonate", Published on Jan. 20, 2003.
Rjabtsev A.D. et al., English Translation of Abstract and Figure 1 of RU2196735C1, "Process of Extracting Monohydrate of High-Purity Lithium Hydroxide From Materials Containing Lithium Carbonate", Published on Jan. 20, 2003.
English Translation—Machine Generated of CN103086505A, "Clean Production Method of Battery Level Lithium Carbonate", Published on May 8, 2013.

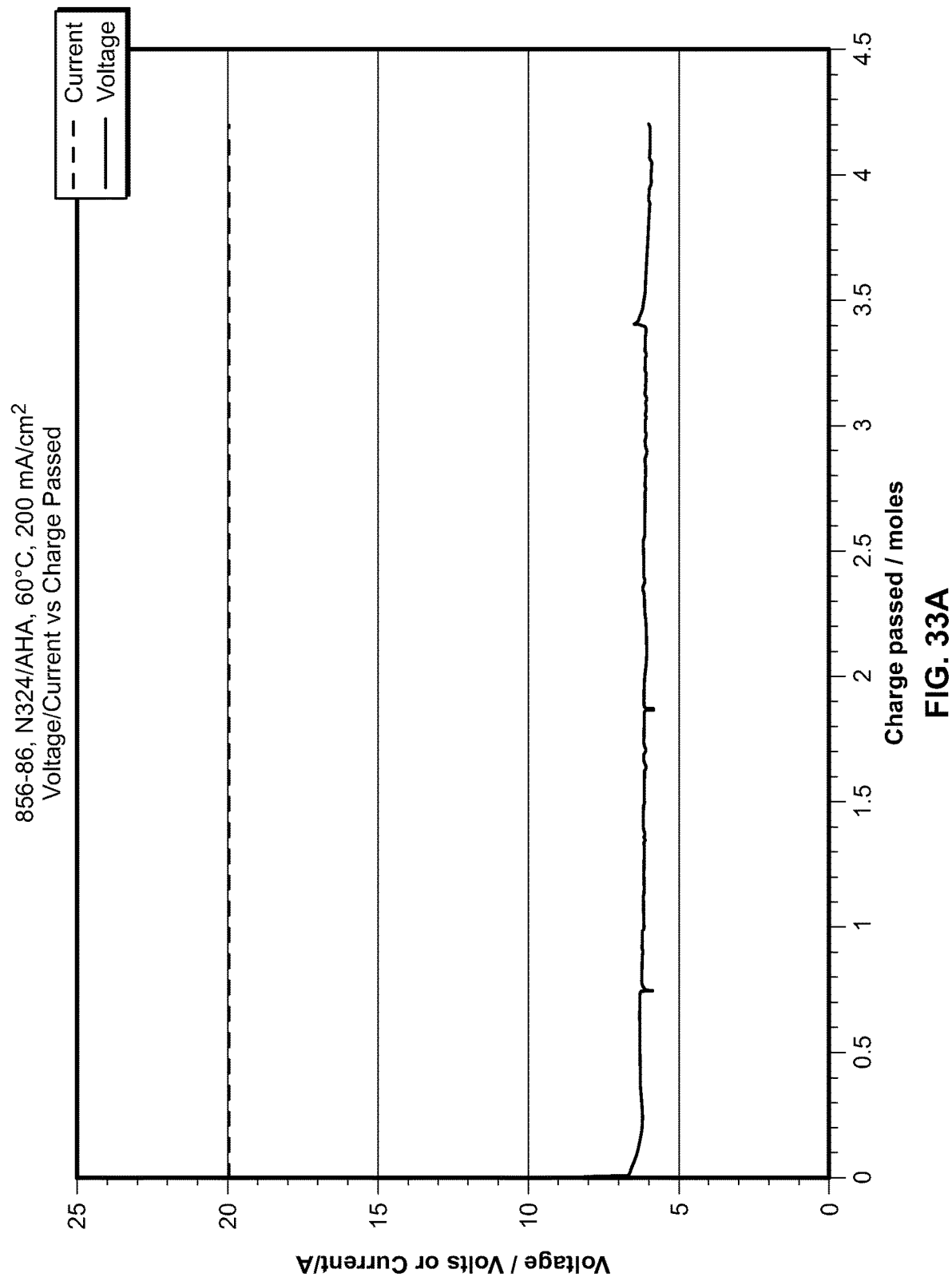

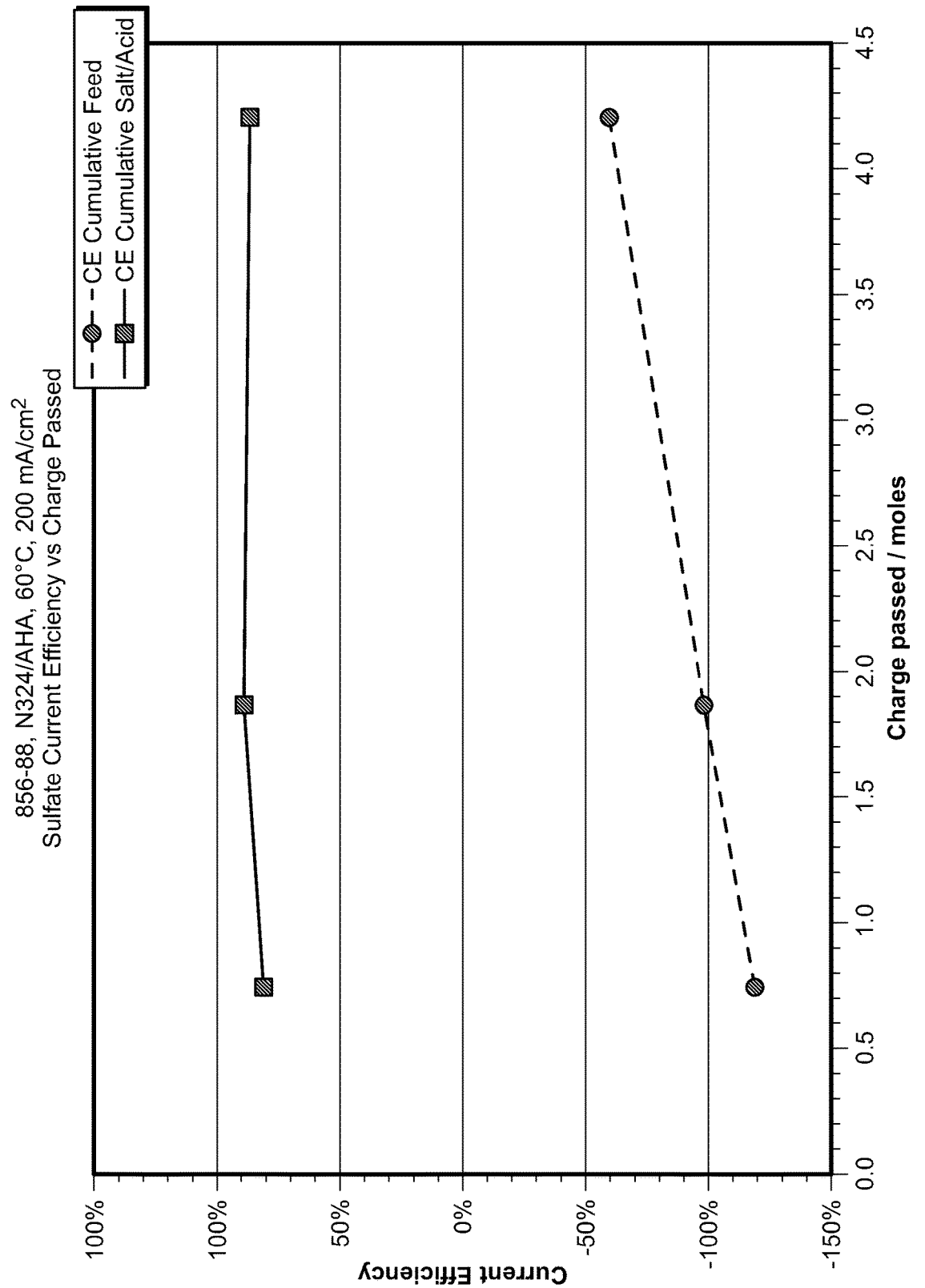

PROCESSES FOR PREPARING LITHIUM CARBONATE

The present application is a continuation of U.S. patent application Ser. No. 14/404,466 filed on Nov. 27, 2014, that is a 35 USC 371 national stage entry of PCT/CA2013/000526 filed on May 30, 2013 and which claims priority on U.S. 61/653,035 filed on May 30, 2012 and U.S. 61/767,328 filed on Feb. 21, 2013. These documents are hereby incorporated by reference in their entirety.

The present disclosure relates to improvements in the field of chemistry applied to the manufacture of lithium carbonate. For example, such processes are useful for preparing lithium carbonate from lithium-containing materials. For example, the disclosure also relates to the production of other lithium products such as lithium hydroxide and lithium sulphate.

The demand for lithium carbonate is growing rapidly. The market for lithium carbonate is expanding and the current world production capacity will likely not meet the expected increase in demand. For example, lithium carbonate is used as an additive in aluminum molten salt electrolysis and in enamels and glasses. Lithium carbonate can also be used to control manic depression, in the production of electronic grade crystals of lithium niobate, tantalate and fluoride as well as in the emerging technology of lithium batteries.

Lithium batteries have become the battery of choice in several existing and proposed new applications due to their high energy density to weight ratio, as well as their relatively long useful life when compared to other types of batteries. Lithium batteries are used for several applications such as laptop computers, cell phones, medical devices and implants (for example cardiac pacemakers). Lithium batteries are also an interesting option in the development of new automobiles, e.g., hybrid and electric vehicles, which are both environmentally friendly and "green" because of the reduced emissions and decreased reliance on hydrocarbon fuels.

High purity can be required for lithium carbonate that is used, for example, for various battery applications. There is a limited number of lithium carbonate producers. As a direct result of increased demand for lithium products, battery manufacturers are looking for additional and reliable sources of high quality lithium products, for example lithium carbonate.

Few methods have been proposed so far for preparing lithium carbonate. Lithium carbonate can be prepared, for example by using lithium-containing brines or using sea water. Some proposed methods involve several purifying steps of the produced lithium carbonate. For example, methods have been proposed that require precipitation with sodium carbonate and involve several purifying steps of the produced lithium carbonate.

There is thus a need for providing an alternative to the existing solutions for preparing lithium carbonate.

According to one aspect, there is provided a process for preparing lithium carbonate, the process comprising:
  reacting an aqueous composition comprising lithium hydroxide with $CO_2$ by sparging the $CO_2$ into the composition, the sparging being carried out at a pH of about 10 to about 12.5, thereby obtaining a precipitate comprising the lithium carbonate;
  inserting at least a portion of the precipitate into a clarifier and obtaining a supernatant comprising lithium bicarbonate and a solid comprising the lithium carbonate, separating the solid from the supernatant; and
  heating the supernatant at a temperature of at least about 85° C. so as to at least partially convert the lithium bicarbonate into lithium carbonate.

According to another aspect, there is provided a process for preparing lithium carbonate, the process comprising:
  submitting an aqueous composition comprising a lithium compound to an electrodialysis or electrolysis under conditions suitable for converting at least a portion of the lithium compound into lithium hydroxide, wherein during the electrodialysis or electrolysis, the aqueous composition comprising the lithium compound is at least substantially maintained at a pH having a value of about 9.5 to about 12.5; and
  converting the lithium hydroxide into lithium carbonate.

According to another aspect, there is provided a process for preparing lithium carbonate, the process comprising:
  submitting an aqueous composition comprising a lithium compound to an electrodialysis or electrolysis under conditions suitable for converting at least a portion of the lithium compound into lithium hydroxide, wherein during the electrodialysis or electrolysis, the aqueous composition comprising the lithium compound has a pH of greater than 7; and
  converting the lithium hydroxide into lithium carbonate.

According to another aspect, there is provided a process for preparing lithium carbonate, the process comprising
  leaching an acid roasted lithium-containing material with water so as to obtain an aqueous composition comprising $Li^+$ and at least one metal ion;
  reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;
  optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;
  contacting the aqueous composition comprising $Li^+$ and having a reduced content of the at least one metal ion with an ion exchange resin so as to at least partially remove at least one metal ion from the composition, thereby obtaining an aqueous composition comprising a lithium compound;
  submitting the aqueous composition comprising the lithium compound to an electrodialysis or electrolysis under conditions suitable for converting at least a portion of the lithium compound into lithium hydroxide; and
  converting the lithium hydroxide into lithium carbonate.

According to another aspect, there is provided a process for preparing lithium carbonate, the process comprising
  leaching a base-baked lithium-containing material with water so as to obtain an aqueous composition comprising $Li^+$ and at least one metal ion;

reacting the aqueous composition comprising Li$^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising Li$^+$ and having a reduced content of the at least one metal ion, and separating the aqueous composition from the precipitate;

optionally reacting the aqueous composition comprising Li$^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising Li$^+$ and having a reduced content of the at least one metal ion, and separating the aqueous composition from the precipitate;

contacting the aqueous composition comprising Li$^+$ and having a reduced content of the at least one metal ion with an ion exchange resin so as to at least partially remove at least one metal ion from the composition, thereby obtaining an aqueous composition comprising a lithium compound;

submitting the aqueous composition comprising the lithium compound to an electrodialysis or electrolysis under conditions suitable for converting at least a portion of the lithium compound into lithium hydroxide; and converting the lithium hydroxide into lithium carbonate.

According to another aspect, there is provided a process for preparing lithium carbonate, the process comprising leaching a base-baked lithium-containing material with water so as to obtain an aqueous composition comprising Li$^+$ and at least one metal ion;

optionally reacting the aqueous composition comprising Li$^+$ and the at least one metal ion with a base so as to obtain a pH of about 4.5 to about 6.5;

at least partially precipitating the at least one metal ion under the form of at least one hydroxide so as to obtain a precipitate comprising the at least one hydroxide and an aqueous composition comprising Li$^+$ and having a reduced content of the at least one metal ion, and separating the aqueous composition from the precipitate;

optionally reacting the aqueous composition comprising Li$^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising Li$^+$ and having a reduced content of the at least one metal ion, and separating the aqueous composition from the precipitate;

contacting the aqueous composition comprising Li$^+$ and having a reduced content of the at least one metal ion with an ion exchange resin so as to at least partially remove at least one metal ion from the composition, thereby obtaining an aqueous composition comprising a lithium compound;

submitting the aqueous composition comprising the lithium compound to an electrodialysis or electrolysis under conditions suitable for converting at least a portion of the lithium compound into lithium hydroxide; and converting the lithium hydroxide into lithium carbonate.

According to another aspect, there is provided a process for preparing lithium carbonate, the process comprising:

submitting an aqueous composition comprising lithium sulphate to an electrodialysis or electrolysis under conditions suitable for converting at least a portion of the lithium sulphate into lithium hydroxide, wherein during the electrodialysis or electrolysis, the aqueous composition comprising lithium sulphate is at least substantially maintained at a pH having a value of about 9.5 to about 12.5; and converting the lithium hydroxide into lithium carbonate.

According to another aspect, there is provided a process for preparing lithium carbonate, the process comprising:

submitting an aqueous composition comprising lithium sulphate to an electrodialysis or electrolysis under conditions suitable for converting at least a portion of the lithium sulphate into lithium hydroxide, wherein during the electrodialysis or electrolysis, the aqueous composition comprising lithium sulphate has a pH of greater than 7; and converting the lithium hydroxide into lithium carbonate.

According to another aspect, there is provided a process for preparing lithium hydroxide, the process comprising:

submitting an aqueous composition comprising a lithium compound to an electrodialysis or electrolysis under conditions suitable for converting at least a portion of the lithium compound into lithium hydroxide.

According to another aspect, there is provided a process for preparing lithium hydroxide, the process comprising:

submitting an aqueous composition comprising a lithium compound to an electrodialysis or electrolysis under conditions suitable for converting at least a portion of the lithium compound into lithium hydroxide, wherein during the electrodialysis or electrolysis, the aqueous composition comprising the lithium compound is at least substantially maintained at a pH having a value of about 9.5 to about 12.5.

According to another aspect, there is provided a process for preparing lithium hydroxide, the process comprising:

submitting an aqueous composition comprising lithium sulphate to an electrodialysis or electrolysis under conditions suitable for converting at least a portion of the lithium sulphate into lithium hydroxide, wherein during the electrodialysis or electrolysis, the aqueous composition comprising lithium sulphate is at least substantially maintained at a pH having a value of about 9.5 to about 12.5.

According to another aspect, there is provided a process for preparing lithium hydroxide, the process comprising:

submitting an aqueous composition comprising a lithium compound to an electrodialysis or electrolysis under conditions suitable for converting at least a portion of the lithium compound into lithium hydroxide, wherein during the electrodialysis or electrolysis, the aqueous composition comprising the lithium compound has a pH of greater than 7.

According to another aspect, there is provided a process for preparing lithium hydroxide, the process comprising:

submitting an aqueous composition comprising lithium sulphate to an electrodialysis or electrolysis under conditions suitable for converting at least a portion of the lithium sulphate into lithium hydroxide, wherein during the electrodialysis or electrolysis, the aqueous composition comprising lithium sulphate has a pH of greater than 7.

According to another aspect, there is provided a process for preparing lithium hydroxide, the process comprising:
leaching an acid roasted lithium-containing material with water so as to obtain an aqueous composition comprising $Li^+$ and at least one metal ion;
reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;
contacting the aqueous composition comprising $Li^+$ and having a reduced content of the at least one metal ion with an ion exchange resin so as to at least partially remove at least one metal ion from the composition, thereby obtaining an aqueous composition comprising a lithium compound; and
submitting the aqueous composition comprising the lithium compound to an electrodialysis or electrolysis under conditions suitable for converting at least a portion of the lithium compound into lithium hydroxide.

According to another aspect, there is provided a process for preparing lithium hydroxide, the process comprising:
leaching a base-baked lithium-containing material with water so as to obtain an aqueous composition comprising $Li^+$ and at least one metal ion;
reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;
optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;
contacting the aqueous composition comprising $Li^+$ and having a reduced content of the at least one metal ion with an ion exchange resin so as to at least partially remove at least one metal ion from the composition, thereby obtaining an aqueous composition comprising a lithium compound; and
submitting the aqueous composition comprising the lithium compound to an electrodialysis or electrolysis under conditions suitable for converting at least a portion of the lithium compound into lithium hydroxide.

According to another aspect, there is provided a process for preparing lithium hydroxide, the process comprising:
leaching a base-baked lithium-containing material with water so as to obtain an aqueous composition comprising $Li^+$ and at least one metal ion;
optionally reacting the aqueous composition comprising $Li^+$ and the at least one metal ion with a base so as to obtain a pH of about 4.5 to about 6.5
at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;
optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;
contacting the aqueous composition comprising $Li^+$ and having a reduced content of the at least one metal ion with an ion exchange resin so as to at least partially remove at least one metal ion from the composition, thereby obtaining an aqueous composition comprising a lithium compound; and
submitting the aqueous composition comprising the lithium compound to an electrodialysis or electrolysis under conditions suitable for converting at least a portion of the lithium compound into lithium hydroxide.

According to another aspect, there is provided a process for preparing lithium hydroxide, the process comprising:
leaching an acid roasted lithium-containing material with water so as to obtain an aqueous composition comprising $Li^+$ and at least one metal ion;
reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising $Li^+$ and having a reduced content of the at least one metal ion, and separating the aqueous composition from the precipitate;
optionally reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising $Li^+$ and having a reduced content of the at least one metal ion, and separating the aqueous composition from the precipitate;
contacting the aqueous composition comprising $Li^+$ and having a reduced content of the at least one metal ion with an ion exchange resin so as to at least partially remove at least one metal ion from the composition, thereby obtaining an aqueous composition comprising a lithium compound; and submitting the aqueous composition comprising the lithium compound to an electrodialysis or electrolysis under conditions suitable for converting at least a portion of the lithium compound into lithium hydroxide.

According to another aspect, there is provided a process for preparing lithium sulphate, the process comprising:

leaching an acid roasted lithium-containing material with water so as to obtain an aqueous composition comprising Li$^+$ and at least one metal ion, wherein the lithium-containing material is a material that has been previously reacted with $H_2SO_4$;

reacting the aqueous composition comprising Li$^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising Li$^+$ and having a reduced content of the at least one metal ion, and separating the aqueous composition from the precipitate; and contacting the aqueous composition comprising Li$^+$ and having a reduced content of the at least one metal ion with an ion-exchange resin so as to at least partially remove at least one metal ion from the composition, thereby obtaining an aqueous composition comprising a lithium sulphate.

According to another aspect, there is provided a process for preparing lithium sulphate, the process comprising:

leaching an acid roasted lithium-containing material with water so as to obtain an aqueous composition comprising Li$^+$ and at least one metal ion, wherein the lithium-containing material is a material that has been previously reacted with $H_2SO_4$;

reacting the aqueous composition comprising Li$^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising Li$^+$ and having a reduced content of the at least one metal ion, and separating the aqueous composition from the precipitate;

optionally reacting the aqueous composition comprising Li$^+$ and having the reduced content of the at least one metal ion with another base so as to obtain a pH of about 9.5 to about 11.5 and with at least one metal carbonate thereby at least partially precipitating at least one metal ion under the form of at least one carbonate so as to obtain a precipitate comprising the at least one carbonate and an aqueous composition comprising Li$^+$ and having a reduced content of the at least one metal ion, and separating the aqueous composition from the precipitate; and contacting the aqueous composition comprising Li$^+$ and having a reduced content of the at least one metal ion with an ion-exchange resin so as to at least partially remove at least one metal ion from the composition, thereby obtaining an aqueous composition comprising a lithium sulphate.

According to another aspect, there is provided a for preparing lithium carbonate, the process comprising:

leaching a base-baked lithium-containing material with water so as to obtain an aqueous composition comprising Li$^+$ and at least one metal ion;

reacting the aqueous composition comprising Li$^+$ and the at least one metal ion with a base so as to obtain a pH of about 4.5 to about 6.5 and thereby at least partially precipitating the at least one metal ion under the form of at least one hydroxide so as to obtain a precipitate comprising the at least one hydroxide and an aqueous composition comprising Li$^+$ and having a reduced content of the at least one metal ion, and separating the aqueous composition from the precipitate;

optionally reacting the aqueous composition comprising Li$^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising Li$^+$ and having a reduced content of the at least one metal ion, and separating the aqueous composition from the precipitate;

contacting the aqueous composition comprising Li$^+$ and having a reduced content of the at least one metal ion with an ion exchange resin so as to at least partially remove at least one metal ion from the composition, thereby obtaining an aqueous composition comprising a lithium compound;

submitting the aqueous composition comprising the lithium compound to an electrodialysis or electrolysis under conditions suitable for converting at least a portion of the lithium compound into lithium hydroxide; and converting the lithium hydroxide into lithium carbonate; or leaching a base-baked lithium-containing material with water so as to obtain an aqueous composition comprising Li$^+$ and at least one metal ion;

optionally reacting the aqueous composition comprising Li$^+$ and the at least one metal ion with a base so as to obtain a pH of about 4.5 to about 6.5;

at least partially precipitating the at least one metal ion under the form of at least one hydroxide so as to obtain a precipitate comprising the at least one hydroxide and an aqueous composition comprising Li$^+$ and having a reduced content of the at least one metal ion, and separating the aqueous composition from the precipitate;

optionally reacting the aqueous composition comprising Li$^+$ and having the reduced content of the at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising the at least one carbonate and an aqueous composition comprising Li$^+$ and having a reduced content of the at least one metal ion, and separating the aqueous composition from the precipitate;

contacting the aqueous composition comprising Li$^+$ and having a reduced content of the at least one metal ion with an ion exchange resin so as to at least partially remove at least one metal ion from the composition, thereby obtaining an aqueous composition comprising a lithium compound;

submitting the aqueous composition comprising the lithium compound to an electrodialysis or electrolysis under conditions suitable for converting at least a portion of the lithium compound into lithium hydroxide; and converting the lithium hydroxide into lithium carbonate.

According to another aspect, there is provided a process for preparing lithium hydroxide, the process comprising:

submitting an aqueous composition comprising lithium sulphate to an electrolysis or electrodialysis under conditions suitable for converting at least a portion of the lithium sulphate into lithium hydroxide, wherein during the electrolysis, the aqueous composition comprising lithium sulphate has a pH of greater than 7.

According to another aspect, there is provided a process for preparing lithium hydroxide, the process comprising:

submitting an aqueous composition comprising a lithium compound to an electrolysis or electrodialysis under conditions suitable for converting at least a portion of the lithium compound into lithium hydroxide, wherein during the electrolysis or electrodialysis, the aqueous composition comprising lithium sulphate has a pH of greater than 7.

In the following drawings, which represent by way of example only, various embodiments of the disclosure:

FIG. 10 describe how an ion exchange resin is used so as to at least partially remove at least one metal ion from the composition;

Figure 28A:
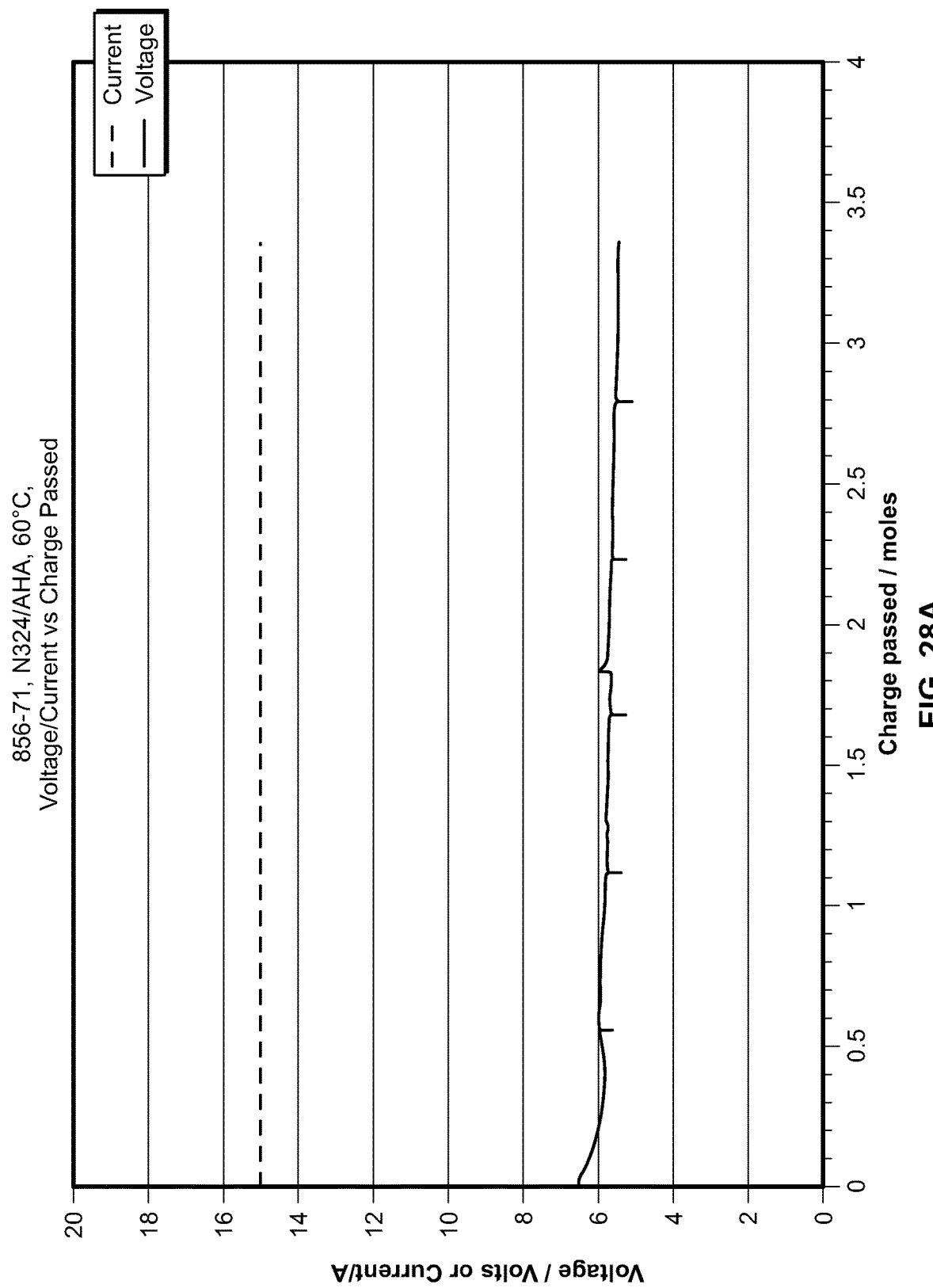
Figure 28B:
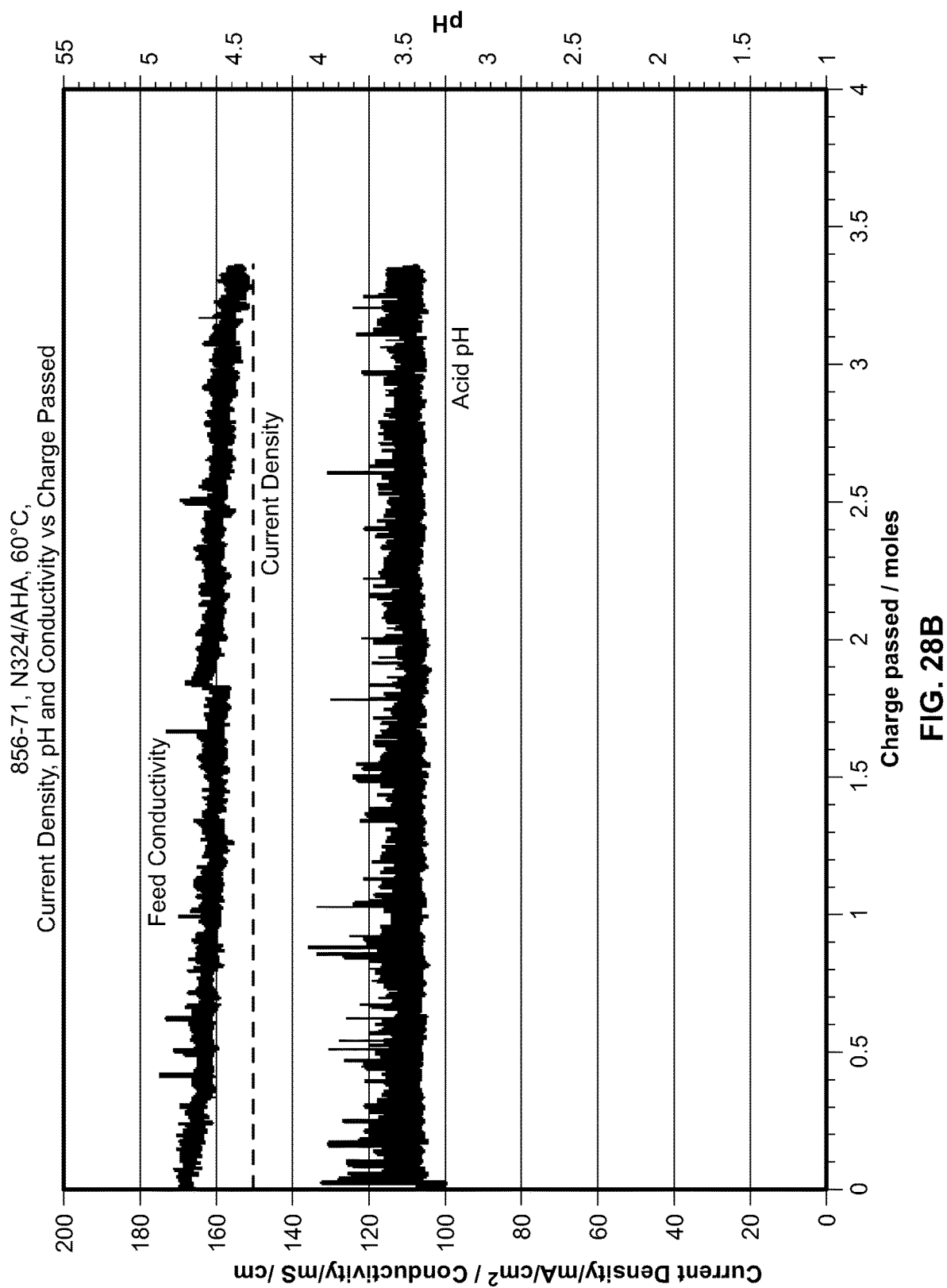
Figure 28C:
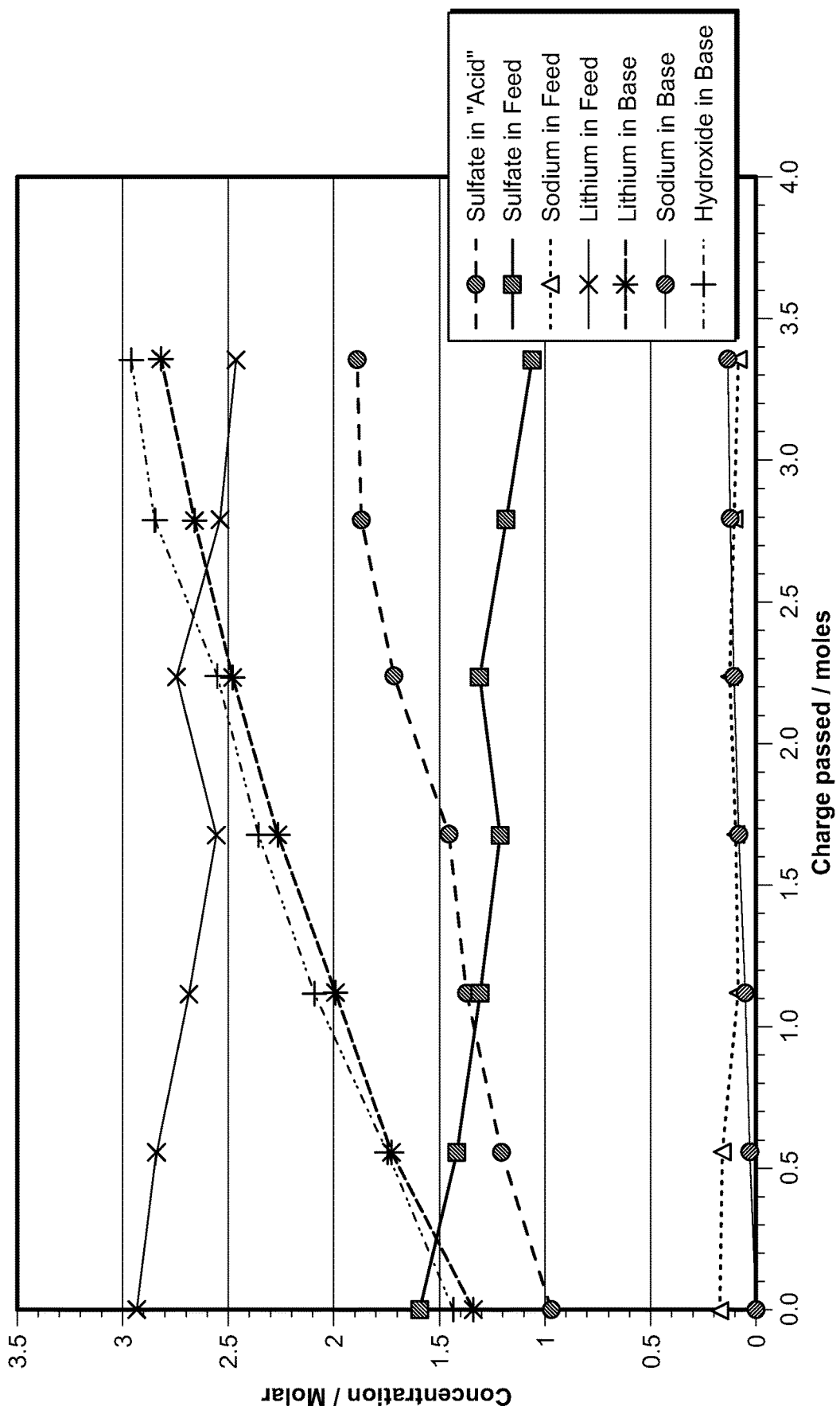
Figure 28D:
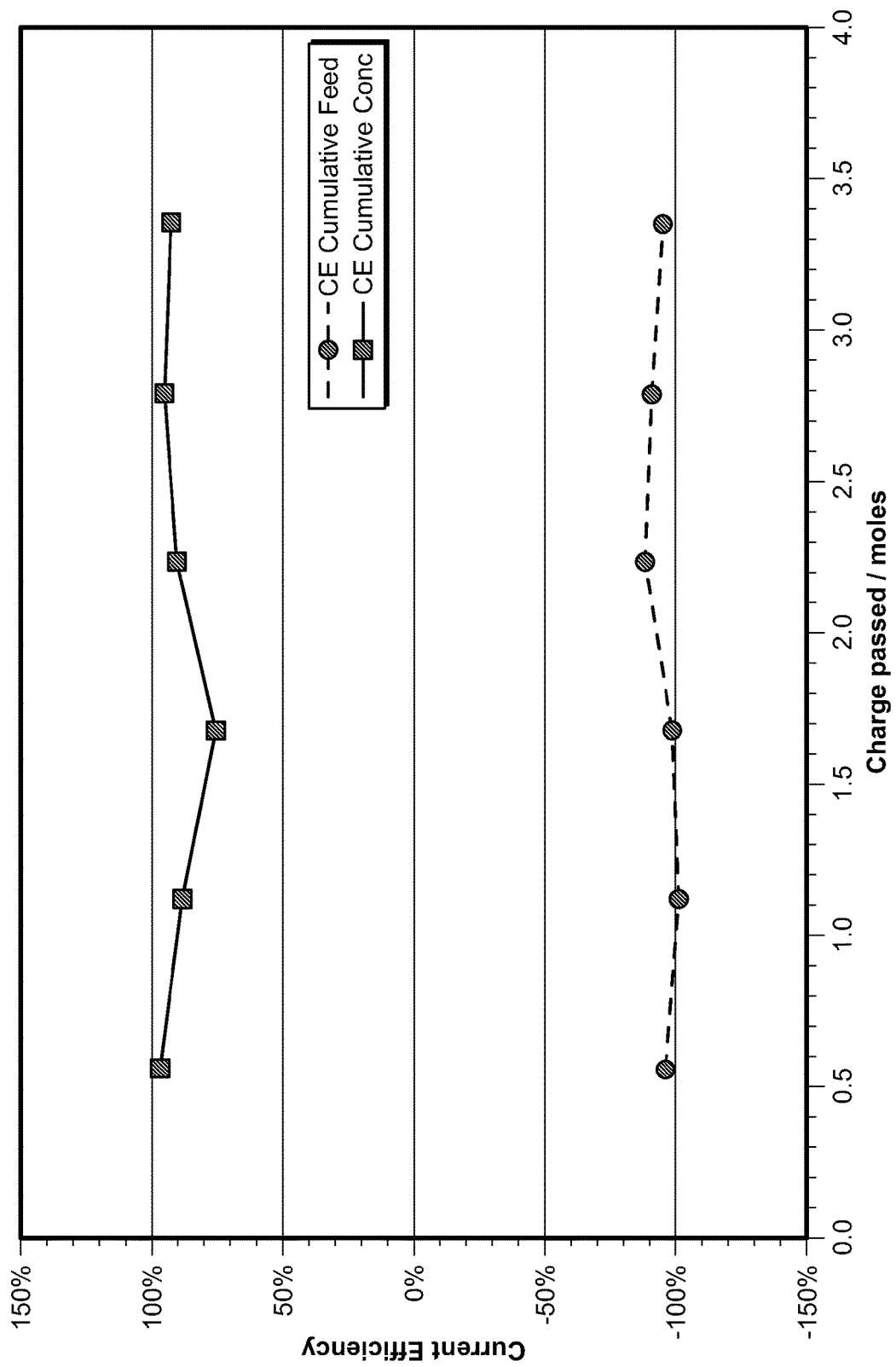
Figure 29A:
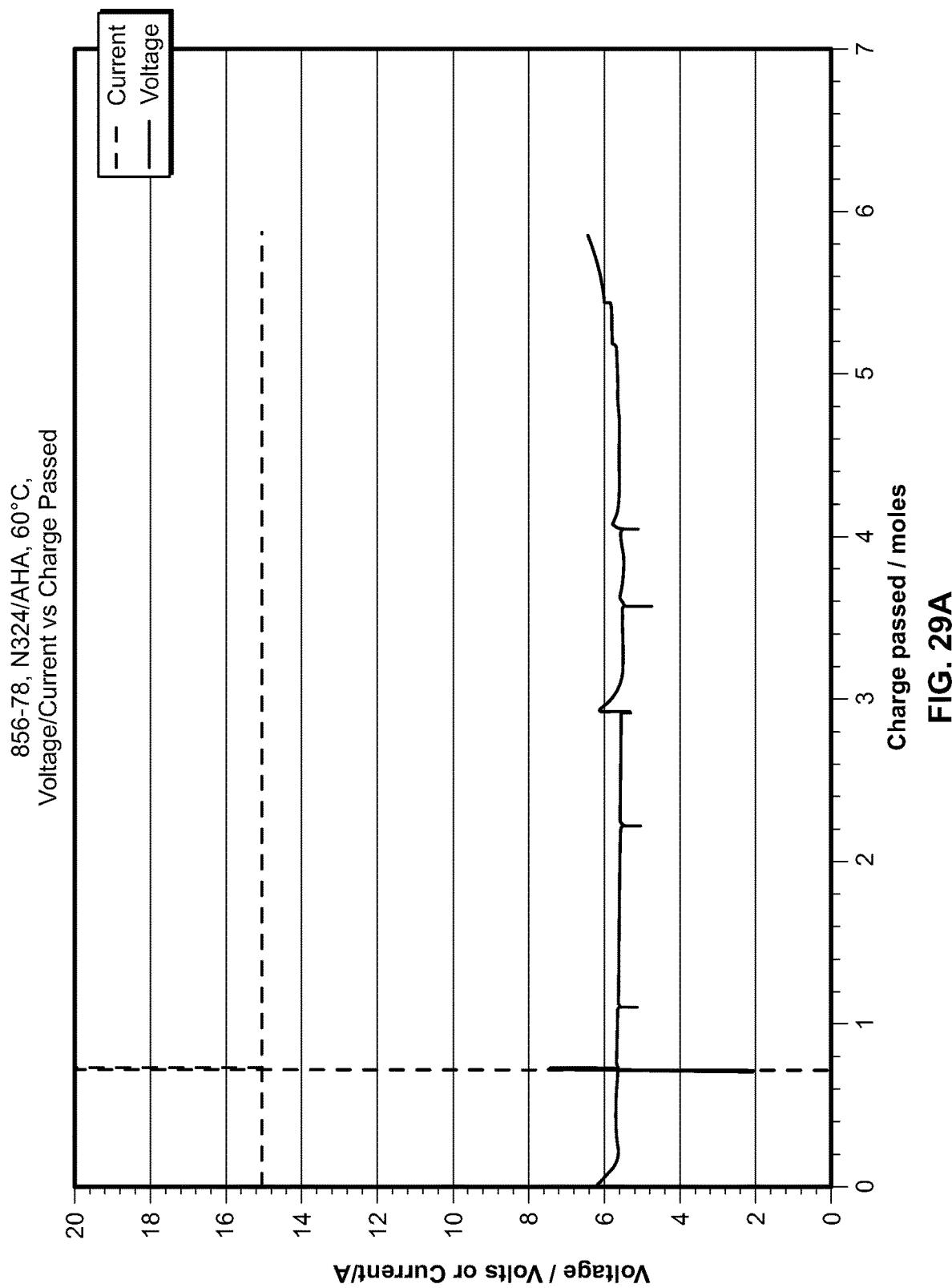
Figure 29B:
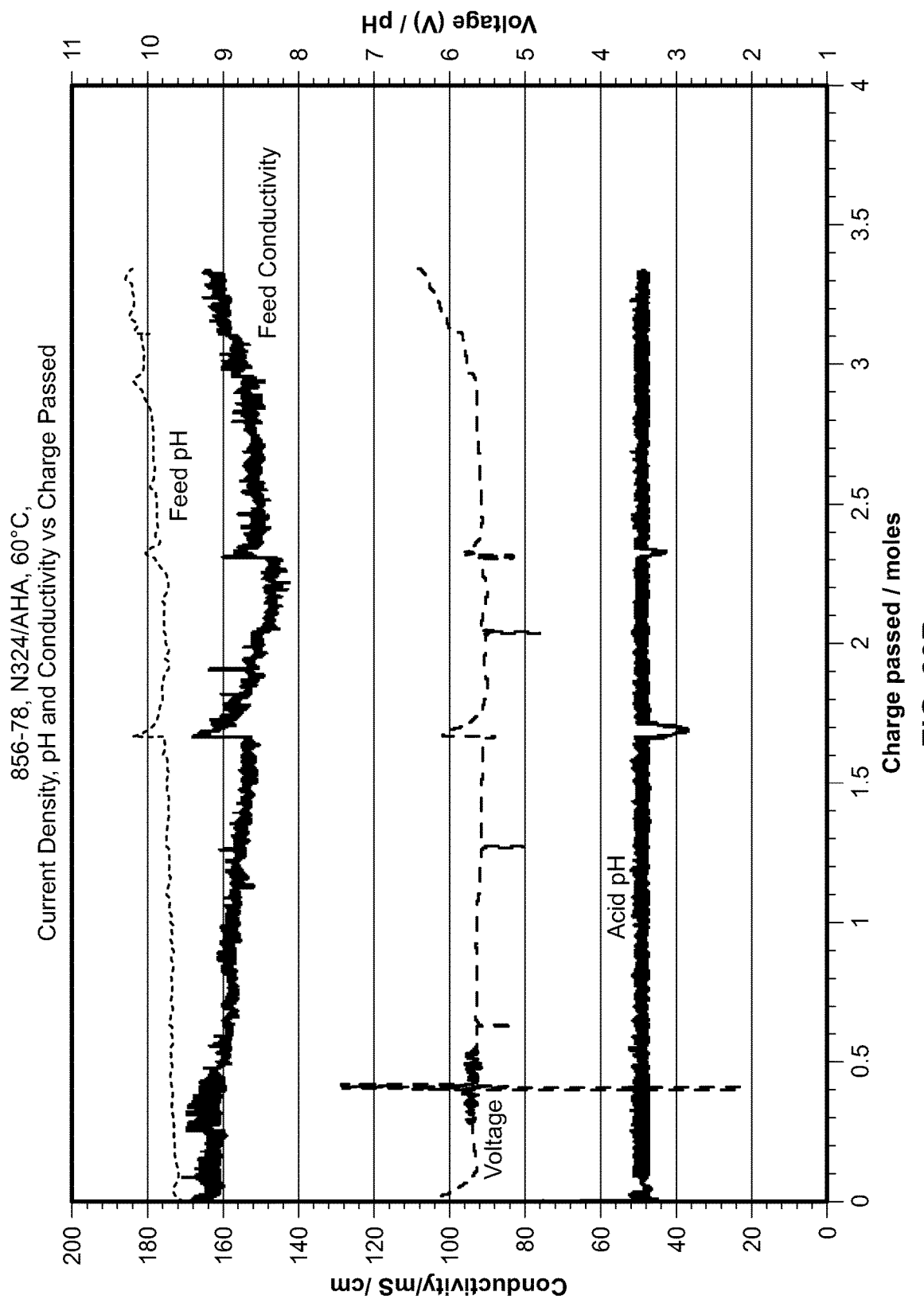
Figure 29C:
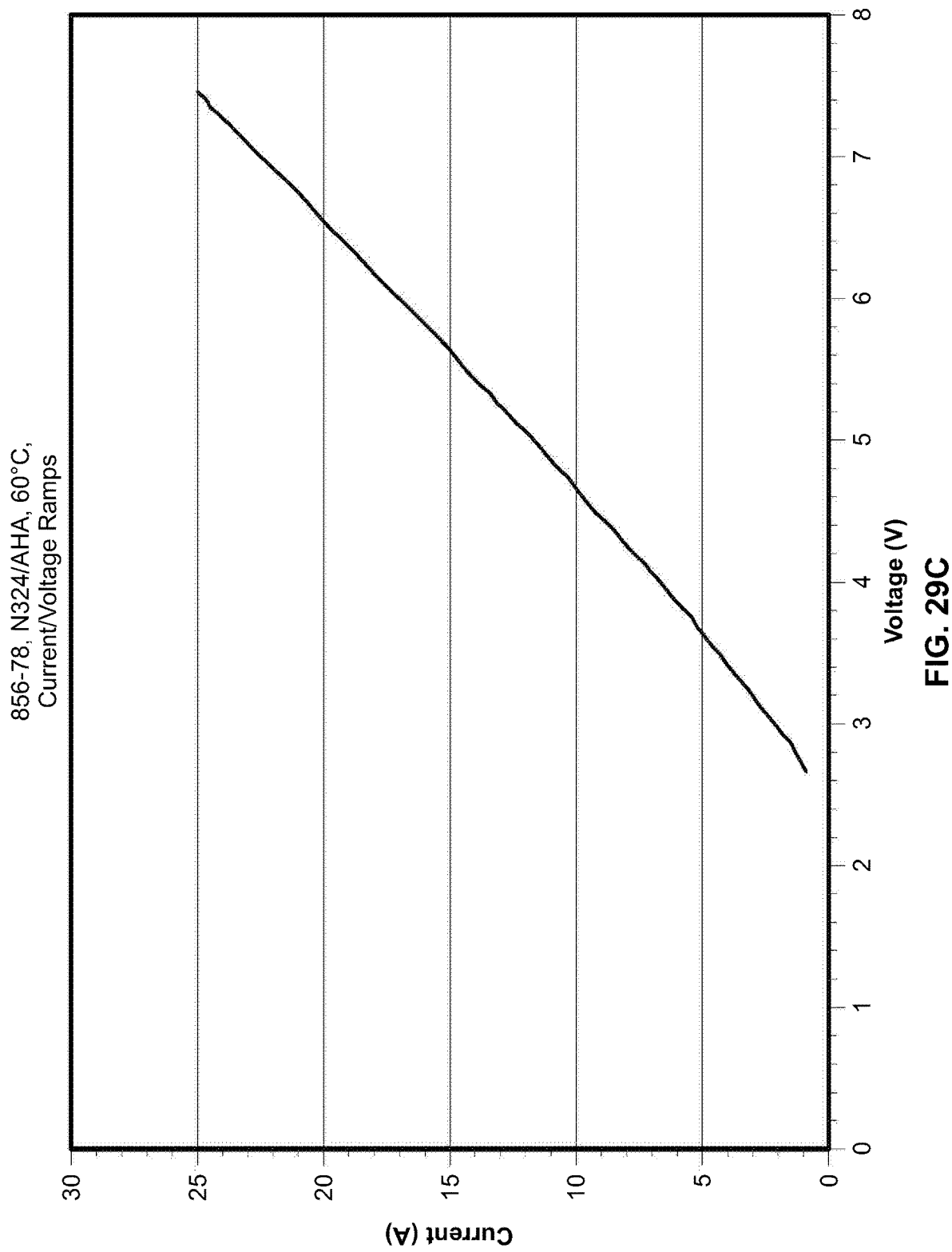
Figure 29D:
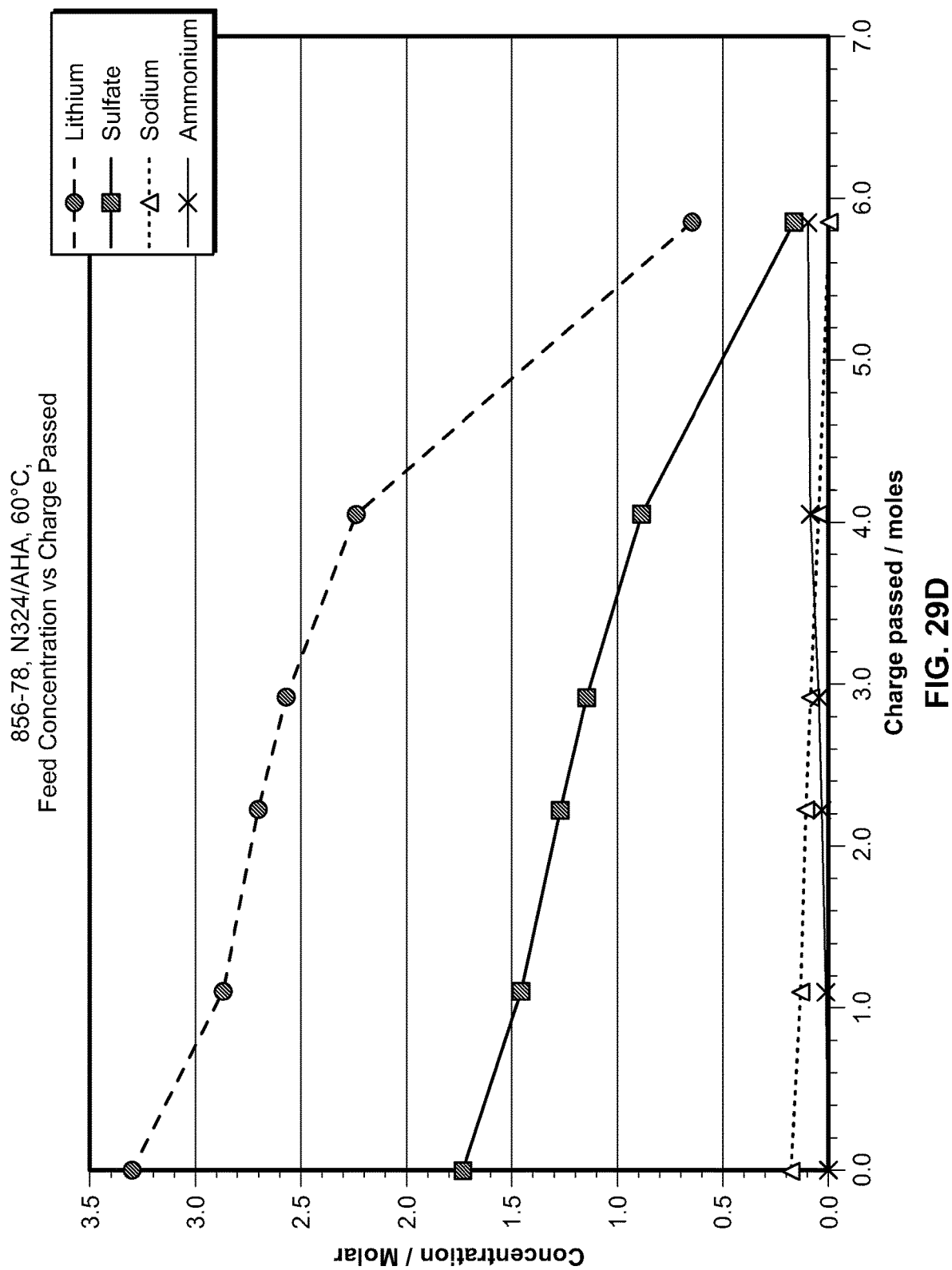
Figure 29E:
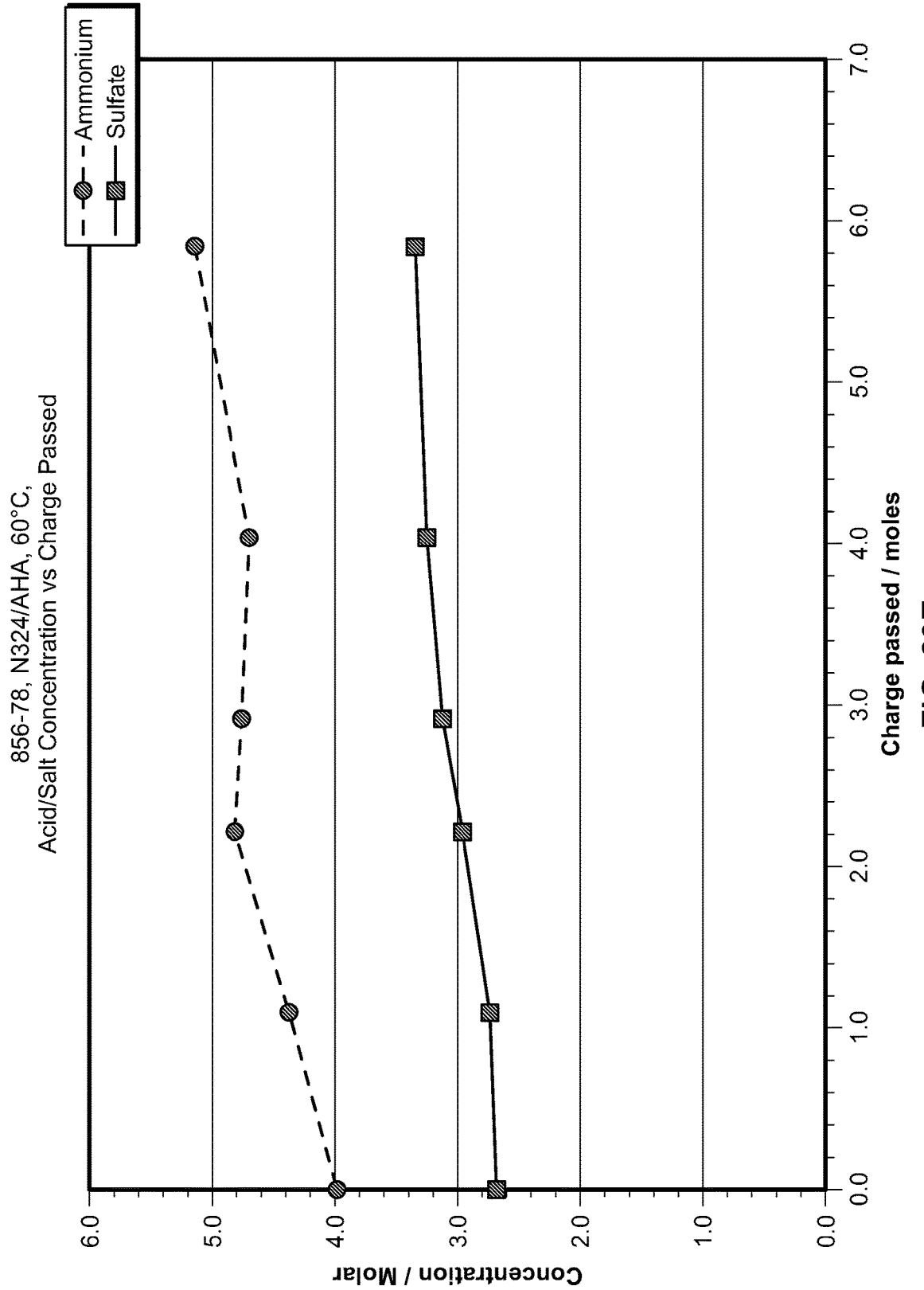
Figure 29F:
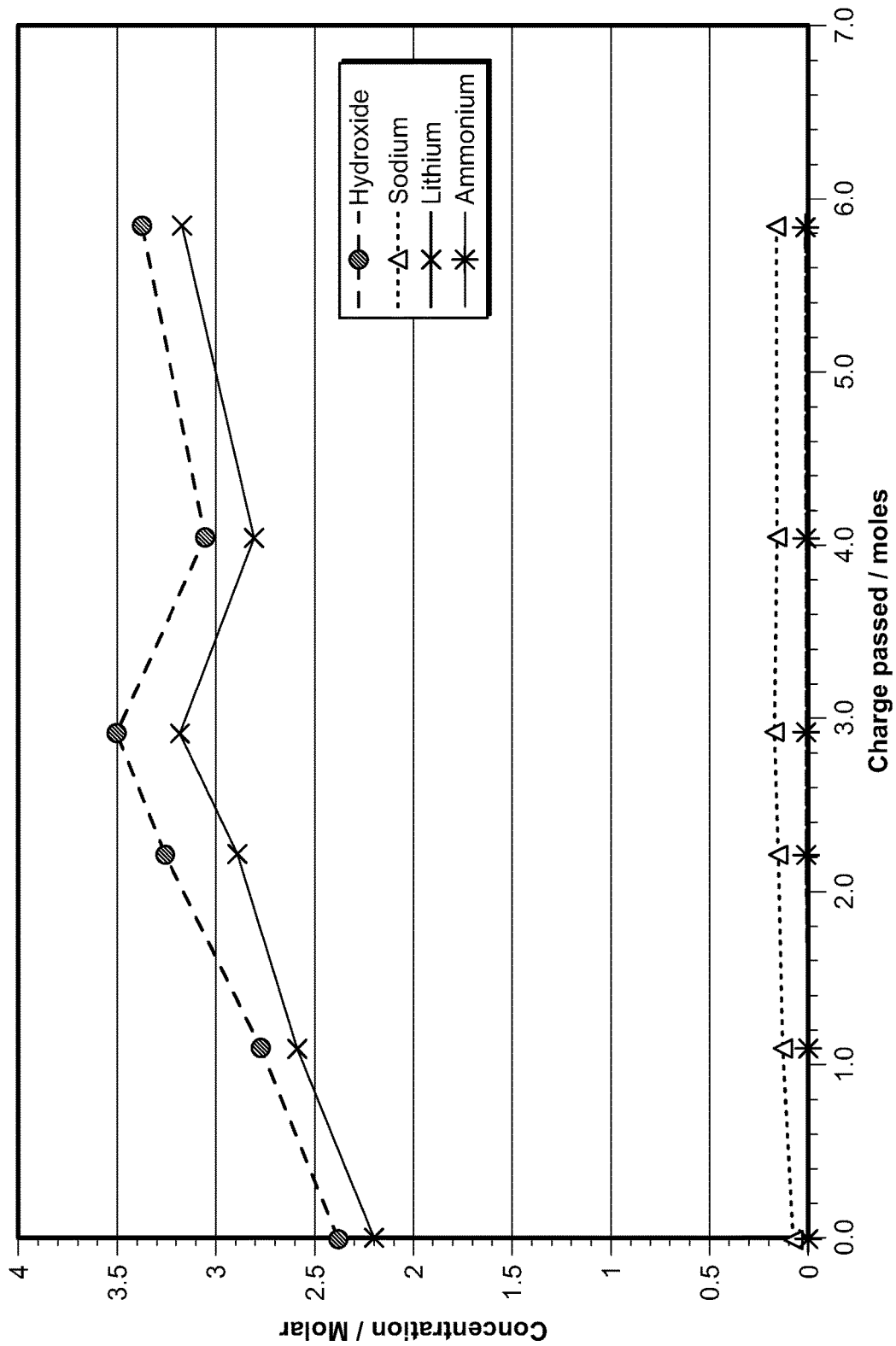
Figure 29G:
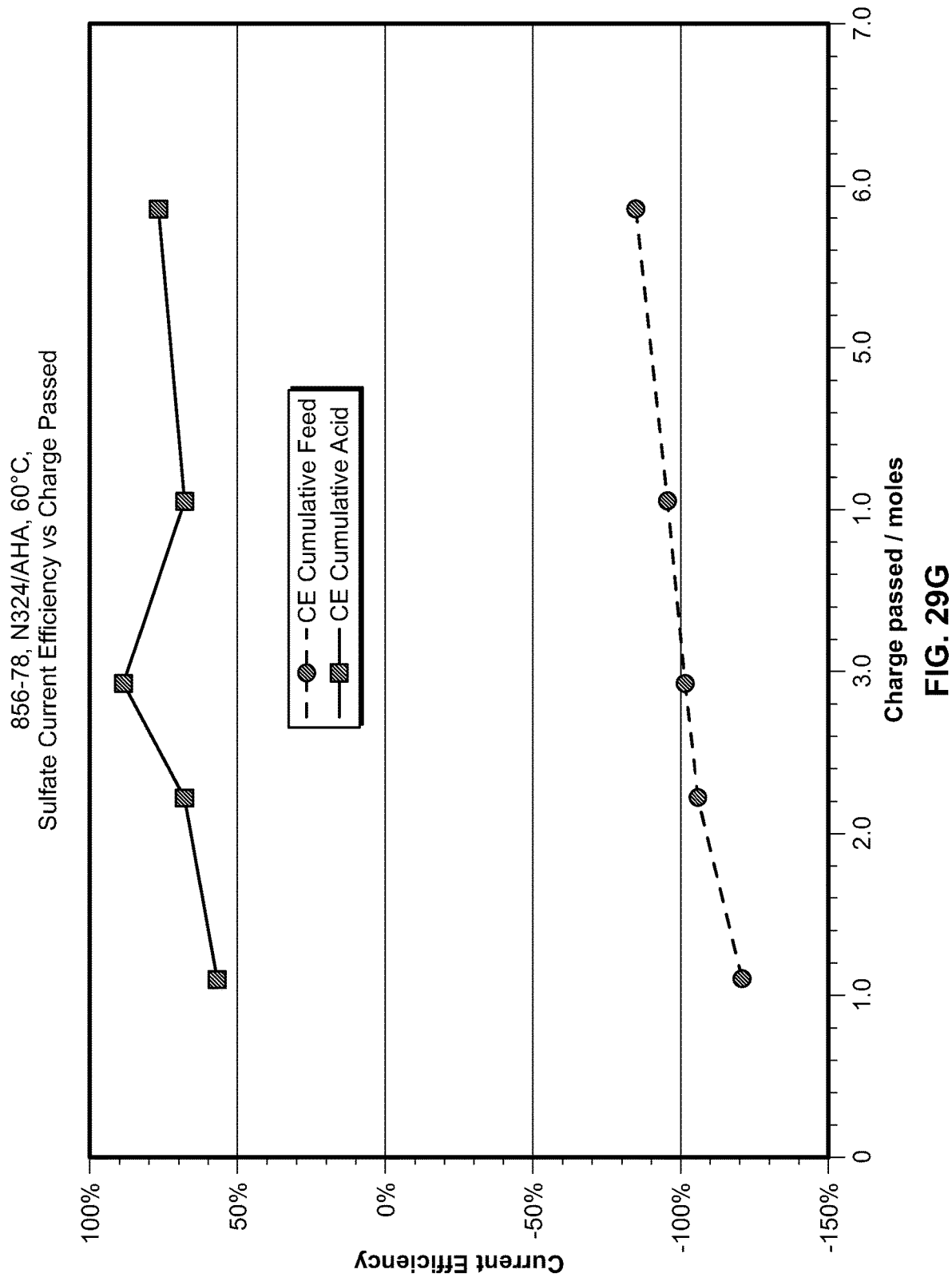
Figure 30A:
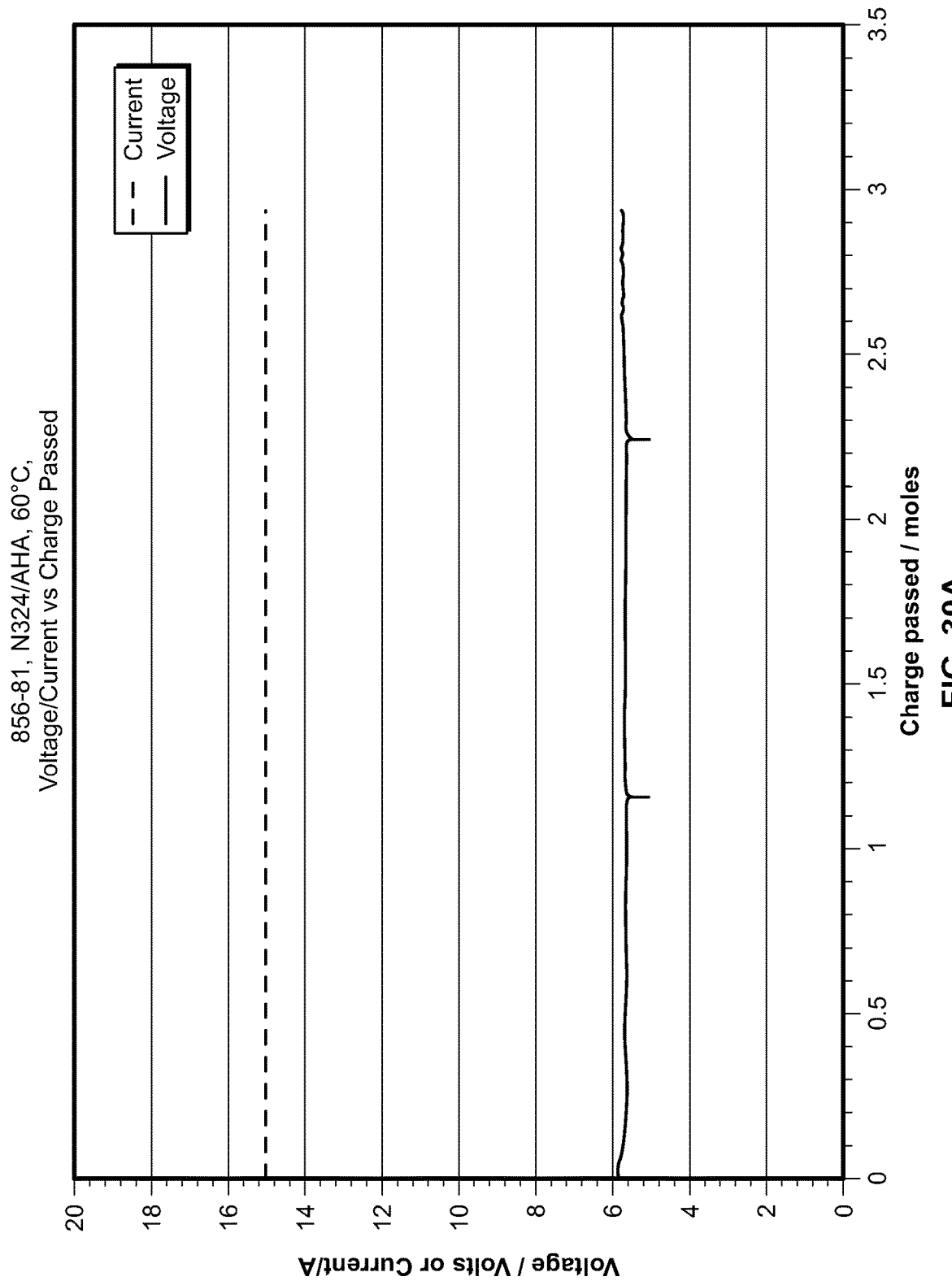
Figure 30B:
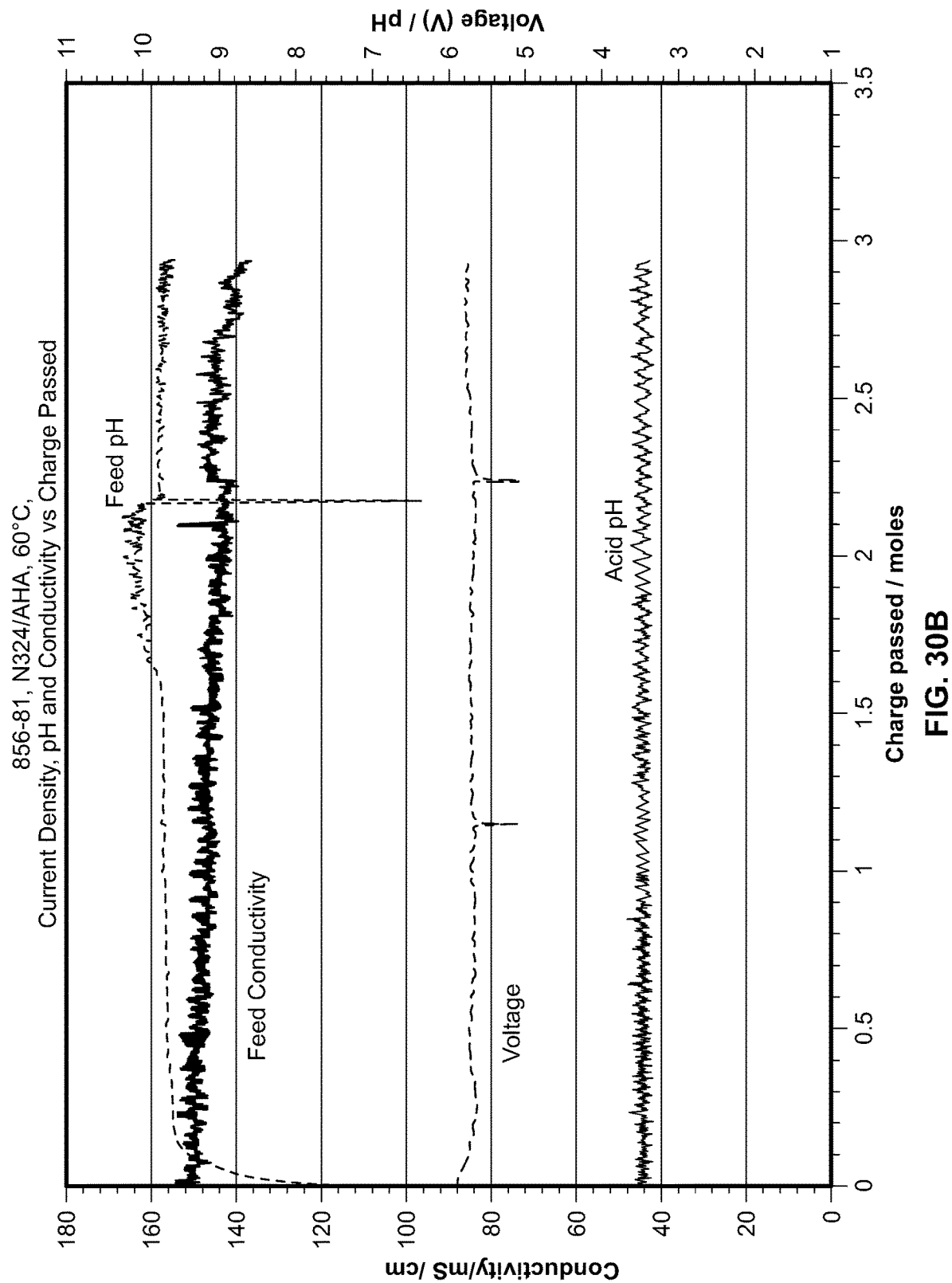
Figure 30C:
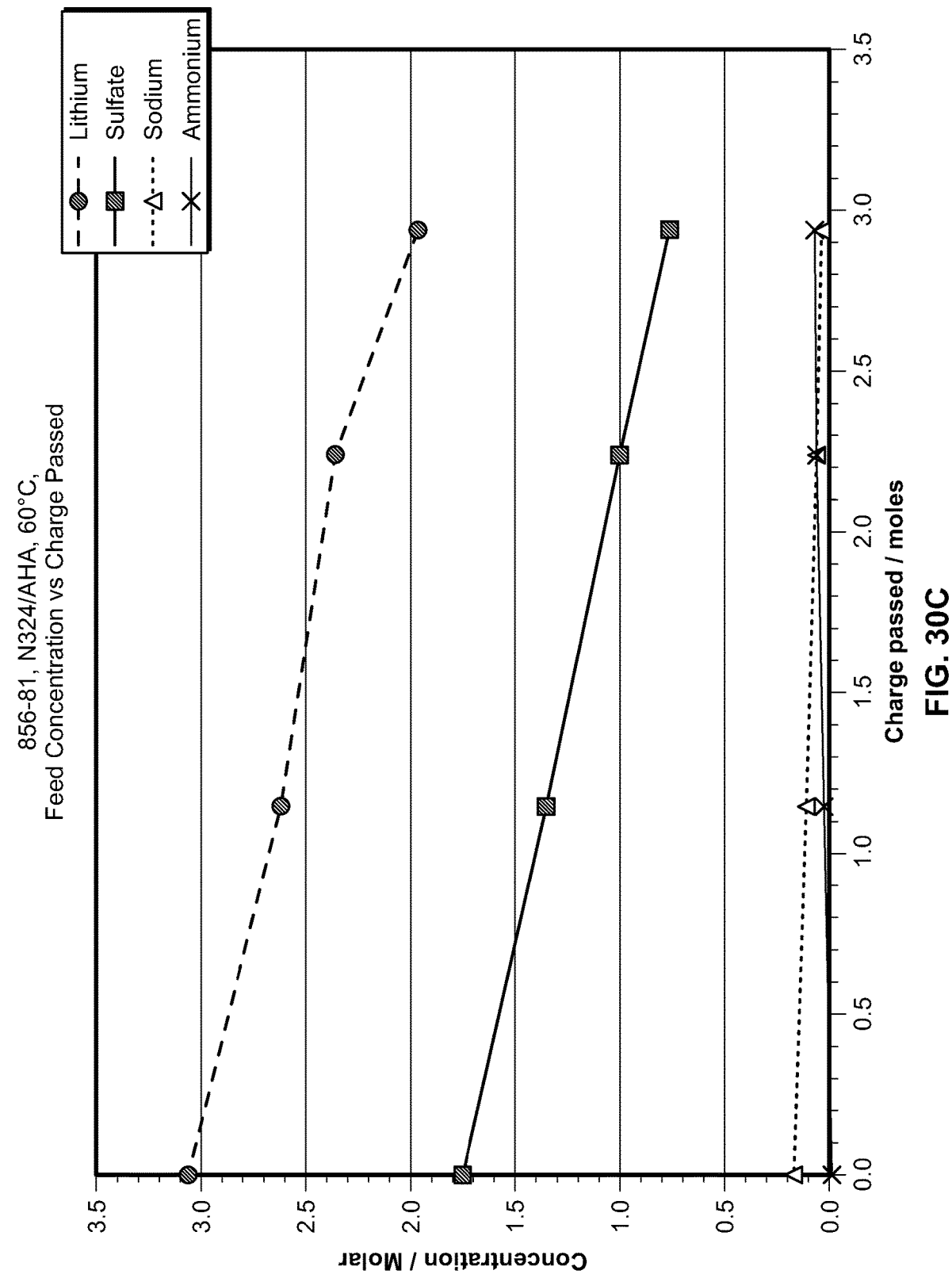
Figure 30D:
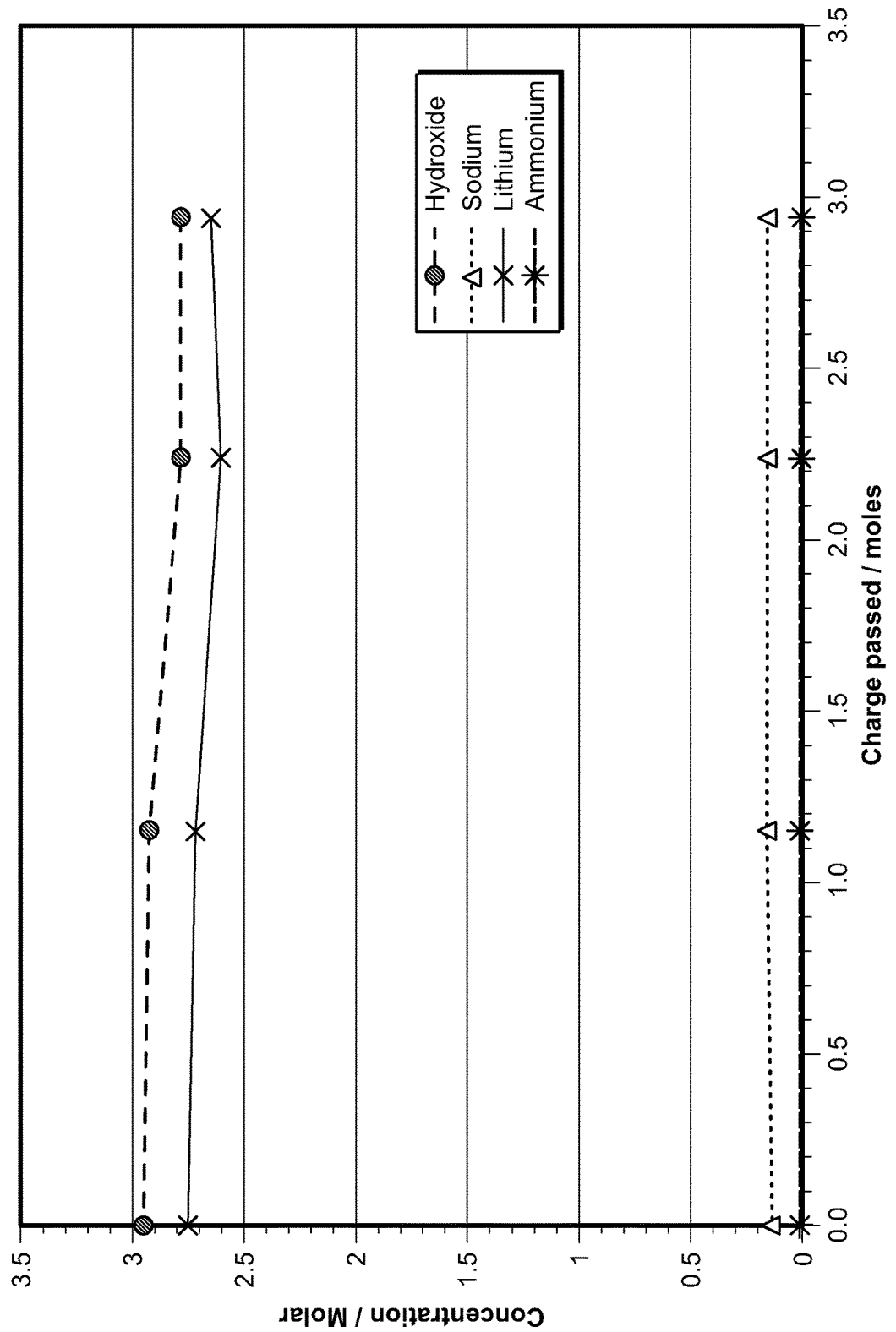
Figure 30E:
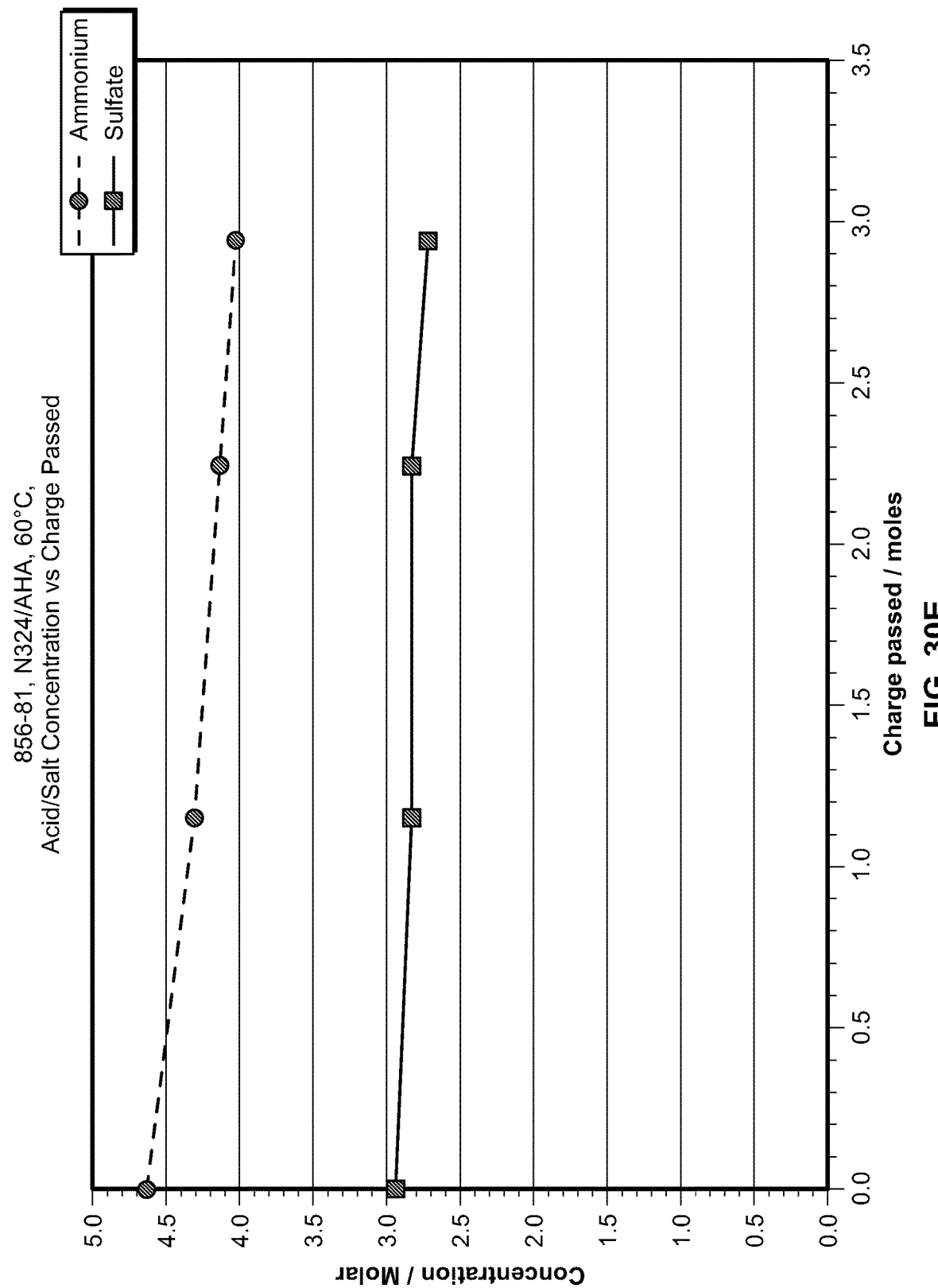
Figure 30F:
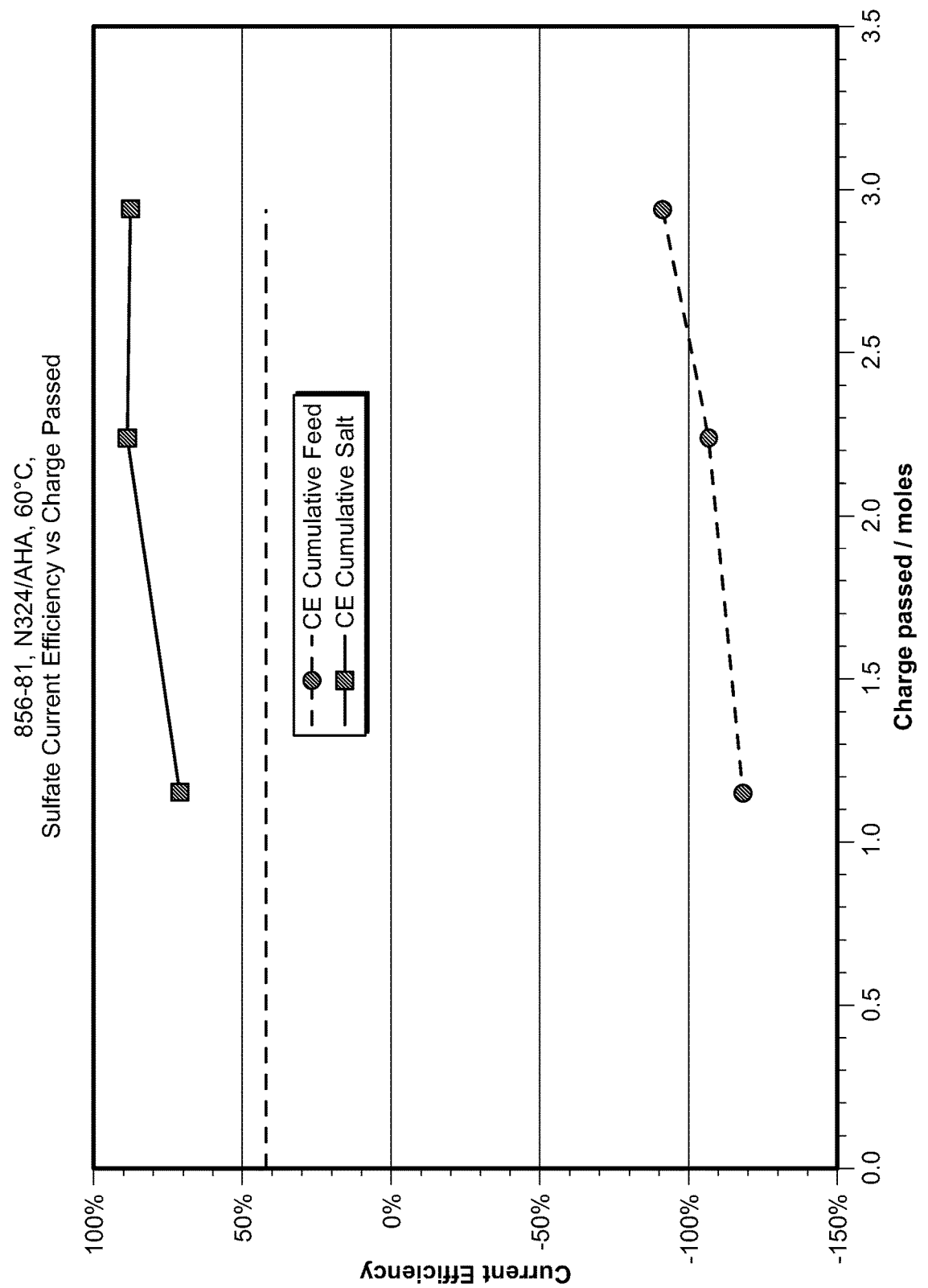
Figure 30G:
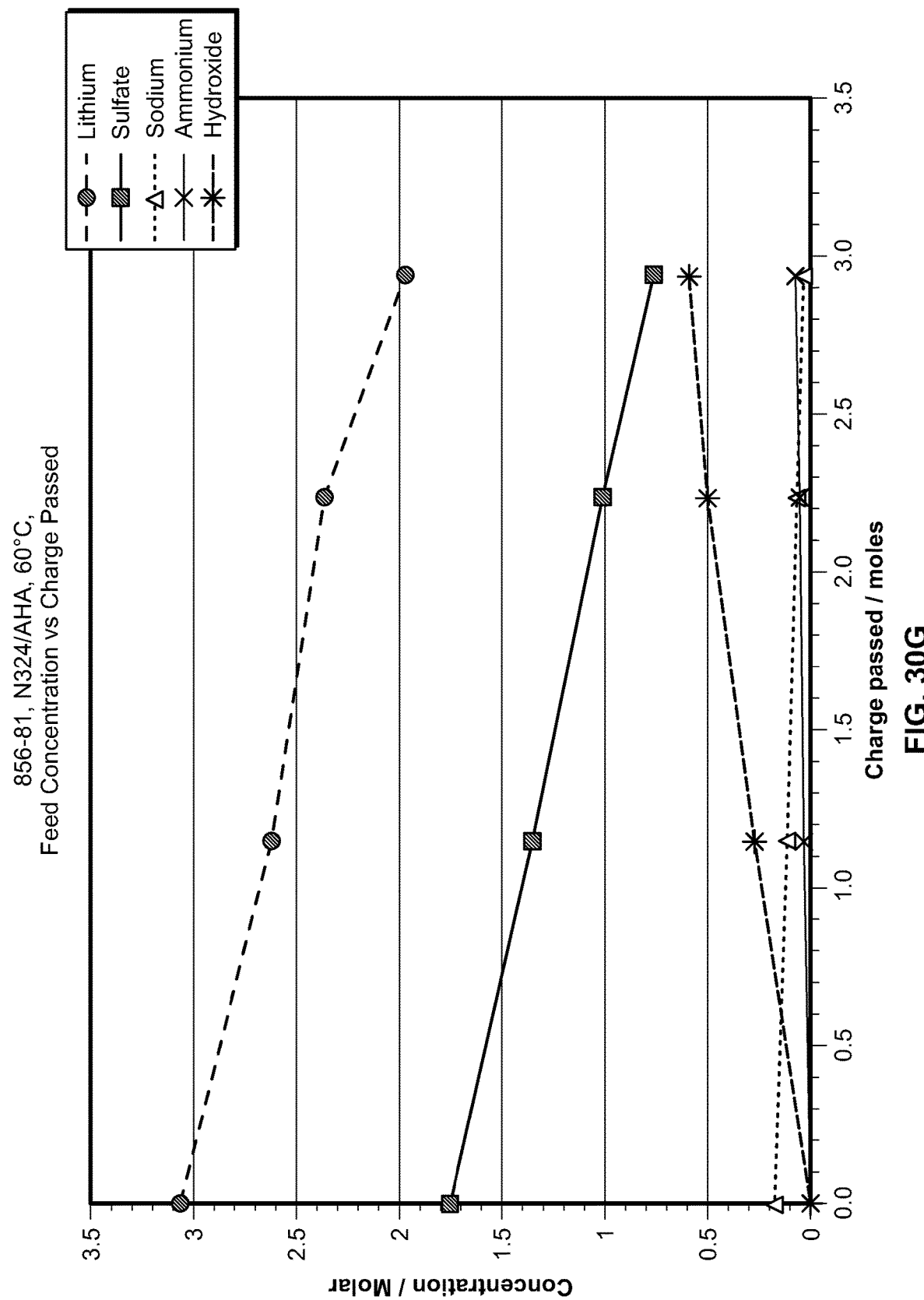
Figure 31A:
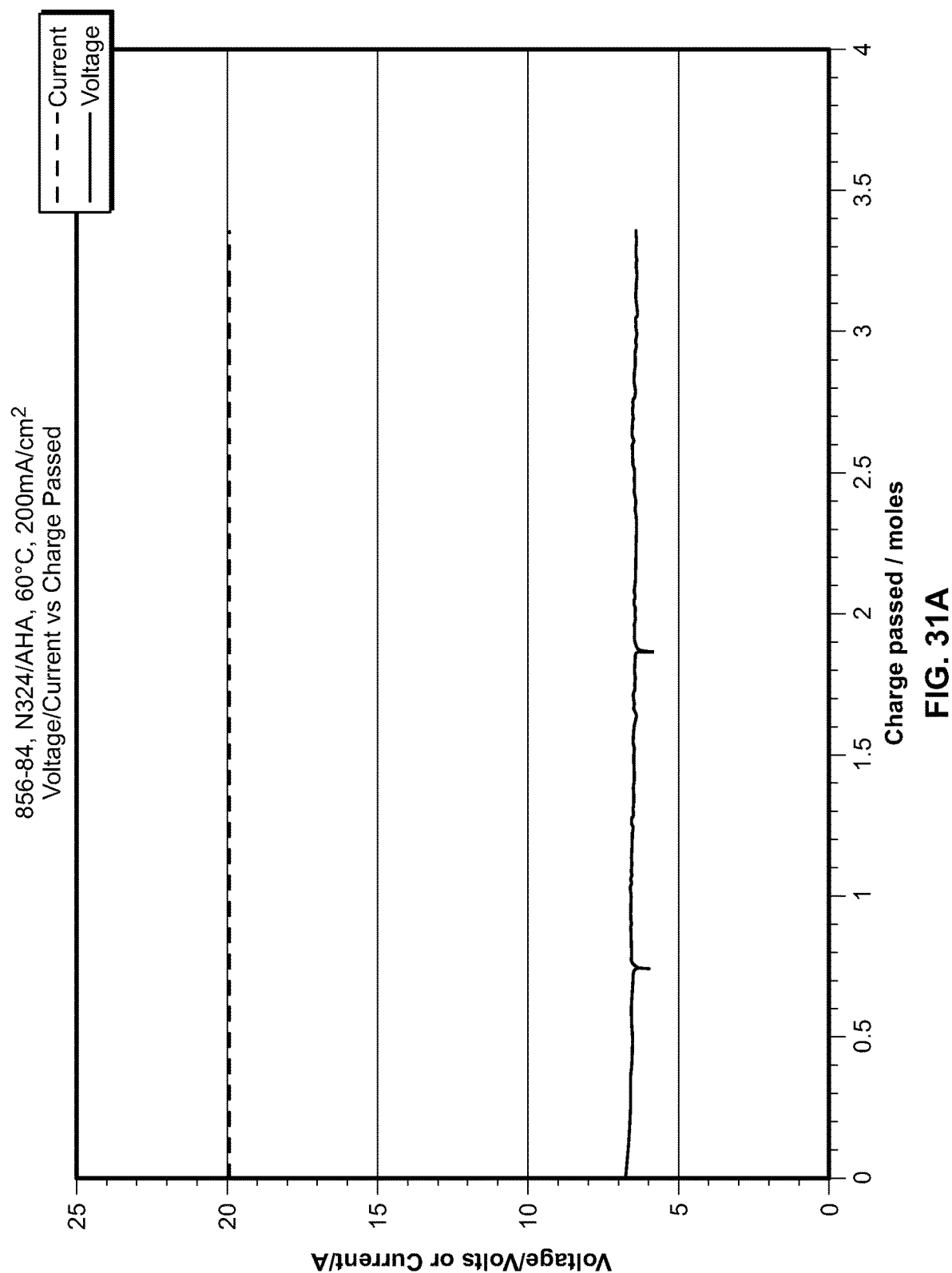
Figure 31B:
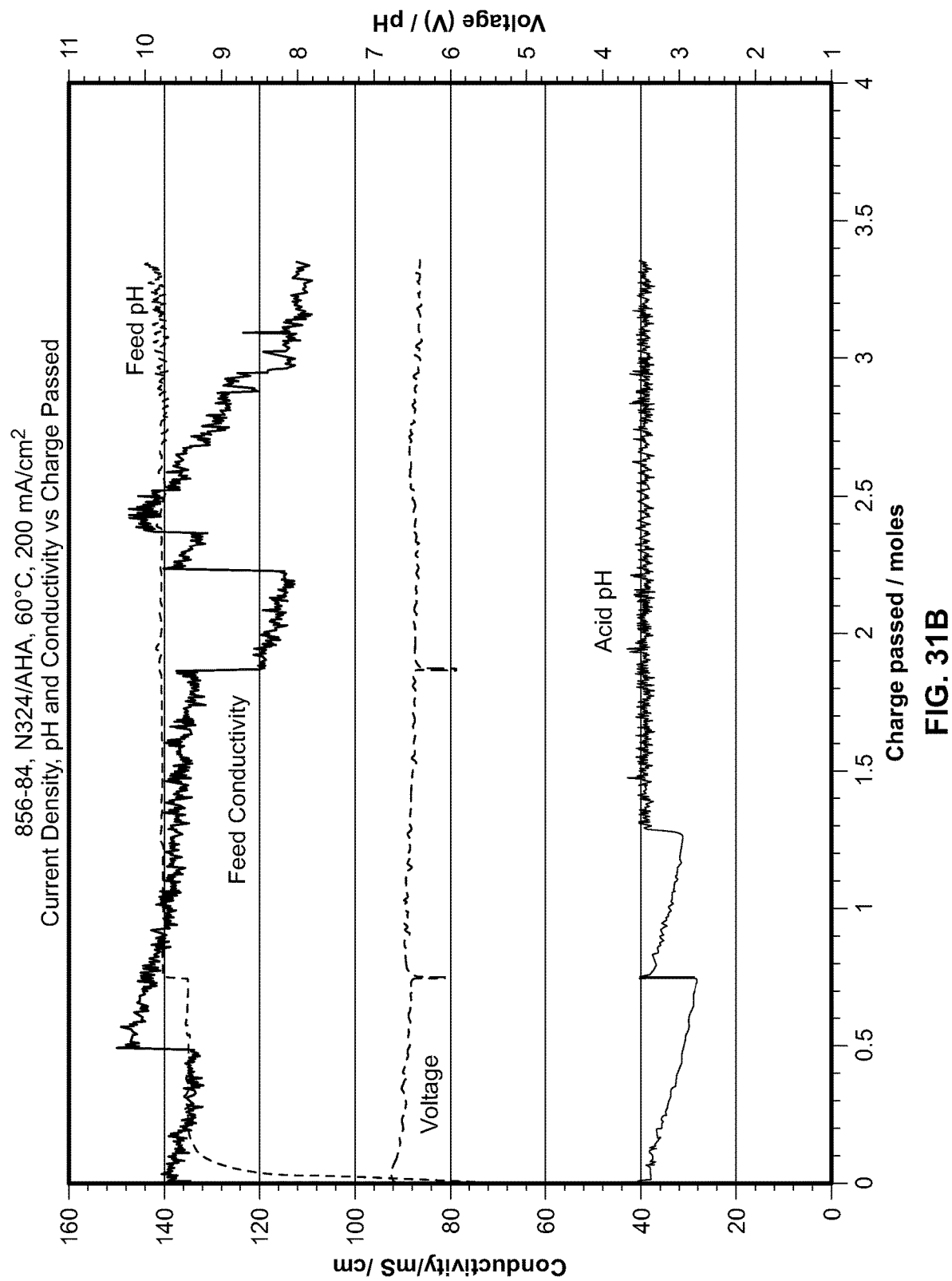
Figure 31C:
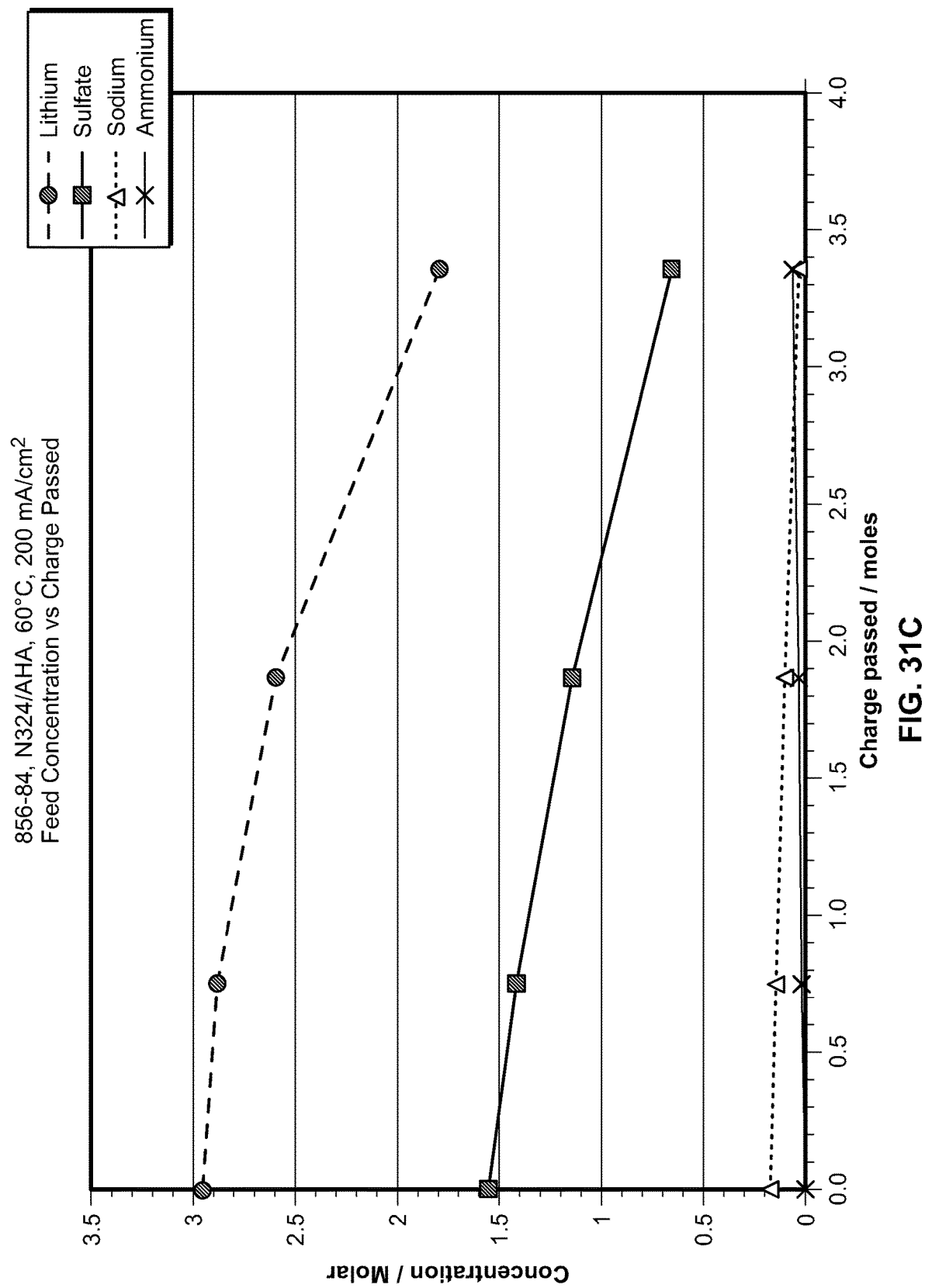
Figure 31D:
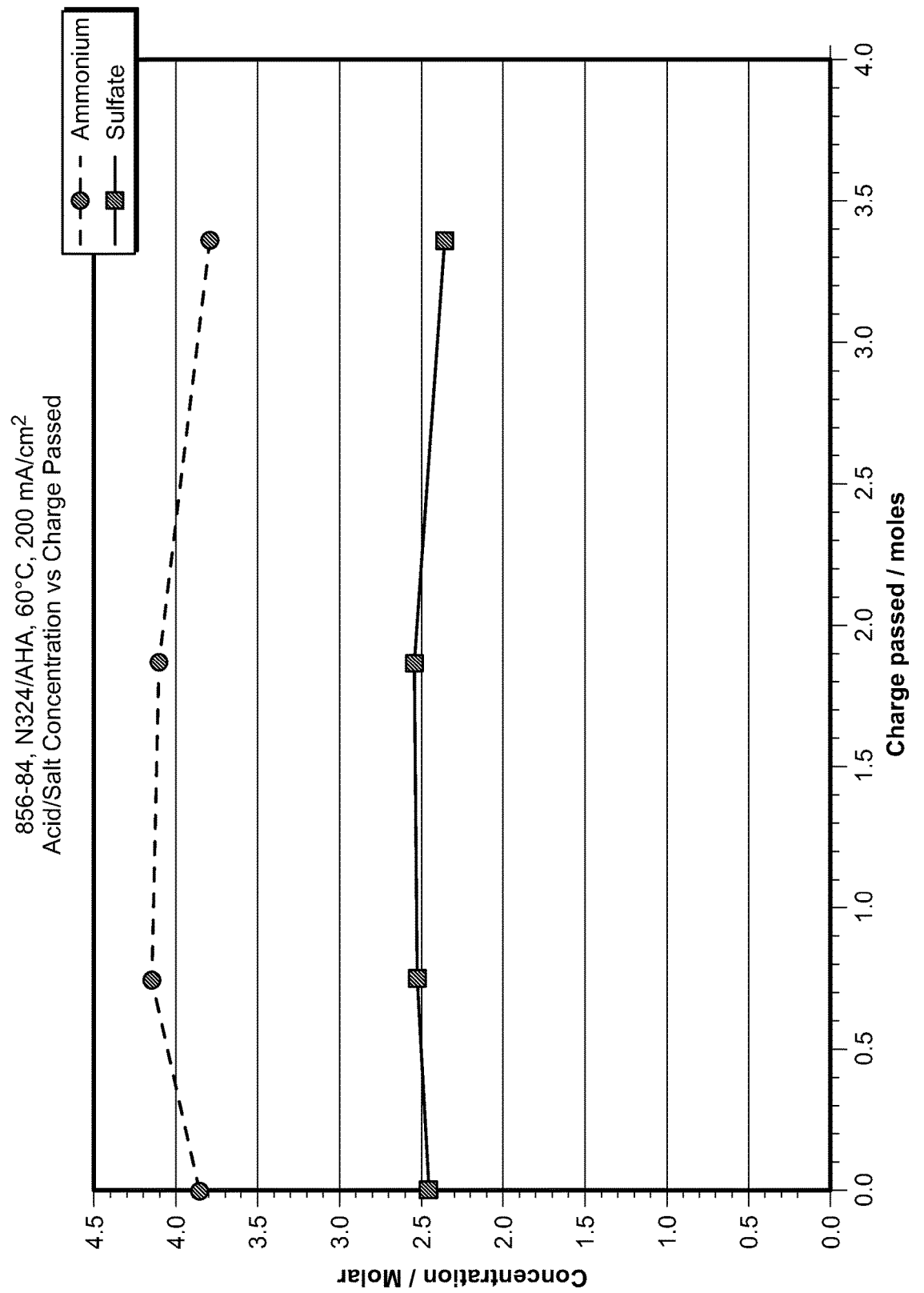
Figure 31E:
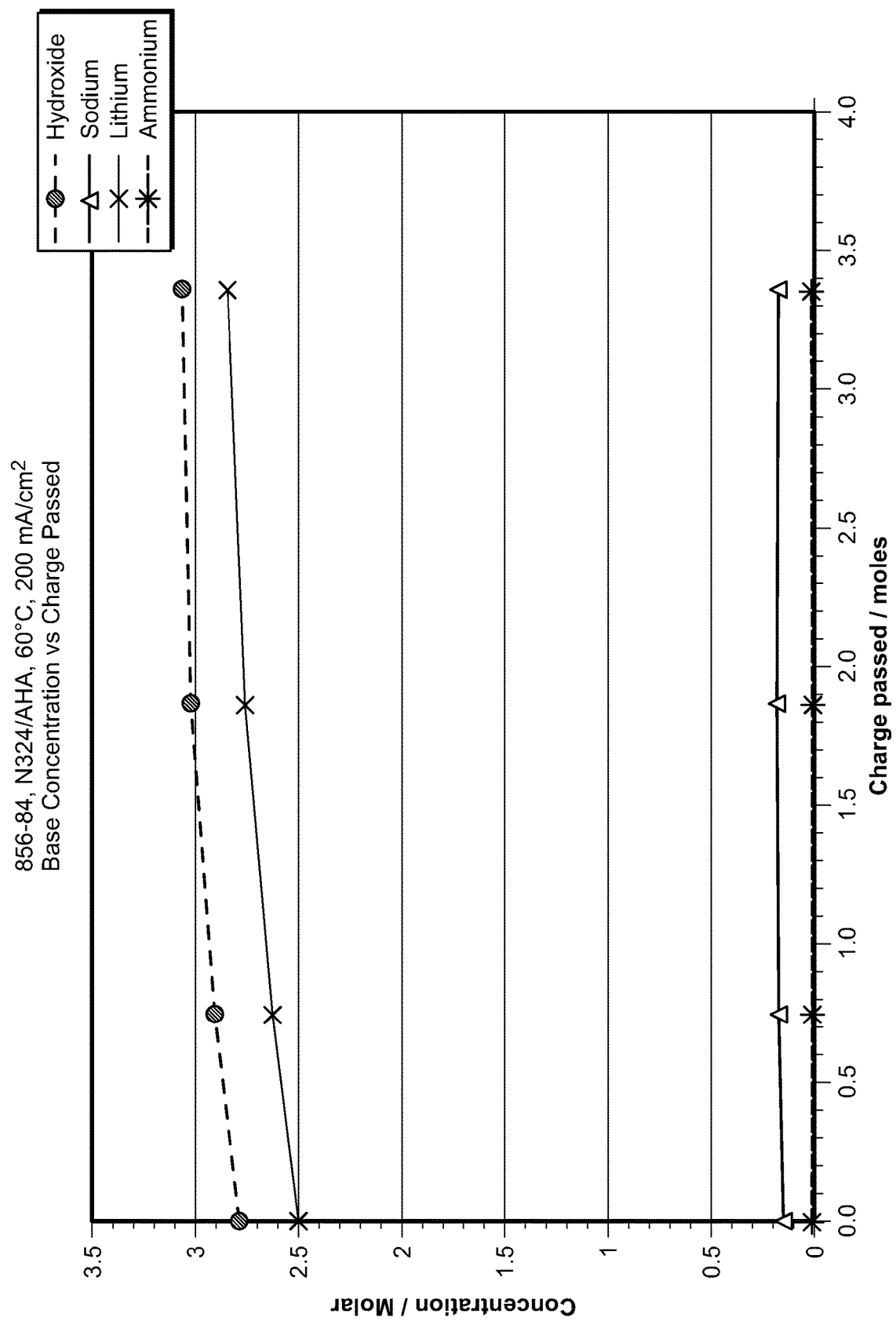
Figure 31F:
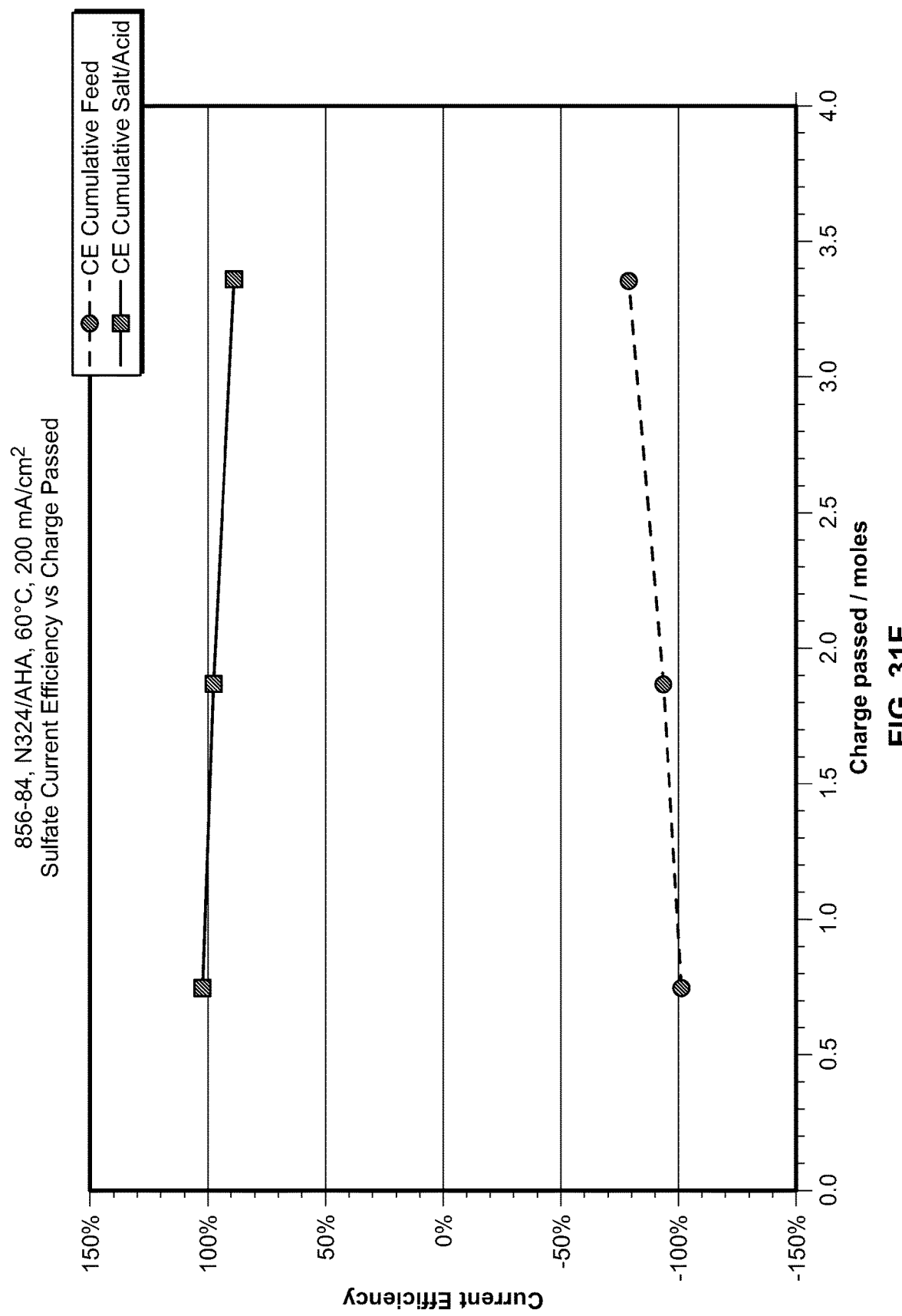
Figure 32A:
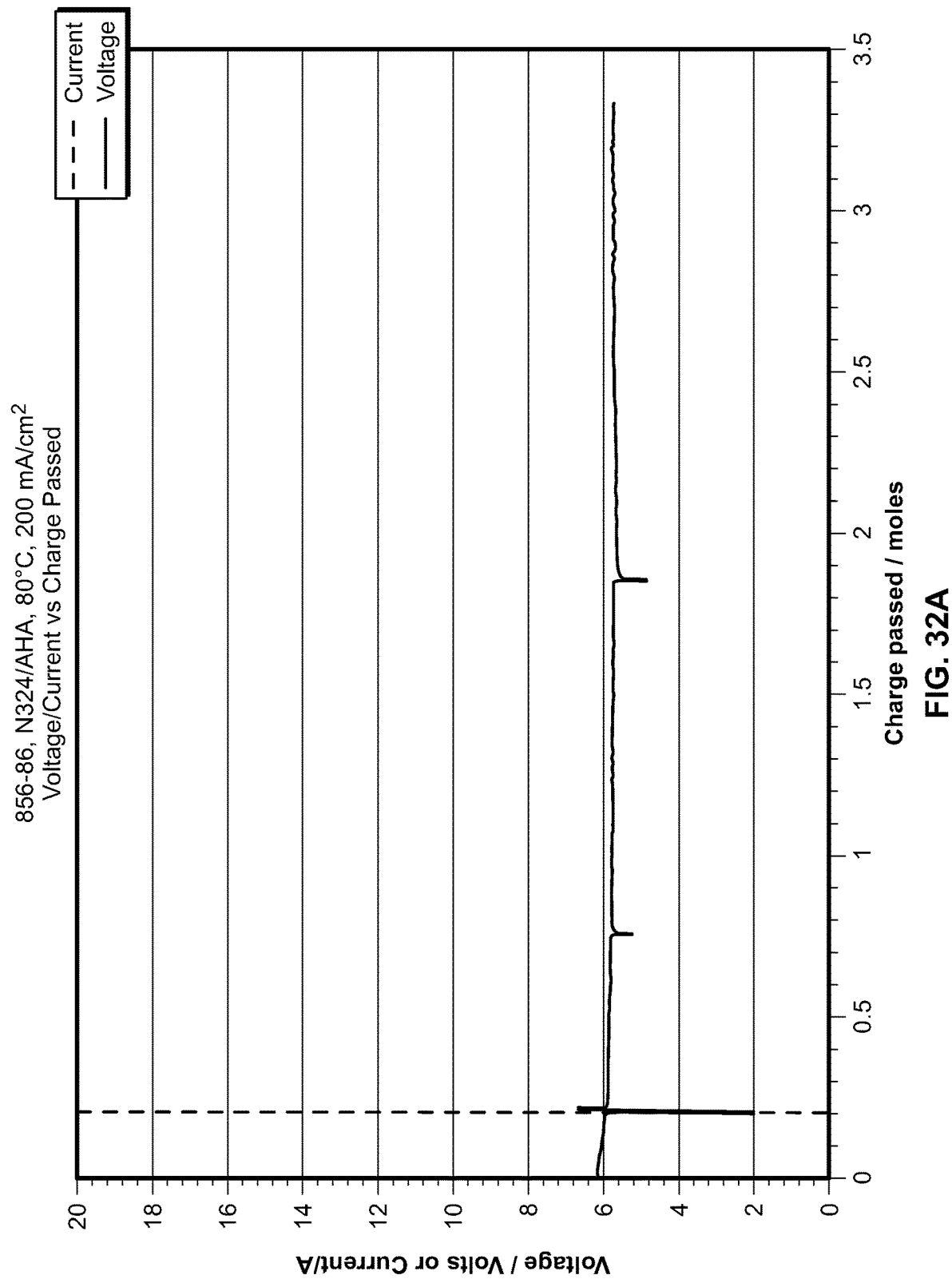
Figure 32B:
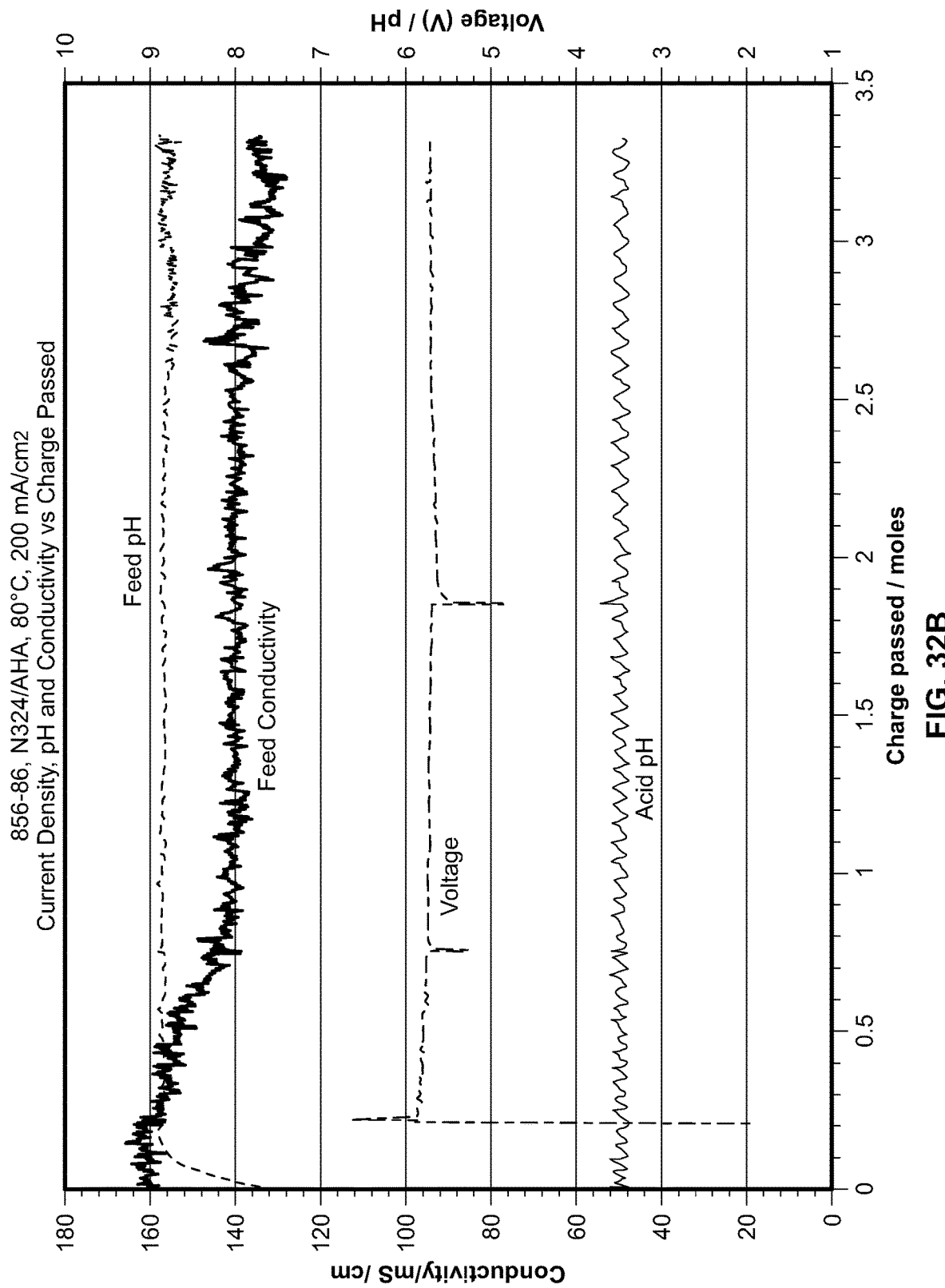
Figure 32C:
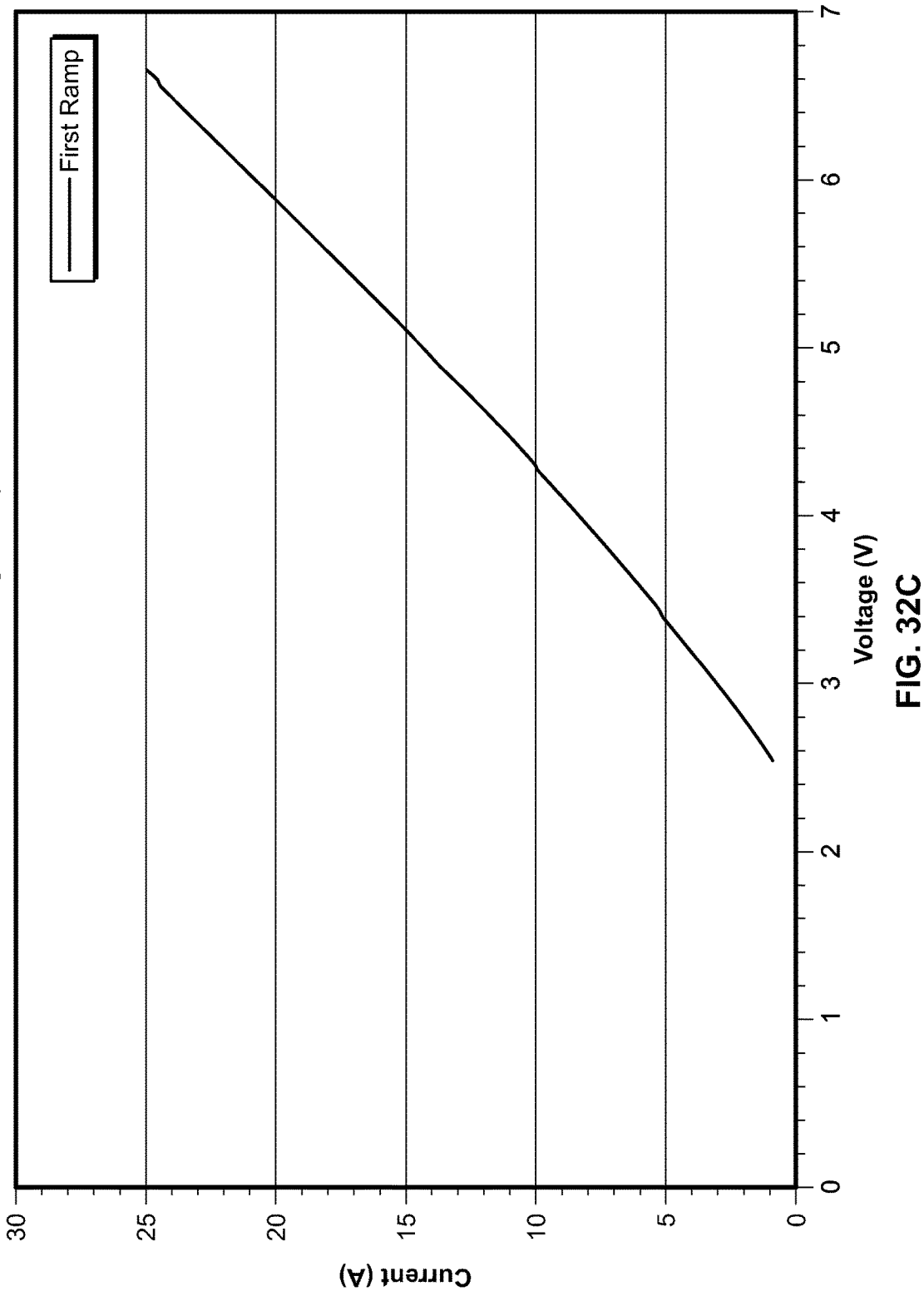
Figure 32D:
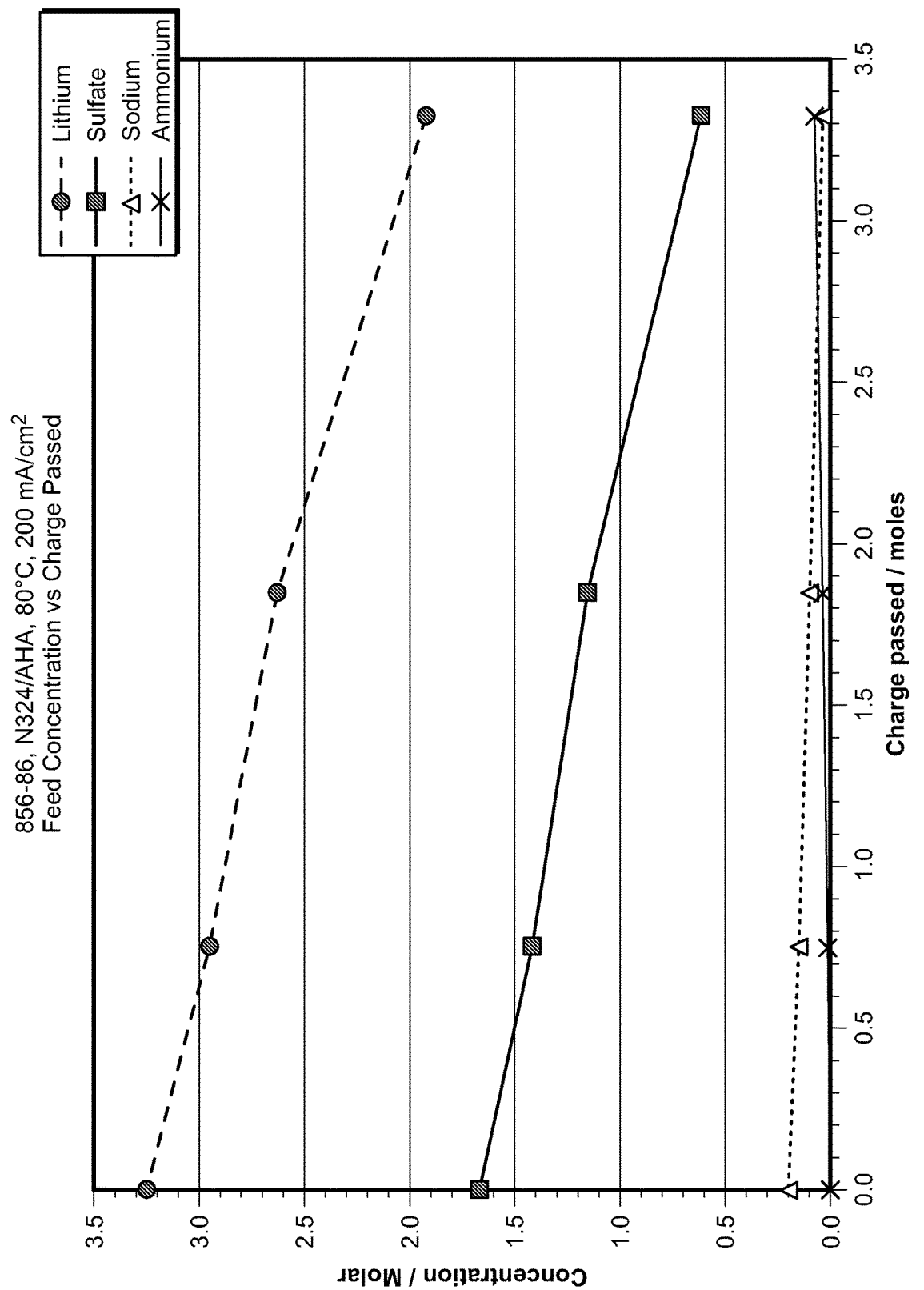
Figure 32E:
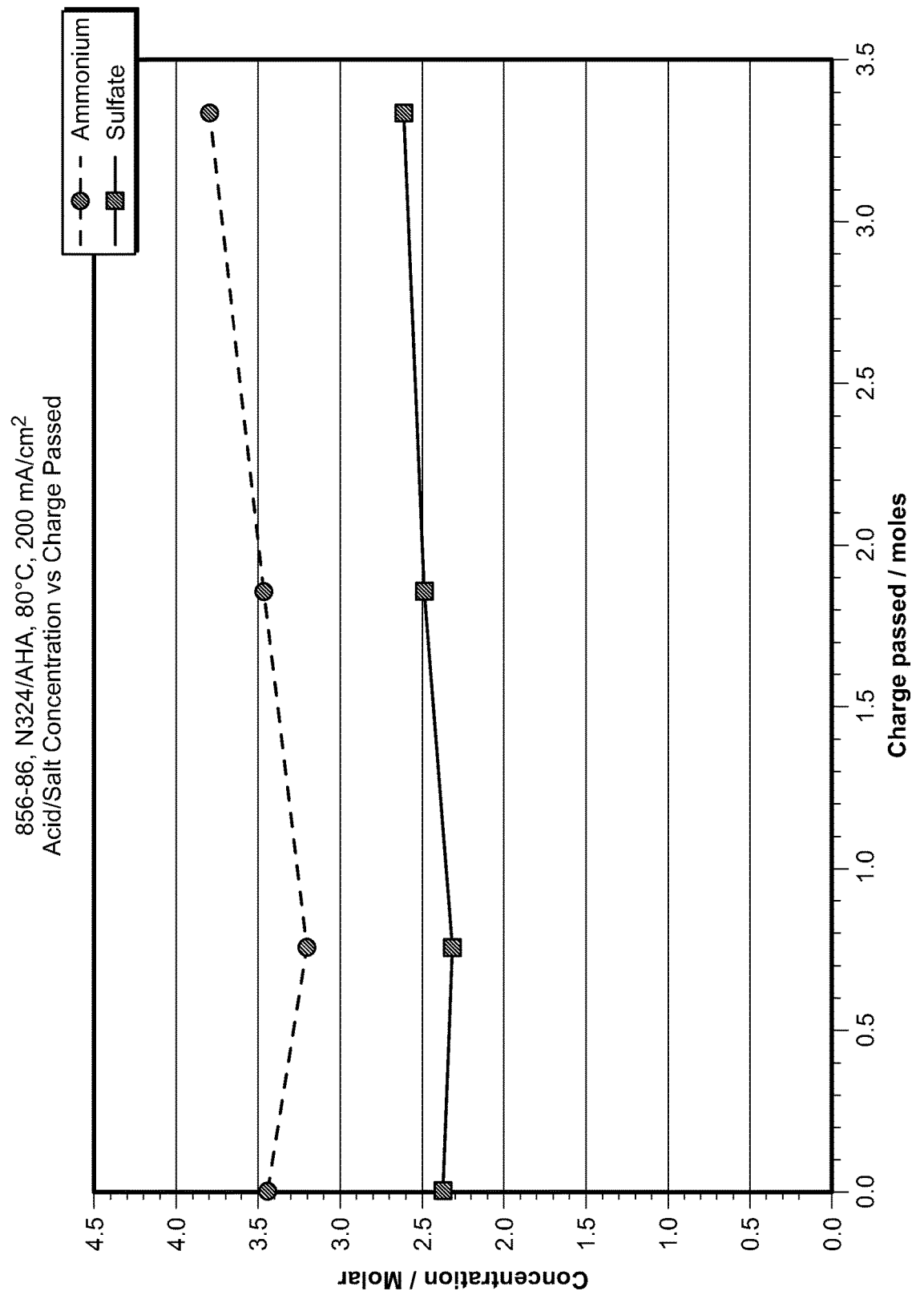
Figure 32F:
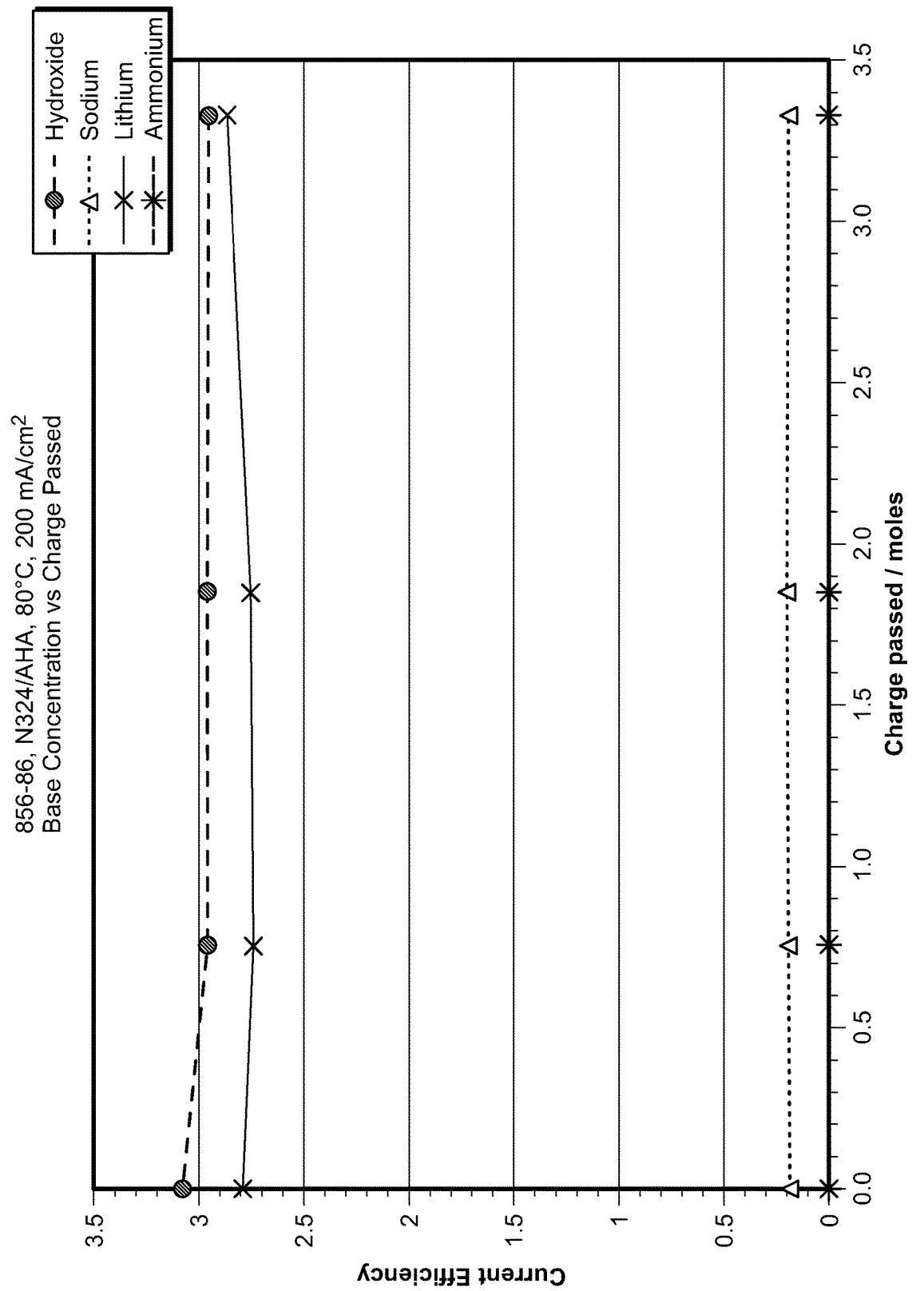
Figure 32G:
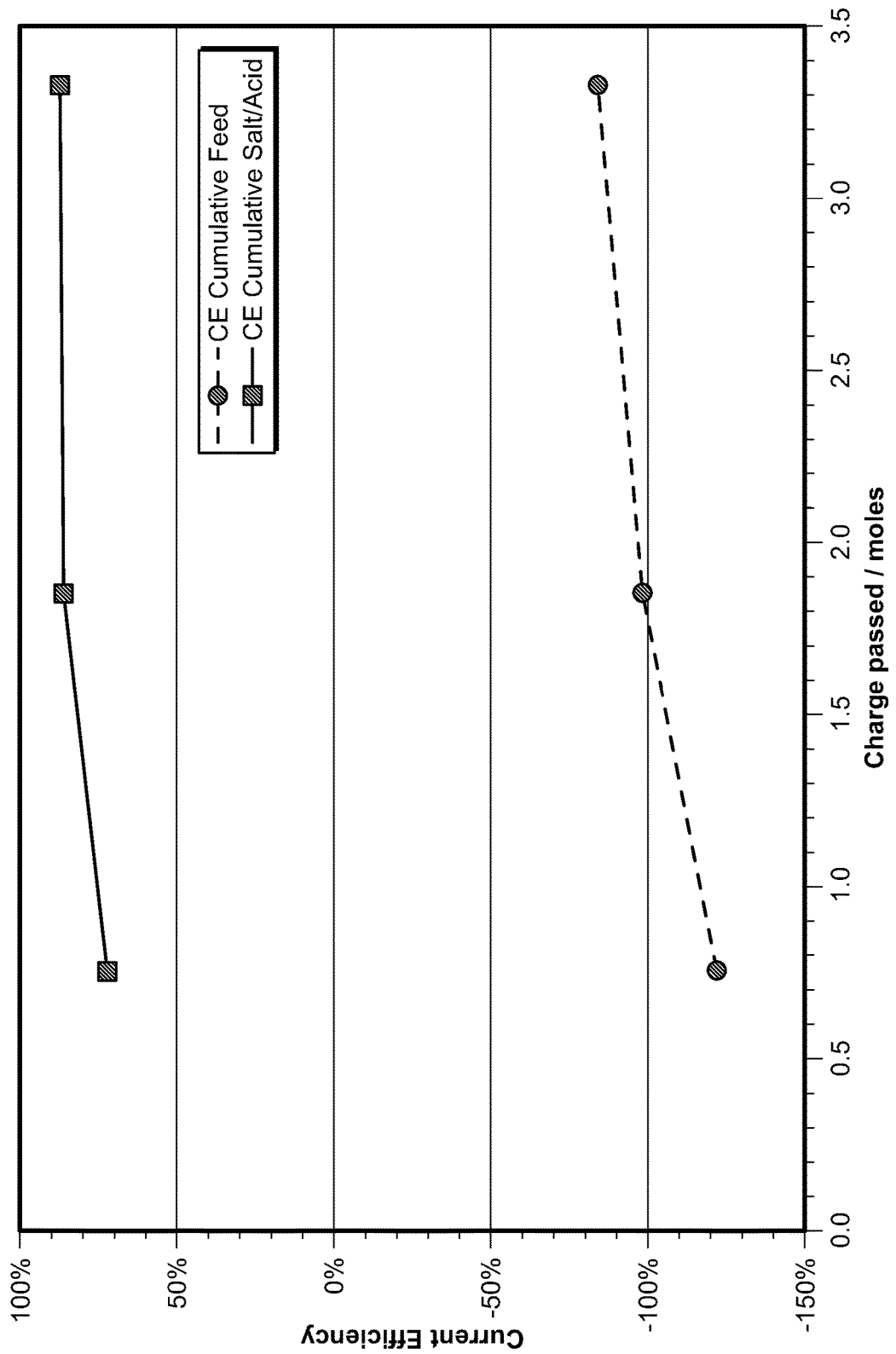
Figure 33B:
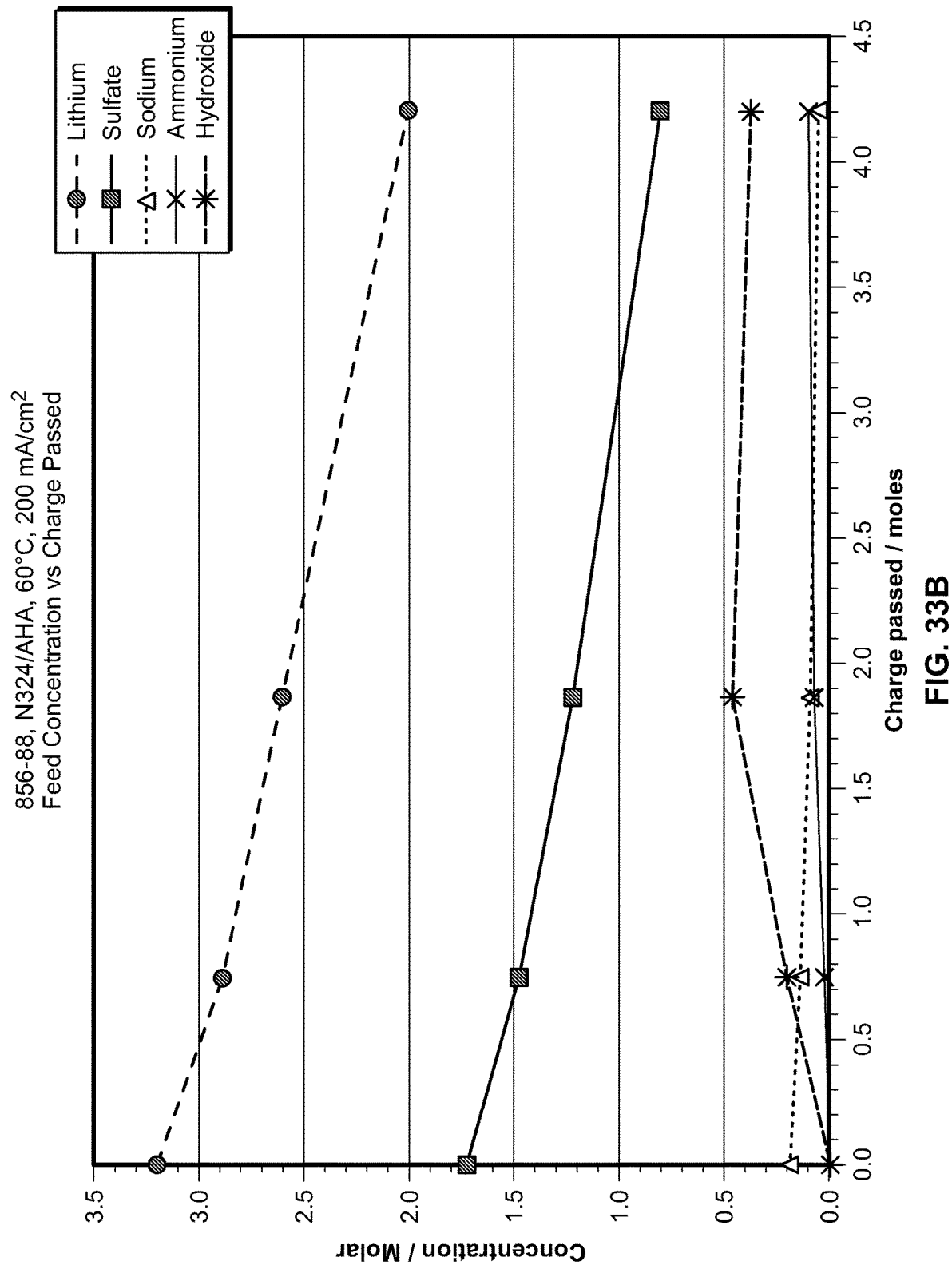
Figure 33C:
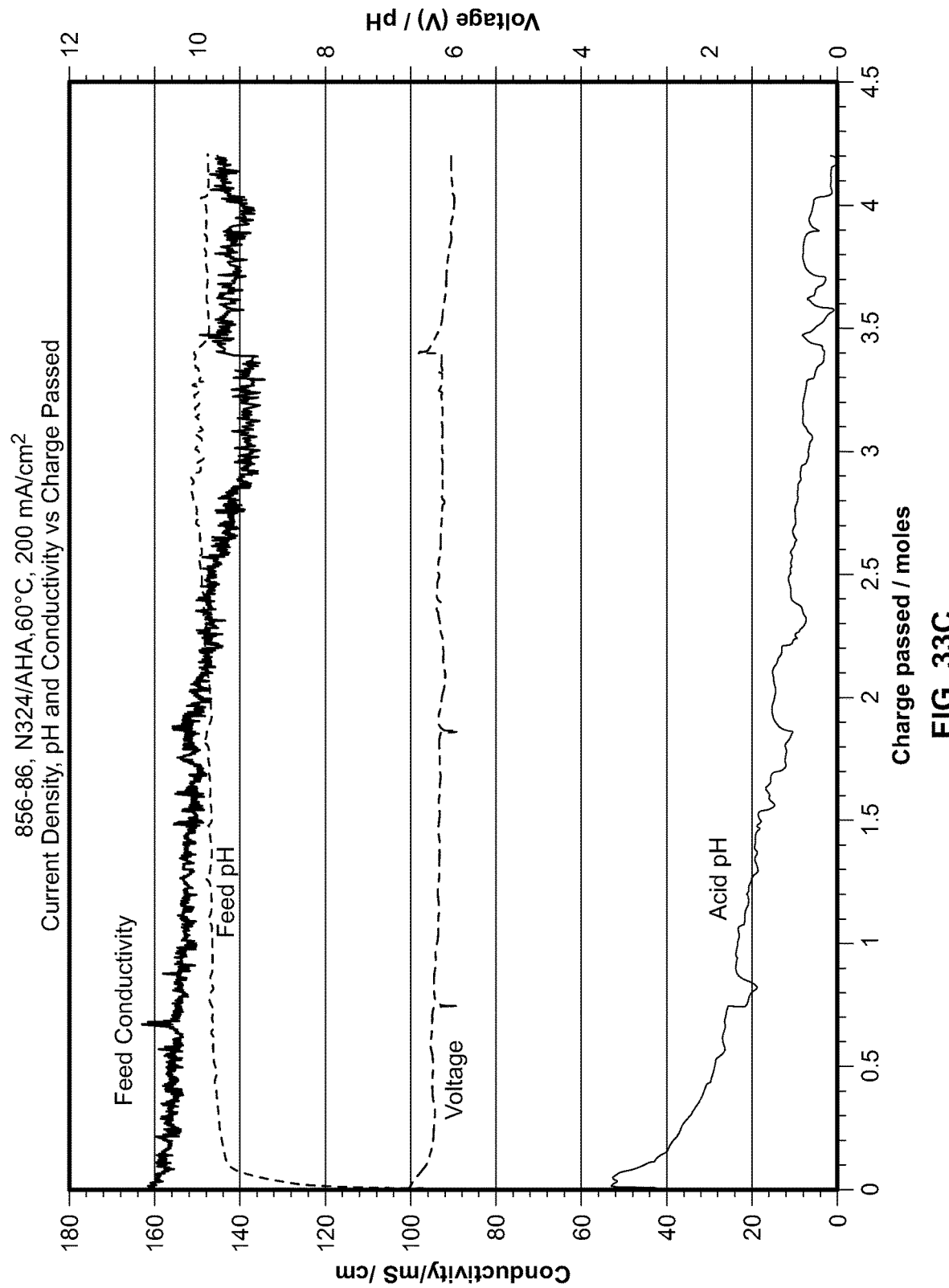
Figure 33D:
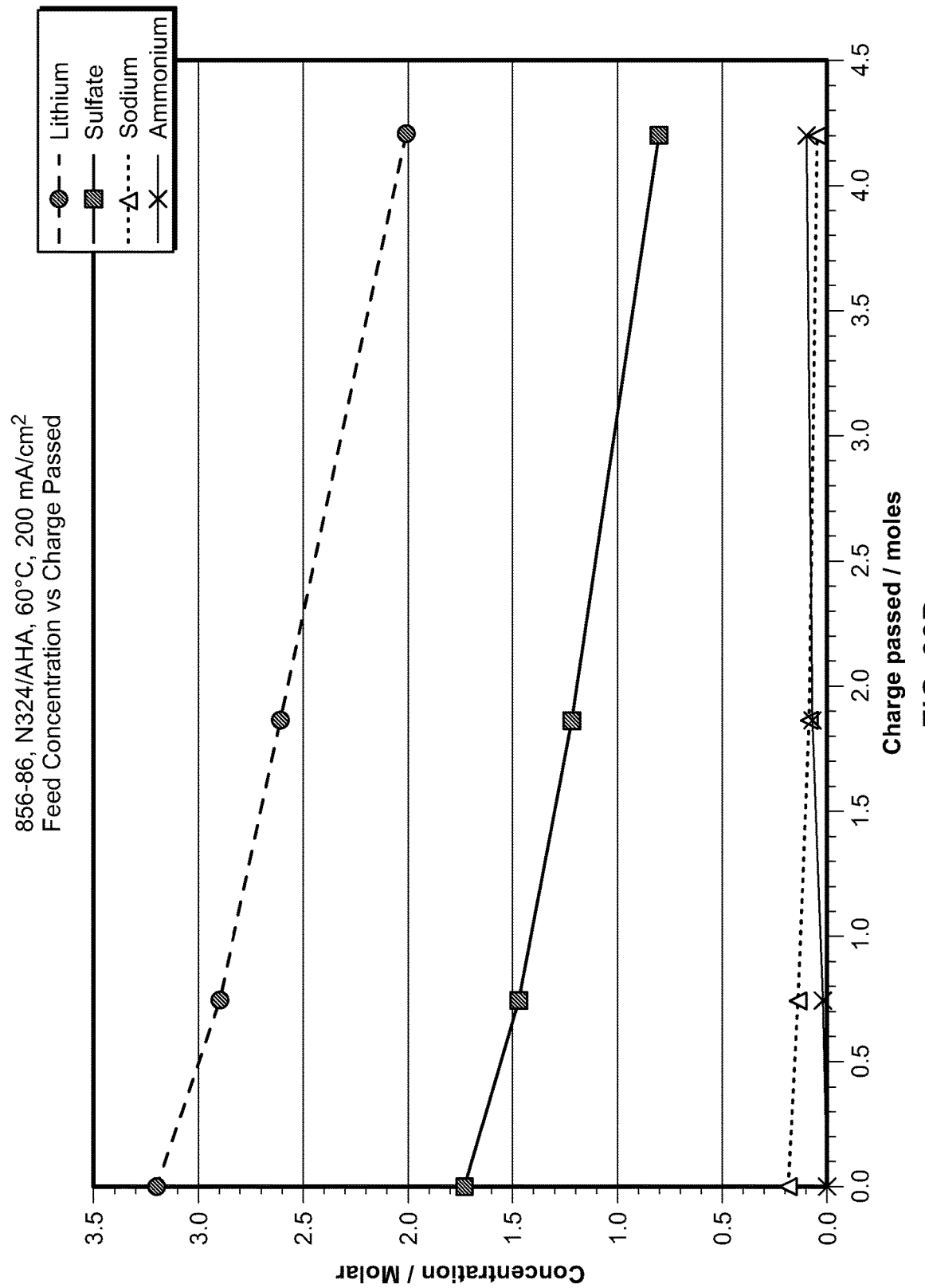
Figure 33E:
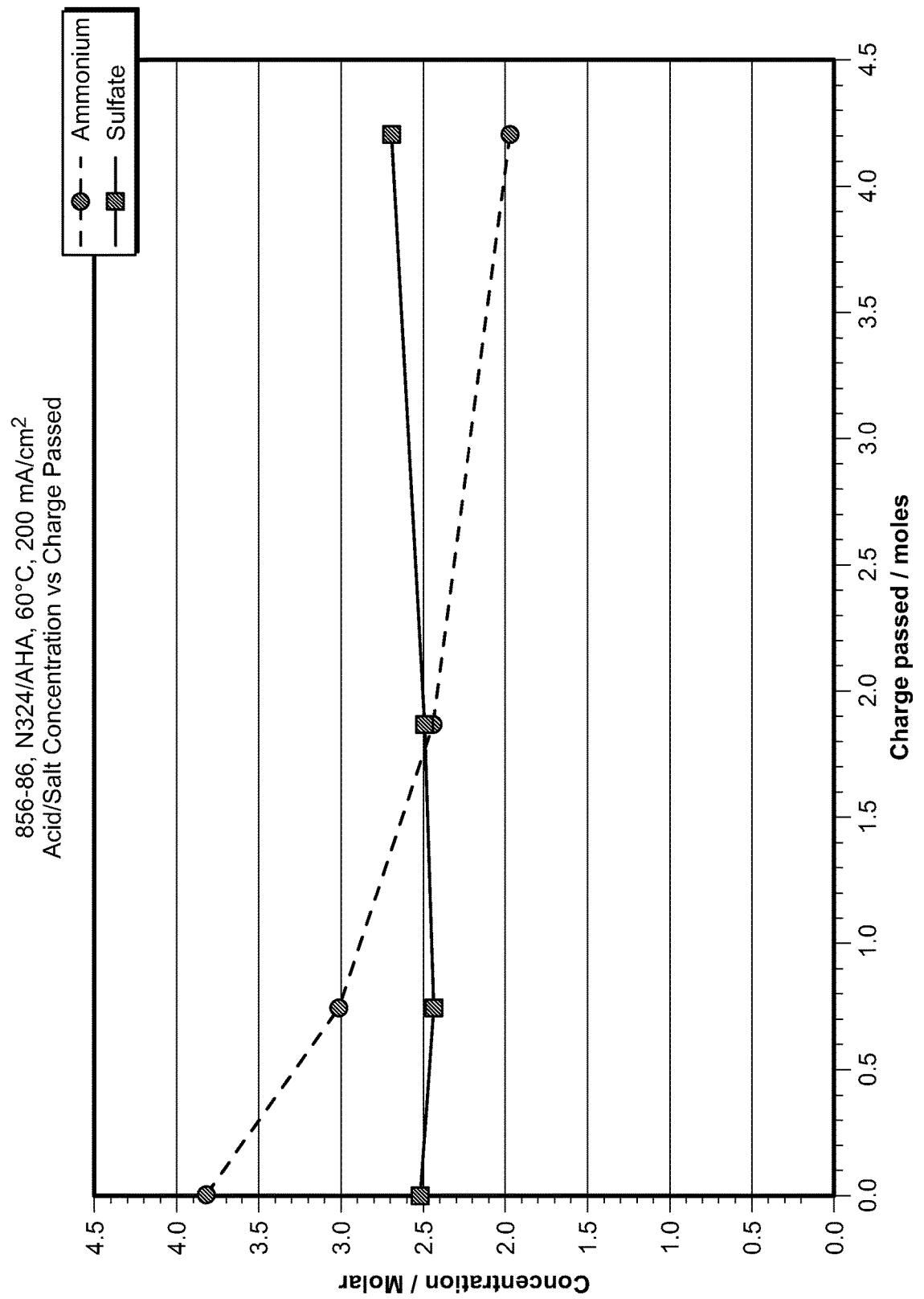
Figure 33F:
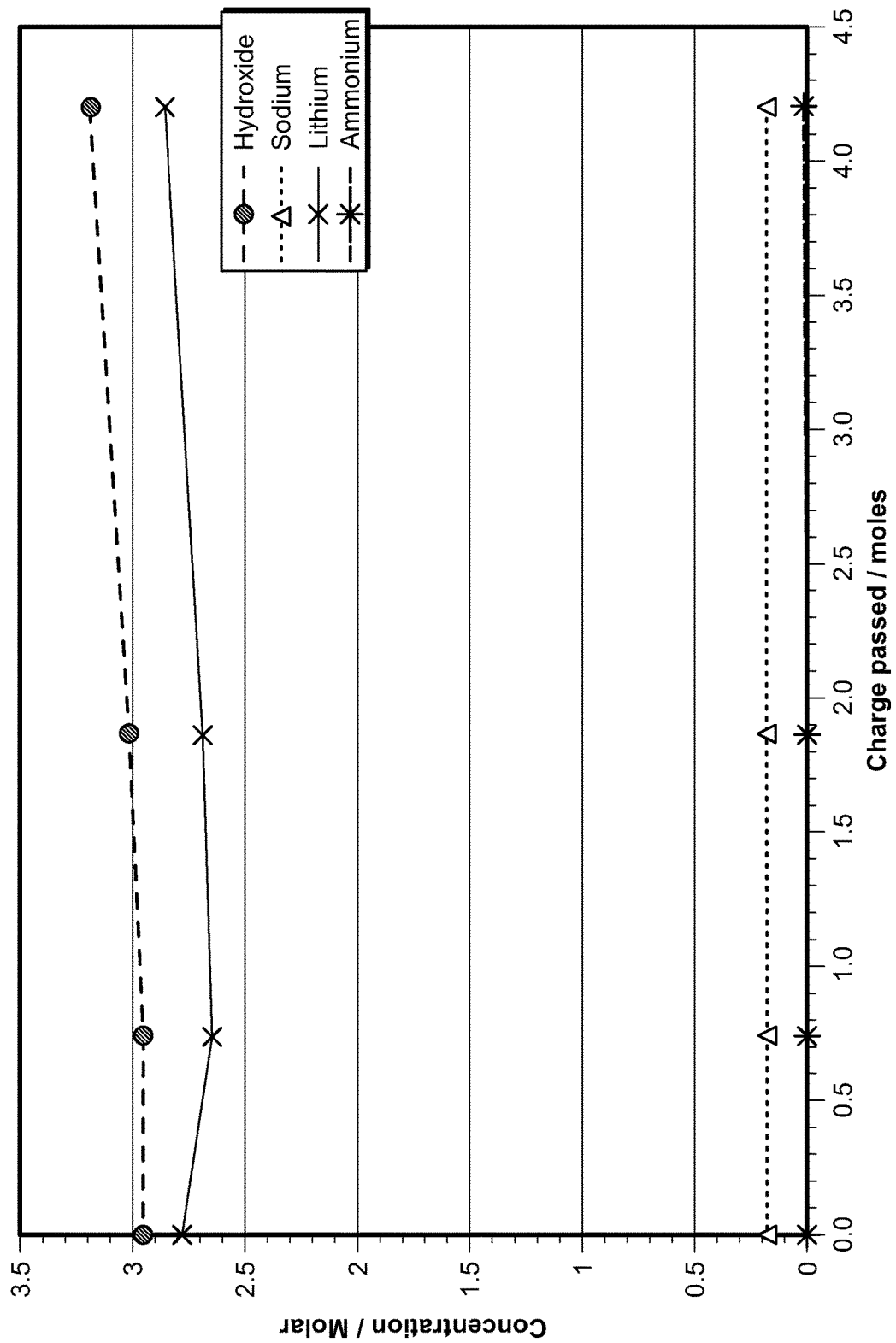
Figure 34:
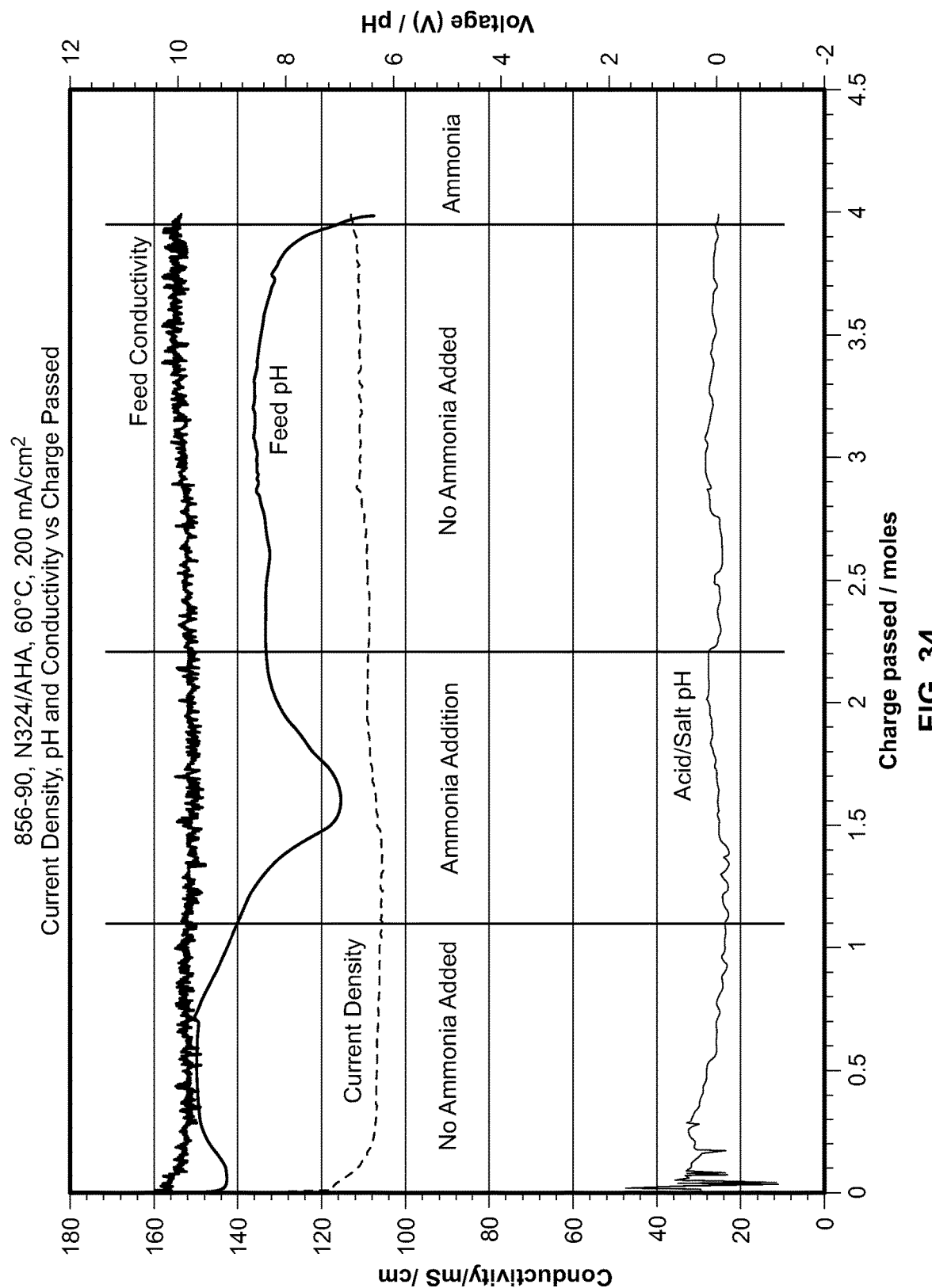

FIG. 28A, FIG. 28B, FIG. 28C and FIG. 28D show plots relating to a process according to the present disclosure using N324/AHA membranes at about 60° C.: FIG. 28A is a plot showing current and voltage as a function of charge passed, FIG. 28B is a plot showing feed conductivity, current density and acid pH as a function of charge passed, FIG. 28C is a plot showing the concentration in the "acid" compartment, feed and base of various ions as a function of charge passed and FIG. 28D is a plot showing sulfate current efficiency as a function of charge passed;

FIG. 29A, FIG. 29B, FIG. 29C, FIG. 29D, FIG. 29E, FIG. 29F and FIG. 29G show plots relating to a process according to the present disclosure using N324/AHA membranes at about 60° C.: FIG. 29A is a plot showing current and voltage as a function of charge passed, FIG. 29B is a plot showing feed conductivity, voltage, feed pH and acid pH as a function of charge passed, FIG. 29C is a plot showing a current/voltage ramp, FIG. 29D is a plot showing the concentration in the feed of various ions as a function of charge passed, FIG. 29E is a plot showing the concentration of ammonium and sulfate in the acid compartment (or anolyte compartment) as a function of charge passed, FIG. 29F is a plot showing the concentration of various ions in the base as a function of charge passed, and FIG. 29G is a plot showing sulfate current efficiency as a function of charge passed;

FIG. 30A, FIG. 30B, FIG. 30C, FIG. 30D, FIG. 30E, FIG. 30F and FIG. 30G show plots relating to a process according to the present disclosure using N324/AHA membranes at about 60° C.: FIG. 30A is a plot showing current and voltage as a function of charge passed; FIG. 30B is a plot showing feed conductivity, voltage, feed pH and acid pH as a function of charge passed, FIG. 30C is a plot showing the concentration of various ions in the feed as a function of charge passed, FIG. 30D is a plot showing the concentration of various ions in the base as a function of charge passed, FIG. 30E is a plot showing the concentration of ammonium and sulfate in the "acid" compartment as a function of charge passed, FIG. 30F is a plot showing sulfate current efficiency as a function of charge passed, and FIG. 30G is a plot showing the concentration of various ions in the feed as a function of charge passed;

FIG. 31A, FIG. 31B, FIG. 31C, FIG. 31D, FIG. 31E and FIG. 31F show plots relating to a process according to the present disclosure using N324/AHA membranes at about 60° C. and about 200 mA/cm$^2$: FIG. 31A is a plot showing current and voltage as a function of charge passed, FIG. 31B is a plot showing feed conductivity, voltage, feed pH and acid pH as s function of charge passed, FIG. 31C is a plot showing the concentration of various ions in the feed as a function of charge passed, FIG. 31D is a plot showing the concentration of ammonium and sulfate in the "acid" compartment as a function of charge passed, FIG. 31E is a plot showing the concentration of various ions in the base as a function of charge passed, and FIG. 31F is a plot showing sulfate current efficiency as a function of charge passed;

FIG. 32A, FIG. 32B, FIG. 32C, FIG. 32D, FIG. 32E, FIG. 32F and FIG. 32G show plots relating to a process according to the present disclosure using N324/AHA membranes at about 80° C. and about 200 mA/cm$^2$: FIG. 32A is a plot showing current and voltage as a function of charge passed, FIG. 32B is a plot showing feed conductivity, voltage, feed pH and acid pH as a function of charge passed, FIG. 32C is a plot showing a current/voltage ramp, FIG. 32D is a plot showing the concentration of various ions in the feed as a function of charge passed, FIG. 32E is a plot showing the concentration of ammonium and sulfate in the "acid" compartment as a function of charge passed, FIG. 32F is a plot showing the concentration of various ions in the base as a function of charge passed, and FIG. 32G is a plot showing sulfate current efficiency as a function of charge passed;

FIG. 33A, FIG. 33B, FIG. 33C, FIG. 33D, FIG. 33E, FIG. 33F and FIG. 33G show plots relating to a process according to the present disclosure using N324/AHA membranes at about 60° C. and about 200 mA/cm$^2$: FIG. 33A is a plot showing current and voltage as a function of charge passed; FIG. 33B is a plot showing the concentration of various ions in the feed as a function of charge passed, FIG. 33C is a plot showing feed conductivity, voltage, feed pH and acid pH as a function of charge passed, FIG. 33D is a plot showing the concentration of various ions in the feed as a function of charge passed, FIG. 33E is a plot showing the concentration of ammonium and sulfate in the "acid" compartment as a function of charge passed, FIG. 33F is a plot showing the concentration of various ions in the base as a function of charge passed, and FIG. 33G is a plot showing sulfate current efficiency as a function of charge passed; and FIG. 34 is a plot showing the current density, pH and conductivity as a function of charge passed in an example of a process according to the present disclosure using N324/AHA membranes at about 60° C. and about 200 mA/cm$^2$.

Further features and advantages will become more readily apparent from the following description of various embodiments as illustrated by way of examples.

The term "suitable" as used herein means that the selection of the particular conditions would depend on the specific manipulation or operation to be performed, but the selection would be well within the skill of a person trained in the art. All processes described herein are to be conducted under conditions sufficient to provide the desired product.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

The expression "at least one metal ion", as used herein refers, for example, to at least one type of ion of at least one metal. For example, the at least one metal ion can be M. In this example, $M^{X+}$ is an ion of the metal M, wherein $X^+$ is a particular form or oxidation state of the metal M. Thus, $M^{X+}$ is at least one type of ion (oxidation state X+) of at least one metal (M). For example, $M^{Y+}$ can be another type of ion of the metal M, wherein X and Y are different integers.

The expression "is at least substantially maintained" as used herein when referring to a value of a pH or a pH range that is maintained during a process of the disclosure or a portion thereof (for example sparging, heating, electrodialysis, electrolysis, etc.) refers to maintaining the value of the pH or the pH range at least 75, 80, 85, 90, 95, 96, 97, 98 or 99% of the time during the process or the portion thereof.

The expression "is at least substantially maintained" as used herein when referring to a value of a concentration or a concentration range that is maintained during a process of the disclosure or a portion thereof (for example sparging, heating, electrodialysis, electrolysis, etc.) refers to maintaining the value of the concentration or the concentration range at least 75, 80, 85, 90, 95, 96, 97, 98 or 99% of the time during the process or the portion thereof.

The expression "is at least substantially maintained" as used herein when referring to a value of a temperature or a temperature range that is maintained during a process of the disclosure or a portion thereof (for example sparging, heating, electrodialysis, electrolysis, etc.) refers to maintaining the value of the temperature or the temperature range at least 75, 80, 85, 90, 95, 96, 97, 98 or 99% of the time during the process or the portion thereof.

The expression "is at least substantially maintained" as used herein when referring to a value of an oxidation potential or an oxidation potential range that is maintained during a process of the disclosure or a portion thereof (for example sparging, heating, electrodialysis, electrolysis, etc.) refers to maintaining the value of the oxidation potential or the oxidation potential range at least 75, 80, 85, 90, 95, 96, 97, 98 or 99% of the time during the process or the portion thereof.

The expression "is at least substantially maintained" as used herein when referring to a value of an electrical current or an electrical current range that is maintained during a process of the disclosure or a portion thereof (for example electrodialysis, electrolysis, etc.) refers to maintaining the value of the electrical current or the electrical current range at least 75, 80, 85, 90, 95, 96, 97, 98 or 99% of the time during the process or the portion thereof.

The expression "is at least substantially maintained" as used herein when referring to a value of a voltage or a voltage range that is maintained during a process of the disclosure or a portion thereof (for example electrodialysis, electrolysis, etc.) refers to maintaining the value of the voltage or the voltage range at least 75, 80, 85, 90, 95, 96, 97, 98 or 99% of the time during the process or the portion thereof.

The below presented examples are non-limitative and are used to better exemplify the processes of the present disclosure.

The processes of the present disclosure can be effective for treating various lithium-containing materials. The lithium-containing material can be a lithium-containing ore, a lithium compound, or a recycled industrial lithium-containing entity. For example, the lithium-containing ore can be, for example, α-spodumene, β-spodumene, lepidolite, pegmatite, petalite, eucryptite, amblygonite, hectorite, smectite, clays, or mixtures thereof. The lithium compound can be, for example, LiCl, $Li_2SO_4$, $LiHCO_3$, $Li_2CO_3$, $LiNO_3$, $LiC_2H_3O_2$ (lithium acetate), LiF, lithium stearate or lithium citrate. The lithium-containing material can also be a recycled industrial lithium-containing entity such as lithium batteries, other lithium products or derivatives thereof.

A person skilled in the art would appreciate that various reaction parameters, will vary depending on a number of factors, such as the nature of the starting materials, their level of purity, the scale of the reaction as well as all the parameters since they can be dependent from one another, and could adjust the reaction conditions accordingly to optimize yields.

For example, in the processes of the present disclosure useful for preparing lithium carbonate, the processes can comprise heating the supernatant at a temperature of at least about 85° C. so as to at least partially convert the lithium bicarbonate into lithium carbonate and precipitate any dissolved lithium carbonate contained therein.

For example, in the processes of the present disclosure useful for preparing lithium carbonate, the starting material can be, for example, lithium hydroxide. For example, it can be lithium hydroxide produced by a process as described in the present disclosure.

For example, conversion of lithium hydroxide into lithium carbonate can be carried out by:
  reacting an aqueous composition comprising the lithium hydroxide with $CO_2$ by sparging the $CO_2$ into the composition, the sparging being carried out at a pH of about 10 to about 12.5, thereby obtaining a precipitate comprising the lithium carbonate;
  inserting at least a portion of the precipitate into a clarifier and obtaining a supernatant comprising lithium bicarbonate and a solid comprising the lithium carbonate, separating the solid from the supernatant; and
  heating the supernatant at a temperature of at least about 85° C. so as to at least partially convert the lithium bicarbonate into lithium carbonate.

The processes of the present disclosure can be effective for treating various lithium-containing materials. The lithium-containing material can be a lithium-containing ore, a lithium compound or a recycled industrial lithium-containing entity. For example, the lithium-containing ore can be, for example, α-spodumene, β-spodumene, lepidolite, pegmatite, petalite, eucryptite, amblygonite, hectorite, smectite, clays, or mixtures thereof. The lithium compound can be, for example, LiCl, $Li_2SO_4$, $LiHCO_3$, $Li_2CO_3$, $LiNO_3$, $LiC_2H_3O_2$ (lithium acetate), lithium stearate, lithium citrate or LiF. The lithium-containing material can also be a recycled industrial lithium-containing entity such as lithium batteries, other lithium products or derivatives thereof.

A person skilled in the art would appreciate that various reaction parameters such as, for example, reaction time, reaction temperature, reaction pressure, reactant ratio, flow rate, reactant purity, current density, voltage, retention time, pH, oxidation/reduction potential, bed volumes, type of resin used, and/or recycle rates, will vary depending on a number of factors, such as the nature of the starting materials, their level of purity, the scale of the reaction as well as all the parameters previously mentioned since they can be dependent from one another, and could adjust the reaction conditions accordingly to optimize yields.

For example, when the process comprises heating the supernatant at the temperature of at least about 85° C. so as to at least partially convert the lithium bicarbonate into lithium carbonate, it can further comprise precipitating any dissolved lithium carbonate contained therein.

For example, when sparging, the pH can be at least substantially maintained at a value of about 10 to about 12.5, about 10.5 to about 12.0, about 10.5 to about 11.5, about 10.7 to about 11.3, about 10.8 to about 11.2, about 10.9 to about 11.1 or about 11.

For example, the supernatant can be heated at a temperature of at least about 87° C., at least about 89° C., at least about 91° C., at least about 93° C., at least about 95° C., at least about 97° C., about 85° C. to about 105° C., about 90° C. to about 100° C., about 92° C. to about 98° C., about 93° C. to about 97° C., about 94° C. to about 96° C., or about 95° C.

For example, during the processes, the aqueous composition comprising lithium hydroxide can be at least substantially maintained at a concentration of lithium hydroxide of about 30 to about 70 g/L, about 40 to about 60 g/L or about 48 to about 55 g/L.

For example, the sparging can be carried out at a temperature of about 10 to about 40° C., about 15 to about 30° C. or about 20 to about 30° C.

For example, when heating the supernatant, the latter can be maintained at a Li concentration of about 1 to about 10 g/L, about 2 to about 6 g/L or about 3 to about 5 g/L.

For example, during the electrodialysis or the electrolysis, the pH of the composition comprising lithium sulfate or the lithium compound can be at least substantially maintained at a value of about 9.5 to about 12.5, about 10 to about 12, about 10.5 to about 12.5, about 11 to about 12.5, about 11 to about 12, about 9.8 to about 10.8, about 9.8 to about 10.2, about 10 to about 10.5, or about 10.

For example, during the electrodialysis or the electrolysis, the pH of the composition comprising lithium sulfate or the lithium compound can be at least substantially maintained at a value between 7 and 14.5, 7 and 14, 7 and 13.5, 7 and 13, 7 and 12, 7 and 10; or 7 and 9.

For example, the pH of the wherein during the electrodialysis or electrolysis, the aqueous composition comprising lithium sulfate or the lithium compound can have a pH between 7 and 14.5, 7 and 14, 7 and 13.5, 7 and 13, 7 and 12, 7 and 10; or 7 and 9.

For example, the pH of the wherein during the electrodialysis or electrolysis, the aqueous composition comprising lithium sulfate or the lithium compound can have a pH of about 9.5 to about 12.5, about 10 to about 12, about 10.5 to about 12.5, about 11 to about 12, about 9.8 to about 10.8, about 9.8 to about 10.2, about 10 to about 10.5, or about 10.

For example, the electrodialysis or the electrolysis can be carried out in a three-compartment membrane electrolysis cell.

For example, the electrodialysis or the electrolysis can be carried out in a two-compartment membrane electrolysis cell.

For example, the electrodialysis or the electrolysis can be carried out in a three-compartment membrane cell.

For example, the electrodialysis or the electrolysis can be carried out in a two-compartment membrane cell.

For example, the electrolysis can be carried out in a monopolar electrolysis cell. For example, the electrolysis can be carried out in a monopolar three-compartment electrolysis cell.

For example, the electrolysis can be carried out in a bipolar electrolysis cell. For example, the electrolysis can be carried out in a bipolar three-compartment electrolysis cell.

For example, the electrodialysis can be carried out in a bipolar electrodialysis cell. For example, the electrodialysis can be carried out in a bipolar three-compartment electrodialysis cell.

For example, the aqueous composition comprising the lithium sulphate or the lithium compound can be submitted to a monopolar membrane electrolysis process.

For example, the aqueous composition comprising the lithium sulphate or the lithium compound can be submitted to a monopolar three compartment membrane electrolysis process.

For example, the aqueous composition comprising the lithium sulphate or lithium compound can be submitted to a bipolar membrane electrodialysis process.

For example, the aqueous composition comprising the lithium sulphate or lithium compound can be submitted to a bipolar three compartment electrodialysis process.

For example, the electrodialysis or the electrolysis can be carried out in an electrolytic cell in which a cathodic compartment is separated from the central or anodic compartment by a cathodic membrane.

For example, the electrodialysis can be carried out in a bipolar membrane. For example such a membrane is a membrane that splits water molecules (H+ and OH−) and wherein acid and base solution are produced, for example, at low concentration.

For example, the electrolysis can be carried out by using a monopolar membrane. For example, it can be carried out by using an electrolysis stack comprising three compartment cells equipped with monopolar membranes and bipolar electrodes. For example, such electrodes are effective for evolving gaseous hydrogen ($H_2$) at the cathodic electrode and gaseous oxygen ($O_2$) or chlorine gas ($Cl_2$) at the anodic electrode. For example, such electrodes are effective for splitting water molecules.

For example, the membrane can be a perfluorinated membrane or a styrene/divinylbenzene membrane.

For example, the membrane can be a cation exchange membrane, PEEK-reinforced membrane.

For example, the electrodialysis or the electrolysis can be carried out by introducing the aqueous composition comprising the lithium compound (for example LiCl, LiF, $Li_2SO_4$, $LiHCO_3$, $Li_2CO_3$, $LiNO_3$, $LiC_2H_3O_2$ (lithium acetate), lithium stearate or lithium citrate) into a central compartment, an aqueous composition comprising lithium hydroxide into a cathodic compartment, and generating an aqueous composition comprising an acid (for example HCl, $H_2SO_4$, $HNO_3$ or acetic acid) in an anodic compartment (or acid compartment). The person skilled in the art would understand that, for example, when LiCl is introduced in the central compartment, HCl is generated in the anodic compartment, for example a monopolar membrane electrolysis cell. For example, when LiF is used in the central compartment, HF is generated in the anodic compartment. For example, when $Li_2SO_4$ is used in the central compartment, $H_2SO_4$ is generated in the anodic compartment. For example, when $LiHCO_3$ is used in the central compartment, $H_2CO_3$ is generated in the anodic compartment. For example, when $LiNO_3$ is used in the central compartment, $HNO_3$ is generated in the anodic compartment. For example, when $LiC_2H_3O_2$ is used in the central compartment, acetic acid is generated in the anodic compartment. For example, when lithium stearate is used in the central compartment, stearic acid is generated in the anodic compartment. For example, when lithium citrate is used in the central compartment, citric acid is generated in the anodic compartment.

For example, the electrodialysis or the electrolysis can be carried out by introducing the lithium sulphate into a central compartment, an aqueous composition comprising lithium hydroxide into a cathodic compartment, and generating an aqueous composition comprising sulphuric acid in an anodic compartment.

For example, an anolyte used during the process can comprise ammonia, ammonium bisulfate, ammonium sulfate and/or $NH_4OH$. For example, an anolyte used during the process can comprise ammonia, ammonium bisulfate, ammonium sulfate and/or $NH_4OH$, thereby generating an ammonium salt.

For example, the process can further comprise adding ammonia and/or $NH_4OH$, for example gaseous or liquid ammonia, for example $NH_3$ and/or $NH_4OH$, in an anolyte compartment, in an acid compartment, in the anolyte, at an anode or adjacently thereof, wherein the anode is used for the process.

For example, the process can further comprise adding ammonia and/or $NH_4OH$, in an anolyte compartment, in an anolyte at an anode or adjacently thereof, thereby generating an ammonium salt, wherein the anode is used for the process.

For example, the process can further comprise adding ammonia and/or $NH_4OH$ in an anolyte compartment or in an anolyte used for the process.

For example, the process can further comprise adding ammonia and/or $NH_4OH$ in an anolyte used for the process, thereby generating an ammonium salt.

For example, the ammonium salt can be $(NH_4)_2SO_4$.

For example, concentration of the produced ammonium salt can be about 1 to about 4 M, about 1 to about 3 M, or about 1.5 M to about 2.5 M.

For example, concentration of the ammonium bisulfate present in the anolyte can be at a concentration of about 1 to about 4 M, about 1 to about 3 M, or about 1.5 M to about 3.5 M.

For example, concentration of the ammonium sulfate present in the anolyte can be at a concentration of about 1 to about 4 M, about 1 to about 3 M, or about 1.5 M to about 3.5 M.

For example, pH of the anolyte is maintained at a value of about −0.5 to about 4.0, about −0.5 to about 3.5, about −0.25 to about 1.5 or about −0.25 to about 1.0.

For example, ammonia can be added in a substoichiometric quantity as compared to sulfuric acid produced.

For example, ammonia can be added in a molar ratio ammonia:sulfuric acid comprised between 0.5:1 and 2:1 or between 1:1 and 1.9:1.

For example, the electrodialysis or the electrolysis can be carried out by introducing the aqueous composition comprising the lithium compound (for example LiCl, LiF, $Li_2SO_4$, $LiHCO_3$, $Li_2CO_3$, $LiNO_3$, $LiC_2H_3O_2$ (lithium acetate), lithium stearate or lithium citrate) into a central compartment, an aqueous composition comprising lithium hydroxide into a cathodic compartment, and an aqueous composition comprising $NH_3$ into an anodic compartment. For example, when an aqueous composition comprising $NH_3$ is introduced into the anodic compartment, proton-blocking membranes may not be required and membranes which are capable, for example of running at a temperature of about 80° C. and which may, for example, have lower resistance can be used. For example, the aqueous composition comprising the lithium compound can further comprise $Na^+$.

For example, during the electrodialysis or the electrolysis, the aqueous composition comprising lithium hydroxide can be at least substantially maintained at a concentration of lithium hydroxide of about 30 to about 90 g/L, about 40 to about 90 g/L, about 35 to about 70 g/L, about 40 to about 66 g/L, about 45 to about 65 g/L, about 48 to about 62 g/L or about 50 to about 60 g/L.

For example, during the electrodialysis or the electrolysis, the aqueous composition comprising lithium hydroxide can be at least substantially maintained at a concentration of lithium hydroxide of about 1 to about 5 M, about 2 to about 4 M, about 2.5 to about 3.5 M, about 2.7 to about 3.3 M, about 2.9 to about 3.1 M or about 3 M.

For example, during the electrodialysis or the electrolysis, the aqueous composition comprising sulphuric acid can be at least substantially maintained at a concentration of sulphuric acid of about 30 to about 100 g/L, about 40 to about 100 g/L, about 60 to about 90 g/L, about 20 to about 40 g/L, about 20 to about 50 g/L, about 25 to about 35 g/L, or about 28 to about 32 g/L.

For example, during the electrodialysis or the electrolysis, the aqueous composition comprising sulphuric acid can be at least substantially maintained at a concentration of sulphuric acid of about 0.1 to about 5 M, about 0.2 to about 3M, about 0.3 to about 2 M, about 0.3 to about 1.5 M, about 0.4 to about 1.2 M, about 0.5 to about 1 M, or about 0.75 M.

For example, during the electrodialysis or the electrolysis, the aqueous composition comprising lithium sulphate can be at least substantially maintained at a concentration of lithium sulphate of about 5 to about 30 g/L, about 5 to about 25 g/L, about 10 to about 20 g/L, or about 13 to about 17 g/L.

For example, during the electrodialysis or the electrolysis, the aqueous composition comprising lithium sulphate can be at least substantially maintained at a concentration of lithium sulphate of about 0.2 to about 3 M, about 0.4 to about 2.5 M, about 0.5 to about 2 M, or about 0.6 to about 1.8 M.

For example, during the electrodialysis or the electrolysis, the aqueous composition comprising lithium sulphate can be at least substantially maintained at a concentration of sulphate ($SO_4^{2-}$) of about 0.2 to about 3 M, about 0.4 to about 2.5 M, about 0.5 to about 2 M, or about 0.6 to about 1.8 M.

For example, during the electrodialysis or the electrolysis, the aqueous composition comprising lithium sulphate can comprise between about 1 to about 30%, about 1 to about 25%, about 5 to about 25%, about 10 to about 25%, by weight of sodium based on the total weight of sodium and lithium in the composition.

For example, during the electrodialysis or the electrolysis, the aqueous composition comprising lithium sulphate can comprise sodium. The ratio Li:Na (g/g) can be about 2:1 to about 10:1 or about 3:1 to about 5:1.

For example, during the electrodialysis or the electrolysis, temperature of the aqueous composition comprising lithium sulphate or lithium compound can be at least substantially maintained at a value of about 20 to about 80° C., about 20 to about 60° C., about 30 to about 40° C., about 50 to about 60° C., or about 46 to about 54° C.

For example, during the electrodialysis or the electrolysis, temperature of the aqueous composition comprising lithium sulphate can be at least substantially maintained at a value of about 20 to about 60° C., about 30 to about 40° C., about 50 to about 60° C., or about 46 to about 54° C. The person skilled in the art would understand that such a temperature can vary as a function of the membrane chosen in the electrolysis cell.

For example, when an aqueous composition comprising $NH_3$ is introduced into the anodic compartment during the electrodialysis or the electrolysis, temperature of the aqueous composition comprising lithium sulphate can be at least substantially maintained at a value of about 20 to about 100° C., about 20 to about 95° C., about 20 to about 90° C., about 45 to about 95° C., about 65 to about 95° C., about 20 to about 80° C. about 20 to about 80° C., about 75 to about 85° C., about 20 to about 60° C., about 30 to about 40° C., about 35 to about 65° C., about 40 to about 60° C., about 35 to about 45° C., about 55 to about 65° C., about 50 to about 60° C. or about 46 to about 54° C.

For example, during the electrodialysis or the electrolysis, electrical current can be at least substantially maintained at a density of about 300 to about 6000 $A/m^2$, about 2000 to about 6000 $A/m^2$, about 3500 to about 5500 $A/m^2$. about 4000 to about 5000 $A/m^2$, about 400 to about 3000 $A/m^2$, about 500 to about 2500 $A/m^2$, about 1000 to about 2000 $A/m^2$ about 400 to about 1200 $A/m^2$, about 400 to about 1000 $A/m^2$, about 300 to about 700 $A/m^2$, about 400 to about 600 $A/m^2$, about 425 to about 575 $A/m^2$, about 450 to about 550 $A/m^2$, or about 475 to about 525 $A/m^2$.

For example, during the electrodialysis or the electrolysis, electrical current can be at least substantially maintained at a density of about 30 to about 250 $mA/cm^2$, 50 to about 250 $mA/cm^2$, about 75 to about 200 $mA/cm^2$ or about 100 to about 175 $mA/cm^2$.

For example, during the electrodialysis or the electrolysis, electrical current can be at least substantially maintained at a constant value.

For example, during the electrodialysis or the electrolysis, voltage can be at least substantially maintained at a constant value.

For example, during the process, voltage can be at least substantially maintained at a constant value that is about 3 to about 10 V or about 4 to about 7 V. For example, the cell voltage can be at least substantially maintained at a value of about 1.0 V to about 8.5 V, about 1.0 V to about 3.0 V, about 2.0 V to about 3.0 V, about 3.0 V to about 8.5 V, about 6.5 V to about 8 V, about 5.5 V to about 6.5 V or about 6 V.

For example, during the electrodialysis or the electrolysis, the overall current efficiency can be about 50% to about 90%, about 60% to about 90%, about 60% to about 85%, about 60% to about 70%, about 60% to about 80%, about 65% to about 85%, about 65% to about 80%, about 65% to about 75%, about 70% to about 85% or about 70% to about 80%.

For example, during the electrodialysis or the electrolysis, the overall LiOH current efficiency can be about 50% to about 90%, about 60% to about 90%, about 60% to about 70%, about 60% to about 80%, about 65% to about 85%, about 65% to about 80%, about 65% to about 75%, about 70% to about 85% or about 70% to about 80%.

For example, during the electrodialysis or the electrolysis, the overall $H_2SO_4$ current efficiency can be about 55% to about 95%, 55% to about 90%, about 60% to about 85%, about 65% to about 80%, about 85% to about 95% or about 70% to about 80%.

For example, after generation of LiOH by means of electrolysis or electrodialysis, a mixture comprising Li2SO4 and/or LiHSO4 and H2SO4 can be obtained. For example, Li2SO4 can at least be partially recovered from said mixture by carrying out an electrodialysis.

For example, the aqueous composition comprising $Li^+$ and at least one metal ion can be reacted with the base so as to obtain a pH of about 4.8 to about 6.5, about 5.0 to about 6.2, about 5.2 to about 6.0, about 5.4 to about 5.8 or about 5.6.

For example, the aqueous composition comprising $Li^+$ and at least one metal ion can be reacted with lime.

For example, the at least one metal ion comprised in the aqueous composition that is reacted with the base so as to obtain a pH of about 4.5 to about 6.5 can be chosen from $Fe^{2+}$, $Fe^{3+}$ and $Al^{3+}$.

For example, the at least one metal ion comprised in the aqueous composition that is reacted with the base so as to obtain a pH of about 4.5 to about 6.5 can comprise $Fe^{3+}$.

For example, the at least one metal ion comprised in the aqueous composition that is reacted with the base so as to obtain a pH of about 4.5 to about 6.5 can comprise $Al^{3+}$.

For example, the at least one metal ion comprised in the aqueous composition that is reacted with the base so as to obtain a pH of about 4.5 to about 6.5 can comprise $Fe^{3+}$ and $Al^{3+}$.

For example, the at least one hydroxide comprised in the precipitate can be chosen from $Al(OH)_3$ and $Fe(OH)_3$.

For example, the precipitate can comprise at least two hydroxides that are $Al(OH)_3$ and $Fe(OH)_3$.

For example, the base used so as to obtain a pH of about 4.5 to about 6.5 can be lime.

For example, lime can be provided as an aqueous composition having a concentration of about 15% by weight to about 25% by weight.

For example, the processes can further comprise maintaining the aqueous composition comprising $Li^+$ and the at least one metal ion that is reacted with a base so as to obtain a pH of about 4.5 to about 6.5 at an oxidative potential of at least about 350 mV.

For example, the aqueous composition can be at least substantially maintained at an oxidative potential of at least about 350 mV by sparging therein a gas comprising $O_2$. For example, the gas can be air. Alternatively, the gas can be $O_2$.

For example, the processes can comprise reacting the aqueous composition comprising $Li^+$ and having the reduced content of the at least one metal ion with the another base so as to obtain a pH of about 9.5 to about 11.5, about 10 to about 11, about 10 to about 10.5, about 9.8 to about 10.2 or about 10.

For example, the base used so as to obtain a pH of about 9.5 to about 11.5 can be NaOH, KOH or LiOH.

For example, the base used so as to obtain a pH of about 9.5 to about 11.5 can be NaOH.

For example, the at least one metal carbonate can be chosen from $Na_2CO_3$, $NaHCO_3$, and $(NH_4)_2CO_3$.

For example, the base and metal carbonate can be a mixture of aqueous NaOH, $NaHCO_3$, LiOH and $LiHCO_3$.

For example, the at least one metal carbonate can be $Na_2CO_3$.

For example, the aqueous composition comprising $Li^+$ and having the reduced content of the at least one metal ion can be reacted with the another base over a period of time sufficient for reducing the content of the at least one metal ion in the aqueous composition below a predetermined value. For example, the at least one metal ion can be chosen from $Mg^{2+}$, $Ca^{2+}$ and $Mn^{2+}$. For example, the reaction can be carried out over a period of time sufficient for reducing the content of $Ca^{2+}$ below about 250 mg/L, about 200 mg/L, about 150 mg/L, or about 100 mg/L. For example, the reaction can be carried out over a period of time sufficient for reducing the content of $Mg^{2+}$ below about 100 mg/L, about 50 mg/L, about 25 mg/L, about 20 mg/L, about 15 mg/L or about 10 mg/L.

For example, the ion exchange resin can be a cationic resin.

For example, the ion exchange resin can be a cationic resin that is substantially selective for divalent and/or trivalent metal ions.

For example, contacting with the ion exchange resin can allow for reducing a content of $Ca^{2+}$ of the composition below about 10 mg/L, about 5 mg/L, about 1 mg/L, or about 0.5 mg/L.

For example, contacting with the ion exchange resin can allow for reducing a content of $Mg^{2+}$ of the composition below about 10 mg/L, about 5 mg/L, about 1 mg/L, or about 0.5 mg/L.

For example, contacting with the ion exchange resin can allow for reducing total bivalent ion content such as $Ca^{2+}$, $Mg^{2+}$ and $Mn^{2+}$ of the composition below about 10 mg/L, about 5 mg/L, about 1 mg/L or about 0.5 mg/L.

For example, the acid roasted lithium-containing material can be leached with water so as to obtain the aqueous composition comprising $Li^+$ and at least three metal ions chosen from the following metals: iron, aluminum, manganese and magnesium.

For example, the acid roasted lithium-containing material can be leached with water so as to obtain the aqueous composition comprising $Li^+$ and at least three metal ions chosen from $Al^{3+}$, $Fe^{2+}$, $Fe^{3+}$, $Mg^{2+}$, $Ca^{2+}$, $Cr^{2+}$, $Cr^{3+}$, $Cr^{6+}$, $Zn^{2+}$ and $Mn^{2+}$.

For example, the acid roasted lithium-containing material can be leached with water so as to obtain the aqueous composition comprising $Li^+$ and at least four metal ions chosen from $Al^{3+}$, $Fe^{2+}$, $Fe^{3+}$, $Mg^{2+}$, $Ca^{2+}$, $Cr^{2+}$, $Cr^{3+}$, $Cr^{6+}$, $Zn^{2+}$ and $Mn^{2+}$.

For example, during the electrodialysis or the electrolysis, the pH can be at least substantially maintained at a value of about 10 to about 12, about 10.5 to about 12.5, or about 11 to about 12.

For example, the acid roasted lithium-containing material can be β-spodumene that has been previously reacted with $H_2SO_4$.

For example, the acid roasted lithium-containing material can be obtained by using a process as described in CA 504,477, which is hereby incorporated by reference in its entirety.

For example, the acid roasted lithium-containing material can be a α-spodumene, β-spodumene, lepidolite, pegmatite, petalite, amblygonite, hectorite, smectite, clays, or mixtures thereof, that has been previously reacted with $H_2SO_4$.

For example, the base-baked lithium-containing material can be β-spodumene that has been previously reacted with $Na_2CO_3$ and with $CO_2$, and eventually heated.

For example, when carrying out the leaching of the base-baked lithium material, lithium carbonate can be formed in the baked ore (very low solubility in water). It can then be slurried and sparged with $CO_2$ (for example in an autoclave) to convert lithium carbonate to water soluble lithium bicarbonate, and heated at a temperature of about 85 to about 95° C. to drive off $CO_2$ and re-precipitate a more pure lithium carbonate. The bicarbonate step can be repeated to obtain a higher purity grade. It can be possible to bake the β-spodumene with sodium hydroxide and leach out lithium hydroxide that could need purification.

In the processes of the present disclosure, the pH can thus be controlled by further adding some base, some acid or by diluting. The ORP can be controlled as previously indicated by sparging air.

For example, when reacting the aqueous composition comprising $Li^+$ and the at least one metal ion with a base so as to obtain a pH of about 4.5 to about 6.5 and thereby at least partially precipitating the at least one metal ion under the form of at least one hydroxide so as to obtain a precipitate, the metal of the at least one metal ion can be Fe, Al, Cr, Zn or mixtures thereof.

For example, when reacting the aqueous composition comprising $Li^+$ and having the reduced content of the at least one metal ion with another base so as to obtain a pH of about 9.5 to about 11.5, and with optionally at least one metal carbonate, thereby at least partially precipitating at least one metal ion, the metal of the at least one metal ion can be Mn, Mg, Ca or mixtures thereof.

For example, when contacting the aqueous composition comprising $Li^+$ and having a reduced content of the at least one metal ion with an ion-exchange resin so as to at least partially remove at least one metal ion, the at least one metal ion can be $Mg^{2+}$, $Ca^{2+}$ or a mixture thereof.

EXAMPLE 1

Figure 1:
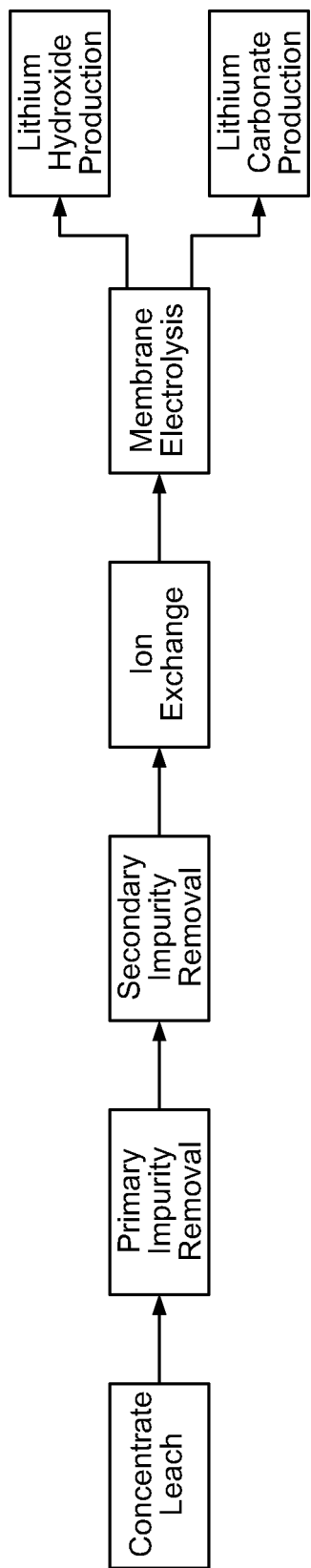
FIG. 1 is a block diagram concerning an example of a process according to the present disclosure.

As shown in FIG. 1, lithium hydroxide can be obtained, for example, by using such a process and by using a pre-leached lithium-containing material as a starting material. For example, various leached ores such as acid roasted β-spodumene can be used. The process shown in FIG. 1 can also be used for producing lithium carbonate. According to another embodiment, the starting material can be a lithium compound such as lithium sulphate, lithium chloride or lithium fluoride. In such a case, the process would be shorter and would be starting at the box entitled "membrane electrolysis".

Acid Roasted β-Spodumene (AR β-Spodumene)

Two different blends of the AR β-spodumene were tested. The samples were composed of different ratios of the flotation and dense media separation (DMS) concentrates. The samples were identified as 75/25 and 50/50. The former sample contained about 75% by weight of the flotation concentrate and about 25% by weight of the DMS concentrate. The latter sample contained substantially equal portions by mass of the two concentrates. The assay data of the feed samples is summarized in Table 1. The two samples had very similar analytical profiles. The 75/25 sample had higher levels of Fe, Mn, Mg, Ca and K than the 50/50 sample. Both samples had typical compositions for AR β-spodumene.

TABLE 1

| Assay Data of the AR β-Spodumene Samples | | | | | | |
| --- | --- | --- | --- | --- | --- | --- |
| Sample | Li | Si | Al | Fe | Na | S |
| | % | | | | | |
| 75/25 Comp | 2.24 | 25.0 | 10.5 | 1.04 | 0.39 | 6.09 |
| 50/50 Comp | 2.29 | 24.4 | 10.4 | 0.96 | 0.36 | 6.06 |
| Sample | Cr | Zn | Mn | Mg | Ca | K |
| | g/t | | | | | |
| 75/25 Comp | 167 | 134 | 1962 | 1186 | 3431 | 3653 |
| 50/50 Comp | 163 | 103 | 1755 | 905 | 2311 | 3376 |

Concentrate Leach (CL) and Primary Impurity Removal (PIR)

The objectives of the Concentrate Leach (CL) and the Primary Impurity Removal (PIR) were 1) to dissolve lithium sulphate contained in the AR β-spodumene and 2) to remove the major impurities from the process solution that co-leach with lithium from the feed solids.

Figure 2:
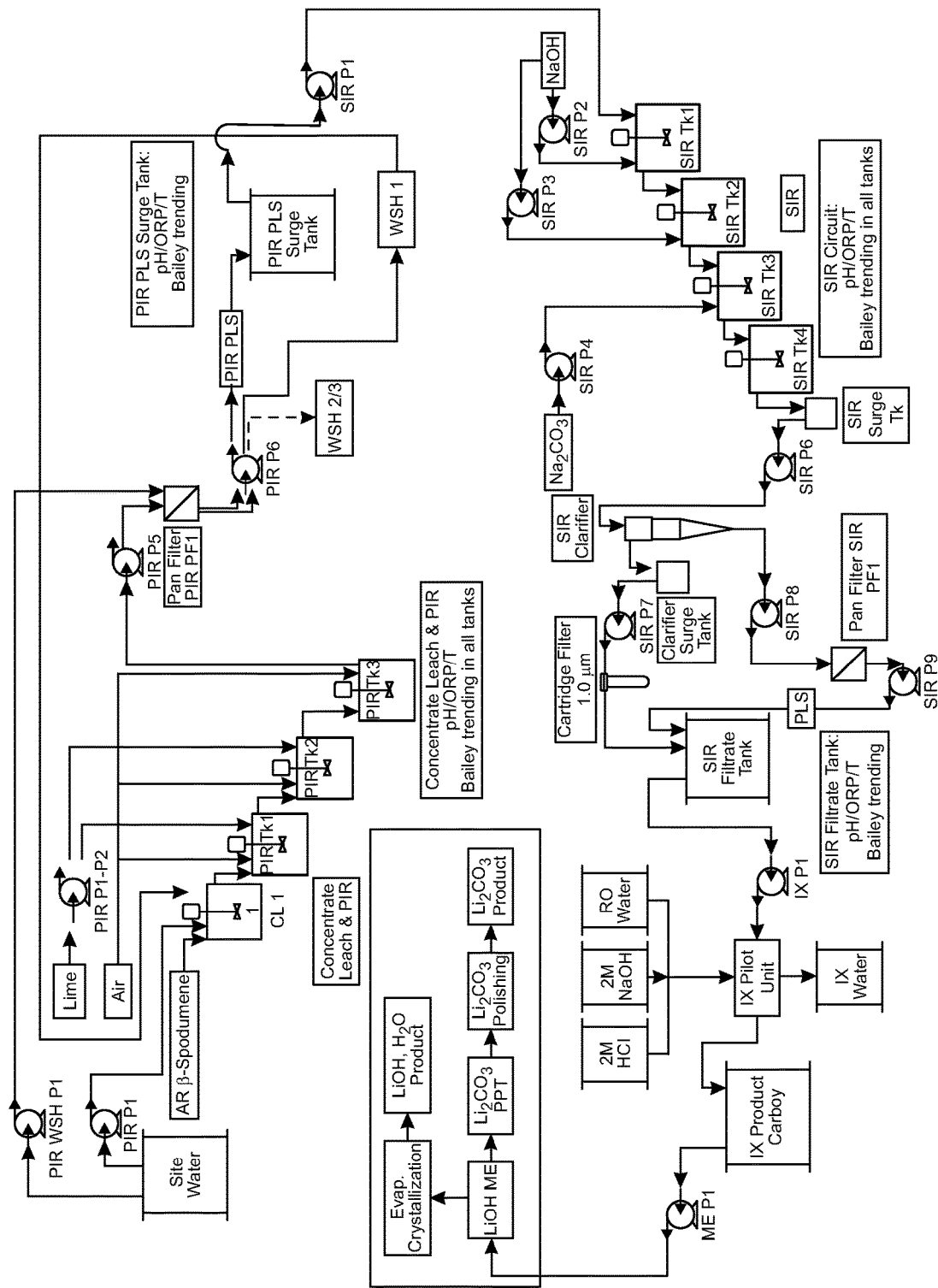
FIG. 2 is a flow sheet diagram concerning another example of a process according to the present disclosure.

A four tank cascade was used for the combined CL and PIR process circuit (see FIG. 2). The AR β-spodumene was added using a feed hopper that was equipped with a vibratory feeder. Each of the reactors was equipped with the following: an overhead mixer motor (0.5 hp) with a 4-blade pitch impeller attached, pH and ORP (Oxidation Reduction Potential) probes. The PIR reactors also had air spargers located directly below the impeller. The process slurry flowed by gravity from one reactor to the next through overflow ports. The overflow port of the CL reactor was set such that the active volume of the tank was about 32 L. The PIR reactors each had an active volume of about 14 L. The overflow from PIR Tank 3 (the last reactor of the tank train) was pumped to the filtration station.

About 1,200 kg of the 75/25 and about 1,400 kg of the 50/50 AR β-spodumene samples were leached in about 85 hours of operation. The change over from one feed to the other occurred at the 37th hour of operation. Time zero of the operation was when pulp began to overflow from the CL reactor.

In the CL step, water and solids were combined in an agitated tank at a 50:50 weight ratio and mixed for about 30 to about 45 minutes under ambient conditions. Lithium was extracted along with undesirable gangue metals such as, for example, iron, aluminum, silicon, manganese, and magnesium. The obtained slurry (CL slurry) thus comprised a solid composition and an aqueous (liquid) composition containing solubilized $Li^+$ (lithium ions) as well as solubilized ions of the above-mentioned metals. The CL slurry pH and ORP were monitored but not controlled. Alternatively, the pH can eventually be controlled by further adding some base, some acid or by diluting. The ORP can also be controlled as previously indicated by sparging air. The CL slurry flowed by gravity to the PIR Tank 1. The aqueous composition can alternatively be separated from the solid composition before being introduced in the PIR Tank 1. In such a case, the aqueous composition (instead of the whole CL slurry as it is the case for the present example) would be inserted into Tank 1.

After 9 hours of operation there was sufficient volume of the Wash 1 fraction (the first displacement wash fraction generated when washing the combined CL and PIR solids residue) to recycle back to the CL. The initial recycle rate of the Wash 1 was set to about 50% of the water addition requirement of the CL. After 37 hours of operation, this amount was increased to make-up 60% of the water addition to the process. This wash stream contained on average about 12 g/L Li (about 95 g/L of $Li_2SO_4$).

Primary Impurity Removal (PIR) was carried out, for example, to substantially remove Fe, Al and Si from the aqueous composition while substantially not precipitating any lithium. In this process, the pH of the concentrate leach slurry (comprising the aqueous composition and the solid composition) was elevated to about 5.6 by lime slurry addition to the three PIR tanks. The lime was added as a slurry having a concentration of about 20 wt %. The CL slurry was thus converted into a precipitate and an aqueous composition. The impurities such as Fe, Al and Si were at least substantially precipitated as insoluble metal hydroxides and found in the precipitate while the lithium ions were substantially found in the aqueous composition. The retention time for the PIR circuit was about 45 to about 60 minutes. Air was sparged into the PIR tanks in order to maintain the oxidative potential of the process slurry at or above about 350 mV. At this level, iron present in the ferrous ($Fe^{2+}$) form would likely oxidize to ferric iron ($Fe^{3+}$), a form suitable for precipitation at such a pH. Thus, a precipitate comprising, for example, metal hydroxides of Fe, Al and Si was obtained and eventually separated from the aqueous composition comprising lithium ions. In the PIR, the pH can thus be controlled by further adding some base, some acid or by diluting. The ORP can be controlled as previously indicated by sparging air.

The resulting slurry (comprising the aqueous composition and the solid composition (comprising the precipitate)) was filtered on pan filters. The filtrate (aqueous composition comprising lithium ions and having a reduced content of the above mentioned metals (such as Fe, Al and Si)) proceeded to Secondary Impurity Removal (SIR). The PIR filter cake underwent three displacement washes. The first wash fraction was collected separately from the second two washes.

The first wash stream was recycled to the CL process as a portion of the water feed stream to recover the contained lithium. Wash fractions 2 and 3 were combined and stored as a solution. This solution can be used for lime slurry make-up to recover the lithium units.

Figure 3:
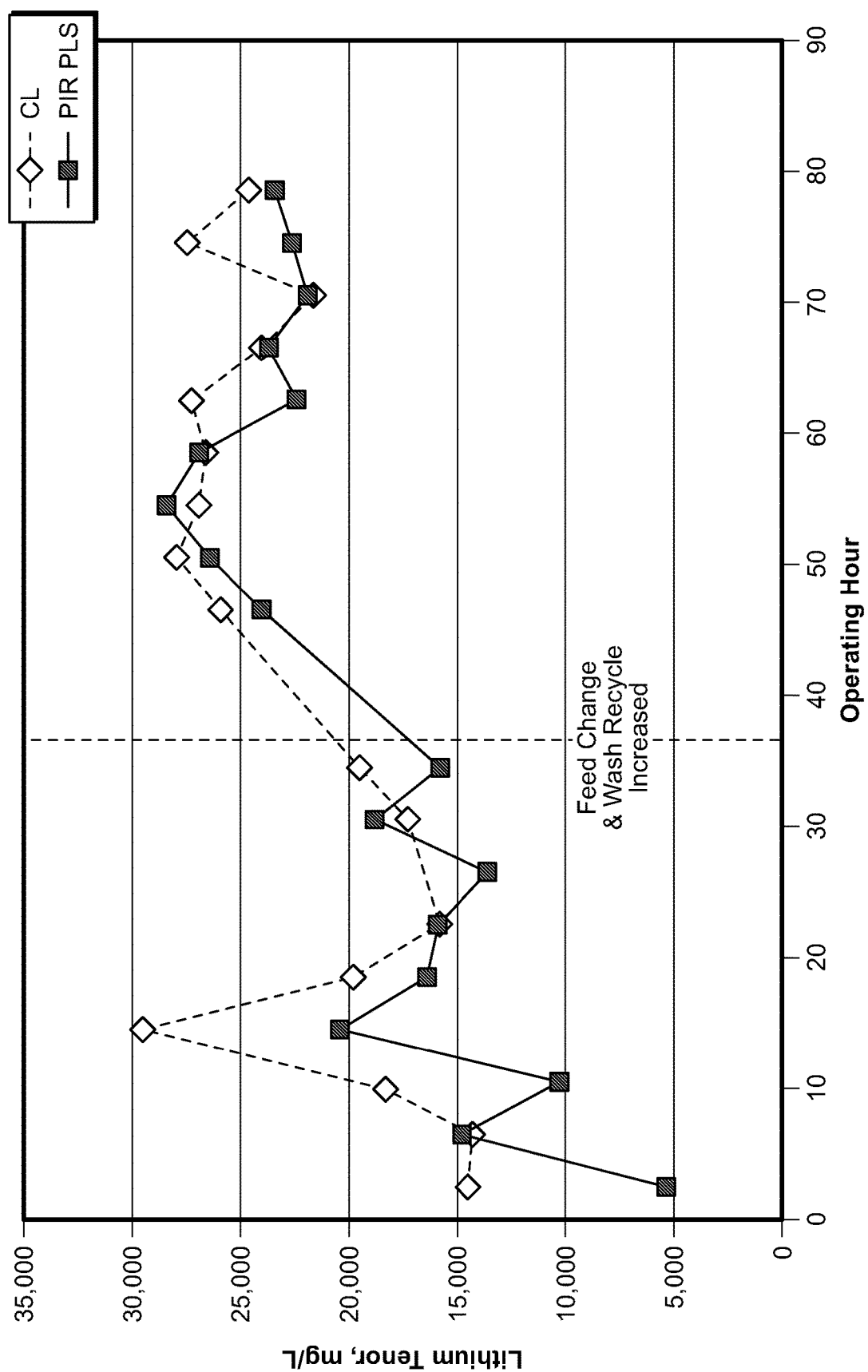
FIG. 3 is a plot showing lithium tenor as a function of time in another example of a process according to the present disclosure.

The lithium tenors in CL and PIR are presented in FIG. 3. At hour 9, the first wash fraction from PIR was recycled back to the CL tank to make-up half of the water addition to the leach. Lithium tenors increased throughout the circuit to about 18 g/L (about 142.6 g/L of $Li_2SO_4$) as a result. At hour 37.5, the recycle rate was increased to make-up 60% of the water to the leach and lithium tenors increased to about 25 g/L (about 198 g/L of $Li_2SO_4$). The PIR first wash lithium tenors ranged from about 12 to about 15 g/L (about 95 g/L to about 118.8 g/L of $Li_2SO_4$).

The pH was substantially steady throughout the operation once the throughput was reduced. The ORP of the slurry in PIR tank 3 was substantially steady and above about 350 mV during the operation. The iron tenors for CL and PIR are presented in FIG. 4. At hours 10 and 54, the pH of PIR3 was near a value of about 5.6 and yet the iron tenor in the PIR3 liquor increased.

Figure 4:
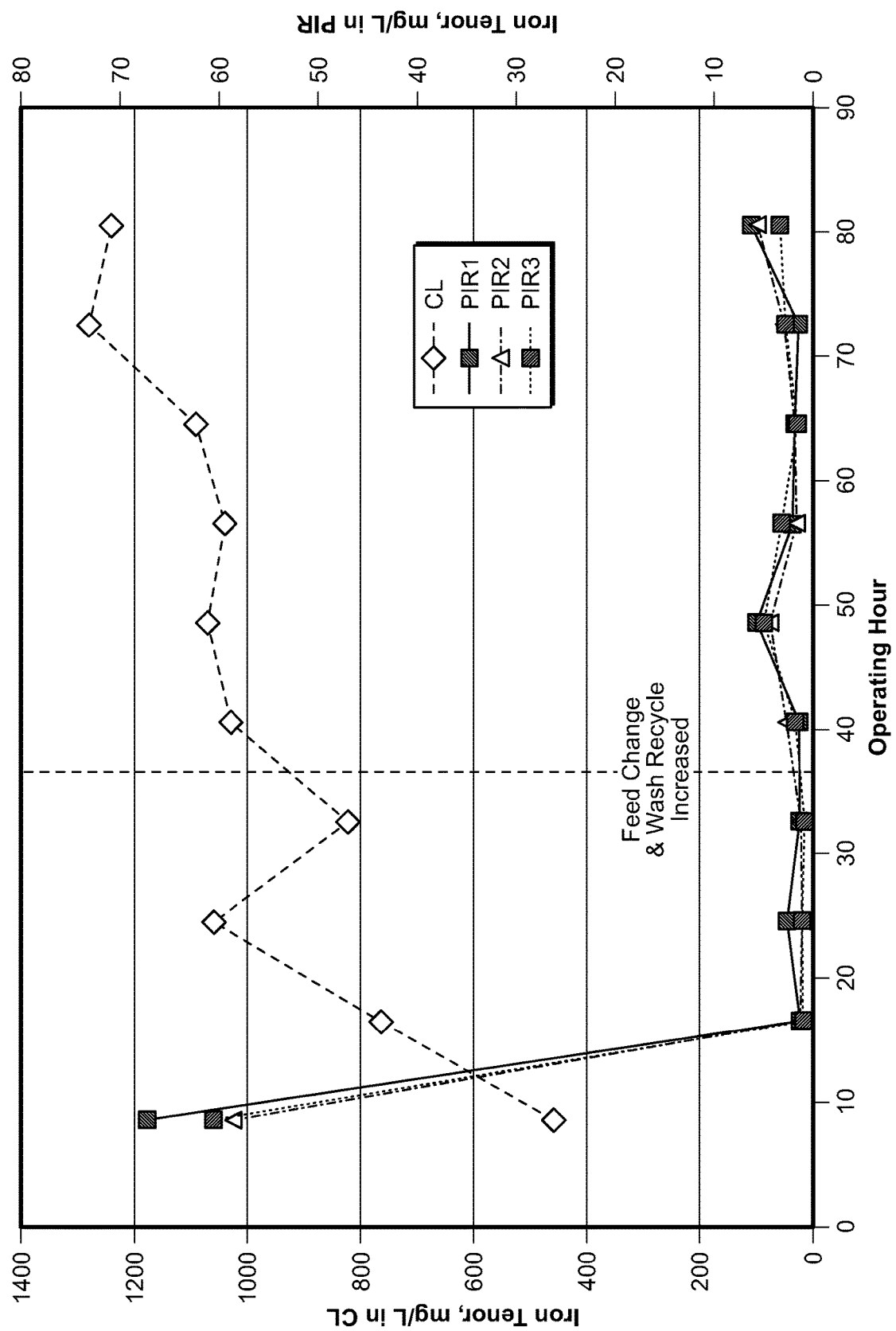
FIG. 4 is a plot showing iron tenor as a function of time in another example of a process according to the present disclosure.
Figure 5:
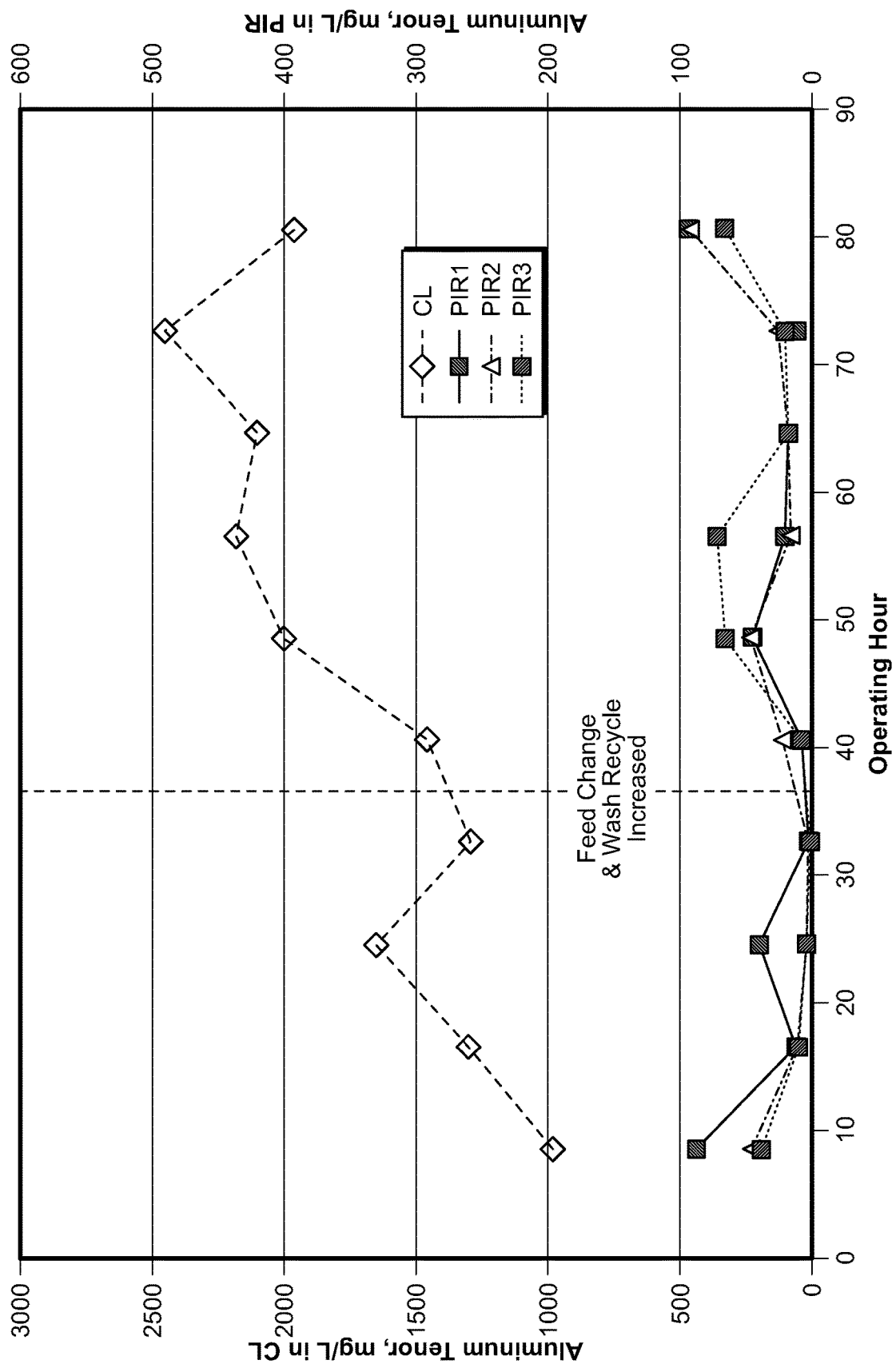
FIG. 5 is a plot showing aluminum tenor as a function of time in another example of a process according to the present disclosure.

Iron and aluminum profiles are presented in FIGS. 4 and 5. Both iron and aluminum showed increasing levels in the CL tank throughout the run. Iron levels maintained below about 5 mg/L in PIR3 for most of the run regardless of the increase observed in CL. Aluminum in PIR3 was less than about 10 mg/L for the first 40 hours, and then ranged between about 20 and about 65 mg/L for the remainder of the operating time.

A mass balance for the CL and PIR circuits is shown in Table 2. Lithium extraction and impurity precipitation is calculated based on solids assays. The mass balance shows that overall about 82% of the lithium present in the AR β-spodumene feed proceeded to Secondary Impurity Removal (SIR). Specifically, about 79% lithium extraction was achieved for the 75/25 blend and about 86% for the 50/50 blend. The portions of aluminum and iron that either did not leach or precipitated totaled about 96% and about 99%, respectively. Other tests have demonstrated that yields of about 95% of extraction from the AR β-spodumene can be obtained.

TABLE 2

Mass Balance of CL and PIR circuits

| Process Streams | | Quantity, | Metal Content, mg/L or % | | | | |
| --- | --- | --- | --- | --- | --- | --- | --- |
| | | | Li | Al | Fe | Cr | Zn |
| INPUTS | Op Hr | kg | % or mg/L | | g/t or mg/L | | |
| AR | 13.5 | 485 | 2.25 | 106909 | 9792 | 173 | 130 |
| B-Spodumene | 25.5 | 436 | 2.19 | 102675 | 10072 | *192* | *154* |
| | 37.5 | 323 | 2.15 | 101087 | 10352 | 211 | 177 |
| | 49.5 | 407 | 2.21 | 104792 | 11261 | *212* | *148* |
| | 61.5 | 435 | 2.28 | 106909 | 8883 | 212 | 119 |
| | 73.5 | 363 | 2.31 | 107438 | 8813 | 182 | 88 |
| | 80.0 | 205 | *2.31* | *107438* | *8813* | *182* | *88* |
| PIR Wash 1 | 13.5 | 113 | *11200* | 77 | *11.2* | *<0.2* | *5.6* |
| | 25.5 | 252 | 11200 | 77 | 11.2 | <0.2 | 5.6 |
| | 37.5 | 214 | 11200 | 77 | 11.2 | <0.2 | 5.6 |
| | 49.5 | 273 | 15300 | 65 | 4.3 | <0.2 | 5.9 |
| | 61.5 | 273 | *15300* | *65* | *4.3* | *<0.2* | *5.9* |
| | 73.5 | 249 | 12300 | 64 | 3.1 | <0.2 | 3.5 |
| | 80.0 | 157 | 12600 | 62 | 1.5 | <0.2 | 3.6 |
| OUTPUTS | | | Li | Al | Fe | Cr | Zn |
| PIR3 Solids | 13.5 | 536 | 0.60 | 126491 | 11960 | 247 | 133 |
| | 25.5 | 277 | 0.40 | 121198 | 11471 | *229* | *160* |

TABLE 2-continued

Mass Balance of CL and PIR circuits

|  | | | | | | | |
|---|---|---|---|---|---|---|---|
| | 37.5 | 268 | 0.58 | 119611 | 13219 | 211 | 187 |
| | 49.5 | 333 | 0.31 | 123315 | 13079 | *211* | *164* |
| | 61.5 | 294 | 0.46 | 126491 | 11051 | 210 | 140 |
| | 73.5 | 282 | 0.48 | 124374 | 10771 | 201 | 141 |
| | 80.0 | 169 | 0.50 | 125962 | 11051 | *201* | *141* |
| PIR3 Solution | 13.5 | 600 | 10700 | 37.3 | 60.5 | <0.2 | 5.5 |
| | 25.5 | 642 | 20100 | 6.95 | 1.05 | <0.2 | 3.9 |
| | 37.5 | 470 | 16400 | 1.3 | 0.8 | <0.2 | 1.7 |
| | 49.5 | 515 | 24550 | 36.45 | 3.3 | <0.2 | 5.4 |
| | 61.5 | 582 | 23500 | 71 | 3.2 | <0.2 | 4.6 |
| | 73.5 | 484 | 22800 | 19.5 | 2.15 | <0.2 | 3.45 |
| | 80.0 | 290 | 25900 | 65.5 | 3.4 | <0.2 | 4.8 |

| Process Streams | | Density | | Metal Units, g | | | |
|---|---|---|---|---|---|---|---|
| INPUTS | Op Hr | kg/L | % Solids | Li | Al | Fe | Cr | Zn |

| Process Streams | Op Hr | kg/L | % Solids | Li | Al | Fe | Cr | Zn |
|---|---|---|---|---|---|---|---|---|
| AR | 13.5 | | | 10912 | 51847 | 4749 | 84 | 63 |
| B-Spodumene | 25.5 | | | 9555 | 44797 | 4394 | 84 | 67 |
| | 37.5 | | | 6938 | 32621 | 3340 | 68 | 57 |
| | 49.5 | | | 8995 | 42653 | 4583 | 86 | 60 |
| | 61.5 | | | 9907 | 46455 | 3860 | 92 | 52 |
| | 73.5 | | | 8397 | 39053 | 3203 | 66 | 32 |
| | 80.0 | | | 4732 | 22007 | 1805 | 37 | 18 |
| PIR Wash 1 | 13.5 | 1.06 | | 1195 | 8 | 1 | 0 | 1 |
| | 25.5 | 1.07 | | 2631 | 18 | 3 | 0 | 1 |
| | 37.5 | 1.06 | | 2262 | 15 | 2 | 0 | 1 |
| | 49.5 | 1.10 | | 3800 | 16 | 1 | 0 | 1 |
| | 61.5 | 1.12 | | 3748 | 16 | 1 | 0 | 1 |
| | 73.5 | 1.09 | | 2821 | 15 | 1 | 0 | 1 |
| | 80.0 | 1.08 | | 1829 | 9 | 0 | 0 | 1 |
| OUTPUTS | | | | Li | Al | Fe | Cr | Zn |
| PIR3 Solids | 13.5 | | 47.2 | 3218 | 67836 | 6414 | 132 | 71 |
| | 25.5 | | 30.1 | 1107 | 33534 | 3174 | 63 | 44 |
| | 37.5 | | 36.3 | 1556 | 32094 | 3547 | 57 | 50 |
| | 49.5 | | 39.3 | 1032 | 41042 | 4353 | 70 | 54 |
| | 61.5 | | 33.6 | 1354 | 37238 | 3253 | 62 | 41 |
| | 73.5 | | 36.8 | 1353 | 35070 | 3037 | 57 | 40 |
| | 80.0 | | *36.8* | 844 | 21268 | 1866 | 34 | 24 |
| PIR3 Solution | 13.5 | 1.07 | | 5995 | 21 | 34 | 0 | 3 |
| | 25.5 | 1.12 | | 11477 | 4 | 1 | 0 | 2 |
| | 37.5 | 1.11 | | 6970 | 1 | 0 | 0 | 1 |
| | 49.5 | 1.15 | | 10953 | 16 | 1 | 0 | 2 |
| | 61.5 | 1.15 | | 11926 | 36 | 2 | 0 | 2 |
| | 73.5 | 1.15 | | 9580 | 8 | 1 | 0 | 1 |
| | 80.0 | 1.16 | | 6464 | 16 | 1 | 0 | 1 |
| Units IN | 13.5 | | | 12107 | 51855 | 4750 | 84 | 64 |
| | 25.5 | | | 12186 | 44815 | 4397 | 84 | 68 |
| | 37.5 | | | 9200 | 32636 | 3343 | 68 | 58 |
| | 49.5 | | | 12795 | 42669 | 4585 | 86 | 62 |
| | 61.5 | | | 13655 | 46471 | 3861 | 92 | 53 |
| | 73.5 | | | 11218 | 39068 | 3204 | 66 | 33 |
| | 80.0 | | | 6560 | 22017 | 1805 | 37 | 19 |
| | TOTAL | | | 77722 | 279532 | 25945 | 517 | 356 |
| Units OUT | 13.5 | | | 9212 | 67857 | 6448 | 132 | 74 |
| | 25.5 | | | 12584 | 33538 | 3174 | 63 | 46 |
| | 37.5 | | | 8527 | 32095 | 3547 | 57 | 51 |
| | 49.5 | | | 11985 | 41058 | 4355 | 70 | 57 |
| | 61.5 | | | 13281 | 37274 | 3255 | 62 | 44 |
| | 73.5 | | | 10934 | 35078 | 3038 | 57 | 41 |
| | 80.0 | | | 7308 | 21284 | 1867 | 34 | 25 |
| | TOTAL | | | 73830 | 268184 | 25684 | 475 | 338 |
| Extraction | 13.5 | | | 71 | | | | |
| | 25.5 | | | 88 | | | | |
| | 37.5 | | | 78 | | | | |
| | 49.5 | | | 89 | | | | |
| | 61.5 | | | 86 | | | | |
| | 73.5 | | | 84 | | | | |
| | 80.0 | | | 82 | | | | |
| | TOTAL | | | 82 | | | | |
| Precipitation | 13.5 | | | | 131 | 135 | 158 | 113 |
| | 25.5 | | | | 75 | 72 | 76 | 66 |
| | 37.5 | | | | 98 | 106 | 83 | 88 |
| | 49.5 | | | | 96 | 95 | 81 | 90 |

TABLE 2-continued

Mass Balance of CL and PIR circuits

|  |  |  |  |  |  |  |
|---|---|---|---|---|---|---|
| 61.5 |  |  | 80 | 84 | 67 | 80 |
| 73.5 |  |  | 90 | 95 | 86 | 124 |
| 80.0 |  |  | 97 | 103 | 91 | 132 |
| TOTAL |  |  | 96 | 99 | 92 | 93 |
| Accountability, OUT/IN % |  | 76 | 131 | 136 | 158 | 117 |
|  |  | 103 | 75 | 72 | 76 | 68 |
|  |  | 93 | 98 | 106 | 83 | 87 |
|  |  | 94 | 96 | 95 | 81 | 92 |
|  |  | 97 | 80 | 84 | 67 | 82 |
|  |  | 97 | 90 | 95 | 86 | 126 |
|  |  | 111 | 97 | 103 | 91 | 135 |
| TOTAL |  | 95 | 96 | 99 | 92 | 95 |

*Averages if shown in italics

Secondary Impurity Removal

Secondary Impurity Removal (SIR) was performed on the PIR filtrate (aqueous composition comprising lithium ions and having a reduced content of the above mentioned metals (such as Fe, Al and Si)) to substantially precipitate and remove Ca, Mg and Mn impurities therefrom. Feed addition to the SIR circuit started at operating hour 6 (six hours after overflow from the CL tank). There are four process tanks arranged in a cascade (see FIG. 2). The tank volumes could be adjusted during the run from about 11.8 to about 17.5 L by changing the tank overflow ports. All tanks are baffled and agitated by overhead mixers. pH, ORP and temperature were monitored in all tanks.

In the first two agitated tanks, the pH was increased to about 10 using about 2 M sodium hydroxide (NaOH) (another base). Following this pH adjustment, an excess of sodium carbonate ($Na_2CO_3$) based on levels of targeted impurities in the feed was added to the third tank to convert the remaining divalent impurities to insoluble carbonates. The slurry from the third tank was pumped to a clarifier. Underflow solids were removed and recovered by filtration while the overflow solution was collected in a 1000 L tote.

Figure 6:
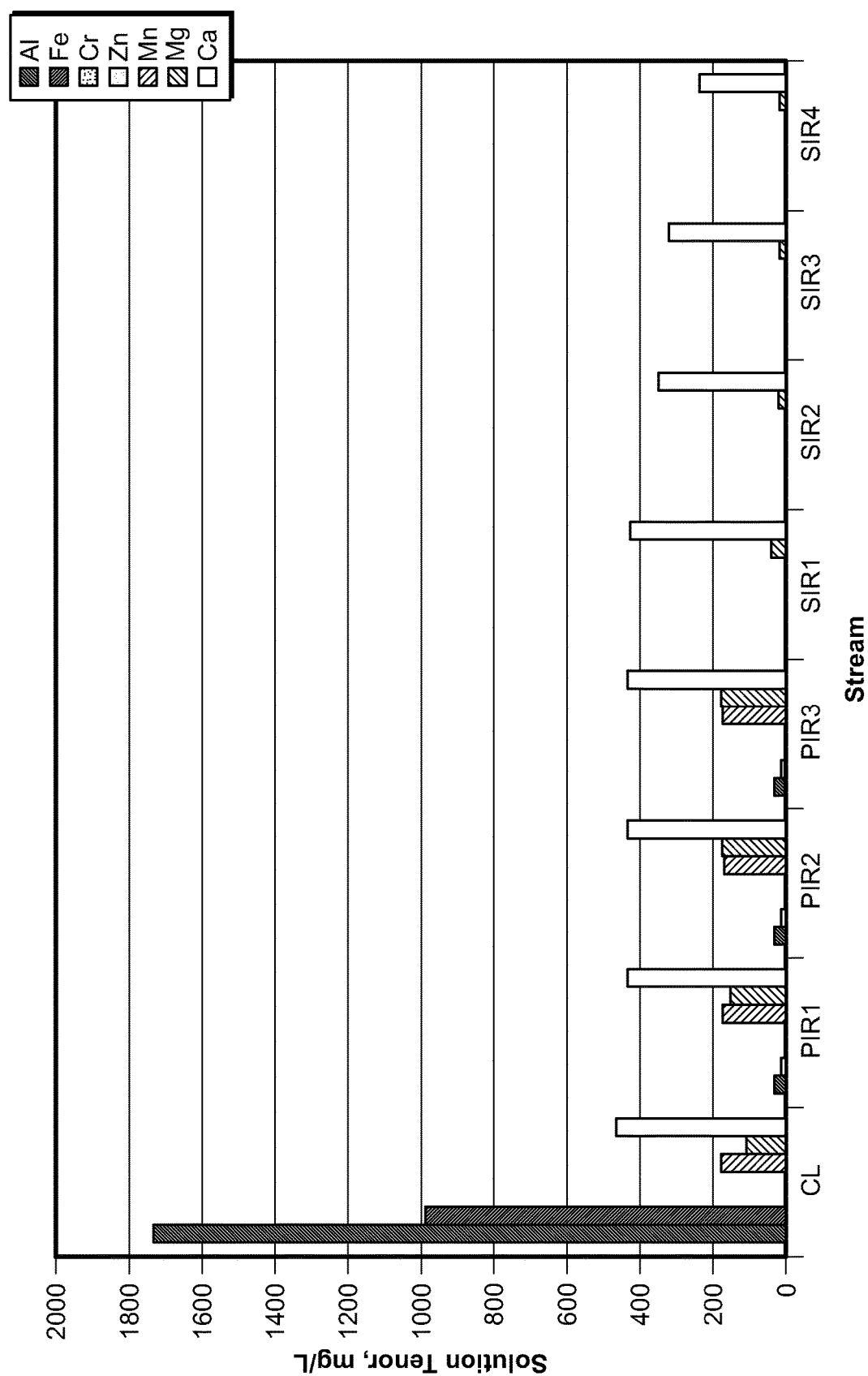
FIG. 6 is a diagram showing various metals tenor as a function of time in another example of a process according to the present disclosure.

Averaged impurity tenors of solutions from the Concentrate Leach stage through to the final tank of Secondary Impurity Removal are shown in Table 3 and FIG. 6.

TABLE 3

Profile of Selected Impurities

| Stream | Li mg/L | Al mg/L | Fe mg/L | Cr mg/L | Zn mg/L | Mn mg/L | Mg mg/L | Ca mg/L |
|---|---|---|---|---|---|---|---|---|
| CL | 23880 | 1737 | 985 | 5.9 | 9.1 | 178 | 109 | 468 |
| PIR1 | 21290 | 34 | 9 | 0.0 | 4.3 | 174 | 153 | 435 |
| PIR2 | 21240 | 28 | 8 | 0.0 | 4.0 | 173 | 175 | 433 |
| PIR3 | 21140 | 30 | 8 | 0.0 | 4.2 | 174 | 179 | 434 |
| SIR1 | 20093 | 1 | 0 | 0.0 | 0.0 | 2 | 43 | 426 |
| SIR2 | 22500 | 0 | 0 | 0.0 | 0.0 | 1 | 19 | 352 |
| SIR3 | 19050 | 1 | 0 | 0.0 | 0.0 | 1 | 16 | 322 |
| SIR4 | 22400 | 0 | 0 | 0.0 | 0.0 | 1 | 14 | 241 |

Impurities introduced in the leach stage included iron, aluminum, chromium, zinc, magnesium, manganese and calcium. Substantially all of the chromium and over about 98% of the iron and aluminum substantially precipitated in the first PIR tank (PIR1). Minimal precipitation occurred in the next two tanks of PIR (PIR2 and PIR3). By the first tank of SIR (SIR1), the only impurities substantially remaining in solution were magnesium and calcium. All other elements were less than about 1 mg/L. Although most of the precipitation occurred in SIR1, the extra retention time of SIR2 dropped the magnesium tenor from about 40 to about 20 mg/L. From SIR2 through SIR4, magnesium and calcium tenors showed a steady decline with more retention time. Impurity levels for SIR4 averaged to about 1 mg/L Mn, about 14 mg/L Mg and about 241 mg/L Ca during the pilot plant run. However, levels as low as about 200 mg/L Ca and about 2 mg/L Mg were attained by the optimization of key parameters.

pH and ORP were monitored throughout the operation. pH was only controlled in the first two tanks. Initially, the selected pH for SIR2 was about 10. At operating hour 30, the pH in SIR2 was increased to about 10.5. With the exception of a 2 hour period at hour 50, where the pH in SIR2 dropped to about 10, pH remained at about 10.5 for the remainder of the run. The average pH values achieved over the two periods were about 10.1 and about 10.5 and the resulting sodium hydroxide consumptions were about 0.022 and about 0.024 kg sodium hydroxide per hour, respectively. The overall sodium hydroxide consumption was about 10 kilograms of sodium hydroxide solution per about 1000 kg of lithium carbonate equivalent (LCE).

Figure 7:
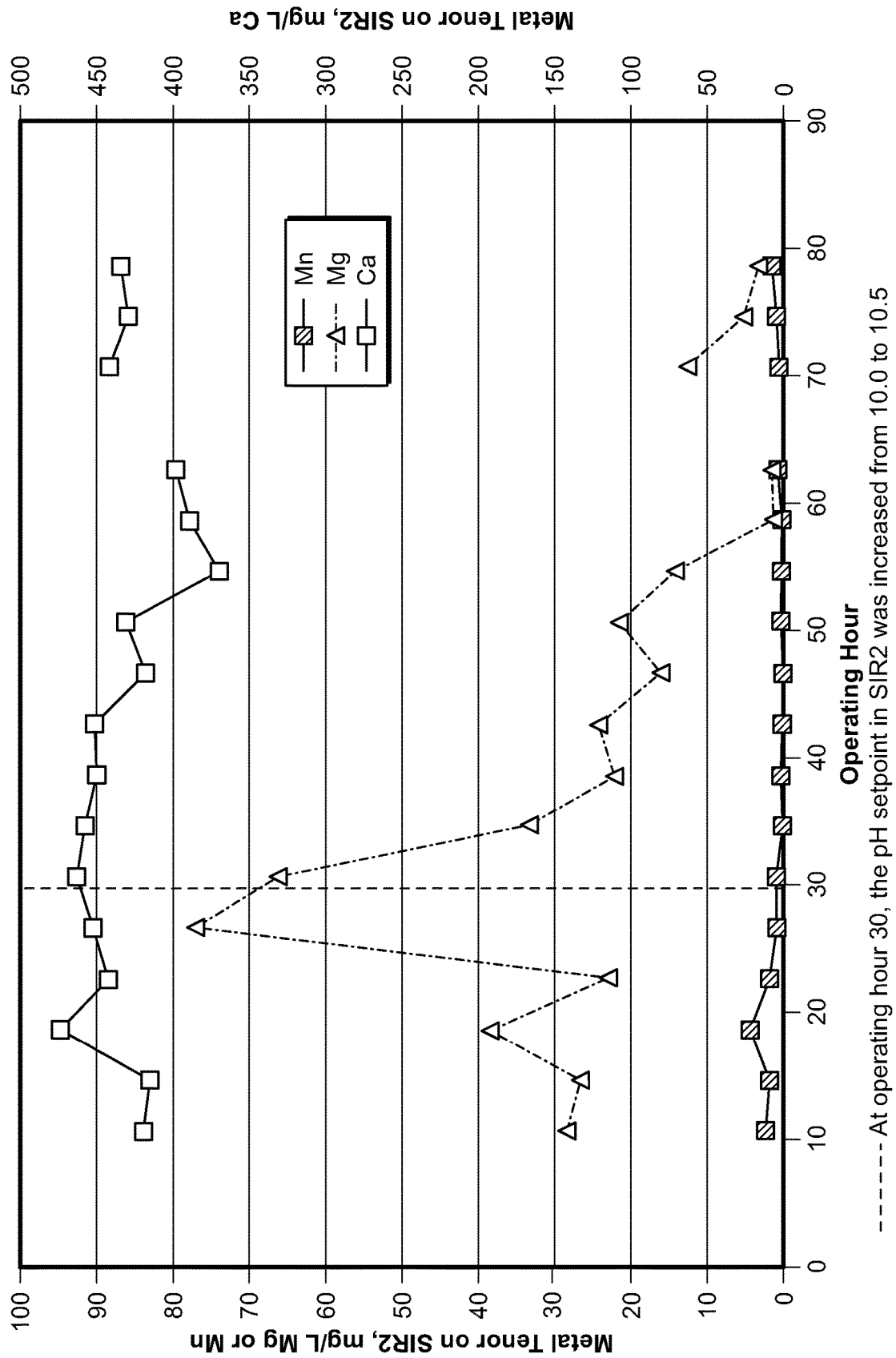
FIG. 7 is a plot showing various metals tenor as a function of time in another example of a process according to the present disclosure.

The impurity tenors of SIR2 solutions are plotted over time in FIG. 7. These solutions have been pH adjusted by sodium hydroxide to above 10, but have not yet been dosed with sodium carbonate. Magnesium tenors are lower after the adjustment, but the levels show a gradual trend downwards that appears to begin prior to the set point change. It should be noted that later in the pilot plant, the retention time was increased for all SIR tanks, which may have also contributed to improved precipitation performance.

Figure 8:
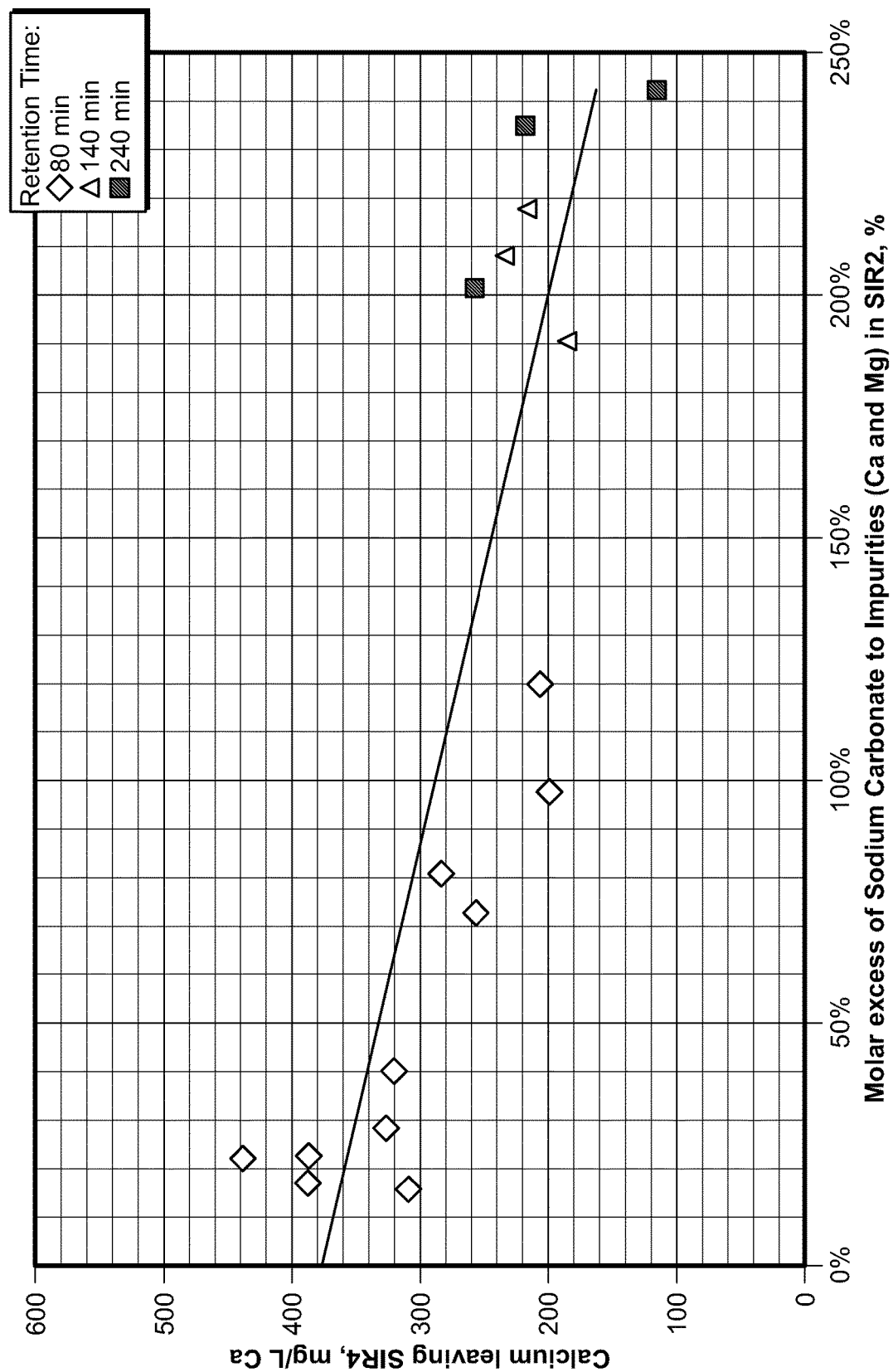
FIG. 8 is a plot showing calcium tenor as a function of molar excess of sodium carbonate in another example of a process according to the present disclosure.
Figure 9:
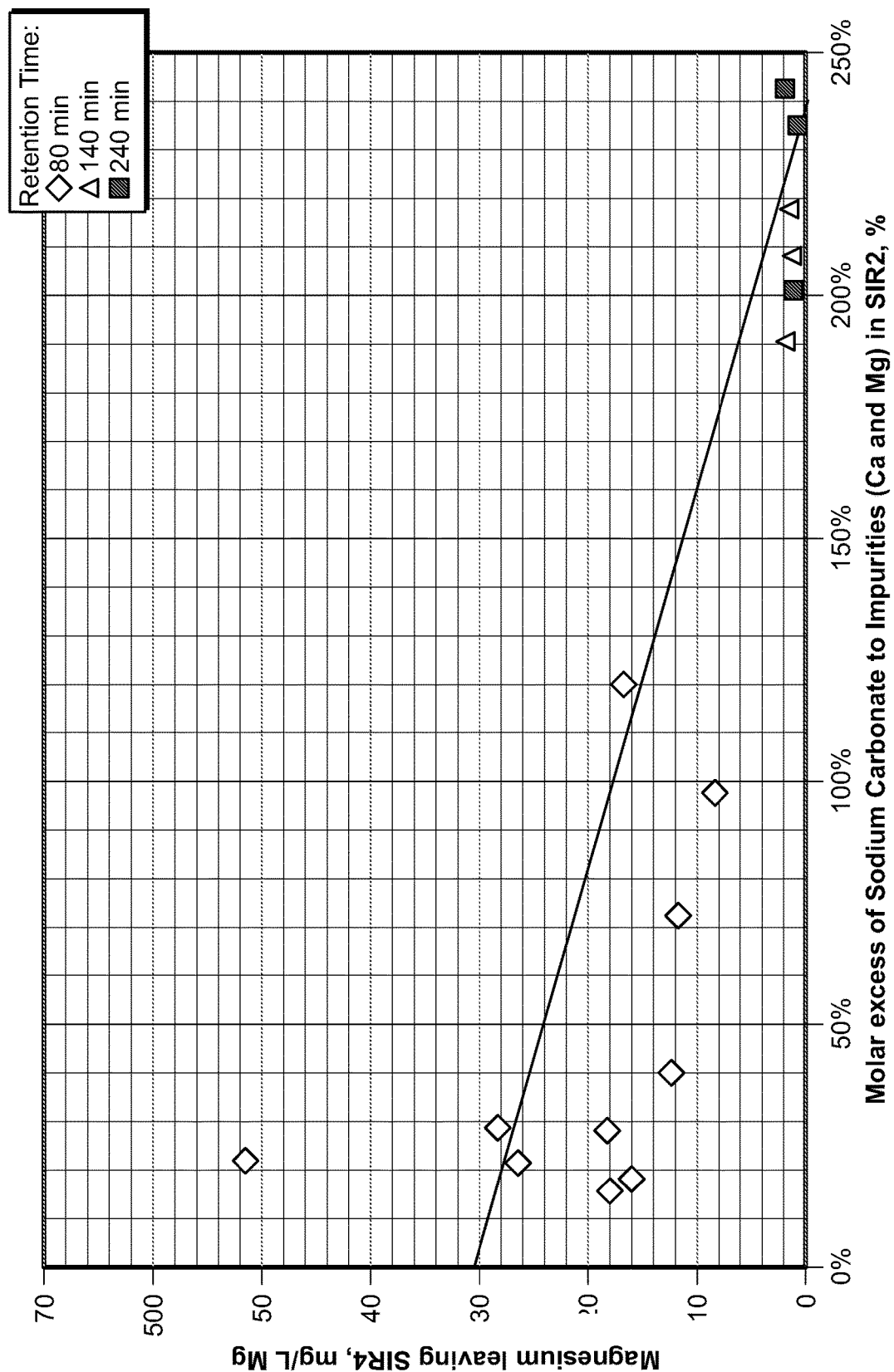
FIG. 9 is a plot showing magnesium tenor as a function of molar excess of sodium carbonate in another example of a process according to the present disclosure.

Calcium and magnesium tenors in solutions leaving SIR4 are plotted in FIGS. 8 and 9. These Figures relate impurity tenor (Mg and Ca only) with the sodium carbonate dosage used at the time the sample was taken. Additionally, the data are plotted based on the retention times of the entire SIR circuit at the time of each sample. Within the range tested, as the sodium carbonate increased, metal tenors decreased. It should be noted that the lowest impurity tenors also corresponded with greater circuit retention time. Sodium carbonate dosage is expressed as molar excess of calcium impurities present prior to sodium carbonate addition (using assays from SIR2). The data indicated that the solution tenor of Ca can decrease to below about 200 mg/L.

Product from the SIR circuit was assayed every 4 hours as it left the final tank (SIR4) (see FIG. 2). The SIR4 product was pumped into a 100 L clarifier and the overflow from the clarifier was filtered through a 0.5 μm spiral wound cartridge filter and then collected in 1000 L plastic totes. These totes were assayed again to confirm bulk calcium feed tenors for Ion Exchange (IX). When the totes were sampled, light brown solids were observed in the bottom of each tote.

Assays revealed a significant drop in calcium tenor from the solutions leaving the final tank of the circuit (SIR4) to the solution sitting unmixed in the totes. A comparison of the average assays for both streams is presented in Table 4, below.

TABLE 4

Effect of Aging on SIR Product

| Stream | Mg mg/L | Ca mg/L |
|---|---|---|
| SIR4 Product | 17 | 286 |
| IX Feed Tote | 15 | 140 |

A mass balance for the SIR circuit is shown in Table 5. The mass balance shows that overall about 92% of the magnesium and all of the manganese reported to the solids. The distribution of lithium to the solids is about 0.9% for an overall SIR lithium recovery of about 99.1%.

TABLE 5

Mass Balance of SIR circuit

| | | | Metal Content, mg/L or % | | |
|---|---|---|---|---|---|
| Process Streams | | Quantity, | Mn | Mg | Ca |
| INPUTS | Op Hr | kg | g/t or mg/L | | |
| SIR Feed | 13.5 | 600 | 72 | 69 | 438 |
| | 25.5 | 642 | 109 | 111 | 463 |
| | 37.5 | 470 | 146 | 209 | 459 |
| | 49.5 | 515 | 199 | 216 | 451 |
| | 61.5 | 582 | 227 | 181 | 415 |
| | 73.5 | 484 | 203 | 154 | 441 |
| | 80.0 | 290 | 195 | 150 | 443 |
| OUTPUTS | | | Mn | Mg | Ca |
| SIR Solids | Solids Pail 1 | 3.17 | 64700 | 63600 | 86300 |
| | Solids Pail 2 | 4.03 | 68000 | 54700 | 85200 |
| SIR4 Solution | 13.5 | | 176 | 0.7 | 18 | 309 |
| | 25.5 | | 383 | 1.2 | 21 | 358 |
| | 37.5 | | 426 | 1.6 | 48 | 370 |
| | 49.5 | | 395 | 0.1 | 20 | 325 |
| | 61.5 | | 208 | 0.2 | 7.6 | 191 |
| | 73.5 | | 214 | 0.2 | 1.4 | 220 |
| | 80.0 | | 206 | 0.4 | 1.5 | 225 |

| Process Streams | | Density | Metal Units, g | | |
|---|---|---|---|---|---|
| INPUTS | Op Hr | kg/L | Mn | Mg | Ca |
| SIR Feed | 13.5 | 1.08 | 40 | 38 | 242 |
| | 25.5 | 1.03 | 68 | 69 | 288 |
| | 37.5 | 1.12 | 62 | 88 | 193 |
| | 49.5 | 1.14 | 90 | 97 | 203 |
| | 61.5 | 1.10 | 121 | 96 | 220 |
| | 73.5 | 1.20 | 81 | 62 | 177 |
| | 80.0 | 1.17 | 48 | 37 | 109 |
| OUTPUTS | | | Mn | Mg | Ca |
| SIR Solids | Solids Pail 1 | | 205 | 201 | 273 |
| | Solids Pail 2 | | 274 | 221 | 343 |
| SIR4 Solution | 13.5 | 1.05 | 0 | 3 | 52 |
| | 25.5 | 1.09 | 0 | 7 | 126 |
| | 37.5 | 1.11 | 1 | 18 | 143 |
| | 49.5 | 1.15 | 0 | 7 | 112 |
| | 61.5 | 1.15 | 0 | 1 | 35 |
| | 73.5 | 1.20 | 0 | 0 | 39 |
| | 80.0 | 1.21 | 0 | 0 | 38 |
| Precipitation = | 13.5 | | 100 | 92 | 79 |
| (1 − SIR4 solution/ | 25.5 | | 99 | 89 | 56 |
| SIR Feed)*100 | 37.5 | | 99 | 79 | 26 |
| | 49.5 | | 100 | 93 | 45 |
| | 61.5 | | 100 | 99 | 84 |
| | 73.5 | | 100 | 100 | 78 |
| | 80.0 | | 100 | 99 | 65 |
| | TOTAL | | 100 | 92 | 62 |
| Accountability, OUT/IN % | | | 94 | 94 | 81 |
| Distribution to Solids | | | 100 | 92 | 53 |

| SIR Lithium Recovery | |
|---|---|
| SIR solids, kg Li | 0.3 |
| SIR total out, kg Li | 36.3 |
| Lithium Recovery, % | 99.1 |

Ion Exchange

The SIR product is processed through an ion-exchange (IX) circuit to further reduce the Ca and Mg tenors prior to lithium product production. The IX circuit comprises three columns packed with Purolite™ S950, a cationic resin that can be used in the sodium form that is selective towards divalent and trivalent metal ions. Purolite™ S950 comprises an aminophosphonic resin supported on a macroporous cross-linked polymer. It can be used for the removal of heavy metal cations. At high pH it can be active in the removal of Group 2 metal cations (Mg, Ca and Ba) and Cd, Ni and Co. At high pH divalent metal cations are preferentially absorbed over monovalent metal cations (e.g. Li, Na, K). Any ion exchange resin that would be suitable for substantially selectively removing of divalent metal cations such as $Ca^{2+}$ and $Mg^{2+}$ and/or trivalent metal cations could be alternatively used in the present disclosure. Alternatively, more than one type of resin can be used to selectively remove the various metal cations. Thus, different ion exchange resins can be used for different metal cations.

Figure 10:
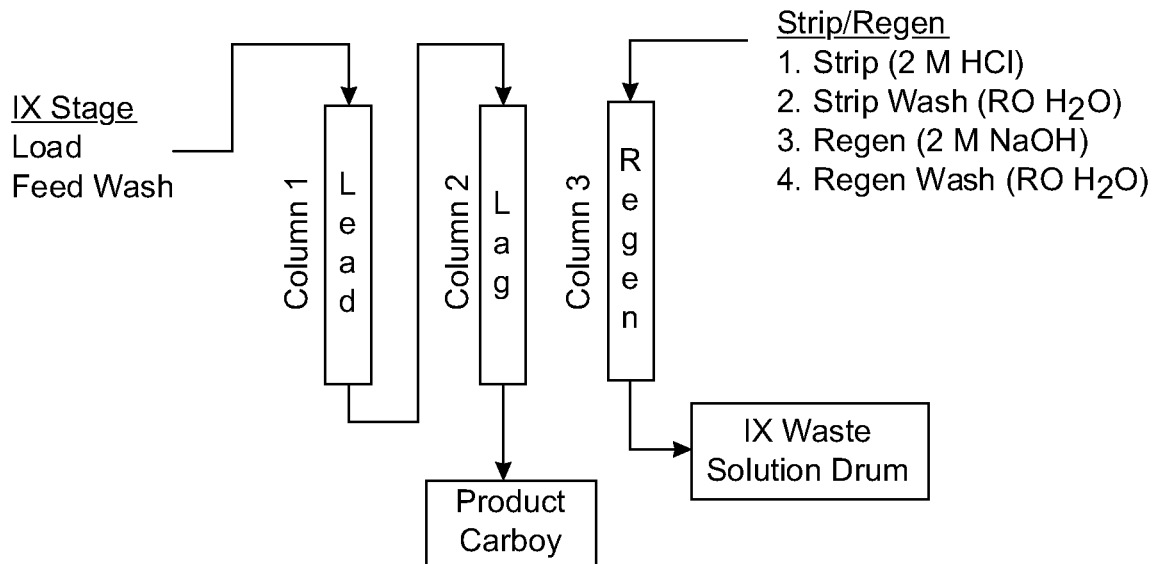
FIG. 10 is a schematic representation of another example of a process according to the present disclosure.
Figure 10:
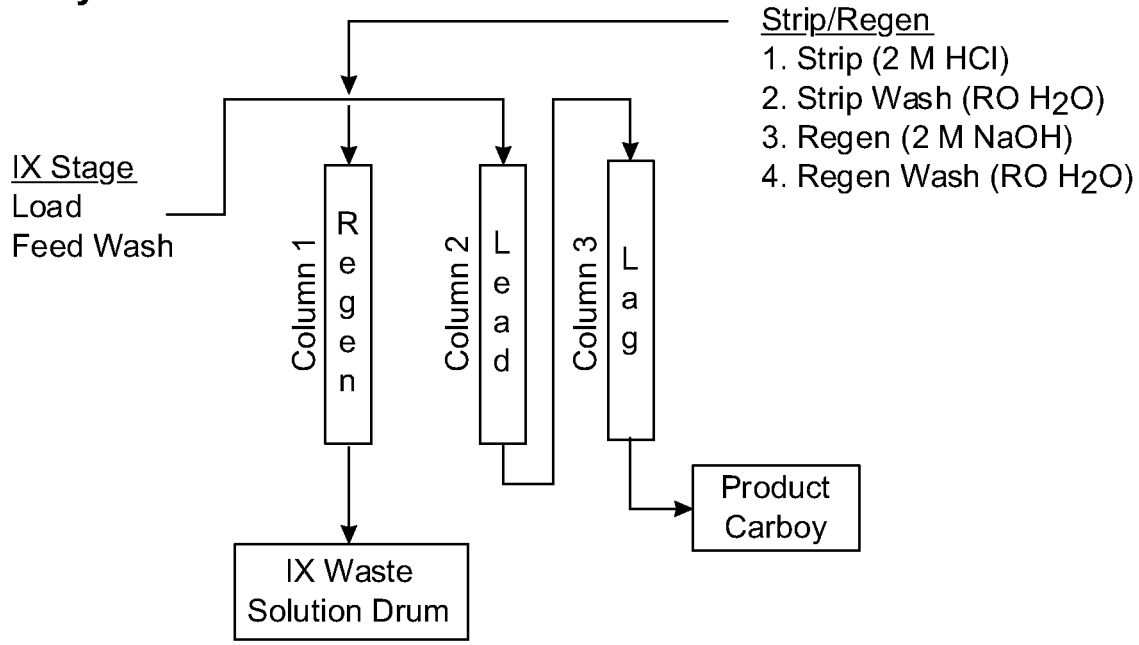

The operating philosophy used for the IX circuit was a Lead-Lag Regeneration process (see FIGS. 2 and 10). Two of the IX columns of the circuit are involved with Ca and Mg removal, while the resin regeneration cycle is conducted on the third column. A schematic illustrating the solution flow through the IX circuit and the lead-lag regeneration operation is provided in FIG. 10. The loading of Ca and Mg will take place on two columns denoted lead and lag and will produce an effluent having both Ca and Mg solution tenors below about 10 mg/L. The loaded column undergoes stripping and regeneration stages prior to being reintroduced as the lag column for the next loading cycle. The columns were constructed from clear PVC pipe. Each column had a diameter of about 15 cm and a height of about 76 cm. The bed volume of each column was about 10 L.

The parameters for the IX operation are summarized in Table 6. These parameters were based on the laboratory tests results and the Lead-Lag column configuration was designed to process 75 bed volumes (BV) of feed solution before the Ca and Mg tenors in the Lag effluent exceeded the established upper limit that was about 10 mg/L that was established for each cation. After processing 75 BV's of feed solution, the combined absorption capacity of the resin in the Lead and Lag columns would not be sufficient to produce a final effluent with the Ca and Mg tenors each below about 10 mg/L. At this point the loading cycle is complete. The Lead column is promoted to the Regeneration stage. The Lag column takes the Lead position. The Regenerated column becomes the Lag column.

The Regeneration stage involved washing the Lead column with reverse osmosis (RO) water to flush out the Li rich solution within the column. This solution is passed to the Lag column. The Feed Wash stage is followed by Acid Strip using about 2 M HCl. This removes the absorbed Ca, Mg, Li and other metal cations from the resin. The resin is now in the acid form. An Acid Wash stage follows to rinse the remaining HCl(aq) from the column. The resin is then converted to the Na form by passing about 2 M NaOH through the column (Regeneration Stage). The final step involves washing the excess NaOH from the column using reverse osmosis (RO) water. The resin is now regenerated and ready to be promoted to the Lag position for the next Loading cycle. The effluent from the Acid Strip cycle was collected separately. The effluents from the Acid Wash, Regeneration and Regeneration Wash cycles were all captured in the same drum.

The Acid Strip stage produces a solution that contains Li, Ca, and Mg. The data indicated that Li elutes from the column first followed by Ca and Mg. It can be possible to separately capture the Li fraction and as a result produce a lithium chloride solution.

TABLE 6

IX Pilot Operation Parameters

| IX Stage | Solution | Bed Volume (BV) | Rate, BV/h |
|---|---|---|---|
| Loading | IX Feed | 75 | 5 |
| Feed Wash | RO Water | 1.5 | 5 |
| Acid Strip | 2M HCl | 3 | 5 |
| Acid Wash | RO Water | 5 | 5 |
| Regeneration | 2M NaOH | 3 | 5 |
| Regeneration Wash | RO Water | 3 | 5 |

1 BV = 10 L

A total of about 2154 L of SIR Product solution was processed through the IX circuit in four cycles. The average Li, Ca, and Mg tenors of the feed solutions for each cycle are summarized in Table 7.

TABLE 7

IX - Average Feed Solution Li, Ca and Mg Tenors

| IX | Average Feed Solution Tenor, mg/L | | |
|---|---|---|---|
| Cycle | Li | Ca | Mg |
| C1 | 16480 | 176 | 28.2 |
| C2 | 17600 | 140 | 12.9 |
| C3 & C4 | 21940 | 78.7 | 3.6 |

A cycle was initially designed to operate the Loading stage for 75 BV's. The average loading flow rate was about 832 mL/min (about 49.9 L/h). Cycle 1 was the only cycle where 75 BVs of feed solution was passed through the Lead-Lag columns.

Figure 11:
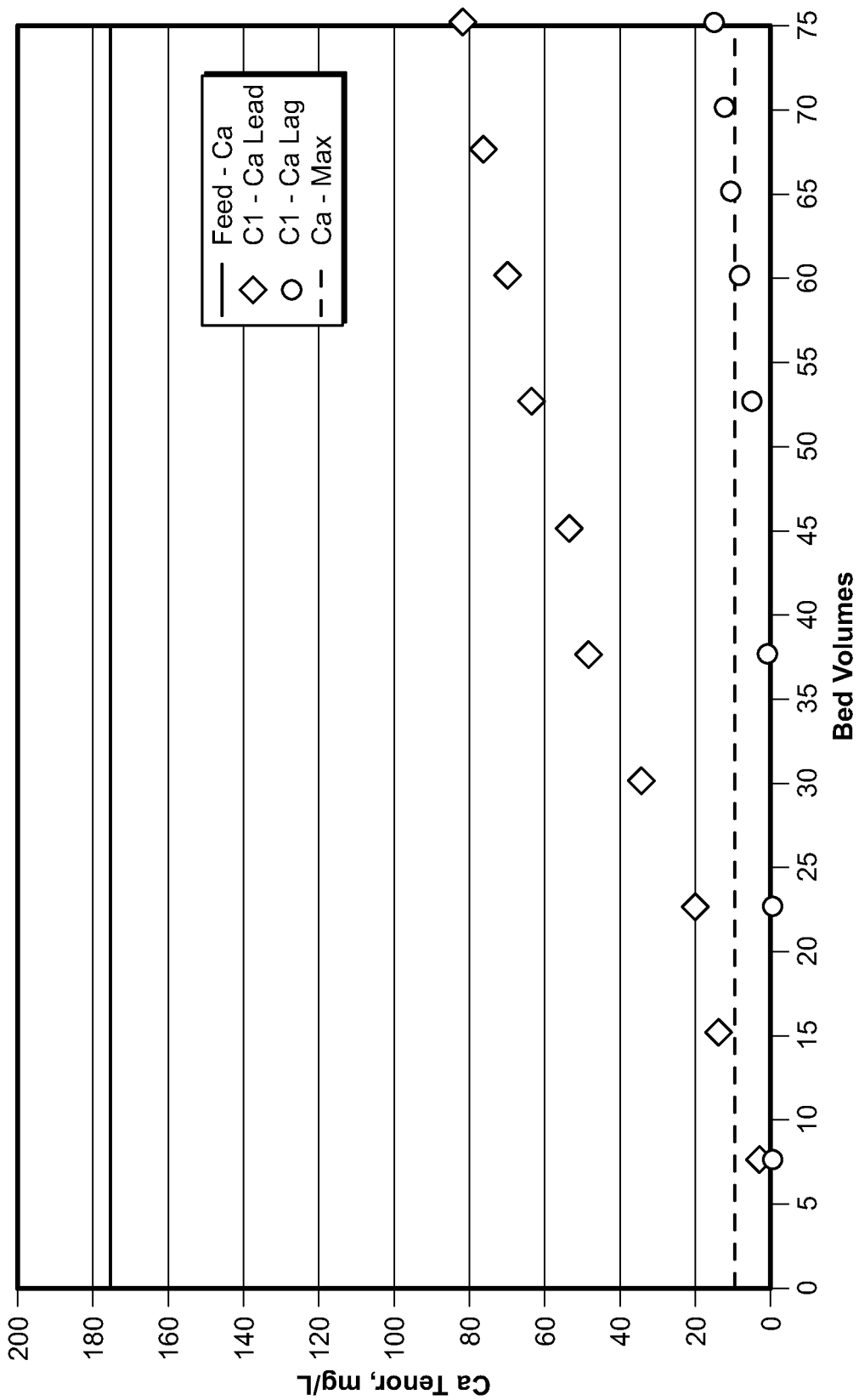
FIG. 11 is a plot showing calcium tenor as a function of bed volumes in an ion exchange process in another example of a process according to the present disclosure.

The Ca Loading curve for Cycle 1, where the Ca tenor of the effluents from the Lead and Lag columns are plotted against cumulative bed volume processed, is presented in FIG. 11. Also plotted on this plot is the average Ca tenor in the feed solution and the selected limit for Ca tenor in the Lag effluent (about 10 mg/L) for the present example. The breakthrough point for Ca of the Lead column occurred at 7.5 BV. The Ca tenor of the Lead effluent was about 82.3 mg/L after 75 BV's indicating that the loading capacity of the Lead column was not reached for Ca. The breakthrough point for Ca of the Lag column occurred at about 35 BV. The Ca tenor in the Lag effluent increased above about 10 mg/L between the 60th and 65th BV. It was decided to continue the Loading stage of Cycle 1 through to the 75th BV point even though the Lag effluent was above about 10 mg/L of Ca. The effluent from the 65th to 75th BV point was diverted to a 200 L drum and kept separate from the main product solution of Cycle 1. The diverted solution was later combined with the main Cycle 1 product when it was determined that the Ca tenor in the resulting combined solution would not exceed about 10 mg/L.

Figure 12:
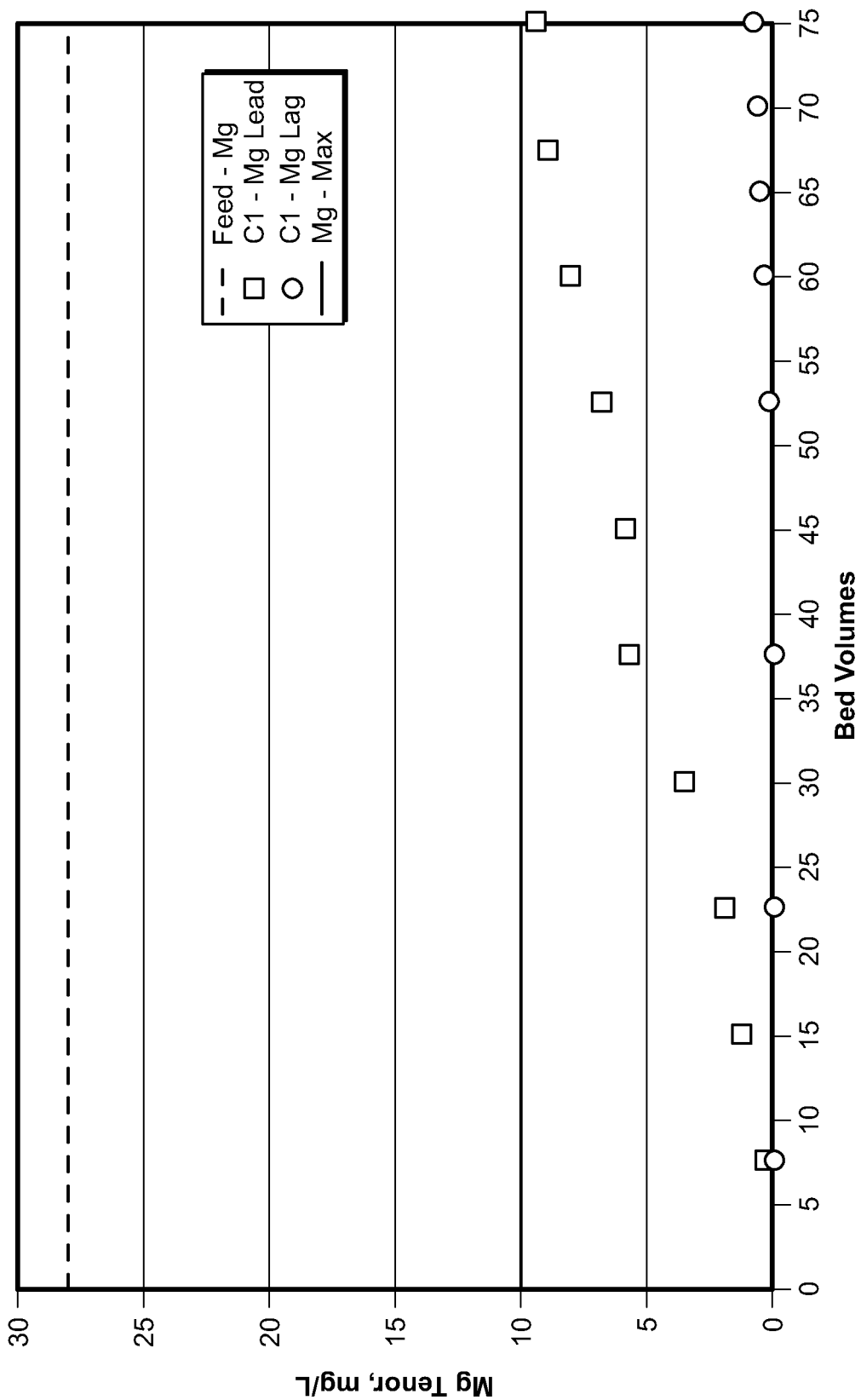
FIG. 12 is a plot showing magnesium tenor as a function of bed volumes in an ion exchange another example of a process according to the present disclosure.

A similar loading profile for Mg for Cycle 1 is presented in FIG. 12. The average Mg tenor in the feed solution and for example an upper limit of Mg tenor in the Lag effluent (about 10 mg/L) are also included in this plot. The breakthrough point for Mg of the Lead column occurred at 7.5 BV's. After 75 BV's the Mg tenor of the Lead effluent was about 9.5 mg/L. The breakthrough point for Mg of the Lag column occurred at 52.5 BV's. After 75 BV's the Mg tenor of the Lag effluent was about 0.8 mg/L, well below the selected limit level for Mg in the IX product solution, according to this example.

Figure 13:
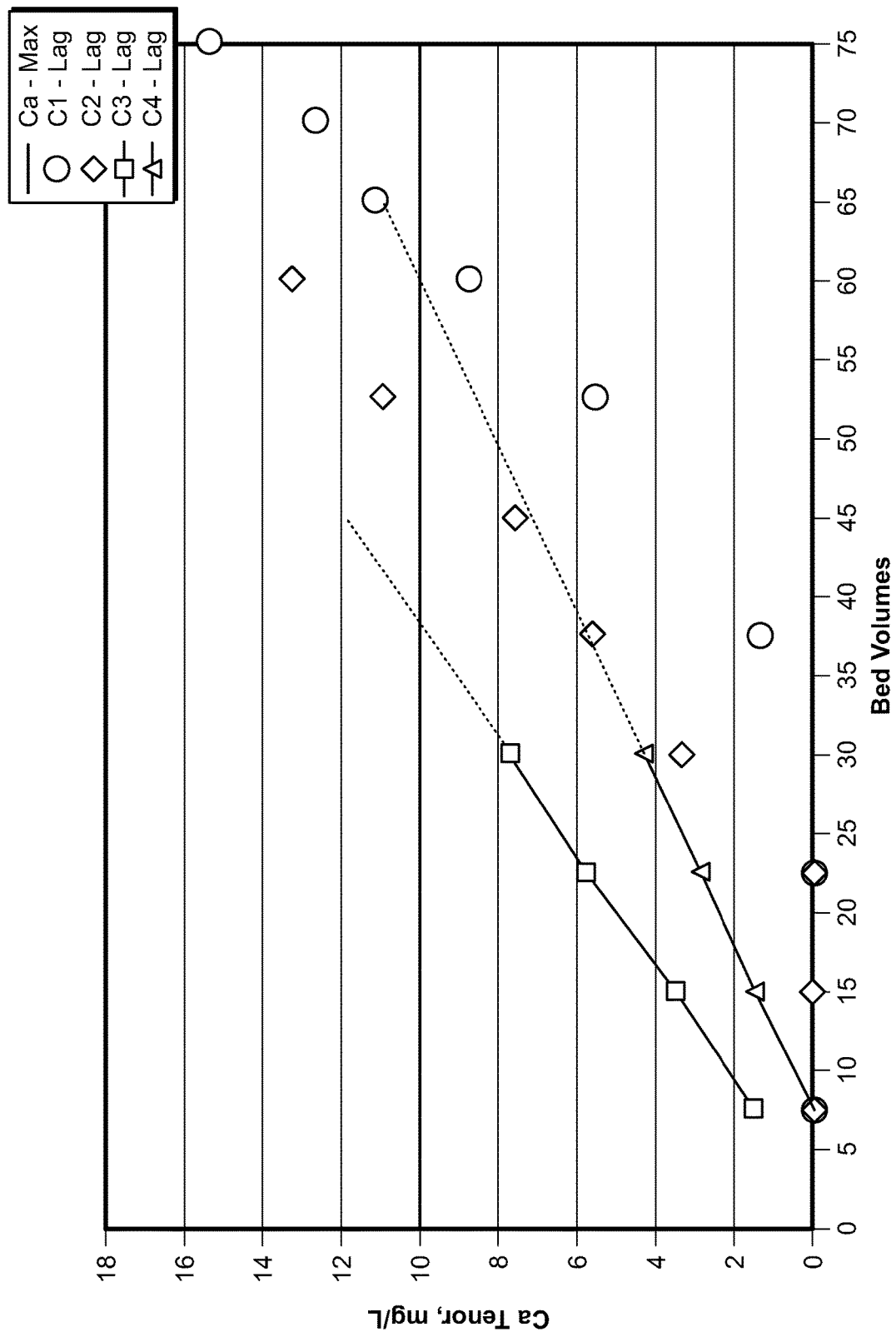
FIG. 13 is a plot showing calcium tenor as a function of bed volumes in an ion exchange another example of a process according to the present disclosure.

Cycles 2 and 3 had to be stopped before 75 BV's of feed solution could be processed through the columns. The Ca tenors of the Lag effluent for each IX cycle are plotted against cumulative BV in FIG. 13. In the case of Cycle 2, the Ca breakthrough points for the Lead and Lag columns occurred at <about 7.5 and about 23 BV, respectively. Cycle 2 was stopped after about 68 BV. The Ca in the Lag effluent had reached about 13 mg/L at after about 60 BV's. Breakthrough of Ca for the Lag column of Cycle 3 occurred within the first 5 BV's. Cycle 3 was stopped after about 30 BV's. The tenor of the Ca in the Lag effluent at the 30 BV point was about 7.7 mg/L.

The balance of the Cycle 3 feed solution was processed over about 36.4 BV's in Cycle 4. The Ca breakthrough points for the Lead and Lag columns for Cycle occurred at <about 7.5 and about 7.5 BV, respectively. Extrapolation of the Cycle 4 Lag effluent Ca tenor data indicated that the product solution would have a Ca tenor>about 10 mg/L after 60 BV's.

Figure 14:
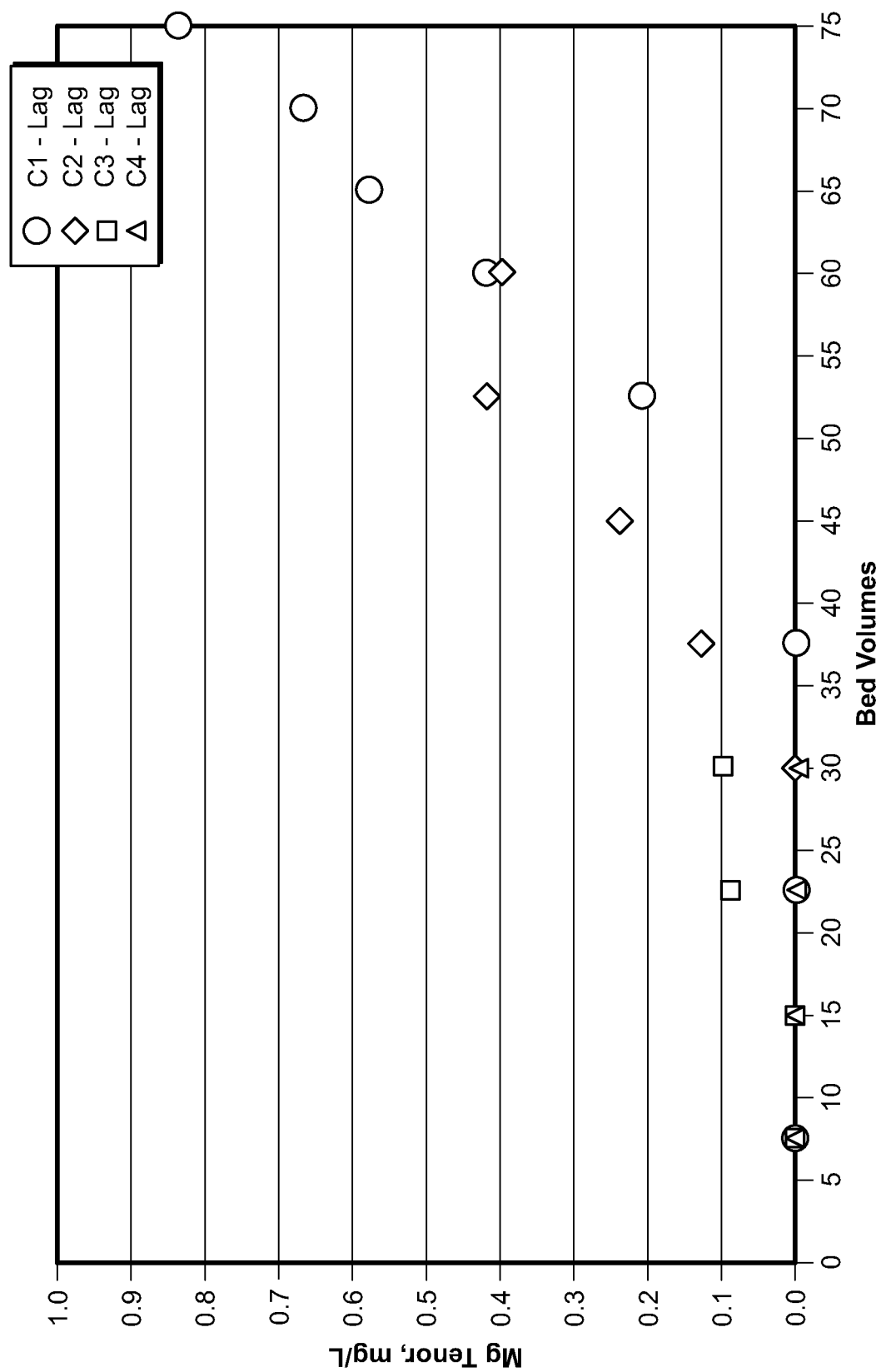
FIG. 14 is a plot showing magnesium tenor as a function of bed volumes in an ion exchange another example of a process according to the present disclosure.

The Mg tenors of the Lag effluent for each IX cycle are plotted against cumulative BV in FIG. 14. It is clear that the Mg tenor in the Lag effluent never approached a level close to the level of about 10 mg/L.

Figure 15:
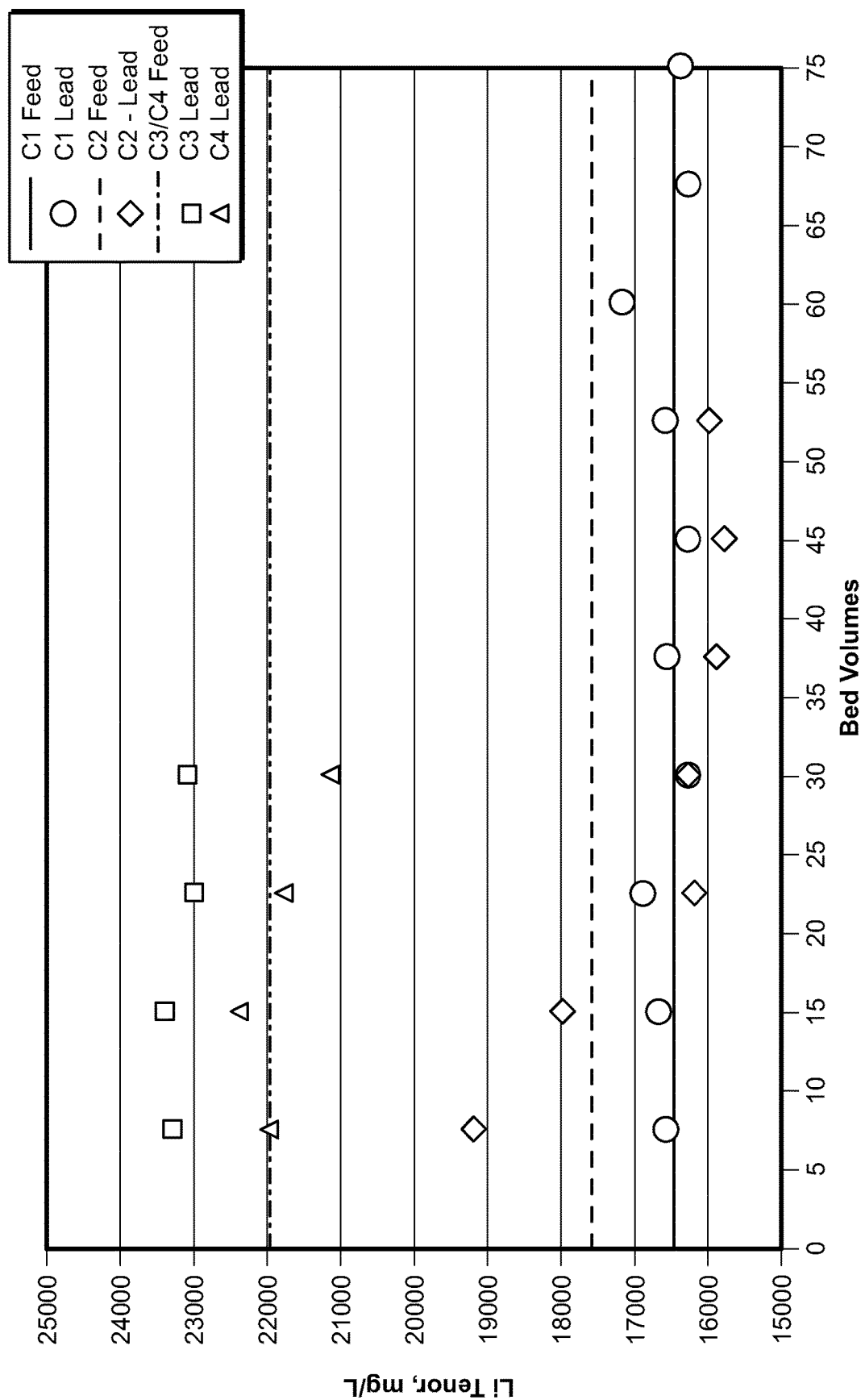
FIG. 15 is a plot showing lithium tenor as a function of bed volumes in an ion exchange another example of a process according to the present disclosure.

The average Li tenors of the Lead effluent for each IX cycle are plotted against cumulative BV in FIG. 15. Also included in this plot are the average Li tenors of the feed solutions. The data indicated that substantially no Li loaded onto the resin.

Figure 16:
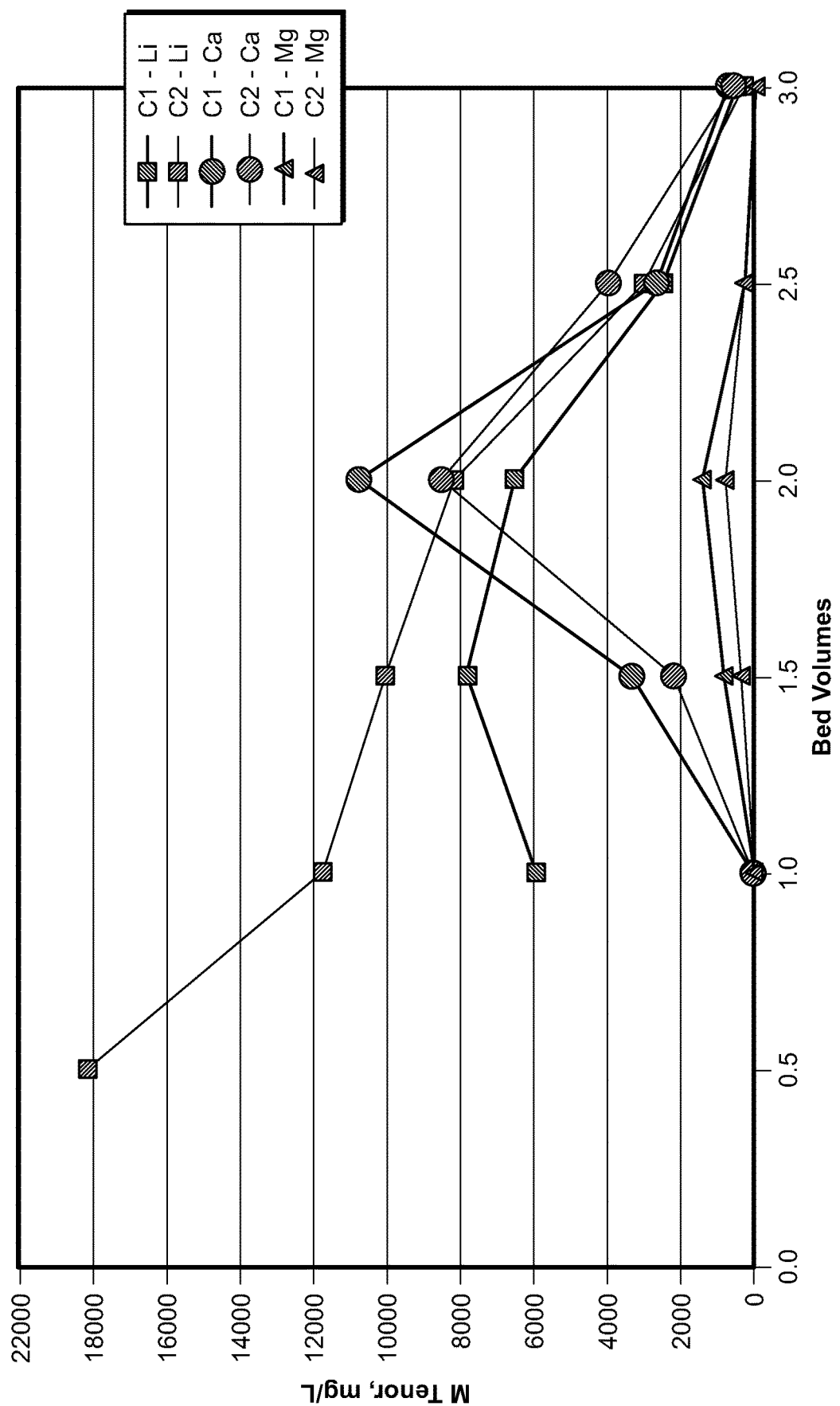
FIG. 16 is a plot showing various metals tenor as a function of bed volumes in an ion exchange another example of a process according to the present disclosure.

The Li, Ca and Mg tenors in the Acid Strip effluents of Cycle 1 and 2 are plotted against cumulative BV in FIG. 16. The data indicate that Li is stripped first from the resin and reaches for example an upper limit tenor in the range of about 0.5 and about 1.5 BV's. The Ca and Mg eluted from the resin starting around 1 BV and both reach for example an upper limit tenor at about 2 BV. The three metals are eluted from the resin after 3 BV's. The Ca and Mg profiles for Cycle 3 and 4 were similar.

Reagent consumptions are reported relative to the LCE produced on a kg per about 1000 kg basis. The lithium sulphate stream produced from Ion Exchange contained about 39.1 kg of Li (this includes 100% of the lithium units in a PIR PLS sample that did not undergo SIR and IX). The equivalent mass of lithium carbonate that could be produced given no losses in downstream processes would equal about 187.7 kg.

The IX circuit produced about 2006 L of product solution. The assay data of the IX Product solutions are summarized in Table 8. The Li tenor ranged from about 15.7 to about 21.9 g/L. The ranges of the Ca and Mg tenors were about 2.4 to about 5.7 mg/L and <about 0.07 to about 0.2 mg/L, respectively. Other constituents of note were Na and K at about 3.5 g/L and about 0.1 g/L on average, respectively. The elements that assayed below the detection limits of the analytical technique are also listed in Table 8.

TABLE 8

IX Product Solution Assays

| IX Product | Solution Tenor, mg/L | | | | | | | | |
|---|---|---|---|---|---|---|---|---|---|
| | Li | SO4 | Cl | Na | K | Ca | Sr | Mg | Ba |
| Carboy 1 | 15700 | 120000 | 5 | 3980 | 107 | 3.8 | 0.61 | 0.2 | 0.03 |
| Carboy 2 | 16700 | 120000 | 4 | 1990 | 105 | 5.7 | 0.9 | 0.18 | 0.043 |
| Carboy 3 | 21900 | 160000 | 5 | 4470 | 117 | 2.4 | 0.74 | <0.07 | 0.05 |

Elements Assaying below Detection (Detection Limits provided in mg/L)

| Ag | Al | As | Be | Bi | Cd | Co | Cr | Cu | Fe |
|---|---|---|---|---|---|---|---|---|---|
| <0.5 | <0.8 | <3 | <0.002 | <1 | <0.3 | <0.3 | <0.2 | <0.1 | <0.2 |
| Mn | Mo | Ni | P | Pb | Sb | Se | Sn | Ti | Tl |
| <0.04 | <0.6 | <1 | <5 | <2 | <1 | <3 | <2 | <0.1 | <3 |
| U | V | W | Y | Zn | | | | | |
| <1 | <0.07 | <2 | <0.02 | <0.7 | | | | | |

The mass balance of for the IX circuit is provided in Table 9. Good accountability for Li was obtained. About 2.7% of the Li was lost in the Strip/Regeneration process solution. The process removed about 97.6% of the Ca and about 99.0% of the Mg contained in the feed solutions.

The IX circuit met the process objectives by reducing the Ca and Mg tenors in the product solution to below about 10 mg/L for each metal cation. Further, a high quality lithium sulphate solution was produced.

TABLE 9

IX Mass Balance

| Process Stream | kg or L | Assays, mg/L or % | | |
|---|---|---|---|---|
| | | Li | Ca | Mg |
| SIR Feed C1 | 750 | 16480 | 176 | 28.2 |
| SIR Feed C2 | 682 | 17600 | 140 | 12.9 |
| SIR Feed C3 | 359 | 21940 | 78.7 | 3.6 |
| SIR Feed C4 | 364 | 21940 | 78.7 | 3.6 |
| IX Product Carboy 1 | 914 | 15700 | 3.8 | 0.2 |
| IX Product Carboy 2 | 478 | 16700 | 5.7 | 0.18 |
| IX Product Carboy 3 | 614 | 21900 | 2.4 | <0.07 |
| IX Regen Reject Drum 1 | 202 | 16.9 | 35.5 | 2.47 |
| IX Regen Reject Drum 2 | 208 | 12.2 | 16.7 | <0.07 |
| IX Strip - Solids | 0.8 | 0.002 | 26.5 | 0.0004 |
| IX Strip - Solution | 111 | 8760 | 718 | 229 |
| Elemental Masses IN, kg | | | | |
| SIR Feed C1 | | 12.36 | 0.13 | 0.02 |
| SIR Feed C2 | | 11.99 | 0.10 | 0.01 |
| SIR Feed C3 | | 7.87 | 0.03 | 0.00 |
| SIR Feed C4 | | 7.99 | 0.03 | 0.00 |
| Total IN, kg | | 40.2 | 0.28 | 0.03 |
| Elemental Masses OUT, kg | | | | |
| IX Product Carboy 1 | | 14.35 | 0.00 | 0.00 |
| IX Product Carboy 2 | | 7.99 | 0.00 | 0.00 |
| IX Product Carboy 3 | | 13.45 | 0.00 | 0 |
| IX Regen Reject Drum 1 | | 0.00 | 0.01 | 0.00 |
| IX Regen Reject Drum 2 | | 0.00 | 0.00 | 0 |
| IX Strip - Solids | | 0.00 | 0.22 | 0.00 |
| IX Strip - Solution | | 0.97 | 0.08 | 0.03 |
| Total OUT, kg | | 36.8 | 0.32 | 0.03 |
| Distribution, % | | | | |
| Product | | 97.3 | 2.4 | 1.0 |
| Tails | | 2.7 | 97.6 | 99.0 |
| Distribution Total | | 100.0 | 100.0 | 100.0 |
| OUT/IN, % | | 91.4 | 112.4 | 80.3 |
| Li Loss, % | | 2.7 | | |
| M Removed, % | | | 97.6 | 99.0 |

Examination of the semi-quantitative x-ray diffraction (SQ-XRD) data of composite samples of the CL/PIR residues showed that each sample contains both α- and β-spodumene. The SQ-XRD data for the CL/PIR residues generated from each of the two feed samples (75/25 and 50/50) are summarized in Table 10. The presence of α-spodumene indicates that the phase transition step that was conducted by a third party vendor (acid roast of α-spodumene) was not 100% efficient. Any Li present in this form would thus not be chemically available to the hydrometallurgical process. It should be noted that the efficiency of the phase transition step (conversion from α-spodumene to β-spodumene) is not 100% and therefore a percentage of the contained Li in the feed to the Hydrometallurgical process is as α-spodumene.

TABLE 10.

SQ-XRD Data of the two CL/PIR Residue Types

| Chemical Composition | 75/25 CL/PIR Residue Drum 1-5, wt % | 50/50 CL/PIR Residue Drum 7-14, wt % |
|---|---|---|
| $H(AlSi_2)O_6$ | 60.6 | 67.3 |
| Spodumene beta | 12.0 | 9.4 |
| $SiO_2$ | 11.6 | 7.5 |
| $NaAlSi_3O_8$ | 3.6 | 3.8 |
| $CaSO_4.(H_2O)$ | 2.7 | 4.4 |
| $KAlSi_3O_8$ | 1.6 | 3.6 |
| $LiAlSi_2O_6$ | 2,2 | 2.5 |
| $Ca(SO_4)(H_2O)0.5$ | 2.5 | — |
| αFeO·OH | 1.9 | — |
| $Fe_3O_4$ | — | 1.6 |
| $CaSO_4.2H_2O$ | 1.1 | — |
| gamma-$Mn_3O_4$ | 0.3 | — |
| | 100.1 | 100.1 |
| Li Bearing Mineral | Relative Distribution of Li, % | |
| Spodumene beta | 94.9 | 92.7 |
| $LiAlSi_2O_6$, | 5.1 | 7.3 |

The Li units that are in the CL/PIR residues as β-spodumene were never available to the process and as a result provide a false low Li recovery value.

An adjusted Li recovery was calculated that did not consider the Li units tied up as β-spodumene in the CL/PIR residue. The data for this calculation are summarized in Table 11. The total Li in all of the out process streams was about 63.2 kg. This included about 11.7 kg of Li in the CL/PIR residue that was present as β-spodumene. The adjusted total Li out value thus becomes about 51.6 kg. The total recoverable Li by the overall process was about 46.9 kg. The adjusted total Li recovery is then calculated to be about 95.8%.

TABLE 11

Adjusted Total Li Recovery

| | Li Mass, g |
|---|---|
| Total Li OUT based on Assays | 60615 |
| Total Li Recovered | 46884 |
| Total Li in CL/PIR Residue as β-Spodumene | 11655 |
| Total Li OUT minus Li as β-Spodumene | 48960 |
| Adjusted Total Li Recovery, % | 95.8 |

A high grade lithium sulphate solution was thus produced. In accordance with FIG. 1, this solution can be used, for example, as the lithium source in the production of a solution of high quality lithium hydroxide and/or high quality lithium carbonate. This high grade lithium sulphate solution can also be used as a feed in the production of other high grade lithium products.

EXAMPLE 2

Electrolysis: Conversion of $Li_2SO_4$ into LiOH.

Figure 17:
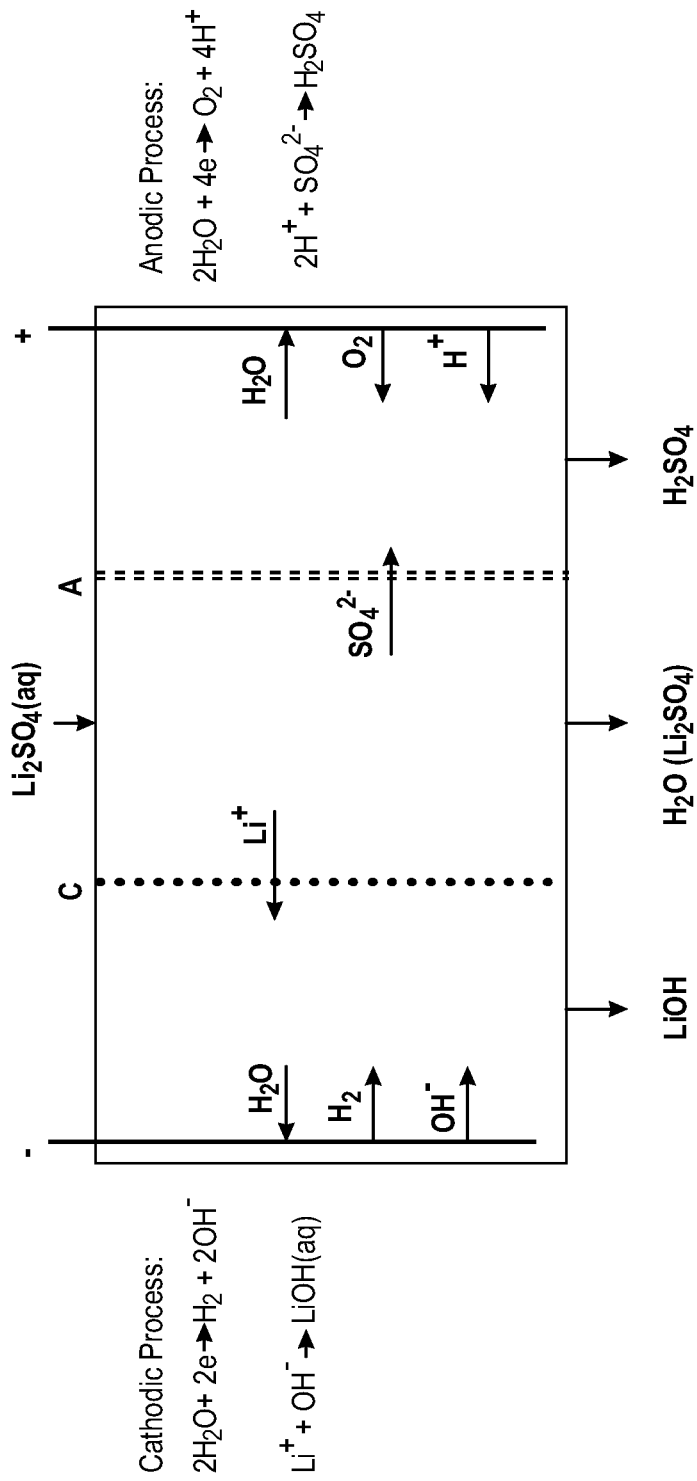
FIG. 17 is a schematic representation of an example of a membrane electrolysis cell that can be used for carrying out an example of a process according to the present disclosure.

The electrolysis was conducted using an electrolysis method in a three-compartment membrane electrolysis (ME) cell. The central compartment of the ME cell was separated from the cathodic compartment by a cationic membrane and from the anodic compartment by an anionic membrane. The cathodes comprised stainless steel (316) and the anode comprised a Ti mixed metal oxide (MMO) layer. The basic schematic of the ME cell is provided in FIG. 17. The central compartment of the cell was charged with low concentration lithium sulphate solution. The cathodic compartment was filled with lithium hydroxide solution. The anodic compartment was charged with dilute sulphuric acid solution at about 30 g/L acid.

Under the influence of an electric field, lithium ions from the central compartment were transported through the cationic membrane into the cathodic compartment. In parallel, the sulphate ions moved through the anionic membrane into the anodic compartment. Meanwhile, hydroxyl ions are produced on the cathode and hence lithium hydroxide is formed in the catholyte. The anodic reaction generated protons resulting in the production of sulphuric acid as the anolyte. As a result the lithium concentration increases in the catholyte and drops in the central compartment during membrane electrolysis. During operation the Li tenor in the central compartment was maintained by the controlled addition of a concentrated lithium sulphate solution.

The cathodic and anodic compartments are fed with deionized water in order to keep the lithium hydroxide and sulphuric acid concentrations at predetermined levels.

The synthesis of lithium hydroxide was conducted using a stacked ME cell consisting of two three-compartment cells. The main components of the cell were fabricated with high density polypropylene (HDP). The cathodes comprised 316 stainless steel and were about 100 cm×about 50 cm. The anode was coated with titanium mixed metal oxide (MMO) and was about 100 cm×about 50 cm. The anode was purchased from De Nora Tech (part number: DNT-DX-09-118 Electrowinning Anodes sheet, coating code DN-475E both sides).

The stack design of the ME cell allowed for essentially two ME cells that operated in parallel. Further, the stacked configuration allowed for the anode to be shared by the two cells. Each cell comprises a cathodic compartment equipped with a cathode, a central compartment and an anodic compartment with the shared electrode. The central compartment of the cell was separated from cathodic compartment by a cationic membrane Lanxess Ionac™-MC-3470 and from the anodic compartment by an anionic membrane Lanxess Ionac™-MA-7500. Effective working area of each membrane was about 0.84 $m^2$. The void space within each compartment was filled with polypropylene mesh to aid in dispersing the solution flow. The process flow diagram of the ME circuit is provided in FIG. 18.

The electricity to the ME cell was supplied by a direct current rectifier unit, type SR DDS-5C024-02 manufactured by Hanson. The rectifier had both an amp meter and a volt meter that were used for monitoring the voltage and current applied to the cell. The rectifier was set on current control mode.

The lithium sulphate solution produced in the previous sections was used as a lithium source for the ME pilot plant (electrolysis). The composition of the feed solution is provided in Table 12.

TABLE 12

Composition of Feed Solution

Tenor of solution components, mg/L

| Sample ID | Li | Na | K | Ca | Mg | Fe | Zn |
|---|---|---|---|---|---|---|---|
| IX | 15700 | 3980 | 107 | 3.8 | 0.2 | <0.2 | <0.7 |
| Product | Ag | Al | As | Ba | Be | Bi | Cd |
| Carboy 1 | <0.5 | <0.8 | <3 | 0.03 | <0.002 | <1 | <0.3 |
| | Co | Cr | Cu | Mn | Mo | Ni | P mg/L |
| | <0.3 | <0.2 | <0.1 | <0.04 | <0.6 | <1 | <5 |
| | Pb | Sb | Se | Sn | Sr | Ti | Tl |
| | <2 | <1 | <3 | <2 | 0.61 | <0.1 | <3 |
| | U | V | W | Y | | SO4 | Cl |
| | <1 | <0.07 | <2 | <0.02 | | 120000 | 5 |

The ME cell was pre-filled prior to the start of the pilot plant. The central compartment of the cell was charged with an aqueous composition comprising lithium sulphate Feed solution that had been diluted down to about 2 g/L Li with RO water (thus about 15.8 g/L of $Li_2SO_4$). The cathodic compartment was filled up with an aqueous composition comprising lithium hydroxide. About sixty litres of an aqueous composition comprising sulphuric acid (about 30 g/L) was prepared from reagent acid and used to fill the anodic compartment. The composition of the starting material compositions were thus as follows (see Table 13).

TABLE 13

Compositions of Starting Material Compositions

Tenor of solution components, mg/L

| Sample ID | Li | Na | K | Ca | Mg | Fe | Zn |
|---|---|---|---|---|---|---|---|
| Spent-Init | 1300 | 452 | 14 | <0.9 | <0.07 | <0.2 | <0.7 |
| Ca-Init | 3100 | 740 | 30 | <0.9 | <0.2 | <0.07 | <0.7 |
| An-Init | 0.07 | <2 | <1 | <0.9 | <0.07 | <0.2 | <0.7 |

| | Ag | Al | As | Ba | Be | Bi | Cd |
|---|---|---|---|---|---|---|---|
| Spent-Init | <0.5 | <0.8 | <3 | <0.007 | <0.002 | <1 | <0.3 |
| Ca-Init | <0.5 | <0.8 | <3 | <0.007 | <0.002 | <1 | <0.3 |
| An-Init | <0.5 | <0.8 | <3 | <0.007 | <0.002 | <1 | <0.3 |

TABLE 13-continued

Compositions of Starting Material Compositions

|  | Co | Cr | Cu | Mn | Mo | Ni | P |
|---|---|---|---|---|---|---|---|
| Spent-Init | <0.3 | <0.2 | <0.1 | <0.04 | <0.6 | <1 | <5 |
| Ca-Init | <0.3 | <0.2 | <0.1 | <0.04 | <0.6 | <1 | <5 |
| An-Init | <0.3 | <0.2 | <0.1 | <0.04 | <0.6 | <1 | <5 |

|  | Pb | Sb | Se | Sn | Sr | Ti | Tl |
|---|---|---|---|---|---|---|---|
| Spent-Init | <2 | <1 | <3 | <2 | 0.077 | <0.02 | <3 |
| Ca-Init | <2 | <1 | <3 | <2 | 0.049 | <0.02 | <3 |
| An-Init | <2 | <1 | <3 | <2 | <0.002 | <0.02 | <3 |

|  | U | V | W | Y | SO4 | Cl |
|---|---|---|---|---|---|---|
| Spent-Init | <1 | <0.2 | <2 | <0.02 | 13000 | <1 |
| Ca-Init | <1 | <0.2 | <2 | <0.02 |  |  |
| An-Init | <1 | <0.2 | <2 | <0.02 | 24000 | <1 |

The central compartment of the cell was fed with the fresh aqueous composition comprising lithium sulphate (Feed). The feed flow rate was controlled to maintain about 2 g/L of Li in the central compartment (about 15.8 g/L of $Li_2SO_4$). The pH of the aqueous composition comprising lithium sulphate in the central compartment was maintained at a value of about 10 to about 12.

Figure 18:
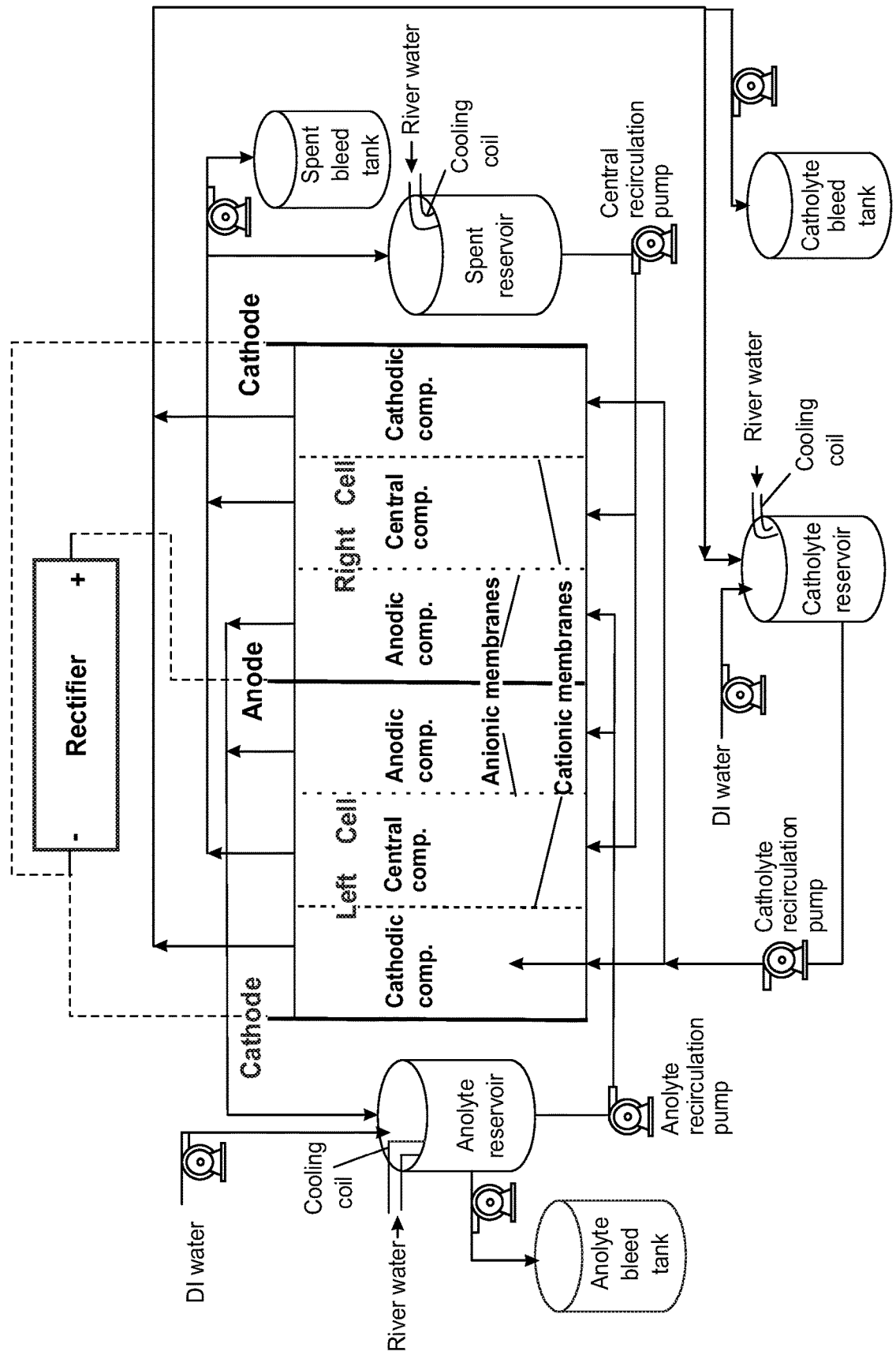
FIG. 18 is a flow sheet diagram concerning another example of a process according to the present disclosure.

The spent electrolyte from central compartment was bled to the spent bleed tank. The bleed was taken from recirculation tubing before reaching the reservoir to ensure a low lithium tenor in the spent electrolyte. The bleed flow rate was controlled to maintain a constant level in the reservoir tank. The anolyte had both a bleed flow from the anolyte reservoir and a dilution water flow to the reservoir. The bleed flow rate was controlled to maintain level in the anolyte reservoir by having the bleed tubing at a fixed level in the tank and ensuring the pump was set higher than the dilution water flow rate. The dilution water flow rate was controlled to maintain a concentration of about 30 g/L concerning the aqueous composition comprising sulphuric acid (in the anodic cell (as monitored by free acid titrations)). The catholyte also had both a bleed flow and a dilution water flow to the reservoir. The bleed flow rate for the catholyte was controlled to maintain level in the reservoir. The bleed was taken from the recirculation tubing before reaching the reservoir to ensure a high Li tenor and no contamination. Dilution water for the catholyte was added to maintain lithium tenor at about 15 g/L (about 51.8 g/L in terms of LiOH) in the catholyte product (aqueous composition comprising LiOH). These flows are illustrated in FIG. 18.

Grab samples from the central compartment (the spent solution) were taken every about 4 hours, profile samples were taken every about 6 hours and composite samples were taken every about 12 hours of the anolyte and every about 24 hours for the spent and catholyte. Titrations for lithium hydroxide in the catholyte and free acid titrations for the anolyte were done once an hour.

The ME pilot plant ran in two 5 day sections: Week 1 and Week 2. Each section operated continuously for the five days. Hourly readings were taken to monitor current, voltage, temperature, the flow rates, and product and feed weights. All of the readings were recorded in an Operation Log sheet. At start-up a current of about 400 A was applied to the cell. The recirculation flow rate was set at about 3 L/min and the temperature set points on the cooling water for the circulation tanks was set to about 40° C. During the operation of the pilot plant several changes were made to operating conditions in order to determine the effect the changes would have on production. The first change involved increasing the amperage from about 400 A to about 440 A, to see if it would be possible to increase the feed flow rate without decreasing the product Li tenor. Next the recirculation speed was increased from about 3 to about 6 L/min, to see if this would improve the efficiency of the cell. Another test carried out was to operate on voltage control rather than amperage control, by trying to achieve and maintain about 10 to about 12 V. Finally, the temperature set point on the cooling water for the recirculation tanks was changed to about 50° C. and about 35° C. Membrane electrolysis operation conditions are summarized in Tables 14 and 15.

TABLE 14

ME Pilot Plant Operation Conditions. Week One

|  | Time | | Current | Electrolysis time | Current quantity | Power | Circ. Rate | Temp. |
|---|---|---|---|---|---|---|---|---|
|  | From | To | A | h | Ah | Wh | L/min | ° C. |
| Day 1 | 12-11 23:47 | 12-11 23:59 | 400 | 0.2 | 85 | 710 | 3 | 40 |
|  | 12-05 10:43 | 12-05 23:59 | 400 | 13.3 | 5287 | 44837 | 3 | 40 |
|  | 12-06 0:00 | 12-06 6:00 | 400 | 6.0 | 2398 | 19040 | 3 | 40 |
|  | Total |  |  | 19.5 | 7770 | 64586 |  |  |
| Day 2 | 12-06 6:01 | 12-06 14:28 | 400 | 8.4 | 3373 | 31638 | 3 | 40 |
|  | 12-06 14:29 | 12-06 23:59 | 440 | 9.5 | 4164 | 43448 | 3 | 40 |
|  | 12-07 0:00 | 12-07 5:59 | 440 | 6.0 | 2619 | 28855 | 3 | 40 |
|  | Total |  |  | 23.9 | 10156 | 103941 |  |  |
| Day 3 | 12-07 6:00 | 12-07 10:37 | 440 | 4.6 | 2026 | 24327 | 3 | 40 |
|  | Run 440 A |  |  | 20.1 | 8809 | 96629 |  |  |
|  | 12-07 11:40 | 12-07 23:59 | 400 | 12.3 | 4915 | 51481 | 3 | 40 |
|  | 12-08 0:00 | 12-08 5:59 | 400 | 6.0 | 2390 | 27229 | 3 | 40 |
|  | Total |  |  | 22.9 | 9332 | 103037 |  |  |
| Day 4 | 12-08 6:00 | 12-08 11:59 | 400 | 6.0 | 2392 | 31380 | 3 | 40 |
|  | 12-08 12:00 | 12-08 19:25 | 400 | 7.4 | 2959 | 27988 | 6 | 40 |
|  | 12-08 19:54 | 12-08 21:08 | 400 | 1.2 | 490 | 4274 | 6 | 40 |
|  | 12-08 21:16 | 12-08 23:59 | 400 | 2.6 | 1029 | 9107 | 6 | 40 |
|  | 12-09 0:00 | 12-09 5:54 | 400 | 5.9 | 2357 | 21190 | 6 | 40 |
|  | Total |  |  | 23.1 | 9227 | 93939 |  |  |

TABLE 14-continued

ME Pilot Plant Operation Conditions. Week One

| | Time | | Current | Electrolysis time | Current quantity | Power | Circ. Rate | Temp. |
|---|---|---|---|---|---|---|---|---|
| | From | To | A | h | Ah | Wh | L/min | ° C. |
| Day 5 | 12-09 5:55 | 12-09 11:59 | 400 | 6.1 | 2423 | 22159 | 6 | 40 |
| | Run 6 L/min | | | 23.2 | 9259 | 84717 | | |
| | 12-09 12:00 | 12-09 15:29 | 400 | 3.5 | 1394 | 17566 | 3 | 40 |
| | 12-09 15:30 | 12-09 23:59 | 400 | 8.5 | 3385 | 37798 | 3 | 40 |
| | 12-10 0:00 | 12-10 5:00 | 400 | 5 | 1987 | 18703 | 3 | 40 |
| | Total | | | 23.0 | 9190 | 96226 | | |
| | Total Week 1 | | | 113.0 | 45856 | 464366 | | |

TABLE 15

ME Pilot Plant Operation Conditions. Week Two

| | Time | | Current | Electrolysis time | Current quantity | Power | Circ. Rate | Temp. |
|---|---|---|---|---|---|---|---|---|
| | From | To | A | h | Ah | Wh | L/min | ° C. |
| Day 6 | 12-11 23:47 | 12-12 0:00 | 400 | 0.2 | 85 | 710 | 3 | 40 |
| | 12-12 0:00 | 12-12 5:54 | 400 | 5.9 | 2359 | 20381 | 3 | 40 |
| | Total | | | 6.1 | 2444 | 21091 | | |
| Day 7 | 12-12 5:55 | 12-12 11:58 | 400 | 6.0 | 2422 | 21166 | 3 | 40 |
| | 12-12 11:58 | 12-12 23:59 | 420 | 12.00 | 5029 | 49732 | 3 | 40 |
| | 12-13 0:00 | 12-13 5:53 | 420 | 5.9 | 2468 | 26658 | 3 | 40 |
| | Total | | | 23.9 | 9920 | 97556 | | |
| Day 8 | 12-13 5:54 | 12-13 17:55 | 420 | 12.0 | 5036 | 49160 | 3 | 40 |
| | 12-13 17:56 | 12-13 23:59 | 420 | 6.05 | 2539 | 25817 | 3 | 40 |
| | 12-14 0:00 | 12-14 5:53 | 420 | 5.9 | 2470 | 24367 | 3 | 40 |
| | Total | | | 24.0 | 10044 | 99344 | | |
| Day 9 | 12-14 5:54 | 12-14 7:58 | 420 | 2.1 | 869 | 8335 | 3 | 40 |
| | 12-14 8:37 | 12-14 18:00 | 420 | 9.4 | 3933 | 38591 | 3 | 40 |
| | 12-14 18:01 | 12-14 23:59 | 420 | 6.0 | 2502 | 25998 | 3 | 40 |
| | 12-15 0:00 | 12-15 5:51 | 420 | 5.9 | 2456 | 24553 | 3 | 40 |
| | Total | | | 23.3 | 9761 | 97477 | | |
| Day 10 | 12-15 5:52 | 12-15 17:59 | 420 | 12.1 | 5078 | 42651 | 3 | 40-50 |
| | 12-15 18:00 | 12-15 19:15 | 420 | 1.3 | 529 | 4793 | 3 | 35 |
| | 12-15 19:16 | 12-15 22:14 | 360-450 | 3.0 | 1273 | 12735 | 3 | 35 |
| | 12-15 22:15 | 12-15 23:59 | 420 | 1.7 | 733 | 6854 | 3 | 35 |
| | 12-16 0:00 | 12-16 5:52 | 420 | 5.9 | 2466 | 22448 | 3 | 35 |
| | Total | | | 23.9 | 10079 | 89480 | | |
| Day 11 | 12-16 5:53 | 12-16 21:00 | 420 | 15.1 | 6337 | 61175 | 3 | 35 |
| | Test t = 35° C. | | | 26.9 | 11338 | 108004 | | |
| | Total | | | 15.1 | 6337 | 61175 | | |
| | Total Week 2 | | | 116.3 | 48585 | 466122 | | |

During the two 5-day pilot plants about 621 litres of the aqueous composition comprising lithium hydroxide and having a concentration of about 14.6 g/L of lithium (or about 49.9 g/L of lithium hydroxide) and about 2239 litres of the aqueous composition comprising sulphuric acid at a concentration of about 20 to about 30 g/L were produced. A total of about 675.8 litres of the aqueous composition comprising lithium sulphate was processed and about 425 litres of spent electrolyte containing about 2 to about 3 g/L of lithium was produced. Masses, volumes and densities of products produced are provided in Tables 16 and 17. The ME process was conducted for about 228 hours. During the operation about 930.5 kWh of electrical energy was consumed for lithium sulphate conversion to lithium hydroxide.

TABLE 16

ME Pilot Plant Products. Week One

| | Anolyte | | Spent | | Catholyte | | Feed | |
|---|---|---|---|---|---|---|---|---|
| Time | Mass kg | Volume L | Mass kg | Volume L | Mass kg | Volume L | Mass kg | Volume L |
| Initial solution | 60 | 59.1 | 60.2 | 59.5 | 40 | 39.5 | | |
| Day 1 | 235.8 | 231.7 | 70.8 | 69.6 | 6.6 | 6.3 | 87.3 | 78.9 |
| Day 2 | 274.5 | 269.8 | 42.84 | 42.2 | 80.7 | 75.9 | 93.5 | 84.5 |
| Day 3 | 270.5 | 266.0 | 40.61 | 40.1 | 83.0 | 78.6 | 88.7 | 80.2 |

TABLE 16-continued

ME Pilot Plant Products. Week One

| Time | Anolyte | | Spent | | Catholyte | | Feed | |
|---|---|---|---|---|---|---|---|---|
| | Mass kg | Volume L | Mass kg | Volume L | Mass kg | Volume L | Mass kg | Volume L |
| Day 4 | 261.2 | 257.2 | 35.94 | 35.5 | 74.6 | 70.6 | 81.4 | 73.5 |
| Day 5 | 225.8 | 222.1 | 35.10 | 34.6 | 65.2 | 61.6 | 74.1 | 66.9 |
| Final solution | 60 | 59.0 | 60.2 | 59.4 | 53.6 | 50.6 | | |
| Total Week 1 | 1267.8 | 1246.7 | 225.3 | 221.9 | 310.2 | 315.1 | 425.0 | 384.0 |

TABLE 17

ME Pilot Plant Products. Week Two.

| Time | Anolyte | | Spent | | Catholyte | | Feed | |
|---|---|---|---|---|---|---|---|---|
| | Mass kg | Volume L | Mass kg | Volume L | Mass kg | Volume L | Mass kg | Volume L |
| Initial solution | 60 | 59.0 | 60.2 | 59.4 | 53.5 | 50.5 | | |
| Day 6 | 64.5 | 63.6 | 10.3 | 10.0 | 13.4 | 12.7 | 19.6 | 17.7 |
| Day 7 | 238.5 | 234.6 | 42.50 | 41.9 | 74.9 | 70.8 | 76.4 | 69.1 |
| Day 8 | 233.4 | 229.5 | 45.01 | 44.3 | 75.3 | 71.1 | 75.3 | 68.1 |
| Day 9 | 206.8 | 203.6 | 56.67 | 56.0 | 56.1 | 53.1 | 60.9 | 55.0 |
| Day 10 | 165.2 | 162.7 | 53.2 | 52.5 | 46.2 | 43.7 | 54.1 | 48.9 |
| Day 11 | 116.6 | 114.6 | 35.3 | 34.9 | 34.5 | 32.7 | 36.6 | 33.1 |
| Final solution | 43.6 | 42.9 | 24.0 | 23.8 | 76.0 | 72.0 | | |
| Total Week 2 | 1008.6 | 992.6 | 206.8 | 204.0 | 322.9 | 305.6 | 268.9 | 291.9 |

At the beginning, the starting material aqueous composition in the cathodic compartment contained only about 3.1 g/L Li (about 10.5 g/L of LiOH). During electrolysis the lithium tenor in the catholyte increased. It took about 13 hours for the Li tenor to reach the level of about 15 g/L (about 51.8 g/L of LiOH).

Figure 19:
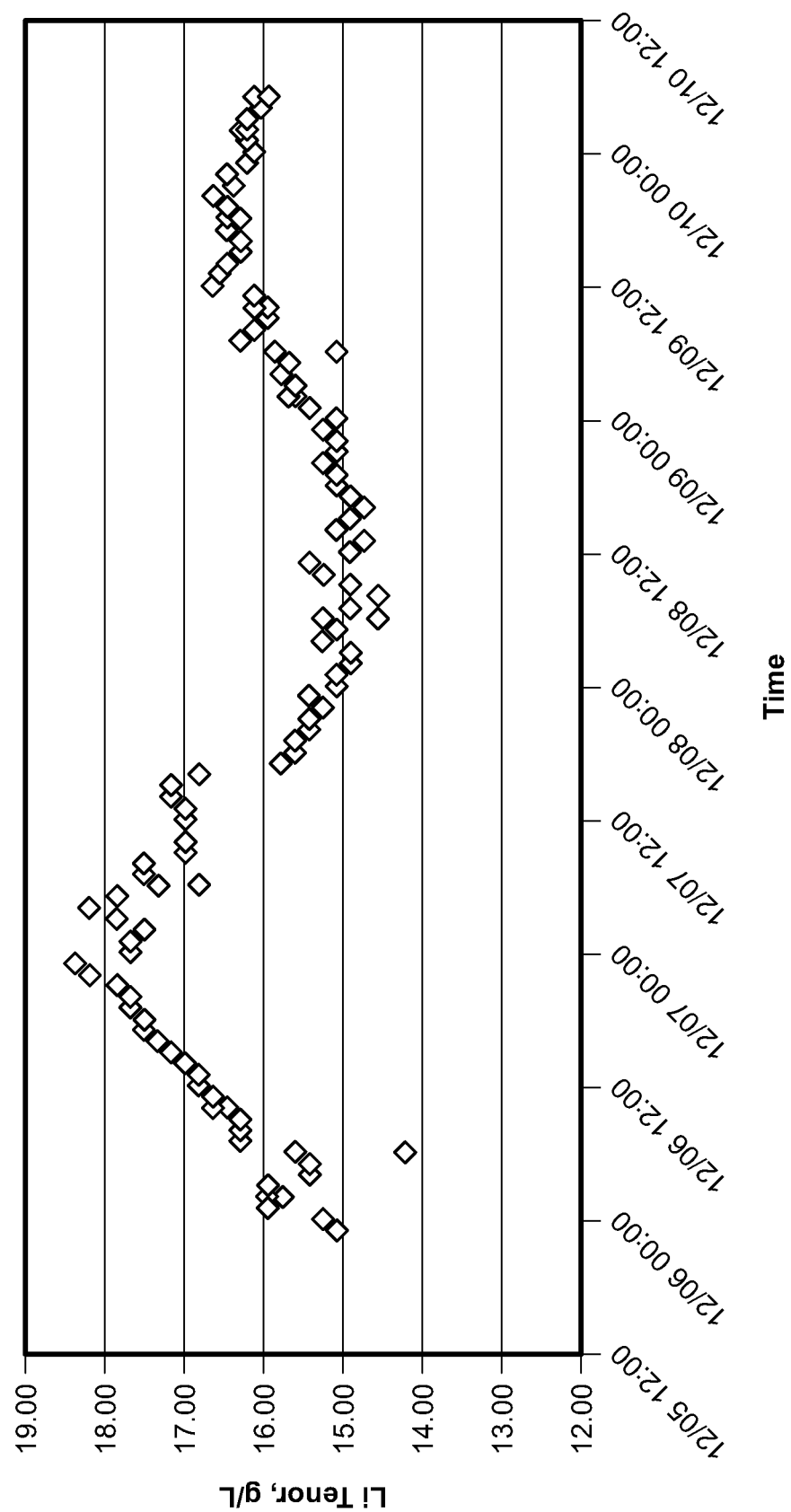
FIG. 19 is a plot showing lithium tenor as a function of time in another example of a process according to the present disclosure.
Figure 20:
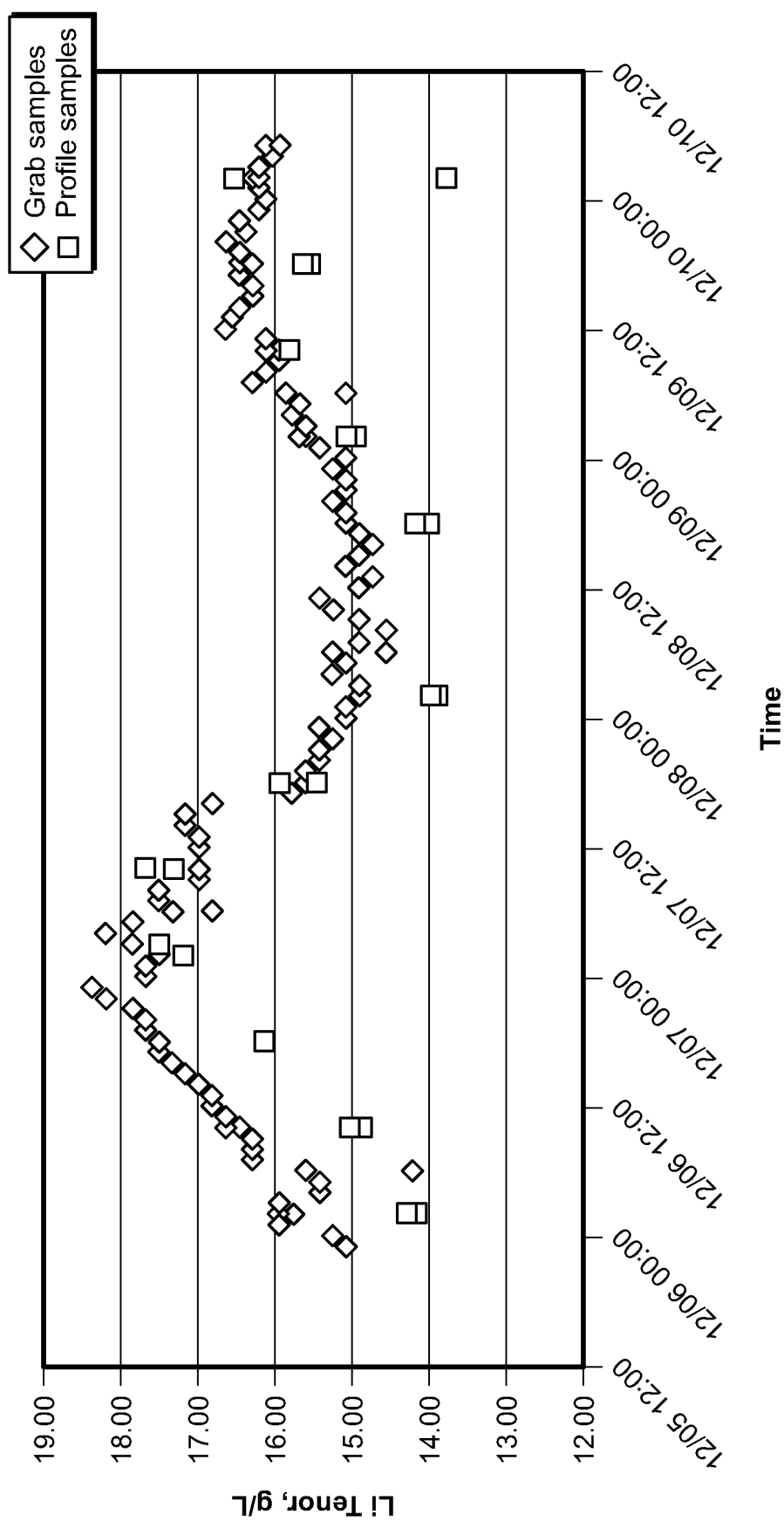
FIG. 20 is a plot showing lithium tenor as a function of time in another example of a process according to the present disclosure.

When the Li concentration in catholyte approached about 15 g/L (about 51.8 g/L of LiOH), reverse osmosis water addition to the cathodic compartment was started. The continuous mode of ME was then started. The Li concentration in the catholyte was maintained by adjusting the dilution water flow to the catholyte reservoir. The Li concentration in catholyte grab samples was about 14 to about 18 g/L during the process (about 48.3 to about 62.1 g/L of LiOH). The Li tenor in the catholyte is plotted against electrolysis time during continuous electrolysis period in first week of pilot plant operations in FIG. 19. During the second week of pilot plant operations the Li tenor was about 15 to about 16.3 g/L (about 51.8 to about 56.2 g/L of LiOH) (FIG. 20). The Li assays for the profile samples differ from Li tenor in grab samples. This happened because the results were obtained by different methods. The Li tenors in the grab samples were determined by titration with hydrochloric acid. The Li tenors in the profile samples were measured using atomic absorption spectroscopy (AAS). The titration results indicate the total hydroxide in solution, including hydroxides of Li, Na and K. The AAS results only report Li in solution.

Assay results of selected metals for the profile samples collected from the left and right line of the catholyte stream are listed in Table 18 and Table 19. The catholytes of the left and right compartments were close in composition. The similarity of these values indicated that electrical current was distributed to both cathodes equally and both cells were working with the same effectiveness.

TABLE 18

Assays for catholyte profile samples - Week One.

| Sampling time | Tenor, mg/L | | | | | | | | | |
|---|---|---|---|---|---|---|---|---|---|---|
| | Li | | Na | | K | | Ca | | Mg | |
| | Left | Right | Left | Right | Left | Right | Left | Right | Left | Right |
| 05Dec 1800 | 8580 | 10900 | 2330 | 2770 | 82 | 101 | 1.6 | 1.9 | <0.07 | <0.07 |
| 06Dec 0200 | 14100 | 14200 | 4090 | 4150 | 131 | 115 | 2.2 | 2.3 | <0.07 | <0.07 |
| 06Dec 1000 | 15000 | 14800 | 4070 | 4020 | 107 | 107 | <0.9 | 2.1 | <0.07 | 0.08 |
| 06Dec 1800 | 16100 | 16100 | 4450 | 4720 | 123 | 128 | 2.6 | 2.4 | <0.07 | <0.07 |
| 07Dec 0200 | 17200 | 17500 | 4050 | 4470 | 119 | 119 | 2.7 | 2.7 | <0.07 | <0.07 |
| 07Dec 1000 | 17300 | 17700 | 3790 | 4130 | 139 | 137 | 2.9 | 2.9 | <0.07 | <0.07 |
| 07Dec 1800 | 15400 | 15900 | 3550 | 3470 | 114 | 123 | 2.6 | 2.5 | <0.07 | <0.07 |
| 08Dec 0200 | 13900 | 13800 | 3220 | 3590 | 115 | 114 | 2.6 | 2.6 | <0.07 | <0.07 |
| 08Dec 1000 | 13300 | 13700 | 3450 | 3680 | 111 | 115 | 2.9 | 3.2 | <0.07 | <0.07 |
| 08Dec 1800 | 13900 | 14100 | 3540 | 3650 | 102 | 104 | 3.2 | 3.2 | <0.07 | <0.07 |
| 09Dec 0200 | 14900 | 15000 | 3940 | 4150 | 123 | 117 | 3.1 | 3.2 | <0.07 | <0.07 |
| 09Dec 1000 | 16100 | 15800 | 4380 | 4580 | 127 | 118 | 3.8 | 3.5 | <0.07 | <0.07 |
| 09Dec 1800 | 15500 | 15600 | 3840 | 3660 | 103 | 101 | 3.6 | 3.4 | <0.07 | <0.07 |
| 10Dec 0200 | 16500 | 13700 | 3920 | 3880 | 114 | 117 | 3.8 | 3.6 | <0.07 | <0.07 |

TABLE 19

Assays for Catholyte Profile Samples - Week Two

| Sampling time | Li | | Na | | K | | Ca | | Mg | |
|---|---|---|---|---|---|---|---|---|---|---|
| | Left | Right | Left | Right | Left | Right | Left | Right | Left | Right |
| 12Dec 0200 | 15300 | 14900 | 3410 | 3360 | 115 | 124 | 3.3 | 3.7 | <0.07 | <0.07 |
| 12Dec 1000 | 13900 | 14400 | 6110 | 3820 | 111 | 114 | 3.6 | 3.7 | <0.07 | <0.07 |
| 12Dec 1800 | 16100 | 16500 | 4240 | 3690 | 118 | 116 | 4 | 3.9 | <0.07 | <0.07 |
| 13Dec 0200 | 16200 | 16400 | 3480 | 3510 | 114 | 110 | 3.5 | 3.3 | <0.07 | <0.07 |
| 13Dec 1000 | 14500 | 14600 | 3430 | 3170 | 118 | 109 | 4 | 3.6 | <0.07 | <0.07 |
| 13Dec 1800 | 14600 | 14400 | 4070 | 4020 | 119 | 157 | 4.2 | 3.9 | <0.07 | <0.07 |
| 14Dec 0200 | 16200 | 16600 | 3810 | 3700 | 126 | 129 | 3.8 | 3.7 | <0.07 | <0.07 |
| 14Dec 1000 | 16000 | 15700 | 3770 | 3720 | 124 | 135 | 3.7 | 4.1 | <0.07 | <0.07 |
| 14Dec 1800 | 15200 | 14800 | 3690 | 3870 | 133 | 134 | 3.9 | 3.9 | <0.07 | <0.07 |
| 15Dec 0200 | 14700 | 14400 | 3560 | 3720 | 101 | 109 | 3.7 | 3.8 | <0.07 | <0.07 |
| 15 Dec 1000 | 14400 | 14300 | 3870 | 3980 | 125 | 128 | 3.7 | 3.8 | <0.07 | <0.07 |
| 15Dec 1800 | 14800 | 15300 | 4040 | 4240 | 138 | 141 | 3.8 | 3.9 | <0.07 | <0.07 |
| 16Dec 0200 | 14700 | 14700 | 3870 | 3860 | 129 | 125 | 3.6 | 3.4 | <0.07 | <0.07 |
| 16Dec 1000 | 13900 | 14000 | 3900 | 3880 | 124 | 126 | 3.9 | 3.8 | <0.07 | <0.07 |
| 16Dec 1800 | 14000 | 15600 | 4120 | 4270 | 130 | 132 | 4 | 4 | <0.07 | <0.07 |

Lithium hydroxide solution was collected in batches over a 24 h period. The batches were switched out during the Day shift operation. A sample from each drum was taken as day composite sample. Assay results for composite samples are listed in Tables 20 and 21.

The LiOH concentration in product batches starting the second day of pilot plant operation were about 47.3 to about 55.6 g/L (about 14 to about 16 g/L of Li). The obtained aqueous composition also comprised about 3.3 to about 4.5 g/L of Na, about 0.11 to about 0.18 g/L of K and about 2 to about 3.9 ppm Ca. Other impurities were present in non-significant amounts or were below the detection limit of the analytical method.

TABLE 20

Assays for Catholyte Composite Samples: Week One

| Sampling time | Li | Na | K | Ca | Mg | Ba | Sr | Fe |
|---|---|---|---|---|---|---|---|---|
| 11Dec-Init | 14800 | 3630 | 108 | 3.5 | <0.07 | 0.06 | 0.56 | 0.5 |
| 12Dec 0600 | 14500 | 3260 | 117 | 3.9 | 0.55 | 0.058 | 0.63 | 0.7 |
| 13Dec 0600 | 14600 | 3640 | 117 | 3.7 | <0.07 | 0.047 | 0.646 | <0.2 |
| 14 Dec 0600 | 15500 | 3560 | 110 | 3.8 | 0.16 | 0.04 | 0.61 | <0.2 |
| 15Dec 0600 | 14100 | 3570 | 129 | 3.9 | <0.07 | 0.037 | 0.629 | <0.2 |
| 16Dec 0600 | 13700 | 3640 | 124 | 4 | <0.07 | 0.035 | 0.63 | <0.2 |
| 16Dec 2100 | 14200 | 3550 | 182 | 3.7 | <0.07 | 0.02 | 0.6 | <0.2 |
| 16Dec Final | 16100 | 3390 | 119 | 3.6 | <0.07 | 0.03 | 0.59 | 0.2 |

TABLE 21

Assays for Catholyte Composite Samples: Week Two

| Sampling time | Li | Na | K | Ca | Mg | Ba | Sr | Fe |
|---|---|---|---|---|---|---|---|---|
| 11Dec-Init | 14800 | 3630 | 108 | 3.5 | <0.07 | 0.06 | 0.56 | 0.5 |
| 12Dec 0600 | 14500 | 3260 | 117 | 3.9 | 0.55 | 0.058 | 0.63 | 0.7 |
| 13Dec 0600 | 14600 | 3640 | 117 | 3.7 | <0.07 | 0.047 | 0.646 | <0.2 |
| 14 Dec 0600 | 15500 | 3560 | 110 | 3.8 | 0.16 | 0.04 | 0.61 | <0.2 |
| 15Dec 0600 | 14100 | 3570 | 129 | 3.9 | <0.07 | 0.037 | 0.629 | <0.2 |
| 16Dec 0600 | 13700 | 3640 | 124 | 4 | <0.07 | 0.035 | 0.63 | <0.2 |
| 16Dec 2100 | 14200 | 3550 | 182 | 3.7 | <0.07 | 0.02 | 0.6 | <0.2 |
| 16Dec Final | 16100 | 3390 | 119 | 3.6 | <0.07 | 0.03 | 0.59 | 0.2 |

At the beginning of pilot plant operation the Li tenor in the spent electrolyte fluctuated between about 1.5 and about 3.5 g/L. The Li tenor was stabilized by adjusting of feed flow rate to the central compartment of the cell. Spent electrolyte collected from the central compartment of the cell at steady state conditions contained about 2.1 to about 2.7 g/L of Li, about 0.36 to about 0.49 g/L of Na and about 8 to about 14 mg/L of K.

Figure 21:
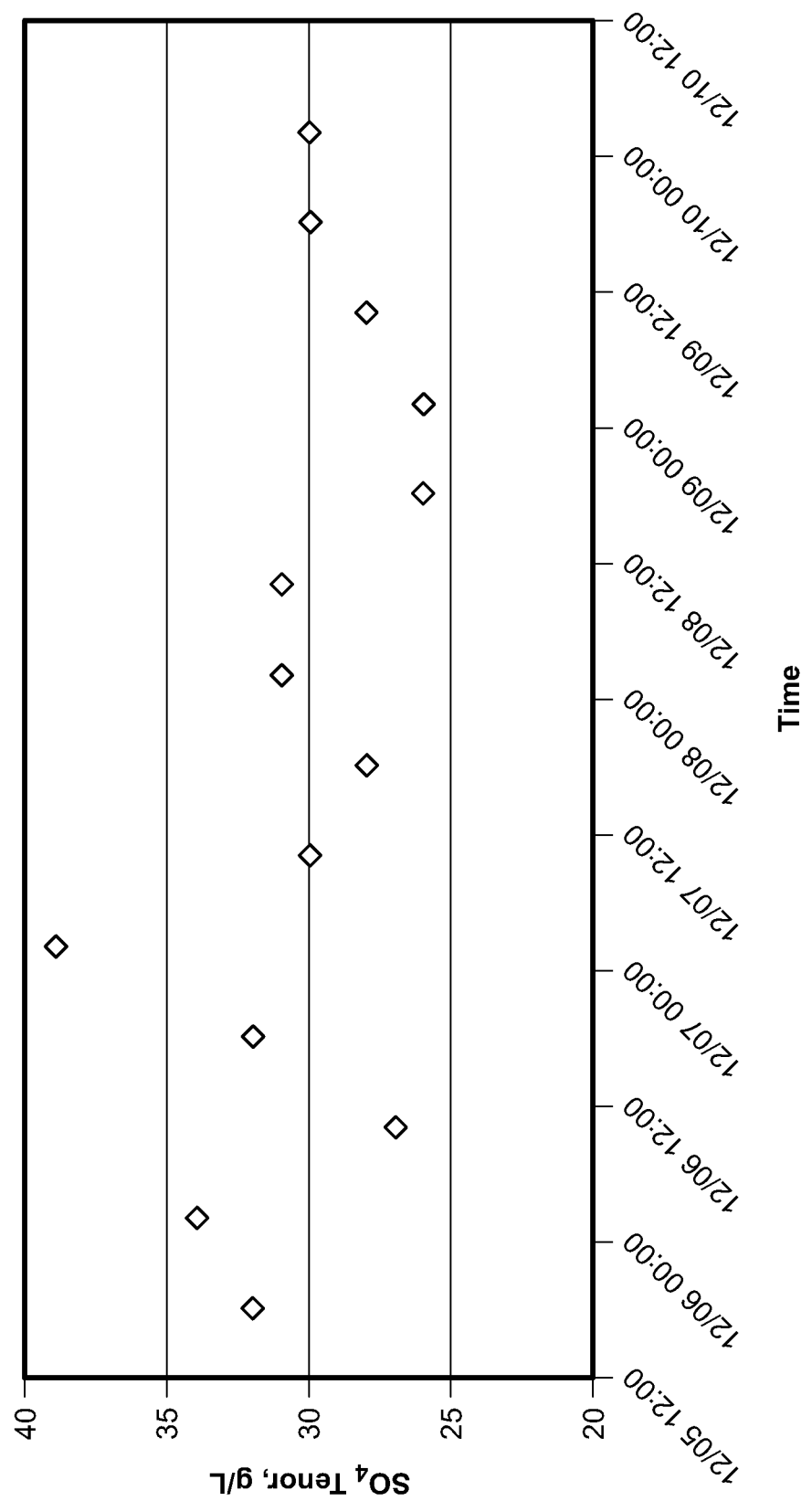
FIG. 21 is a plot showing sulphate tenor as a function of time in another example of a process according to the present disclosure.
Figure 22:
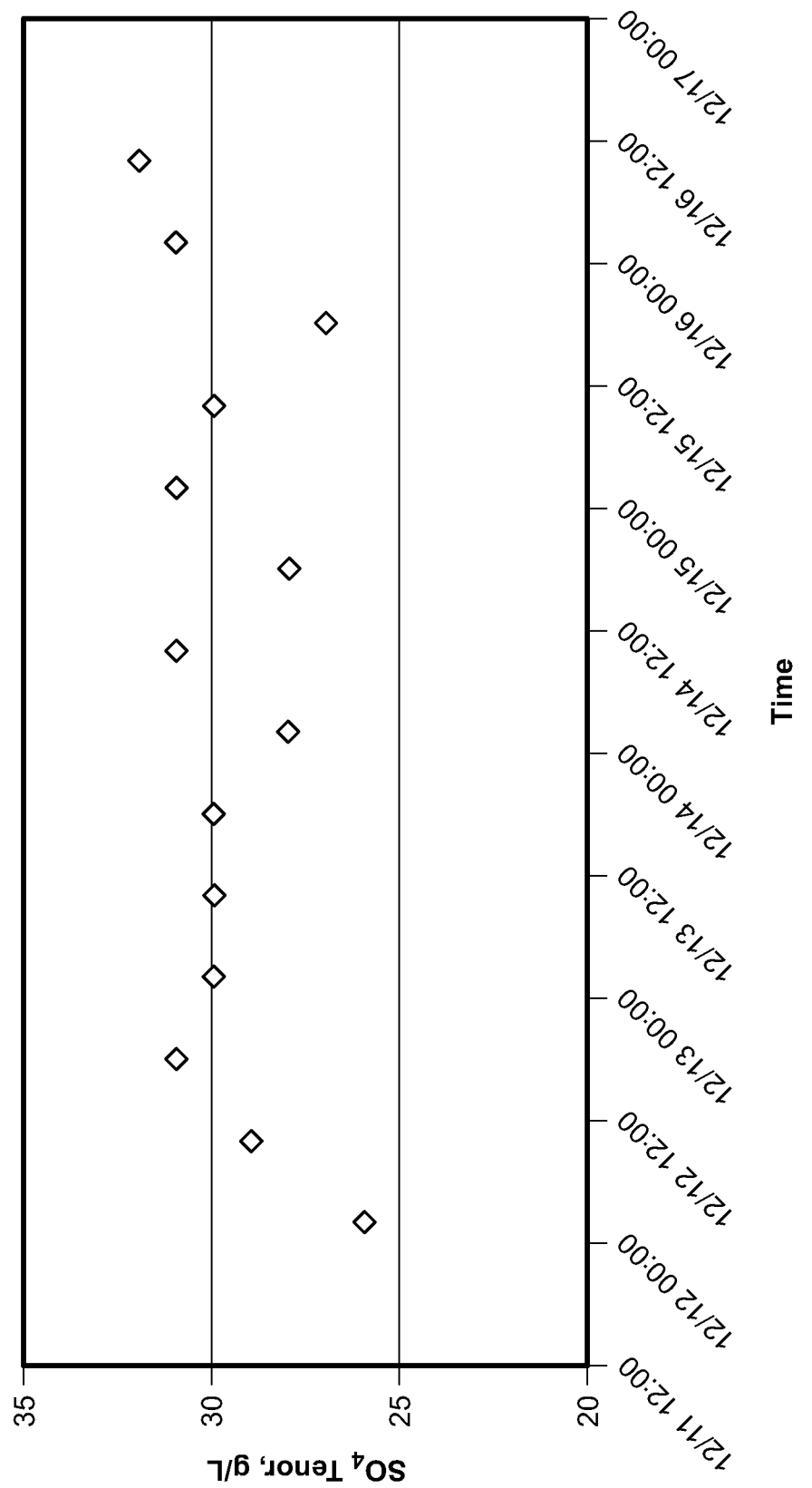
FIG. 22 is a plot showing sulphate tenor as a function of time in another example of a process according to the present disclosure.

The sulphate tenors in anolyte profile samples are plotted in FIGS. 21 and 22. The sulphate tenor in the anolyte solution fluctuated through the range of about 26 to about 39 g/L during the first week of pilot plant operation. The level of sulphuric acid during the second week, ranged from about 26 g/L to about 32 g/L.

Data obtained during pilot plant operation were used for calculations of lithium conversion rate, electrical current utilization efficiency, current quantity and power consumption for synthesis of lithium hydroxide. Calculations have been done for each day and week of pilot plant operations as well as for each period of different operation conditions. Calculations were based on amounts of materials produced during pilot plant campaign and based on concentrations changes in solutions floating in membrane electrolysis cell. Lithium hydroxide synthesis conditions and calculated parameters are summarized in Tables 22 and 23.

TABLE 22

Lithium Hydroxide and Sulphuric Acid Synthesis Parameters - Week One

| Test ID | Current A | Electrolysis time h | Current quantity A*h | Power Wh | Circ. Rate L/min | Temp. °C | Compartment | Li transferred g | Current effic. % | Formed LiOH/H$_2$SO$_4$ | | | |
|---|---|---|---|---|---|---|---|---|---|---|---|---|---|
| | | | | | | | | | | g | g/h | g/A*h | g/kWh |
| Day 1 | 400 | 19.5 | 7770 | 64586 | 3 | 40 | Cathodic | 734 | 36.5 | 2532 | 130 | 0.33 | 39.2 |
| | | | | | | | Central | 1014 | 50.4 | 3497 | 180 | 0.45 | 54.2 |
| | | | | | | | Anodic | | 51.7 | 7353 | 377 | 0.95 | 113.8 |
| Day 2 | 400-440 | 23.9 | 10156 | 103941 | 3 | 40 | Cathodic | 1241 | 47.2 | 4281 | 179 | 0.42 | 41.2 |
| | | | | | | | Central | 1179 | 48.1 | 4068 | 170 | 0.40 | 39.1 |
| | | | | | | | Anodic | | 48.3 | 8980 | 375 | 0.88 | 86.4 |
| 440 A | 440 | 20.1 | 8809 | 96629 | 3 | 40 | Cathodic | 1006 | 44.1 | 3471 | 173 | 0.39 | 35.9 |
| | | | | | | | Central | 1078 | 47.3 | 3720 | 185 | 0.42 | 38.5 |
| | | | | | | | Anodic | | 45.1 | 7272 | 362 | 0.83 | 75.3 |
| Day 3 | 400-440 | 22.9 | 9332 | 103037 | 3 | 40 | Cathodic | 939 | 38.9 | 3241 | 141 | 0.35 | 31.5 |
| | | | | | | | Central | 1167 | 48.3 | 4025 | 176 | 0.43 | 39.1 |
| | | | | | | | Anodic | | 43.3 | 7390 | 322 | 0.79 | 71.7 |
| Day 4 | 400 | 23.1 | 9227 | 93939 | 3-6 | 40 | Cathodic | 1112 | 46.5 | 3836 | 166 | 0.42 | 40.8 |
| | | | | | | | Central | 1165 | 41.3 | 3407 | 147 | 0.37 | 36.3 |
| | | | | | | | Anodic | | 39.6 | 6681 | 289 | 0.72 | 71.1 |
| 6 L/min | 400 | 23.2 | 9259 | 84717 | 6 | 40 | Cathodic | 998 | 41.6 | 3443 | 148 | 0.37 | 40.6 |
| | | | | | | | Central | 958 | 39.9 | 3305 | 142 | 0.36 | 39.0 |
| | | | | | | | Anodic | | 37.8 | 6403 | 276 | 0.69 | 75.6 |
| Day 5 | 400 | 23.0 | 9190 | 96226 | 6-3 | 40 | Cathodic | 868 | 36.5 | 2996 | 130 | 0.33 | 31.1 |
| | | | | | | | Central | 971 | 40.8 | 3351 | 145 | 0.36 | 34.8 |
| | | | | | | | Anodic | | 39.1 | 6581 | 286 | 0.72 | 68.4 |
| Total Week 1 | 400-440 | 113.0 | 45856 | 464366 | 3-6 | 40 | Cathodic | 4894 | 41.2 | 16887 | 149 | 0.37 | 36.4 |
| | | | | | | | Central | 5445 | 45.9 | 18788 | 166 | 0.41 | 40.5 |
| | | | | | | | Anodic | | 44.0 | 36893 | 327 | 0.80 | 79.4 |

The membrane electrolysis stack of two cells equipped with Lanxess Ionac™ membrane, with an effective working area of about 0.84 m², provided the possibility to produce up to about 179 g of lithium hydroxide per hour. The lithium conversion process performed with a current efficiency of about 43.5% during the first week and at about 34.9% during the second week of pilot plant operation. The average amount of lithium hydroxide produced by per about 1 kWh of electrical energy was about 38.4 g and about 32.5 g for the first and the second week of pilot plant operation, respectively.

TABLE 23

Lithium Hydroxide and Sulphuric Acid Synthesis Parameters - Week Two

| Test ID | Current A | Electrolysis time h | Current quantity A*h | Power Wh | Circ. Rate L/min | Temp. °C | Compartment | Li transferred g | Current effic. % | Formed LiOH/H$_2$SO$_4$ | | | |
|---|---|---|---|---|---|---|---|---|---|---|---|---|---|
| | | | | | | | | | | g | g/h | g/A*h | g/kWh |
| Day 6 | 400 | 6.1 | 2444 | 21091 | 3 | 40 | Cathodic | 228 | 36.0 | 787 | 129 | 0.32 | 37.3 |
| | | | | | | | Central | 293 | 46.3 | 1012 | 166 | 0.41 | 48.0 |
| | | | | | | | Anodic | | 40.4 | 1569 | 257 | 0.64 | 74.4 |
| Day 7 | 400-420 | 23.9 | 9920 | 97556 | 3 | 40 | Cathodic | 1077 | 41.9 | 3716 | 155 | 0.37 | 38.1 |
| | | | | | | | Central | 1086 | 42.3 | 3749 | 157 | 0.38 | 38.4 |
| | | | | | | | Anodic | | 39.6 | 7186 | 300 | 0.72 | 73.7 |
| Day 8 | 420 | 24.0 | 10044 | 99344 | 3 | 40 | Cathodic | 1140 | 43.8 | 3933 | 164 | 0.39 | 39.6 |
| | | | | | | | Central | 940 | 36.1 | 3243 | 135 | 0.32 | 32.6 |
| | | | | | | | Anodic | | 37.3 | 6850 | 286 | 0.68 | 69.0 |
| Day 9 | 420 | 23.3 | 9761 | 97477 | 3 | 40 | Cathodic | 659 | 26.1 | 2274 | 98 | 0.23 | 23.3 |
| | | | | | | | Central | 765 | 30.3 | 2639 | 113 | 0.27 | 27.1 |
| | | | | | | | Anodic | | 33.4 | 5964 | 256 | 0.61 | 61.2 |
| Day 10 | 360-450 | 23.9 | 10079 | 89480 | 3 | 35-50 | Cathodic | 592 | 22.7 | 2044 | 85 | 0.20 | 22.8 |
| | | | | | | | Central | 598 | 22.9 | 2062 | 86 | 0.20 | 23.0 |
| | | | | | | | Anodic | | 25.5 | 4703 | 197 | 0.47 | 52.6 |
| t = 35° C. | 420 | 26.9 | 11338 | 108004 | 3 | 35 | Cathodic | 755 | 25.7 | 2605 | 97 | 0.23 | 24.1 |
| | | | | | | | Central | 803 | 27.3 | 2769 | 103 | 0.24 | 25.6 |
| | | | | | | | Anodic | | 34.0 | 7059 | 262 | 0.62 | 65.4 |
| t = 50° C. | 420 | 6.0 | 2525 | 20022 | 3 | 50 | Cathodic | 231 | 35.4 | 798 | 133 | 0.32 | 39.8 |
| | | | | | | | Central | 147 | 22.5 | 509 | 85 | 0.20 | 25.4 |
| | | | | | | | Anodic | | 22.4 | 1035 | 173 | 0.41 | 51.7 |
| Day 11 | 420 | 15.1 | 6337 | 61175 | 3 | 35 | Cathodic | 856 | 52.1 | 2952 | 195 | 0.47 | 48.3 |
| | | | | | | | Central | 548 | 33.4 | 1891 | 125 | 0.30 | 30.9 |
| | | | | | | | Anodic | | 27.0 | 3134 | 207 | 0.49 | 51.2 |
| Total Week 2 | 400-420 | 116.3 | 48585 | 466122 | 3 | 35-50 | Cathodic | 4544 | 36.1 | 15678 | 135 | 0.32 | 33.6 |
| | | | | | | | Central | 4229 | 33.6 | 14593 | 125 | 0.30 | 31.3 |
| | | | | | | | Anodic | | 37.0 | 32933 | 283 | 0.68 | 70.7 |

It can thus be seen that various parameters have been tested. The person skilled in the art can thus infer that such tests provide a factual basis for making a sound prediction concerning various modifications that can be done to this process and obtaining the same utility. When selecting parameters concerning the temperature, the person skilled in the art will understand that such values can be selected as a function of the tolerance of the membranes and the materials of construction of the ME cell. Tables 24 and 25 provide mass balance for both weeks of tests.

TABLE 24

Mass Balance. Week One.

| Materials | Vol | Assays, mg/L | | | | |
|---|---|---|---|---|---|---|
| IN | L | Li | Na | K | Ca | Mg |
| Catholyte Initial | 39.5 | 3100 | 740 | 30 | <0.9 | <0.07 |
| Anolyte Initial | 59.1 | 0.07 | <2 | <1 | <0.9 | <0.07 |
| Central Initial | 59.5 | 1880 | 452 | 14 | <0.9 | <0.07 |
| Feed to Central | 384.0 | 15700 | 3980 | 107 | 3.8 | 0.2 |
| Water to catholyte | 228.3 | 0 | 0 | 0 | 0 | 0 |
| Water to anolyte | 1314 | 0 | 0 | 0 | 0 | 0 |

| OUT | L | Li | Na | K | Ca | Mg |
|---|---|---|---|---|---|---|
| Catholyte Final | 53.6 | 15100 | 3900 | 116 | 3.7 | <0.07 |
| Anolyte Final | 59.0 | 0 | 0 | 0 | 0 | 0 |
| Central Final | 59.4 | 3015 | 588 | 12.7 | <0.9 | <0.07 |
| Product | 293.0 | 14040 | 3792 | 124 | 2.68 | <0.07 |
| Anolyte product | 1247 | 0 | 0 | 0 | 0 | 0 |
| Spent | 222 | 2340 | 505.7 | 11.1 | <0.9 | <0.07 |

| Materials | Mass | Elemental Mass, g | | | | |
|---|---|---|---|---|---|---|
| IN | kg | Li | Na | K | Ca | Mg |
| Catholyte Initial | 40.0 | 122 | 29.2 | 1.2 | 0 | 0 |
| Anolyte Initial | 60.0 | 0 | 0 | 0 | 0 | 0.0 |
| Central Initial | 60.2 | 112 | 27 | 1 | 0 | 0 |
| Feed to Central | 425 | 6029 | 1528 | 41 | 1.5 | 0.08 |
| Water to catholyte | 228 | 0 | 0 | 0 | 0 | 0 |
| Water to anolyte | 1314 | 0 | 0 | 0 | 0 | 0 |

| OUT | kg | Li | Na | K | Ca | Mg |
|---|---|---|---|---|---|---|
| Catholyte Final | 53.6 | 809 | 209 | 6 | 0.2 | 0 |
| Anolyte Final | 60.0 | 0 | 0 | 0 | 0 | 0.0 |
| Central Final | 60.2 | 179 | 35 | 1 | 0 | 0 |
| Product | 310 | 4208 | 1144 | 37 | 1 | 0.00 |
| Anolyte product | 1268 | 0 | 0 | 0 | 0 | 0 |
| Spent | 225 | 515 | 112 | 2 | 0 | 0 |
| Sum IN | 2128 | 6263 | 1584 | 43 | 2 | 0 |
| Sum OUT | 1977 | 5712 | 1500 | 47 | 1 | 0 |
| Accountability % | 92.9 | 91.2 | 94.7 | 107.9 | 67.3 | n/a |

| | Distribution (Calculated Head), % | | | | |
|---|---|---|---|---|---|
| | Li | Na | K | Ca | Mg |
| Catholyte | 87.8 | 90.2 | 93.1 | 100 | n/a |
| Spent | 12.2 | 9.8 | 6.9 | 0 | n/a |
| Sumcheck | 100 | 100 | 100 | 100 | n/a |

TABLE 25

Mass Balance. Week Two.

| Materials | Vol | Assays, mg/L | | | | |
|---|---|---|---|---|---|---|
| IN | L | Li | Na | K | Ca | Mg |
| Catholyte Initial | 50.5 | 14800 | 3630 | 108 | 3.5 | <0.07 |
| Anolyte Initial | 59.0 | 446 | 199 | 10 | <0.9 | <0.07 |
| Central Initial | 59.4 | 5180 | 1500 | 55 | <0.9 | <0.07 |
| Feed to Central | 291.9 | 15700 | 3980 | 107 | 3.8 | 0.2 |
| Water to catholyte | 284.6 | 0 | 0 | 0 | 0 | 0 |
| Water to anolyte | 986 | 0 | 0 | 0 | 0 | 0 |

| OUT | L | Li | Na | K | Ca | Mg |
|---|---|---|---|---|---|---|
| Catholyte Final | 72.0 | 16100 | 3390 | 119 | 3.6 | <0.07 |
| Anolyte Final | 42.9 | 0 | 2 | 0 | 0 | 0 |
| Central Final | 23.8 | 2300 | 356 | 8 | <0.9 | <0.07 |
| Product | 284 | 14433 | 3537 | 130 | 3.8 | 0.4 |
| Anolyte product | 993 | 0 | 0 | 0 | 0 | 0 |
| Spent | 239.6 | 2783 | 517 | 13 | <0.9 | <0.07 |

| Materials | Mass | Elemental Mass, g | | | | |
|---|---|---|---|---|---|---|
| IN | kg | Li | Na | K | Ca | Mg |
| Catholyte Initial | 53.5 | 747 | 183.3 | 5.5 | 0.2 | 0 |
| Anolyte Initial | 60.0 | 26 | 12 | 1 | 0 | 0 |
| Central Initial | 60.2 | 308 | 89 | 3 | 0 | 0 |
| Feed to Central | 269 | 4583 | 1162 | 31 | 1.1 | 0.06 |
| Water to catholyte | 285 | 0 | 0 | 0 | 0 | 0 |
| Water to anolyte | 986 | 0 | 0 | 0 | 0 | 0 |

| OUT | kg | Li | Na | K | Ca | Mg |
|---|---|---|---|---|---|---|
| Catholyte Final | 76 | 1159 | 244 | 9 | 0.3 | 0 |
| Anolyte Final | 43.6 | 0 | 0 | 0 | 0 | 0 |
| Central Final | 24 | 55 | 8 | 0 | 0 | 0 |
| Product | 300 | 4132 | 1017 | 36 | 1.1 | 0.02 |
| Anolyte product | 1009 | 0 | 0 | 0 | 0 | 0 |
| Spent | 243 | 606 | 109 | 2.6 | 0 | 0 |
| Sum IN | 1713 | 5664 | 1446 | 40.5 | 1.3 | 0.06 |
| Sum OUT | 1696 | 5952 | 1378 | 47.2 | 1.4 | 0.02 |
| Accountability % | 99.0 | 105.1 | 95.3 | 116.3 | 105.3 | 31.5 |

| | Distribution (Calculated Head), % | | | | |
|---|---|---|---|---|---|
| | Li | Na | K | Ca | Mg |
| Catholyte | 88.9 | 91.5 | 94.1 | 99.2 | 100 |
| Spent | 11.1 | 8.5 | 5.9 | 0.8 | 0.0 |
| Sumcheck | 100 | 100 | 100 | 100 | 100 |

In view of the above examples, it can be the that the contained lithium sulphate in the AR β-spodumene was leached with an efficiency of about 100%. It was observed that a retention time in the range of about 30 to about 45 minutes was sufficient for the CL. It was demonstrated that the CL and PIR circuits can operate without necessarily having a liquid-solid separation step between the two circuits. The lime consumption was about 350 kg dry equivalent mass of lime per about 1000 kg of lithium carbonate equivalent (LCE).

It was also demonstrated that the SIR circuit can be operated in a continuous manner. Impurities such as calcium and magnesium were reduced to levels that can efficiently be processed through ion exchange columns. The consumption of NaOH was about 10 kg per about 1000 kg LCE. It was determined that calcium continued to precipitate from solution after this solution had left the SIR circuit. In one such example the calcium tenor in the SIR 4 reactor was about 286 mg/L. The filtrate of this solution on sitting for several hours had a calcium tenor of about 140 mg/L. The SIR product slurry was approximately about 0.4% solids by weight. These solids had a Li content of about 4.4% and accounted for about 0.5% of the total Li processed.

The processes were effective for reducing the calcium and magnesium tenors in the lithium sulphate solution to below about 10 mg/L.

The processes were effective for removing about 97.6% of the contained calcium and about 99.0% of the contained magnesium from the lithium sulphate solution. Therefore, a high purity and high quality lithium sulphate was produced. Only about 2.7% of the lithium was removed by the processes.

The process involving the electrolysis carried out by membrane electrolysis in the three-compartment cell was effective for converting lithium sulphate to lithium hydroxide. It was demonstrated that the lithium hydroxide production from lithium sulphate could operate in a continuous manner using a three-compartment membrane electrolysis cell. The aqueous composition comprising lithium hydroxide was produced in the cathodic compartment, sulphuric acid was formed in the anodic compartment and a composition having a low tenor in lithium sulphate overflowed from the central compartment. The pilot plant produced about 621 litres of an aqueous composition comprising lithium hydroxide having a concentration of about 14.6 g/L of lithium (about 50.4 g/L of lithium hydroxide) and about 2239 litres of sulphuric acid having a concentration of about 20 to about 30 g/L. The lithium hydroxide that was produced was of a good quality. The aqueous composition comprising lithium hydroxide solution contained about 3.7 g/L of sodium and about 121 mg/L of potassium. The trace impurities present at levels of less than about 10 mg/L in the lithium hydroxide were Ba, Ca, Cr, Cu, Fe, Mg, Mn and Sr.

It was found that such a conversion of $Li_2SO_4$ into LiOH can be efficiently carried out in even in the presence of up to about 20 or about 25% by weight of sodium based on the total weight of sodium and lithium. Such processes of the disclosure for converting $Li_2SO_4$ into LiOH are thus effective for carrying out such a chemical reaction even if the feed is not of high purity. That allows for saving costs since certain purification steps, prior to electrolysis or electrodialysis can be avoided.

EXAMPLE 3

Conversion of LiOH into $Li_2CO_3$

The lithium carbonate production mini-pilot plant comprised two circuits—the Lithium Hydroxide Carbonization Circuit (LC) and the Lithium Bicarbonate Decomposition Circuit (DC). All equipment that came in contact with the process solutions was made of either glass, plastic or Teflon®. Due to the highly corrosive and quality sensitive nature of the fluids, no metal was introduced to the process.

Lithium hydroxide solution produced from Example 2 was used as a feed for the lithium carbonate production. Tenors of select metals in the feed are listed in Table 25. The tenor in Li thus ranged from about 14 g/L to about 15.5 g/L (or the tenor of LiOH ranged from about 48.3 g/L to about 53.5 g/L).

TABLE 25

Select Assay Data of the Lithium Hydroxide Solution

| Sampling | Element tenor, mg/L | | | | | | | |
|---|---|---|---|---|---|---|---|---|
| | Li | Na | K | Ca | Mg | Ba | Sr | Fe |
| Feed Start | 15100 | 3830 | 110 | 3.2 | <0.07 | 0.061 | 0.589 | <0.2 |
| 28MAR 0600 | 15300 | 3780 | 123 | 3.8 | <0.07 | 0.064 | 0.602 | <0.2 |
| 29 Mar 0600 | 14000 | 3640 | 112 | 3.2 | <0.07 | 0.057 | 0.562 | <0.2 |
| 30MAR 0600 | 14300 | 3630 | 120 | 3.7 | <0.07 | 0.065 | 0.637 | <0.2 |
| Average | 14675 | 3720 | 116 | 3.5 | <0.07 | 0.062 | 0.598 | <0.2 |

Figure 23:
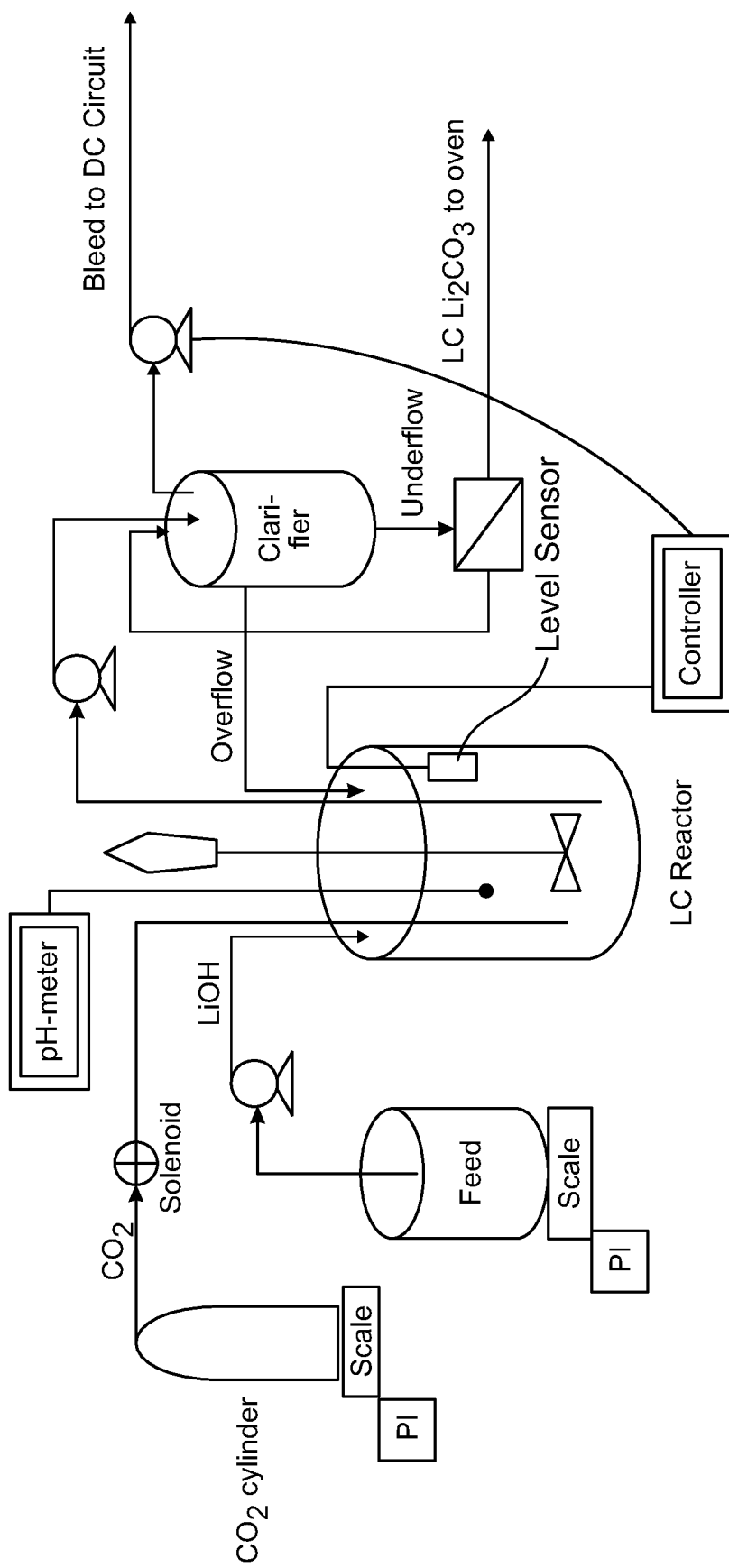
FIG. 23 is a flow sheet diagram concerning another example of a process according to the present disclosure.

The LC circuit scheme is provided in FIG. 23. The lithium hydroxide carbonization (LC) process was conducted in an enclosed 4 L Pyrex® reactor. The reactor was equipped with an overhead impeller, sparger, level controller, pH probe and thermocouple. For example, a burp-type sparger can be used for $CO_2$ addition. The sparger was located below the impeller. For example, the below disposed sparger can ensure full dispersion of the gas. The $CO_2$ flow was controlled by pH of reaction slurry using a solenoid valve.

Peristaltic pumps were used for transferring solutions and slurries. The process slurry from LC was continuously pumped to the LC clarifier, where the solids were permitted to settle and the solution phase could continuously overflow back into the LC reactor. The clarifier solids were harvested from the clarifier underflow on a per shift basis and filtered through Whatman® #3 filter paper. The filter cakes were flood-washed in triplicate with hot reverse osmosis water and then dried on Pyrex® trays in an oven set to about 105 to about 110° C. The recovered filtrate was returned back to the LC circuit.

Figure 24:
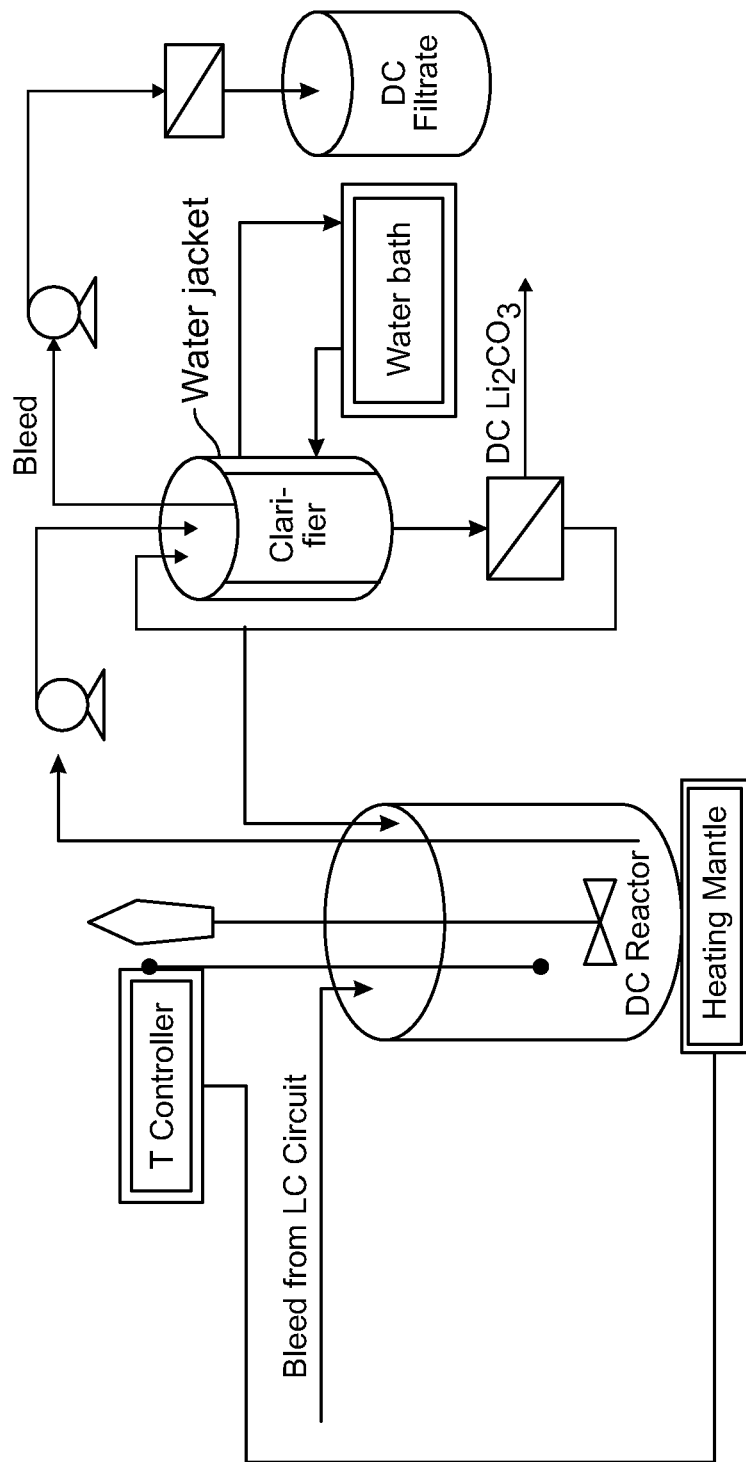
FIG. 24 is a flow sheet diagram concerning another example of a process according to the present disclosure.

The LC reactor level was maintained at a constant volume of about 3 L by the level sensor controlling the bleed pump to the DC circuit. The LC circuit bleed line advanced LC clarifier overflow to the DC reactor. The DC circuit scheme is provided in FIG. 24. The DC process was conducted in an enclosed 4 L Pyrex® reactor. The reactor was placed in an electric heating mantle and equipped with an overhead impeller, pH probe and thermocouple. The solution in the DC Reactor was heated to about 95° C. in order to decompose lithium bicarbonate and drive the remaining lithium carbonate from solution. The resulting slurry was pumped to a heated clarifier. A bleed was taken from the top of the clarifier and collected in a DC Filtrate drum. The slurry level in the DC reactor was maintained by positioning the DC bleed tubing inlet in the clarifier at a fixed level and setting the bleed pump to a greater flow rate than that of the feed to the DC reactor. The thickened pulp was harvested on a per shift basis. The filtered cake was treated in the same manner as the LC reactor solids. The resulting solids represented a secondary lithium carbonate product. This DC solid stream was kept separate from the primary carbonate stream and was independently characterized.

Pilot Plant Operation

The Lithium Carbonate Production pilot plant ran continuously for 3 days, 24 hours per day, with three shifts of 8 hours each. Hourly readings were taken to monitor temperature and pH in LC and DC reactors as well as input and discharge rates of feed, $CO_2$ and spent solution. Grab samples from the LC circuit bleed and DC circuit bleed were collected every 4 hours and submitted for Atomic Absorption Spectroscopy for lithium analysis (referred to as Li-AAS). These assays provided a quick feedback on the performance of the process. Composite samples were collected from the LC and DC bleed streams every 4 hours and combined into 12-hour composite samples. The composite samples were analysed for Li-AAS and a spectrum of other elements using Inductively-Coupled Plasma (ICP scan). Feed grab samples were taken daily and submitted for Li-AAS and ICP scan assays.

During the operation of the pilot plant, the feed flow to the LC reactor was increased from about 30 to about 60 mL/min to observe the effect of retention time on LiOH carbonization efficiency. The operation conditions of the pilot plant are listed in Table 26.

TABLE 26

Conditions of Pilot Plant Operation

| Period | LC circuit | | | | DC circuit | | |
|---|---|---|---|---|---|---|---|
| | Temp °C. | Mixing RPM | Feed flow mL/min | $CO_2$ flow actuated L/min | Reactor temp °C. | Clarifier temp. °C. | Mixing RPM |
| Start-up | 15-32 | 600 | 0 | 0.5-1 | | | |
| Day 1 Cont. | 29-34 | 600 | 38-41 | 1-2 | 90-97 | 91-95 | 400 |
| Night 1 | 34-37 | 600 | 39-40 | 1.4-2.2 | 92-95 | 92-93 | 400 |
| Day 2 | 34-36 | 600 | 39-45 | 1-2.2 | 91-97 | 92-94 | 400 |
| Night 2 Cont. | 31-36 | 600 | 44-45 | 1.4 | 91-96 | 92-93 | 400 |
| Night 2 Batch | 36 | 600 | 0 | 1.4-1.6 | 92-95 | 92-93 | 400 |
| Day 3 | 31-35 | 600 | 44-64 | 1.2-2.4 | 84-96 | 92-93 | 400 |
| Night 3 | 32-35 | 600 | 58-61 | 1.2-2.5 | 82-99 | 92-93 | 400 |

During the 3-day pilot plant campaign, about 12.5 kg of lithium carbonate was produced; about 9.9 kg of product was harvested from the LC reactor and about 2.6 kg from the DC reactor. The masses of $Li_2CO_3$ solids produced during the pilot plant run are summarized in Tables 27 and 28.

TABLE 27

Lithium Carbonate Solids Harvested from LC Circuit

| Batch # | Date | Sample Time | Identifier | Wet Cake g | Moisture % | Dry Product weight g |
|---|---|---|---|---|---|---|
| 1 | 27-Mar | 12:00 | LC-Solids | 24-Jun | 38.3 | 334 |
| 2 | 27-Mar | 20:17 | LC-Solids | 11-Dec | 36.7 | 681.3 |
| 3 | 28-Mar | 1:30 | LC-Solids | 25-Jan | 52.6 | 704.2 |
| 4 | 28-Mar | 10:15 | LC solids | 18-Jan | 45.1 | 812.2 |
| 5 | 28-Mar | 17:28 | LC solids | 13-Sep | 38.2 | 610.2 |
| 6 | 28-Mar | 22:00 | LC solids | 4-Apr | 51.0 | 762.3 |
| 7 | 29-Mar | 3:00 | LC solids | 31-Mar | 51.4 | 399.2 |
| 8 | 29-Mar | 10:30 | LC solids | 29-Nov | 45.5 | 778.6 |
| 9 | 29-Mar | 19:36 | LC solids | 22-Dec | 35.7 | 933 |
| 10 | 29-Mar | 10:30 | LC solids | 22-Mar | 45.0 | 848.2 |
| 11 | 30-Mar | 3:45 | LC solids | 21-Jul | 46.6 | 694 |
| 12 | 30-Mar | 8:30 | LC solids | 14-Oct | 58.4 | 423.4 |
| 13 | 30-Mar | 10:17 | LC solids R | 7-Apr | 11.8 | 86.6 |
| 14 | 30-Mar | 10:30 | LC solids R | 4-Aug | 39.7 | 351.7 |
| 15 | 2-Apr | 8:52 | LC SolidsPost | 27-Sep | 12.0 | 881.6 |
| | 2-Apr | | Reactor Scale | | | 520 |
| | 5-Apr | | Clarifier Scale | | | 76.5 |
| | | | Total Solids | 16373 | | 9897 |

TABLE 28

Lithium Carbonate Solids Harvested from DC Circuit

| Batch # | Date | Sample Time | Identifier | Wet Cake g | Moisture % | Dry Product Weight g |
|---|---|---|---|---|---|---|
| 1 | 28-Mar | 7:00 | DC solids | 28-May | 27.1 | 374.7 |
| 2 | 29-Mar | 6:00 | DC solids | 8-Mar | 17.9 | 355.8 |
| 3 | 30-Mar | 0:30 | DC solids | 16-Aug | 29.5 | 419.7 |
| 4 | 30-Mar | 4:40 | DC Solids | 10-Jun | 55.8 | 233.5 |
| 5 | 30-Mar | 11:16 | DC Solids | 10-Sep | 37.6 | 158.6 |
| 6 | 30-Mar | 12:00 | DC Solids R | 5-Jan | 15.5 | 930.8 |
| | 8-Apr | | Reactor scale | | | 140.0 |
| | 11-Apr | | Clarifier scale | | | 6.3 |
| | | | Total Solids | 3426 | | 2619 |

About 184 liters of lithium hydroxide solution containing about 14.7 g/L of lithium was processed (or about 50.8 g/L of lithium hydroxide) and about 161 litres of spent $Li_2CO_3$ solution containing about 1.39 g/L lithium were produced (or about 7.39 g/L of lithium carbonate). Masses and volumes of materials used daily are summarized in Table 29.

TABLE 29

Materials Used for Pilot Plant Operations

| Period | Feed | | DC Filtrate | | $CO_2$ | |
|---|---|---|---|---|---|---|
| | Weight kg | Volume L | Weight kg | Volume L | Weight kg | Volume L |
| Initial | 3.17 | 3.0 | | | | |
| Day 1 | 26.2 | 24.7 | 14.1 | 13.9 | 1.45 | 736 |
| Night 1 | 29.0 | 27.4 | 26.4 | 26.1 | 1.4 | 701 |
| Day 2 | 31.7 | 30.0 | 28.5 | 28.2 | 1.6 | 810 |
| Night 2 | 27.7 | 26.2 | 22.78 | 22.5 | 1.38 | 702 |
| Day 3 | 36.0 | 34.1 | 30.4 | 30.0 | 1.8 | 910 |
| Night 3 | 44.3 | 41.9 | 41.2 | 40.7 | 2.2 | 1096 |
| Total | 194.9 | 184.4 | 163.4 | 161.4 | 9.7 | 4954 |

Results and Discussion

At the start of the test, the LC reactor was charged with lithium hydroxide solution and agitated. The carbon dioxide flow was initiated and within one and a half hours the pH of the reaction slurry was lowered from about 12.6 to the set point of about pH 11.0.

When the target pH was approached the continuous mode of the pilot plant operation started. Addition of fresh lithium hydroxide solution to the LC reactor was started and the pH of the reaction slurry was maintained at a value of about pH 11.0 by controlled addition of $CO_2(g)$.

Figure 25:
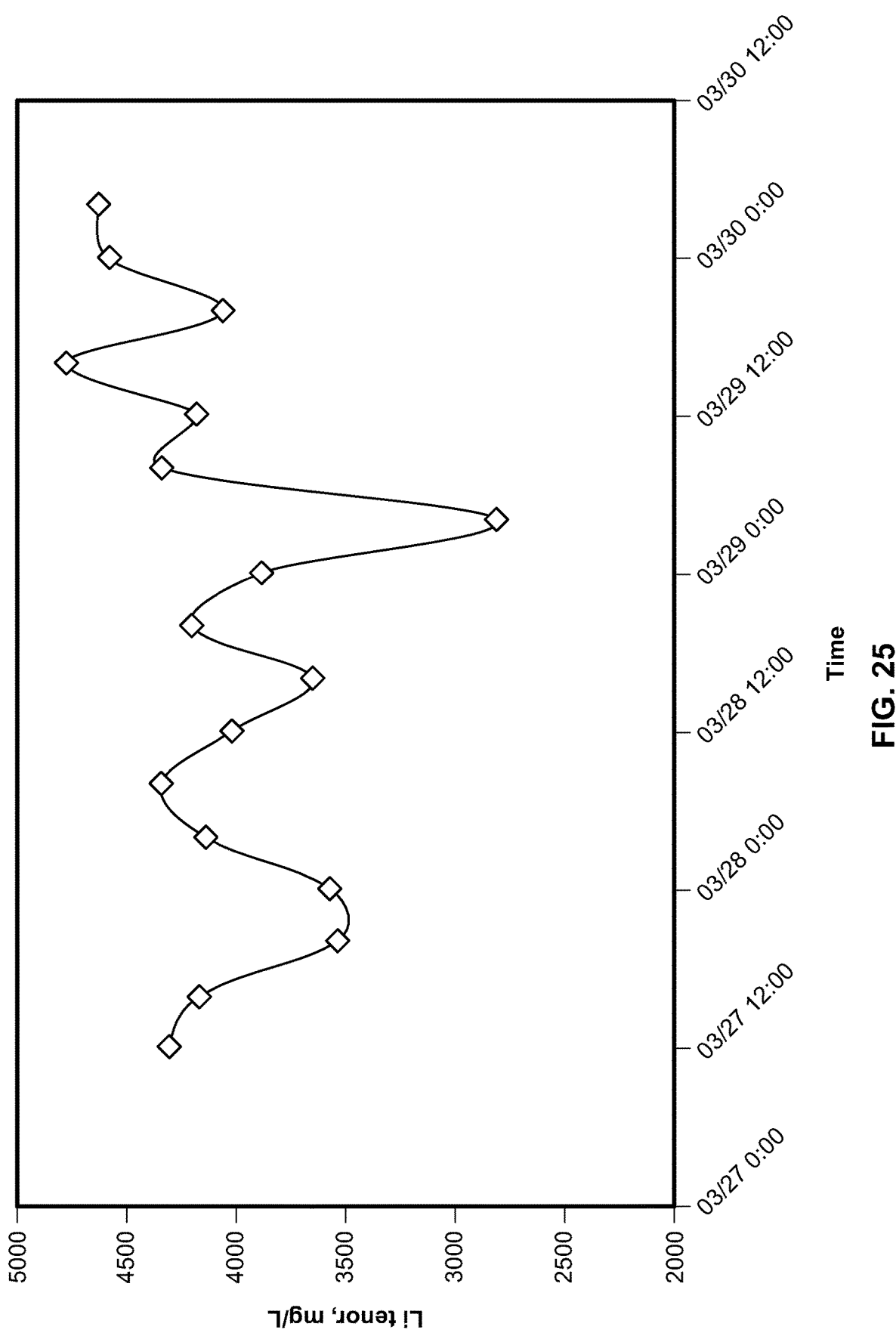
FIG. 25 is a plot showing lithium tenor as a function of time in another example of a process according to the present disclosure.

After about 2.5 hours of operation the overflow from the LC clarifier started and a bleed from the LC circuit was advanced to the DC reactor. It was expected that bleed solution from the LC reactor would contain about 3.5 to about 4 g/L Li as lithium carbonate. The Li tenor in LC circuit overflow fluctuated around 4 g/L and the tenor values are plotted against elapsed time in FIG. 25.

Analytical data of the composite solutions from the LC circuit for metals with concentrations exceeding the analytical detection limits are summarized in Table 30. A comparison of the LC bleed tenors to that of the LC feed solution (Table 25) indicated that Na and K tenors are only minimally affected by the LC process.

TABLE 30

Tenors of Selected Metals in Composite Samples from LC Circuit Bleed

| Sample ID | Tenor mg/L | | | | | | |
|---|---|---|---|---|---|---|---|
| | Li | Na | K | Ca | Mg | Ba | Sr |
| 27Mar 1800 | 4150 | 3780 | 106 | 2.3 | 0.07 | <0.007 | 0.188 |
| 28Mar 0600 | 3940 | 3700 | 105 | 2.2 | <0.07 | <0.007 | 0.164 |
| 28Mar 1800 | 4618 | 3380 | 99 | 1.7 | <0.07 | <0.007 | 0.162 |
| 29Mar 0600 | 4030 | 3600 | 105 | 1.9 | <0.07 | 0.009 | 0.148 |
| 29Mar 1800 | 4315 | 3640 | 106 | 2.3 | <0.07 | 0.02 | 0.197 |
| 30Mar 0600 | 4510 | 3710 | 110 | 2.4 | <0.07 | <0.007 | 0.175 |

The lithium tenor in the DC bleed was about 1240 to about 1490 mg/L during the pilot plant. A considerable depletion of Li tenor in lithium carbonate solution was observed in the DC process (compared with about 2800 to about 4760 mg/L of Li in the LC bleed). Assay results for selected metals in the bleed from the DC circuit are summarized in Table 31. Similar to the LC process, a minimal change in Na and K tenors across the DC process was observed (compared to the LC bleed and the DC bleed in Table 30 and Table 31).

TABLE 31

Tenors of Selected Metals in Composite Samples of Bleed from DC Circuit

| Sample ID | Tenor mg/L | | | | | | |
|---|---|---|---|---|---|---|---|
| | Li | Na | K | Ca | Mg | Ba | Sr |
| 28Mar 0600 | 1450 | 3850 | 115 | 1.1 | <0.07 | <0.007 | 0.075 |
| 28Mar 1800 | 1449 | 3380 | 108 | 1.4 | <0.07 | <0.007 | 0.081 |
| 29 Mar 0600 | 1230 | 3590 | 107 | 2 | <0.07 | 0.021 | 0.068 |
| 29Mar 1800 | 1406 | 3610 | 102 | 1.2 | <0.07 | 0.011 | 0.079 |
| 30Mar 0600 | 1310 | 3530 | 103 | 2 | 0.1 | <0.007 | 0.074 |
| Bleed Drum | 1390 | 4010 | 103 | 1.4 | <0.07 | <0.007 | 0.08 |

Figure 26:
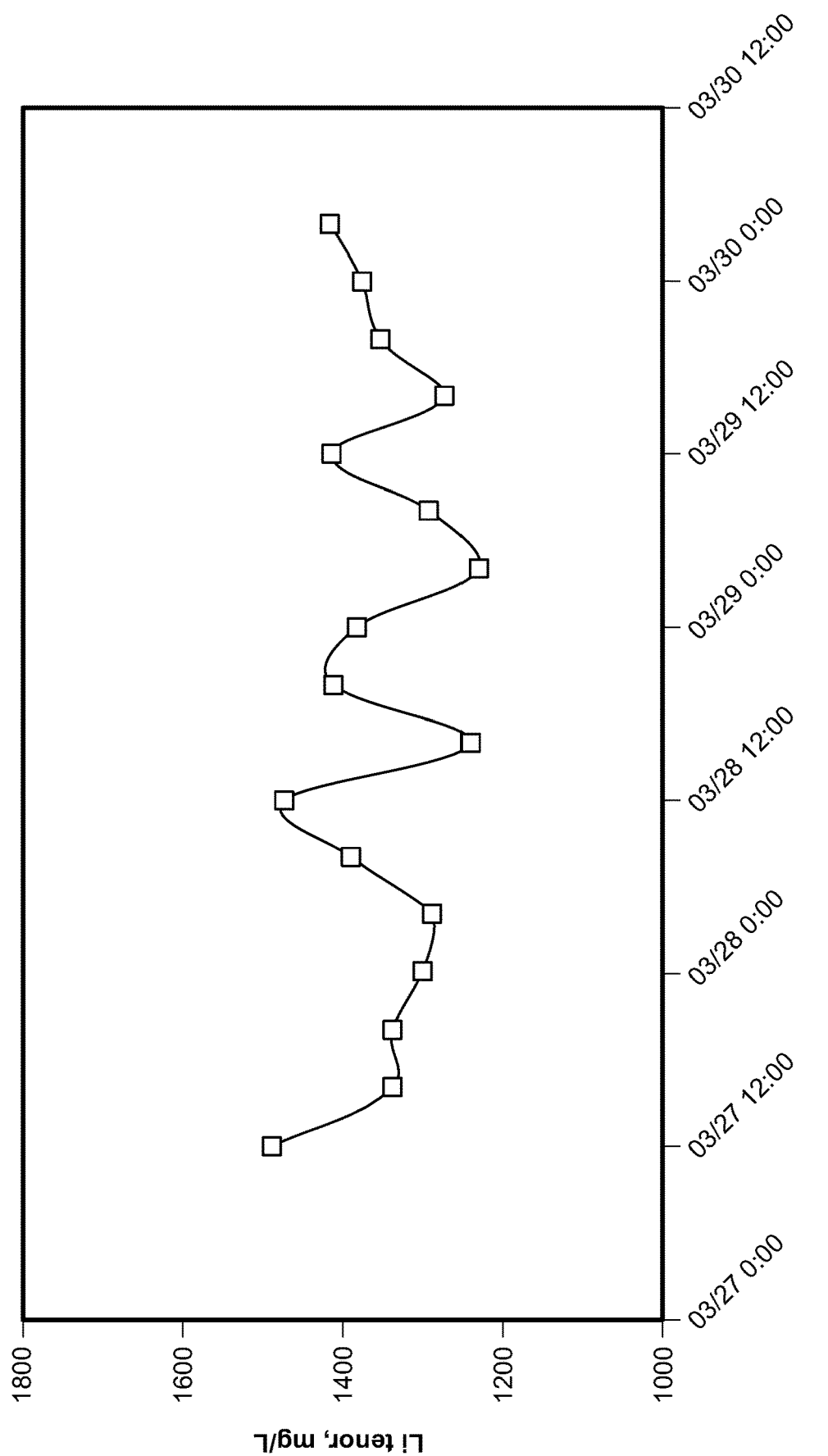
FIG. 26 is a plot showing lithium tenor as a function of time in another example of a process according to the present disclosure.

The lithium tenor in the bleed from DC circuit is plotted against operation time in FIG. 26.

Table 32 summarizes the data on the LiOH feed solution and carbon dioxide gas usage for each 12-hour period of pilot plant operation. Also included in Table 32 are the data on materials used for the periods of batch or continuous modes and for test with increased feed flow rate. Carbon dioxide was utilized with an efficiency of about 90.2% for the overall pilot plant. Increasing the feed flow rate to the LC reactor from about 30 to about 60 mL/min had little impact on the $CO_2$ utilization efficiency.

TABLE 32

Data on Carbon Dioxide Utilization

| Test ID | Feed | | Li Converted g | $CO_2$ | | Utilization % |
|---|---|---|---|---|---|---|
| | Used L | Li tenor g/L | | Needed kg | Used kg | |
| Start-up | 3.0 | 15.1 | 45.4 | 0.14 | 0.1 | 119.8 |
| Day 1 Cont | 21.7 | 15.1 | 328.3 | 1.04 | 1.3 | 78.5 |
| Day 1 total | 24.7 | 15.1 | 373.7 | 1.18 | 1.4 | 81.9 |
| Night 1 | 27.4 | 15.1 | 413.6 | 1.31 | 1.4 | 95.3 |
| Day 2 | 30.0 | 15.3 | 459.5 | 1.46 | 1.6 | 91.6 |
| Night 2 Cont1 | 18.8 | 15.3 | 287.7 | 0.91 | 1.0 | 95.5 |
| Night 2 Batch | 2.94 | 15.3 | 45.0 | 0.14 | 0.2 | 78.0 |

TABLE 32-continued

Data on Carbon Dioxide Utilization

| Test ID | Feed | | Li Converted g | $CO_2$ | | Utilization % |
|---|---|---|---|---|---|---|
| | Used L | Li tenor g/L | | Needed kg | Used kg | |
| Night 2 | 26.2 | 15.3 | 401.5 | 1.27 | 1.4 | 92.2 |
| Day 3 60 mL/min | 19.1 | 14 | 267.0 | 0.85 | 1.0 | 82.2 |
| Day 3 total | 34.1 | 14 | 477.1 | 1.51 | 1.8 | 84.6 |
| Night 3 | 41.9 | 14.3 | 598.8 | 1.90 | 2.15 | 88.2 |
| Overall PP | 184.4 | | 2769.5 | 8.78 | 9.7 | 90.2 |

The assay data of the lithium carbonate solids produced during pilot plant are summarized in Tables 33 and 34.

Lithium carbonate samples from all batches, except "LC solids batch 13R" (Table 33), met the required specifications for lithium carbonate of about 99.9% purity. The $Li_2CO_3$ solids from batches "LC solids batch 12" and "LC solids batch 13R" were re-pulped and rewashed in an attempt to reduce the Na and K content of the solids. Dried products were submitted for assay. The re-pulped lithium carbonate contained significantly lower amounts of Na and K. It follows from the washing test that Na and K, can be removed from lithium carbonate solids by additional washing.

TABLE 33

Assay Results for $Li_2CO_3$ Solids Harvested from LC Circuit

| Sample ID | Elements, % | | | |
|---|---|---|---|---|
| | Na | K | Ca | Mg |
| LC Solids Batch 1 | 0.007 | <0.002 | 0.0025 | <0.00007 |
| LC Solids Batch 2 | 0.009 | <0.002 | 0.0028 | <0.00007 |
| LC Solids Batch 3 | 0.014 | <0.002 | 0.0023 | <0.00007 |
| LC Solids Batch 4 | 0.007 | <0.002 | 0.0026 | <0.00007 |
| LC Solids Batch 5 | 0.006 | <0.002 | 0.0025 | <0.00007 |
| LC Solids Batch 6 | 0.004 | <0.002 | 0.0027 | <0.00007 |
| LC Solids Batch 7 | 0.004 | <0.002 | 0.0028 | <0.00007 |
| LC Solids Batch 8 | 0.013 | <0.002 | 0.0021 | <0.00007 |
| LC Solids Batch 9 | 0.011 | <0.002 | 0.0026 | <0.00007 |
| LC Solids Batch 10 | 0.010 | <0.002 | 0.0025 | <0.00007 |
| LC Solids Batch 11 | 0.012 | <0.002 | 0.0028 | <0.00007 |
| LC Solids Batch 12 | 0.032 | 0.002 | 0.0027 | <0.00007 |
| Repulped Batch 12 | 0.007 | <0.002 | 0.0026 | <0.00007 |
| LC Solids Batch 13 R | 0.042 | 0.003 | 0.0055 | <0.00007 |
| Repulped Batch 13 R | 0.024 | <0.002 | 0.0052 | <0.00007 |
| LC Solids Batch 14R | 0.009 | <0.002 | 0.0028 | <0.00007 |
| Post LC Prod | 0.011 | <0.002 | 0.0042 | <0.00007 |

TABLE 34

Assay Results for $Li_2CO_3$ Solids Harvested from DC Circuit

| Sample ID | Elements, % | | | |
|---|---|---|---|---|
| | Na | K | Ca | Mg |
| DC Solids Batch 1 | <0.002 | <0.002 | 0.003 | <0.00007 |
| DC Solids Batch 2 | <0.002 | <0.002 | 0.0019 | <0.00007 |
| DC Solids Batch 3 | <0.002 | <0.002 | 0.0019 | <0.00007 |
| DC Solids Batch 4 | <0.002 | <0.002 | 0.0014 | <0.00007 |
| DC Solids Batch 5 | <0.002 | <0.002 | 0.0019 | <0.00007 |
| DC Solids Batch 6 R | 0.009 | <0.002 | 0.0083 | <0.00007 |

TABLE 35

Assay data for combined Li₂CO₃ products

| Analyte | Spec | LC Prod Low Na | LC Prod High Na | DC Prod Low Ca | DC Prod High Ca | LC Post Solids |
|---|---|---|---|---|---|---|
| Na | <400 ppm | 60 | 100 | <20 | 70 | 100 |
| Sulphur (S) | <200 ppm | <100 | <100 | <100 | <100 | <100 |
| Chlorides (Cl) | <100 ppm | 19 | 14 | 22 | 21 | 22 |
| Ca | <100 ppm | 28 | 28 | 18 | 64 | 49 |
| Mg | <100 ppm | <0.7 | <0.7 | <0.7 | <0.7 | <0.7 |
| K | <50 ppm | <20 | <20 | <20 | <20 | <20 |
| B | <10 ppm | <4 | <4 | <4 | <4 | <4 |
| Fe | <5 ppm | <2 | <2 | <2 | <2 | <2 |
| Cr | <5 ppm | <1 | <1 | <1 | <1 | <1 |
| Ni | <5 ppm | <1 | <1 | <1 | <1 | <1 |
| Cu | <5 ppm | <1 | <1 | <1 | <1 | <1 |
| Pb | <5 ppm | <0.2 | 0.4 | <0.2 | <0.2 | <0.2 |
| Al | <5 ppm | <4 | <4 | <4 | <4 | <4 |
| Zn | <5 ppm | <1 | 1 | <1 | <1 | <1 |
| Mn | <5 ppm | <0.4 | <0.4 | <0.4 | <0.4 | <0.4 |
| Li₂CO₃ Grade, % | >99.5% | 99.9893 | 99.9858 | 99.994 | 99.9845 | 99.9829 |
| LOD @ 110° C., % | | 0.35 | 0.42 | 0.32 | 0.29 | 0.33 |
| LOI @ 500° C., % | | 0.58 | 0.47 | <0.1 | <0.1 | 0.5 |

Note:
Li₂CO₃ grade determined by difference

Moreover, the DC circuit product has a finer particle size than the solids from the LC circuit: about 80% of particles in the DC product are under about 57 μm compared to about 80% being under about 104 μm in the LC product.

A mass balance of the overall pilot plant is summarized in Table 36. It is evident from the data provided in the table that about 88% of the lithium was converted to the lithium carbonate solids. Sodium and potassium does not precipitate with lithium carbonate.

TABLE 36

Mass Balance Summary:

| Materials | Vol L | Wt g | Li | Na | K | Ca |
|---|---|---|---|---|---|---|
| | | | Assays mg/L, g/t, % | | | |

IN

| Materials | Vol L | Wt g | Li | Na | K | Ca |
|---|---|---|---|---|---|---|
| Feed Day 1 | 39.0 | | 15100 | 3830 | 110 | 3.2 |
| Feed Day 2 | 58.0 | | 15300 | 3780 | 123 | 3.8 |
| Feed Day 3 | 65.8 | | 14000 | 3640 | 112 | 3.2 |
| Feed Day 4 | 21.6 | | 14300 | 3630 | 120 | 3.7 |
| CO₂ | 4954 | | 0 | 0.00 | 0.00 | 0.00 |

OUT

| Materials | Vol L | Wt g | Li | Na | K | Ca |
|---|---|---|---|---|---|---|
| DC Bleed | 161.5 | | 1390 | 4010 | 103 | 1.4 |
| DC filtrate | 2.6 | | 1680 | 4320 | 129 | 1.3 |
| LC filtrate | 0.4 | | 3060 | 3680 | 109 | 1.7 |
| Post LC filtrate | 2.1 | | 1300 | 3860 | 119 | <0.9 |
| Wash | 46.1 | | 1850 | 851 | 25 | 1 |
| Post LC wash | 1.0 | | 1890 | 851 | 25 | 1 |
| LC Prod Low Na | | 4023 | 17.9 | 0.01 | <0.002 | 28 |
| LC Prod High Na | | 4310 | 18.3 | 0.01 | <0.002 | 28 |
| DC Prod Low Ca | | 1168 | 18.8 | <0.002 | <0.002 | 18 |
| DC Prod High Ca | | 1306 | 19.2 | 0.01 | <0.002 | 64 |
| LC Post Solids | | 881.6 | 17.9 | 0.01 | <0.002 | 49 |
| Scale solids | | 829.4 | 19.2 | 0.01 | <0.002 | 64 |

| Materials | Wt kg | Weights, g | | | |
|---|---|---|---|---|---|
| | | Li | Na | K | Ca |

IN

| Materials | kg | Li | Na | K | Ca |
|---|---|---|---|---|---|
| Feed Day 1 | 41.2 | 588.5 | 149.3 | 4.3 | 0.1 |
| Feed Day 2 | 61.3 | 887.1 | 219.2 | 7.1 | 0.2 |

TABLE 36-continued

Mass Balance Summary:

| Materials | kg | Li | Na | K | Ca |
|---|---|---|---|---|---|
| Feed Day 3 | 69.6 | 921.8 | 239.7 | 7.4 | 0.2 |
| Feed Day 4 | 22.8 | 308.4 | 78.3 | 2.6 | 0.1 |
| CO2 | 9.7 | 0 | 0 | 0 | 0 |
| Sum IN | 205 | 2706 | 686 | 21.4 | 0.64 |

OUT

| Materials | kg | Li | Na | K | Ca |
|---|---|---|---|---|---|
| DC Bleed | 163.5 | 224.5 | 647.6 | 16.6 | 0.2 |
| DC filtrate | 2.6 | 4.31 | 11.1 | 0.33 | 0.003 |
| LC filtrate | 0.4 | 1.1 | 1.3 | 0.04 | 0.001 |
| Post LC filtrate | 2.2 | 2.8 | 8.3 | 0.3 | 0 |
| Wash | 46.6 | 85.4 | 39.3 | 1.2 | 0.05 |
| Post LC wash | 1.0 | 1.9 | 0.9 | 0.0 | 0.001 |
| LC Prod Low Na | 4.0 | 720 | 0.2 | 0 | 0.1 |
| LC Prod High Na | 4.3 | 789 | 0.4 | 0 | 0.1 |
| DC Prod Low Ca | 1.2 | 220 | 0 | 0 | 0.02 |
| DC Prod High Ca | 1.3 | 251 | 0.1 | 0 | 0.1 |
| LC Post Solids | 0.9 | 158 | 0.1 | 0 | 0.04 |
| Scale solids | 0.8 | 159 | 0.1 | 0 | 0.1 |
| Sum OUT | 170 | 2616 | 709 | 18.4 | 0.7 |
| IN − OUT | 35.1 | 89.9 | −22.9 | 3.0 | −0.1 |
| Accountability % | 82.9 | 96.7 | 103.3 | 86.1 | 111.9 |

Distribution %

Calculated Head

| | | | | |
|---|---|---|---|---|
| Solids | 87.8 | 0.1 | 0.0 | 61.0 |
| Spent | 8.9 | 94.2 | 93.7 | 32.3 |
| Wash | 3.3 | 5.7 | 6.3 | 6.6 |
| Sumcheck | 100 | 100 | 100 | 100 |

It was thus demonstrated that sparging a lithium hydroxide solution with carbon dioxide gas is an effective method for conversion of lithium hydroxide to high-purity and high quality lithium carbonate. In fact, the average carbon dioxide utilization efficiency of the process was about 90%. It was also demonstrated that lithium carbonate production from lithium hydroxide could operate in a continuous manner. A lithium carbonate production process comprising: i) lithium hydroxide carbonization and ii) lithium bicarbonate decomposition and precipitation, was shown to be efficient. Both (i) and (ii) produced a high grade lithium carbonate product. The pilot plant produced about 12.5 kg of lithium carbonate solids having a $Li_2CO_3$ grade of >99.9%. The achieved Li conversion from LiOH to $Li_2CO_3$ was about 88%. Sodium and potassium did not co-precipitate with the $Li_2CO_3$.

EXAMPLE 4

Alternate process using ammonia to neutralize acid.

Applicant has previously shown in U.S. 61/788,292 (hereby incorporated by reference in its entirety) that lithium hydroxide can be successfully recovered at high efficiencies from a lithium sulfate process stream at temperatures of about 40° C. or about 60° C., using electrolysis with a Nafion 324 cation exchange membrane and either an Asahi AAV or a Fumatech FAB anion exchange membrane. In both cases, sulfuric acid was produced as a coproduct. An alternate process where ammonium sulfate is produced instead of sulfuric acid may be useful and the present disclosure details work demonstrating its feasibility. Tests were performed using a similar electrolysis cell as in U.S. 61/788,292, except that the highly resistive proton-blocking Fumatech™ FAB membrane was replaced with a Neosepta™ AHA membrane. The AHA membrane is an anion membrane manufactured by Astom™ (Japan) with a higher temperature stability (about 80° C.) that have good electrical resistance for sulfate transport.

Current efficiency for hydroxide production (about 80% at about 3 M) matched the highest obtained in the previous studies when the feed was kept at an about neutral pH. Salt production at very high efficiency was initially possible. However, as the batch proceeded the hydroxide inefficiency (about 20%) caused an increase in the feed pH and the hydroxide in the feed competed with sulfate transport across the AHA membrane.

Based on the testing performed in the present studies, a continuous process using Nafion 324 and AHA membranes at about 60° C. would be expected to have the following characteristics, and is compared with results for the known Sulfuric Acid Process in Table 37 below.

TABLE 37

Comparison of Sulfuric Acid and Ammonium Sulfate Processes

| | Sulfuric Acid Process | Ammonium Sulfate Process |
|---|---|---|
| Recommended Process | Batch | Continuous |
| Membranes | N324/FAB | N324/AHA |
| Sulfuric Acid/Ammonium Sulfate | 0.75M | 3M |
| Lithium Hydroxide | 3-3.2M | 3-3.2M |
| Average Current Density | 100 mA/cm$^2$ | 150 mA/cm$^2$ |
| Current Efficiency for Hydroxide | 75% | 80% |
| Cell Voltage in Custom Cell | 6 V | 4.6 V |
| Water Transport: Feed to Base | 8 mol water per mol cation | 8 mol water per mol cation |
| Water Transport: Feed to Acid | <1 mol water per mol cation | 12 mol water per mol cation |

Previous studies (U.S. 61/788,292) have shown that lithium hydroxide can be successfully recovered at high efficiencies from a lithium sulfate process stream at temperatures of about 40° C. or about 60° C., using electrolysis with a Nafion 324 cation exchange membrane and either an Asahi AAV or a Fumatech FAB anion exchange membrane. In both cases, sulfuric acid was produced as a coproduct. The production of sulfuric acid can limit, for example the choice of anion membrane in the system, the acid concentration which can be achieved and the temperature of operation.

Certain anion exchange membranes such as a proton-blocking membrane which has a high resistance especially for sulfate transport such as the Fumatech FAB membrane or a similar membrane, may, for example limit the current density achieved in a process for preparing lithium hydroxide. However, these membranes can be limited to a temperature of about 60° C.

Figure 27:
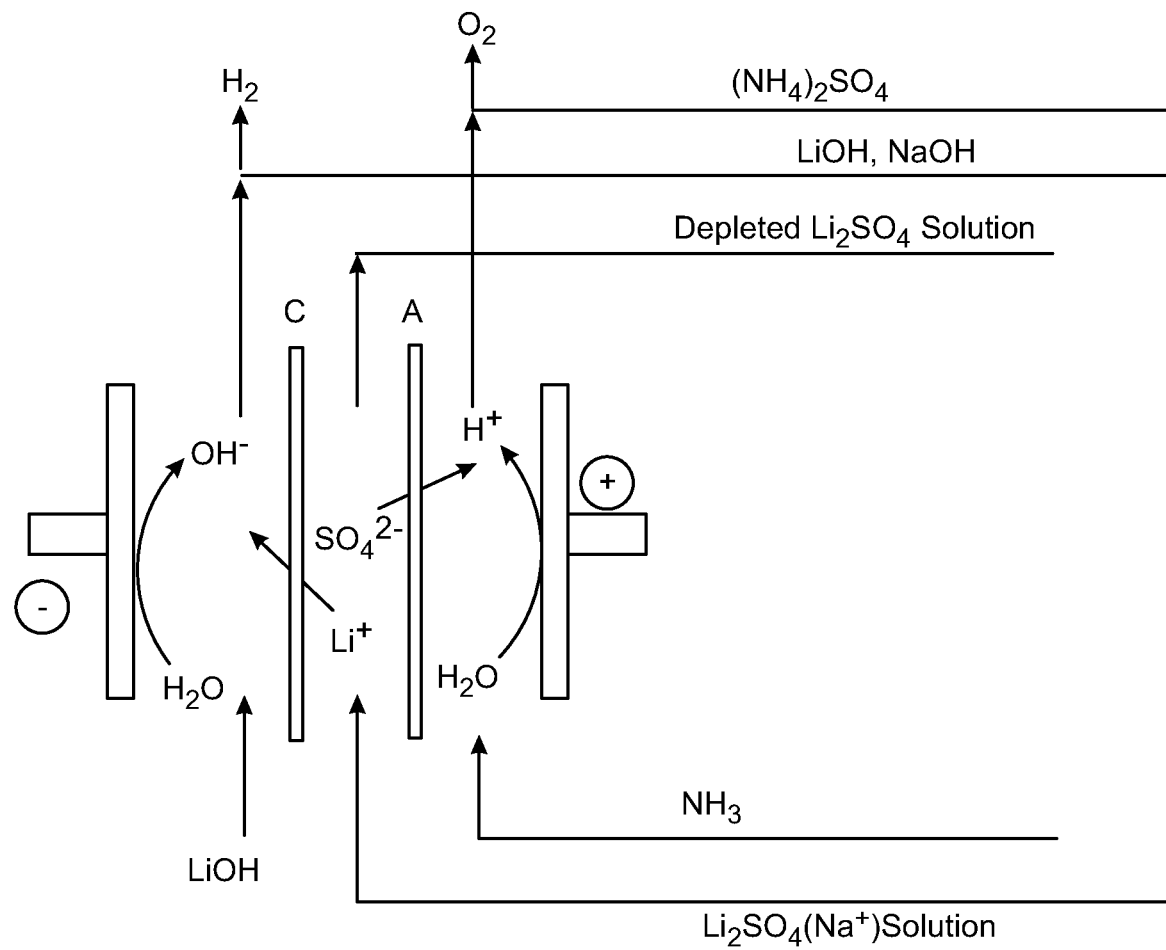
FIG. 27 is a schematic representation of an example of a membrane electrolysis cell that can be used for carrying out another example of a process according to the present disclosure.

Highly concentrated ammonium sulfate (>about 2 M) can be produced in a similar electrolysis cell, and due, for example to the buffering capacity of bisulfate and the ability to dissolve ammonia in solution, it is possible to make the anolyte solution non-acidic as shown in FIG. 27. In this way, proton-blocking anion exchange membranes, for example may not be required and alternative membranes, for example a Neosepta AHA membrane which is capable of running at a temperature of about 80° C. and that should have lower resistance can be used.

Such a process may, for example remove the higher resistance FAB membrane possibly allowing operation at either higher current density (thereby reducing membrane area), lower voltage (thereby reducing power consumption) or a combination of the two. It may also, for example, generate an alternate commercial material. Ammonium sulfate can be sold as an ingredient for fertilizer and should have a higher value than the sulfuric acid. It is also, for example expected to remove more water during the electrolysis from the feed thereby allowing more efficient operation over a wider range of feed conversion. It may also, for example, allow operation of the process at a higher temperature requiring less cooling of solutions. Solutions and membranes are also less resistive at these higher temperatures decreasing power consumption.

The tests performed on this system, where the anion membrane used in the previous process (Fumatech FAB) is replaced by a Neosepata AHA (Astom Corp.) membrane and ammonia is used to control the pH of the "acid" compartment of the cell are summarized below.

The experiments were carried out in an Electrocell MP cell similarly equipped to that used in the previous studies (U.S. 61/788,292) but wherein the anion membrane was replaced with a Neosepta AHA (Astom Corp.) membrane.

The various electrolyte circuits were similar to those used in the previous studies (U.S. 61/788,292), except that pH control was added to the anolyte (acid/salt) circuit. The pH controller actuated a solenoid valve which allowed addition of ammonia gas directly to the anolyte reservoir. Care was taken to not allow the anolyte pH to increase above about 5 as the DSA-$O_2$ coating can be removed at high pH. In addition to those analyses previously performed, ammonium ion was analyzed by cation ion chromatography. All other aspects of the experimental setup were the same as described previously.

During the course of the present studies, experiments of varying duration were performed. These experiments evaluated the effect of temperature, current density, feed conversion, acid/salt concentration, base concentration and pH control strategy on current efficiencies, voltage and water transport. Concentration ranges and current efficiencies are summarized in Table 38. In the first two experiments, the concentration of base and acid/salt were allowed to increase from their starting values. The second experiment ran over two days to provide a greater amount of sulfate removal. In this case, due to volume limitations of the setup, water had to be added to the feed to obtain more than about 90% removal. In the remaining experiments water was only added to the acid and base compartments in an effort to maintain about constant salt and base concentrations (simulating continuous production). Experiments 856-81 through 856-86 were run under about constant acid (about 2.5-3 M sulfate) and base (about 2.8-3.1 M hydroxide) to probe the effect of varying temperature and current density. The final two experiments varied the control pH of the acid compartment in an effort to mediate problems with the resulting feed pH.

TABLE 38

Summary of Results for Ammonium Sulfate Production. Sulfate current efficiency (CE) reported for each of the product streams.

| | | FEED | | | ACID | | BASE | |
|---|---|---|---|---|---|---|---|---|
| Experiment | Conditions | $[SO_4^{2-}]$/M | $SO_4^{2-}$ CE[3] | % REMOVAL | $[SO_4^{2-}]$/M | $SO_4^{2-}$ CE | $[OH^-]$/M | $OH^-$ CE |
| 856-71 | 150 mA/cm$^2$, 60° C., no water | 1.60-1.06 | 94% | 61% | 1.00-1.26 | 93% | 1.43-2.97 | 76% |
| 856-78 | 150 mA/cm$^2$, 60° C., water to base and feed | 1.74-0.18 | 84% | 95% | 2.69-3.37 | 77% | 2.34-3.38 | 77% |
| 856-81 | 150 mA/cm$^2$, 60° C., water to base and acid | 1.77-0.78 | 91% | 80% | 2.95-2.74 | 88% | 2.97-2.79 | 79% |
| 856-84 | 200 mA/cm$^2$, 60° C., water to base and acid | 1.56-0.67 | 80% | 83% | 2.47-2.38 | 88% | 2.79-3.08 | 83% |
| 856-86 | 200 mA/cm$^2$, 80° C., water to base and acid | 1.67-0.63 | 83% | 86% | 2.39-2.63 | 88% | 3.08-2.97 | 80% |
| 856-88 | 200 mA/cm$^2$, 60° C., lower acid pH | 1.73-0.82 | 83% | 78% | 2.53-2.70 | 87% | 2.97-3.20 | 80% |
| 856-90 | cont. 856-88 with new feed | 1.73-0.75 | 72% | 81% | 2.70-3.72 | 75% | 3.20-3.49 | 73% |

Typically the sulfate current efficiency in the feed should equal the sulfate current efficiency in the acid. As shown in Table 38, there is a discrepancy of up to about 8% in some of the experiments. While not wishing to be limited by theory, the majority of this error is likely due to volume measurement error due to hold in the setup, for example when dealing with solutions of high concentration.

FIG. 28A, FIG. 28B, FIG. 28C, FIG. 28D, FIG. 29A, FIG. 29B, FIG. 29C, FIG. 29D, FIG. 29E, FIG. 29F, FIG. 29G, FIG. 30A, FIG. 30B, FIG. 30C, FIG. 30D, FIG. 30E, FIG. 30F, FIG. 30G, FIG. 31A, FIG. 31B, FIG. 31C, FIG. 31D, FIG. 31E, FIG. 31F, FIG. 31G, FIG. 32A, FIG. 32B, FIG. 32C, FIG. 32D, FIG. 32E, FIG. 32F, FIG. 32G, FIG. 33A, FIG. 33B, FIG. 33C, FIG. 33D, FIG. 33E, FIG. 33F, FIG. 33G and FIG. 34 are plots relating to the experiments summarized in Table 38: FIG. 28A, FIG. 28B, FIG. 28C and FIG. 28D relate to experiment 856-71; FIG. 29A, FIG. 29B, FIG. 29C, FIG. 29D, FIG. 29E, FIG. 29F and FIG. 29G relate to experiment 856-78; FIG. 30A, FIG. 30B, FIG. 30C, FIG. 30D, FIG. 30E, FIG. 30F and FIG. 30G relate to experiment 856-81; FIG. 31A, FIG. 31B, FIG. 31C, FIG. 31D, FIG. 31E and FIG. 31F relate to experiment 856-84, FIG. 32A, FIG. 32B, FIG. 32C, FIG. 32D, FIG. 32E, FIG. 32E and FIG. 32G relate to experiment 856-86; FIG. 33A, FIG. 33B, FIG. 33C, FIG. 33D, FIG. 33E, FIG. 33F and FIG. 33G relate to experiment 856-88; and FIG. 34 relates to experiment 856-90. The following sections further discuss the results of the present studies and aspects of the processes.

Lithium Hydroxide Production

The process produced lithium hydroxide at hydroxide concentrations of about 3 M. The efficiency was fairly consistent throughout the testing, giving numbers slightly below about 80% at about 150 mA/cm$^2$, increasing to over about 80% at the higher current density. In the last experiment, the lithium hydroxide concentration was allowed to increase to about 3.5 M and the current efficiency decreased by about 7%. In these experiments, the efficiency is predominantly hydroxide back migration as, unlike the previous studies, the pH of the feed was always greater than about 7 eliminating any proton transport. However, there may also be some inefficiency associated with ammonium transport. As shown in FIG. 30D, the composition of the hydroxide was mostly as lithium/sodium hydroxide with the ratio of lithium and sodium similar to that found in the feed.

Ammonium Sulfate Production

In the majority of the experiments, the ammonium sulfate concentration was kept at about 2.5 to about 3 M sulfate as shown in FIG. 30E, which provided current efficiencies of about 90%. The loss of efficiency could not be accounted for by ammonium back migration. In the first experiment where the ammonium sulfate was at low concentration, very little ammonium was found in the feed (<about 20 mM) which accounts for less than about 1% of the charge. When the ammonium concentration was increased, the ammonium concentration increased to about 100 mM, which is still less than about 2% of the charge. Further analysis suggests that the remaining charge was due to hydroxide transport from the feed to the acid. The hydroxide back migration across the N324 membrane caused the feed pH to increase. Since experiment 856-78 was run to a greater percent removal, the experiment ran for a longer period of time at the higher hydroxide concentration, thereby decreasing the current efficiency of sulfate across the AHA membrane. Further details of this effect and its consequences are discussed in the next section.

Lithium Sulfate Feed Depletion

In the majority of the experiments (except 856-78), no water was added to the feed. Due to limitations of the setup (and time required for larger batches), most experiments were stopped after about 80% conversion. With the amount of water transport, the lithium sulfate concentration was still high at the end of the test as shown in FIG. 30G. If no water transport had occurred, that the end sulfate concentration would have been about 0.35 M.

FIG. 30G also shows the hydroxide concentration in the feed as a function of the charge passed. As shown, even at the end of the experiment, the hydroxide concentration is still increasing as hydroxide back migrates across the N324 membrane from the base. By the end of the experiment, the hydroxide concentration was similar to the sulfate concentration which decreased the efficiency of the process. Eventually, the amount of hydroxide leaving the feed to the acid compartment will equal the amount entering from base and the hydroxide concentration will reach a steady-state. This concentration may approach about 1 M hydroxide concentration.

Experimental Trial at Lower Acid pH (Anolyte pH)

For example, in some experiments of the present studies, the feed pH was allowed to increase due to the hydroxide back migration in the feed. One control method that could be used to circumvent this issue is to add sulfuric acid into the feed to maintain its pH between about 7 and 10. Since the hydroxide production efficiency is about 80%, acid equaling about 20% of the charge would be required.

Alternatively, the pH setpoint on the acid/salt could be modified to allow for some proton back migration. In this case, if the feed pH is above a certain measured setpoint (for example about 9.5, about 9.7 or about 10), then the ammonia addition to the acid is stopped. The pH on the acid drops allowing for proton back migration until the feed pH decreases below the required setpoint. Ammonia is then added to the acid to increase the pH and the process is repeated. The above method allows for self-correction of the process and does not require any external sulfuric acid. It will be appreciated that pH measurement in solutions of high concentration salt may be inaccurate, as the sodium (and lithium) ions may, for example interfere with the measured pH. Typically the measured pH can be a couple of pH units different than the actual pH; typically lower in alkaline salt solutions and higher in acid. It will be appreciated that care must be taken to calibrate and offset for this effect, for example when using pH as a control algorithm. Graphs shown in the present disclosure are as measured.

The last two experiments used this type of control. 856-88 started with about 2.5 M ammonium sulfate at a pH of about 3.5 and was allowed to run without any further ammonia addition. As shown in FIG. 33B, the hydroxide concentration in the feed continued to increase until about half way through the run, and then the concentration started to decrease slightly. This occurred with a measured feed pH of about 10 and a measured acid pH of about 0.5 as shown in FIG. 33C. However, there still had not been enough proton transport to eliminate the feed pH increase. The point at which some conversion had occurred also corresponds to the point where all of the sulfate in the feed had been converted to bisulfate thereby producing some free acid. As shown in FIG. 33E, the ammonium concentration equaled the sulfate concentration at about 1.9 mol of charge (about 2.5 M $(NH_4)HSO_4$).

The final experiment, 856-90, was a continuation of the previous experiment, except that new feed solution was used. As shown in FIG. 34, the feed pH increased slightly and then stabilized before dropping to a pH of about 7, while the acid pH continued to decrease. At about a recorded acid pH of −0.25, the feed pH started to decrease rapidly, and ammonia addition was restarted. The acid pH increased again to a point where proton back migration was limited and the feed pH started to increase. Samples of the acid were taken just before ammonia addition was restarted and after it was stopped. The sample before addition was analyzed as about 3.4 M sulfate with about 0.6 M proton (indicating about 3.1 M $NH_4HSO_4$ plus about 0.3 M $H_2SO_4$). After ammonia addition, the solution was again about 3.4 M sulfate, but contained about 3.3 M bisulfate and about 0.1 M sulfate, indicating that the free proton had been neutralized.

The present tests demonstrated that it is possible to run the process in this way. The current efficiencies for hydroxide production, feed sulfate removal and acid sulfate production (as shown in Table 38) were more closely balanced. However, the caustic strength was slightly higher for this run, making the overall current efficiency closer to about 73%.

The concentration of ammonium in the salt running at a measured pH of about zero is about half the concentration of the same sulfate concentration solution running at a pH of about 3.5 (i.e. $NH_4HSO_4$ instead of $(NH_4)_2SO_4$) which would decrease the amount of ammonium back migration and therefore the amount of ammonium transport into the base.

Cell Voltage and Water Transport

An advantage of the ammonium sulfate system over the sulfuric acid system was the potentially higher current density and lower cell voltage that could be obtained when the highly resistive Fumatech FAB membrane was removed from the process.

Table 39 shows the cell voltage ranges obtained for the current work, requiring about 6 V at about 150 mA/cm$^2$ and about 6.5 V at about 200 mA/cm$^2$. In previous work, a constant cell voltage of about 7.8 V was used to obtain an average current density of about 100 mA/cm$^2$. Therefore higher current densities have been obtained at lower voltages. a cell with about 2 mm solution gaps run as low as about 4.6 V at about 60° C. It will be appreciated that there is less change from the Prodcell to the commercial cell since the feed can be run at higher conductivity. Running the cell at about 80° C. decreased the cell voltage by about 0.6 V when running at about 200 mA/cm$^2$. However, this impact may be less in the commercial cells as the main improvement is in solution conductivity and the commercial cell has smaller solution gaps.

TABLE 39

Cell Voltage Range and Water Transport Numbers.

| Experiment | Conditions | Voltage/ V | Water Transport (mol H$_2$O/mol Q)$^5$ | | |
|---|---|---|---|---|---|
| | | | Feed | Acid | Base |
| 856-71 | 150 mA/cm$^2$, 60° C., no water addition | 6.4-5.5 | 9.3 | 4.4 | 4.7 |
| 856-78 | 150 mA/cm$^2$, 60° C., water addition to base and feed | 5.6-6.3 | 10.9 | 4.4 | 6.2 |
| 856-81 | 150 mA/cm$^2$, 60° C., water addition to base and acid | 5.9-5.8 | 9.6 | 8.8 | 5.9 |
| 856-84 | 200 mA/cm$^2$, 60° C., water addition to base and acid | 6.8-6.4 | 10.7 | 5.9 | 7.5 |
| 856-86 | 200 mA/cm$^2$, 80° C., water addition to base and acid | 6.0-5.7 | 10.2 | 3.8 | 6.5 |
| 856-88 | 200 mA/cm$^2$, 60° C., lower acid pH | 6.0-6.3 | 9.0 | 4.6 | 6.3 |
| 856-90 | cont. 856-88 with new feed | 6.5-6.8 | 8 | 2.4 | 7.7 |

Water transport in this system was fairly high, averaging about 10 mol of water transport per mol of charge (about 22 mol water per mol of lithium sulfate transport). This is about half the water required in order to maintain a constant feed concentration and therefore allow the system to run in a completely continuous process. It may be possible to incorporate a reverse osmosis unit on the feed stream to remove the remaining water, thereby allowing full conversion of the feed. The experiments running at lower acid pH had lower associated water transport. While not wishing to be limited by theory, this effect is likely due to some water transport associated with proton back migration and lower osmotic drag into the acid. Although the sulfate concentration was about the same in the two solutions, there was much less ammonium in the last two experiments.

The water transport numbers are quoted per mole of charge. Per mole of cation in the base, these numbers need to be divided by the current efficiency. Per mole of sulfate into the acid, these numbers need to be multiplied by two and divided by the current efficiency.

Based on the testing performed in the present studies, the process may, for example produce ammonium sulfate at a concentration of about 3 M or higher if lower pH control was used, produce lithium hydroxide at a concentration of about 3 M, have an average current density of about 150 mA/cm$^2$, have a current efficiency of about 80% for hydroxide production, have a cell voltage of about 4.6 V for a custom-designed cell, have water transport from feed to base of about 8 mol water per mol cation and have water transport from feed to acid/salt of about 12 mol water per mol sulfate or less if a lower pH on acid is used, for example.

When compared to the previous sulfuric acid process, these conditions may, for example decrease the required cell area for a plant producing about 3 tonne/hour of LiOH, by over about 35%. It may also, for example decrease the power consumption for a commercially designed cell from about 8.9 kWh/kg of LiOH to about 6.4 kWh/kg of LiOH (in an about 3 M solution). It also may, for example produce between about 8-10 tonne/hour of ammonium sulfate (dry basis) depending on the feed pH control regime.

Hydroxide back migration across the N324 membrane increases the pH of the feed. This transport may affect the overall process and different control strategies may be used to provide steady operation. Three different control strategies may, for example be used:

For example sulfuric acid may be used to control the feed pH around a neutral to slightly basic pH (about 7-9). This method, for example require an additional control circuit and may, for example require purchase of sulfuric acid. The additional sulfuric acid purchased is converted into ammonium sulfate. Lithium hydroxide production may still be at about 80% current efficiency and ammonium sulfate may be between about 90%-100%. An inefficiency may be ammonium back-migration across the AHA. This option may be useful if, for example a suitable sulfuric acid source, and an outlet for the ammonium sulfate produced exists.

For example, no remediation may be performed and the feed pH may increase until the inefficiency of hydroxide across the AHA matches that of hydroxide across the N324. This may, for example make both lithium hydroxide and ammonium sulfate efficiencies the same. Although it may be the easiest to implement, the stability of the anion exchange membrane in high pH solution and temperature may, for example need to be considered. For example, a base stable anion exchange membrane may be used.

For example, variation in the pH of the ammonium sulfate may be allowed so that some proton back-migration is allowed. If the feed pH increases the amount of ammonia added to the acid/salt is stopped, proton is produced at the anode until enough proton has migrated across the AHA to bring the feed pH lower, and then ammonia addition occurs again. This method again matches lithium hydroxide and ammonium sulfate production, but may keep the pH at the AHA low. It also, for example has a benefit of running the acid/salt with a lower ammonium concentration. For example, an about 3 M sulfate solution might comprise about 0.5 M sulfuric acid with about 2.5 M ammonium bisulfate at a pH of about zero, but may comprise almost about 6 M ammonium sulfate at pH of about 4. This may, for example decrease the amount of ammonium back migration on the AHA membrane. The acid/salt solution could then, for example be post neutralized with ammonia to produce the required about 3 M $(NH_4)_2SO_4$ solution. Higher sulfate concentrations could also, for example be used.

While a description was made with particular reference to the specific embodiments, it will be understood that numerous modifications thereto will appear to those skilled in the art. Accordingly, the above description and accompanying drawings should be taken as specific examples and not in a limiting sense.

What is claimed is:

1. A process for preparing lithium carbonate, said process comprising:

reacting an acidic aqueous composition comprising Li$^+$ and at least one metal ion with a base so as to obtain a pH of about 4.5 to about 6.5 and thereby at least partially precipitating said at least one metal ion under the form of at least one hydroxide so as to obtain a precipitate comprising said at least one hydroxide and an aqueous composition comprising Li$^+$ and having a reduced content of said at least one metal ion, and separating said aqueous composition from said precipitate;

optionally reacting said aqueous composition comprising Li$^+$ and having said reduced content of said at least one metal ion with another base so as to obtain a pH of about 9.5 to about 11.5, and with optionally at least one metal carbonate, thereby at least partially precipitating at least one metal ion optionally under the form of at least one carbonate so as to obtain a precipitate optionally comprising said at least one carbonate and an aqueous composition comprising Li$^+$ and having a reduced content of said at least one metal ion, and separating said aqueous composition from said precipitate;

contacting said aqueous composition comprising Li$^+$ and having a reduced content of said at least one metal ion with an ion exchange resin so as to at least partially remove at least one metal ion from said composition, thereby obtaining an aqueous composition comprising a lithium compound;

submitting said aqueous composition comprising said lithium compound to an electrodialysis or an electrolysis under conditions suitable for converting at least a portion of said lithium compound into lithium hydroxide; and converting said lithium hydroxide into lithium carbonate.

2. The process of claim 1, wherein said acidic aqueous composition comprising Li$^+$ and at least one metal ion is reacted with said base so as to obtain a pH of about 5.0 to about 6.2.

3. The process of claim 1, wherein said at least one metal ion comprised in said acidic aqueous composition that is reacted with said base so as to obtain a pH of about 4.5 to about 6.5 is chosen from $Fe^{2+}$, $Fe^{3+}$ and $Al^{3+}$.

4. The process of claim 1, wherein said process comprises reacting said aqueous composition comprising Li$^+$ and having said reduced content of said at least one metal ion with said another base so as to obtain a pH of about 9.5 to about 11.5.

5. The process of claim 1, wherein said acidic aqueous composition comprises $Li^+$, said at least one metal ion and sulfuric acid.

6. The process of claim 1, wherein said acidic aqueous composition comprises $Li^+$, sulfuric acid and at least three metal ions.

7. The process of claim 1, wherein said acidic aqueous composition comprises $Li^+$, sulfuric acid and at least three metal ions chosen from the following metals: iron, aluminum, manganese and magnesium.

8. The process of claim 1, wherein said acidic aqueous composition comprises $Li^+$, sulfuric acid and at least three metal ions chosen from $Al^{3+}$, $Fe^{2+}$, $Fe^{3+}$, $Mg^{2+}$, $Ca^{2+}$, $Cr^{2+}$, $Cr^{3+}$, $Cr^{6+}$, $Zn^{2+}$ and $Mn^{2+}$.

9. The process of claim 1, wherein said acidic aqueous composition is obtained by leaching a lithium-containing material with sulfuric acid.

10. The process of claim 1, wherein said acid aqueous composition is obtained by leaching an acid roasted lithium-containing material with water.

11. The process of claim 1, wherein said acidic aqueous composition comprising $Li^+$ and having said reduced content of said at least one metal ion is reacted with said another base over a period of time sufficient for reducing the content of said at least one metal ion in said aqueous composition below a predetermined value.

12. The process of claim 11, wherein said reaction is carried out over a period of time sufficient for reducing the content of $Ca^{2+}$ below about 200 mg/L.

13. The process of claim 1, wherein said process comprises submitting said acidic aqueous composition comprising said lithium compound to said electrodialysis.

14. The process of claim 13, wherein said lithium compound is lithium sulfate.

15. The process of claim 1, wherein said process comprises submitting said acidic aqueous composition comprising said lithium compound to said electrolysis.

16. The process of claim 15, wherein said lithium compound is lithium sulfate.

17. The process of claim 1, wherein said aqueous composition comprising $Li^+$ and at least one metal ion is reacted with said base so as to obtain a pH of about 5.0 to about 6.2.

18. The process of claim 1, wherein during said electrodialysis or electrolysis, said pH is at least substantially maintained at a value of about 11 to about 12.

19. The process of claim 1, wherein said electrodialysis or said electrolysis is carried out in a three-compartment membrane cell.

20. The process of claim 1, wherein said electrodialysis or said electrolysis is carried out in a two-compartment membrane cell.

* * * * *